United States Patent
Wang et al.

(10) Patent No.: US 10,954,392 B2
(45) Date of Patent: Mar. 23, 2021

(54) REACTIVE NAVY TO BLACK DYE COMPOSITION AND DYE PRODUCT THEREOF

(71) Applicants: Zhejiang Keyong Chemical Co., Ltd., Zhejiang (CN); Shanghai Kehua Dyestuff Industry Co., Ltd., Shanghai (CN)

(72) Inventors: Xiaohong Wang, Zhejiang (CN); Haobing Chen, Zhejiang (CN); Shihua Li, Zhejiang (CN); Renliang Wang, Zhejiang (CN); Junfeng Zhou, Zhejiang (CN); Guixiang Zhang, Zhejiang (CN); Huaiqing Gao, Zhejiang (CN)

(73) Assignees: ZHEJIANG KEYONG CHEMICAL CO., LTD., Zhejiang (CN); SHANGHAI KEHUA DYESTUFF INDUSTRY CO., LTD., Shanghai (CN)

( * ) Notice: Subject to any disclaimer, the term of this patent is extended or adjusted under 35 U.S.C. 154(b) by 0 days.

(21) Appl. No.: 16/632,207

(22) PCT Filed: Jul. 30, 2018

(86) PCT No.: PCT/CN2018/097754
§ 371 (c)(1),
(2) Date: Jan. 17, 2020

(87) PCT Pub. No.: WO2019/020122
PCT Pub. Date: Jan. 31, 2019

(65) Prior Publication Data
US 2020/0283634 A1 Sep. 10, 2020

(30) Foreign Application Priority Data
Jul. 28, 2017 (CN) .......................... 201710632965.6

(51) Int. Cl.
C09B 67/22 (2006.01)
C09B 62/513 (2006.01)
(52) U.S. Cl.
CPC ........ C09B 67/0059 (2013.01); C09B 62/513 (2013.01)
(58) Field of Classification Search
None
See application file for complete search history.

(56) References Cited

U.S. PATENT DOCUMENTS

| | | | |
|---|---|---|---|
| 6,086,639 A | 7/2000 | Steckelberg et al. | |
| 7,390,889 B1 | 6/2008 | Chen et al. | |

FOREIGN PATENT DOCUMENTS

| | | |
|---|---|---|
| CN | 1730566 A | 2/2006 |
| CN | 1745147 A | 3/2006 |
| CN | 101029184 A | 9/2007 |
| CN | 101362864 A | 2/2009 |
| CN | 101735662 A | 6/2010 |
| CN | 102245712 A | 11/2011 |
| CN | 102876084 A | 1/2013 |
| CN | 103013175 A | 4/2013 |
| CN | 103351644 A | 10/2013 |
| CN | 104059387 A | 9/2014 |
| CN | 104073024 A | 10/2014 |
| CN | 105542510 A | 5/2016 |
| CN | 107501995 A | 12/2017 |
| CN | 107501997 A | 12/2017 |

*Primary Examiner* — Joseph R Kosack
(74) *Attorney, Agent, or Firm* — Muncy, Geissler, Olds & Lowe, P.C.

(57) ABSTRACT

A reactive navy to black dye composition comprises component A and component B, wherein component A is selected from one or more compounds of formula (I), component B is selected from one or more compounds of formula (II); $D^1$ and $D^2$ are each independently a group represented by the following formula (a) or (b) or (c); $R^1$-$R^{12}$ are each independently selected from the group consisting of H, linear or branched $C_1$~$C_4$ alkyl, $C_1$~$C_4$ alkoxy and sulfo; m, n=0-3, and every $R^3$ is each independently selected from the group consisting of amino, sulfo, ureido, $C_1$~$C_4$ alkanoylamino, $C_1$~$C_4$ alkoxy and $C_1$~$C_4$ alkyl, every $R^6$ is each independently selected from the group consisting of amino, hydroxyl and sulfo; $X^1$-$X^3$ are each independently selected from the group consisting of H, $C_1$~$C_4$ alkyl, $C_1$~$C_4$ alkoxy, —$SO_2Y^1$, —$NHCO(CH_2)_p SO_2Y^2$ and —$CONH(CH_2)_q SO_2Y^3$, and at least one of $D^1$ and $D^2$ contains a fiber-reactive group, p, q=1-3, and $Y^1$~$Y^5$ are each independently selected from the group consisting of —CH=$CH_2$, —$C_2H_4OSO_3H$ and —$CH_2CH_2Cl$. A reactive navy to black dye product comprising the dye composition, has the properties of good washing fastness, high degree of fixation and dye-uptake, good build-up, clear remanent dyeing liquor, and the like.

(Continued)

-continued
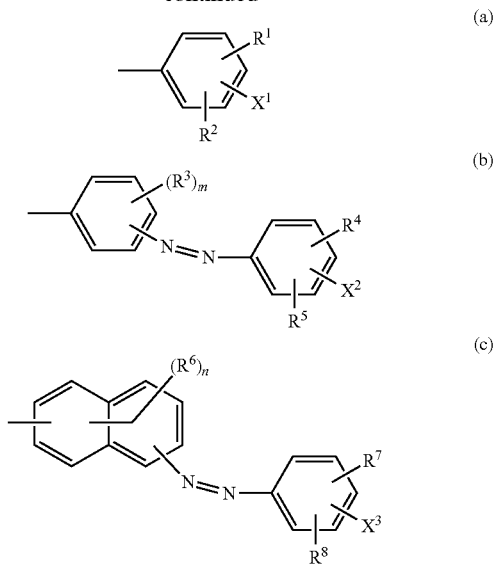
21 Claims, 4 Drawing Sheets

REACTIVE NAVY TO BLACK DYE COMPOSITION AND DYE PRODUCT THEREOF

TECHNICAL FIELD

The present invention relates to a reactive dye composition and dye product thereof, especially to a reactive navy to black dye composition suitable for printing and dyeing of nitrogen-containing and/or hydroxyl-containing fiber materials, and dye product thereof.

BACKGROUND ART

Reactive black KNB has become the most widely used black reactive dye due to its low price, good fastness and easy washing. However, the dye has low substantativity to fiber, and its dye-uptake and degree of fixation are not high. In view of the shortcomings of the reactive black KNB, dye researchers have done a lot of work in the research and development of reactive black dyes in recent years. In the actual application process, existing color matching products of the reactive black dye, such as described in patents CN102245712A, CN1730566A, CN1745147A, and the like, still have problems such as poor build-up, low dye-uptake and degree of fixation, and difficulty in cleaning the dyed fabric.

SUMMARY OF THE INVENTION

To solve the above problems, the object of the present invention is to provide a reactive navy to black dye composition and dye product thereof with properties such as good washing fastness, high degree of fixation and dye-uptake, good build-up and clear remanent dyeing liquor, which is suitable for printing and dyeing of nitrogen-containing and/or hydroxyl-containing fiber materials and blended fabrics thereof.

In order to achieve the above object, the present invention adopts the technical solution as follows:

The present invention provides a reactive navy to black dye composition, comprising component A and component B, wherein component A is selected from one or more dye compounds of formula (I), component B is selected from one or more dye compounds of formula (II); based on component A and component B, component A has a mass percentage of 5% to 50%, and component B has a mass percentage of 50% to 95%;

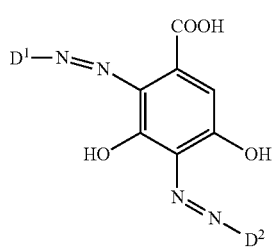

(I)

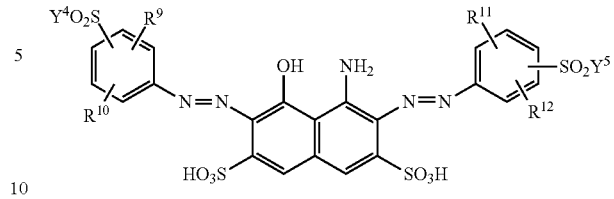

(II)

in formula (I):
$D^1$ and $D^2$ are each independently a group represented by the following formula (a) or (b) or (c);

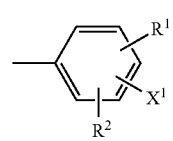

(a)

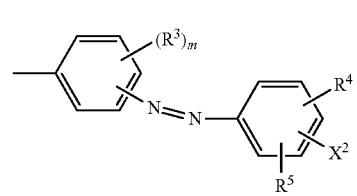

(b)

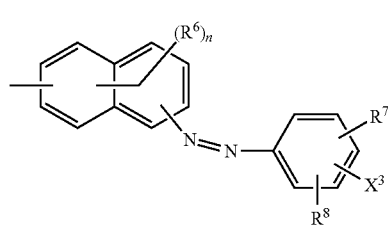

(c)

in the above formulae (a)~(c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and every $R^3$ is each independently selected from the group consisting of amino, sulfo, ureido, $C_1$~$C_4$ alkanoylamino, $C_1$~$C_4$ alkoxy and $C_1$~$C_4$ alkyl; n=0-3, and every $R^6$ is each independently selected from the group consisting of amino, hydroxyl and sulfo; $X^1$, $X^2$ and $X^3$ are each independently H, linear or branched $C_1$~$C_4$ alkyl, $C_1$~$C_4$ alkoxy, —$SO_2Y^1$, —NHCO$(CH_2)_pSO_2Y^2$ or —CONH$(CH_2)_qSO_2Y^3$, and at least one of $D^1$ and $D^2$ contains a fiber-reactive group, that is, —$SO_2Y^1$, —NHCO$(CH_2)_pSO_2Y^2$ or —CONH$(CH_2)_qSO_2Y^3$, wherein p=1-3, q=1-3, and $Y^1$~$Y^3$ are each independently —CH=$CH_2$, —$C_2H_4OSO_3H$ or —$CH_2CH_2Cl$; in formula (II):
$R^9$, $R^{10}$, $R^{11}$ and $R^{12}$ are each independently H, linear or branched $C_1$~$C_4$ alkyl, $C_1$~$C_4$ alkoxy or sulfo; $Y^4$ and $Y^5$ are each independently —CH=$CH_2$, —$C_2H_4OSO_3H$ or —$C_2H_4Cl$.

In the present invention, the linear or branched $C_1$~$C_4$ alkyl can be methyl, ethyl, n-propyl, isopropyl, n-butyl, isobutyl, tert-butyl, etc.; the $C_1$~$C_4$ alkoxy can be methoxy, ethoxy, n-propoxy, isopropoxy, n-butoxy, isobutoxy, tert-butoxy, etc.; the $C_1$~$C_4$ alkanoylamino can be formylamino, acetylamino, n-propionylamino, isopropionylamino, n-butyrylamino, isobutyrylamino, tert-butyrylamino, etc.

Preferably, the reactive navy to black dye composition comprises component A and component B, wherein component A is selected from one or more dye compounds of formula (IA), component B is selected from one or more dye compounds of formula (II); based on component A and component B, component A has a mass percentage of 5% to 50%, and component B has a mass percentage 50% to 95%;

(IA)

[Structure of formula (IA): D¹—N=N group attached to a benzene ring with COOH, HO, OH substituents, and N=N—D² group]

(II)

[Structure of formula (II): naphthalene-based bis-azo dye with Y⁴O₂S, R⁹, R¹⁰, OH, NH₂, R¹¹, R¹², SO₂Y⁵, HO₃S, SO₃H substituents]

in formula (IA):

D¹ and D² are each independently a group represented by the following formula (a) or (b) or (c);

(b)

[Structure with R¹, R², X¹ substituents on a benzene ring]

(a)

[Structure with (R³)ₘ, R⁴, R⁵, X² substituents on two benzene rings connected by N=N]

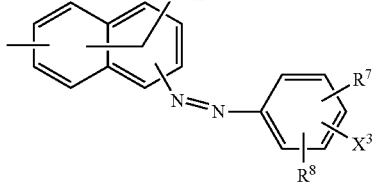

(c)

in the above formulae (a), (b) and (c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and every $R^3$ is each independently selected from the group consisting of sulfo, ureido and $C_1$~$C_4$ alkanoylamino; n=0-3, and every $R^6$ is each independently selected from the group consisting of hydroxyl and sulfo; $X^1$, $X^2$ and $X^3$ are each independently —$SO_2Y^1$, —$NHCO(CH_2)_pSO_2Y^2$ or —$CONH(CH_2)_q SO_2Y^3$, wherein p=1-3, q=1-3, and $Y^1$~$Y^3$ are each independently —$CH=CH_2$, —$C_2H_4OSO_3H$ or —$CH_2CH_2Cl$;

in formula (II):

$R^9$, $R^{10}$, $R^{11}$ and $R^{12}$ are each independently H, linear or branched $C_1$~$C_4$ alkyl, $C_1$~$C_4$ alkoxy or sulfo; $Y^4$ and $Y^5$ are each independently —$CH=CH_2$, —$C_2H_4OSO_3H$ or —$C_2H_4Cl$.

Further, both D¹ and D² are the group of the general formula (a) wherein the substituents are the same or different; or D¹ is selected from the group of formula (a), and D² is selected from the group of formula (b) or formula (c).

Further, $R^1$, $R^2$, $R^4$, $R^5$, $R^7$ and $R^8$ are each independently preferably selected from the group consisting of H, methyl, methoxy and sulfo.

Further, every $R^3$ is each independently preferably selected from the group consisting of methyl, sulfo, ureido and acetylamino.

Further, $R^9$, $R^{10}$, $R^{11}$ and $R^{12}$ are each independently preferably selected from the group consisting of H, methyl, methoxy and sulfo.

Further, the reactive navy to black dye composition consists of component A and component B.

Further, the reactive navy to black dye composition comprises component C, and component C is selected from one or more compounds of formulae (III)~(VI), in the composition, the mass of component C is 1% to 50%, preferably is 5% to 40%, of the total mass of component A and component B, (III)

[Structure of formula (III): bis-azo compound with R¹³, R¹⁴, (Y⁶O₂S)ᶜ, (D³)ₐ, NH₂, NH₂, SO₃H, (D⁴)ᵦ, R¹⁵, R¹⁶, (SO₂Y⁷)ᵈ substituents]

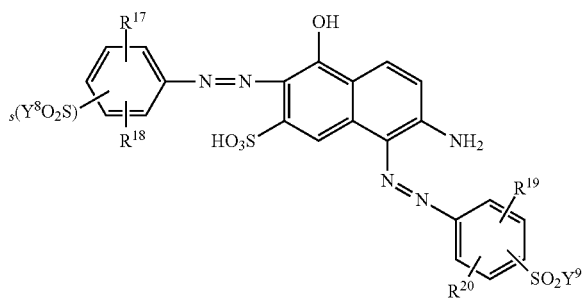
(IV)

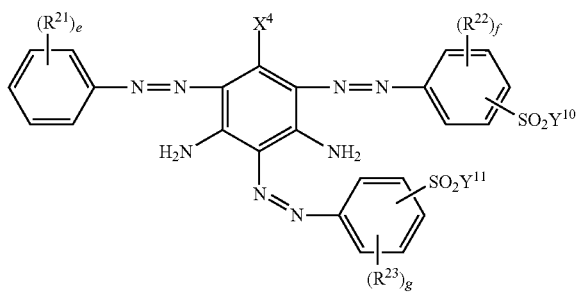
(V)

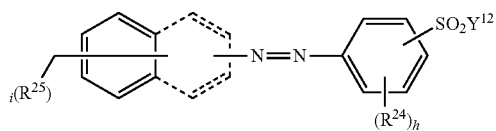
(VI)

in formula (III):

$R^{13}$, $R^{14}$, $R^{15}$ and $R^{16}$ are each independently H, linear or branched $C_1$~$C_4$ alkyl, $C_1$~$C_4$ alkoxy, carboxyl or sulfo, preferably $R^{13}$~$R^{16}$ are each independently selected from the group consisting of methyl, methoxy, carboxyl and sulfo; $Y^6$ and $Y^7$ are each independently —CH=CH$_2$, —C$_2$H$_4$OSO$_3$H or —C$_2$H$_4$Cl; a is 0 or 1; b is 0 or 1; c and d are each independently 0 or 1, preferably are 1; each of $D^3$ and $D^4$ is independently substituted phenyl, unsubstituted phenyl, substituted naphthyl or unsubstituted naphthyl, and the number of the substituents of the substituted phenyl and the substituted naphthyl is 1-3, respectively, and each of the substituents is independently selected from the group consisting of amino, sulfo, ureido, $C_1$~$C_4$ alkanoylamino, $C_1$~$C_4$ alkoxy and hydroxyl, preferably the number of the substituents is 1-2, respectively, and each of the substituents is independently selected from the group consisting of amino, sulfo, ureido, acetylamino, methoxy and hydroxyl;

in formula (IV):

$R^{17}$~$R^{20}$ are each independently H, linear or branched $C_1$~$C_4$ alkyl, $C_1$~$C_4$ alkoxy or sulfo, preferably $R^{17}$~$R^{20}$ are each independently selected from the group consisting of H, methyl, methoxy and sulfo; s=0-1, and $Y^8$ and $Y^9$ are each independently selected from the group consisting of —CH=CH$_2$, —C$_2$H$_4$OSO$_3$H and —CH$_2$CH$_2$Cl;

in formula (V):

e, f and g are each independently selected from 0-3, and every $R^{21}$, $R^{22}$ and $R^{23}$ is each independently linear or branched $C_1$~$C_4$ alkyl, $C_1$~$C_4$ alkoxy or sulfo, preferably are methyl, methoxy or sulfo; $X^4$ is hydrogen or carboxyl; and $Y^{10}$ and $Y^{11}$ are each independently —CH=CH$_2$, —C$_2$H$_4$OSO$_3$H or —C$_2$H$_4$Cl;

in formula (VI):

h=0-2, and every $R^{24}$ is each independently linear or branched $C_1$~$C_4$ alkyl, alkoxy or sulfo, preferably is methyl, methoxy or sulfo; i=1-3, and every $R^{25}$ is each independently selected from the group consisting of amino, sulfo, ureido, $C_1$~$C_4$ alkanoylamino, $C_1$~$C_4$ alkoxy and hydroxyl, preferably is amino, sulfo or acetylamino; $Y^{12}$ is —CH=CH$_2$, —C$_2$H$_4$OSO$_3$H or —C$_2$H$_4$Cl.

More further, component C is selected from at least one dye of formula (III) and/or formula (VI), wherein both a and b are 0, or one of a and b is 0 while the other is 1, c is 1, and d is 0 or 1.

Even more further, the reactive navy to black dye composition of the present invention preferably comprises the following components:

component A, which is selected from at least one dye of formula (I), wherein $D^1$ and $D^2$ are each independently the group of the general formula (a), and the substituents are the same or different; or $D^1$ is the group of formula (a), $D^2$ is the group of formula (b) or formula (c); and at least one of $D^1$ and $D^2$ contains —SO$_2$Y$^1$;

component B, which is selected from at least one dye of formula (II);

and component C, which is selected from at least one dye of formula (III) and/or formula (IV), wherein both a and b are 0, or one of a and b is 0 while the other is 1, c is 1, and d is 0 or 1.

More further, the reactive navy to black dye composition comprises component A, component B and component C.

Even more further, the reactive navy to black dye composition preferably comprises the following dye components:

component A, which is selected from at least one dye of formula (I), wherein $D^1$ and $D^2$ are each independently the group of the general formula (a), and the substituents are the same or different; or $D^1$ is the group of formula (a), $D^2$ is the group of formula (b) or formula (c); and at least one of $D^1$ and $D^2$ contains —SO$_2$Y$^1$;

component B, which is selected from at least one dye of formula (II);

and component C, which is selected from at least one dye of formula (III) and/or formula (IV), wherein both a and b are 0, or one of a and b is 0, while the other is 1, c is 1, and d is 0 or 1.

Specifically, component A is preferably selected from one or more dye compounds of the following formulae:
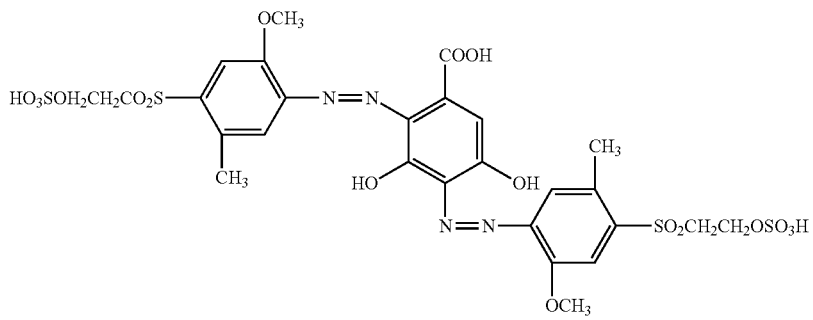
(I-1)
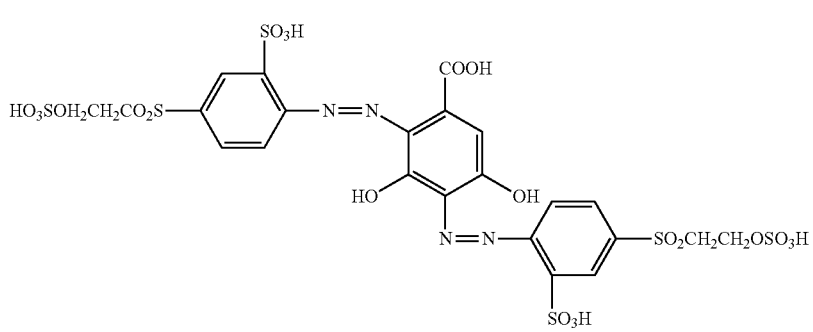
(I-2)
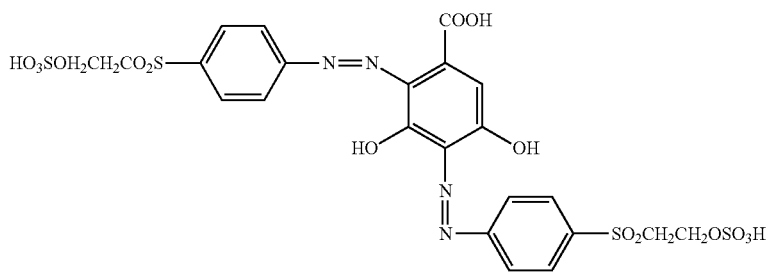
(I-3)
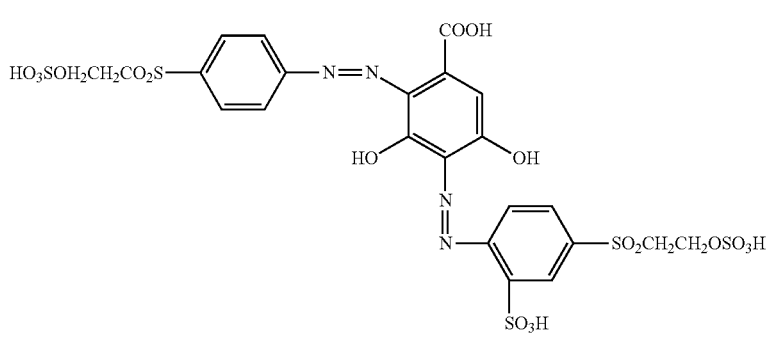
(I-4)
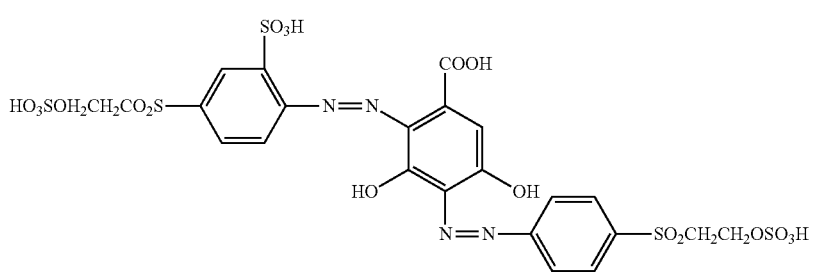
(I-5)

-continued
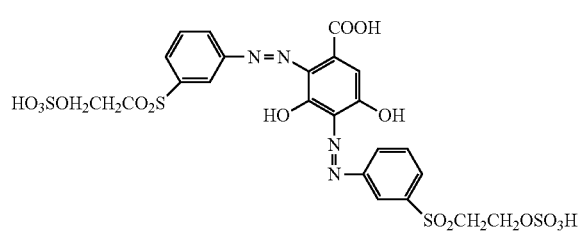
(I-6)
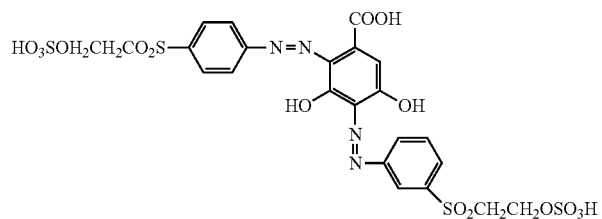
(I-7)
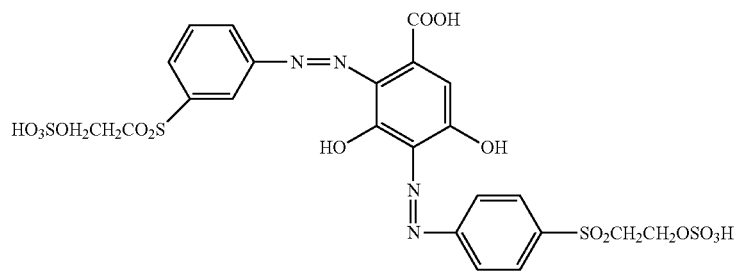
(I-8)
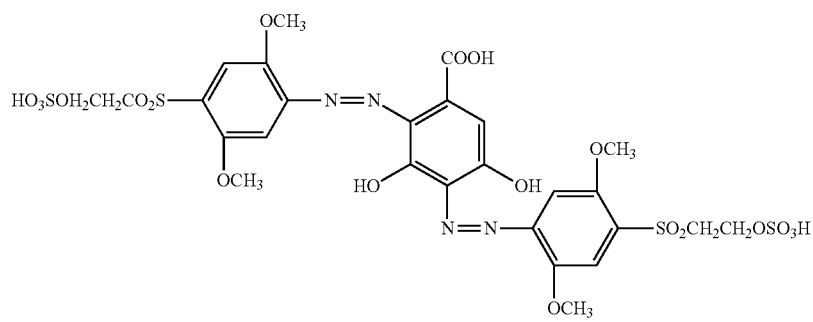
(I-9)
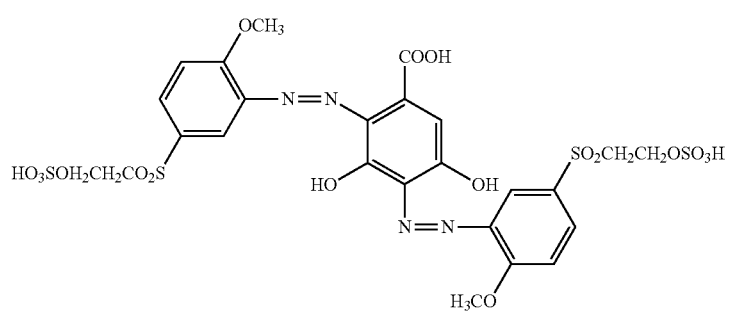
(I-10)
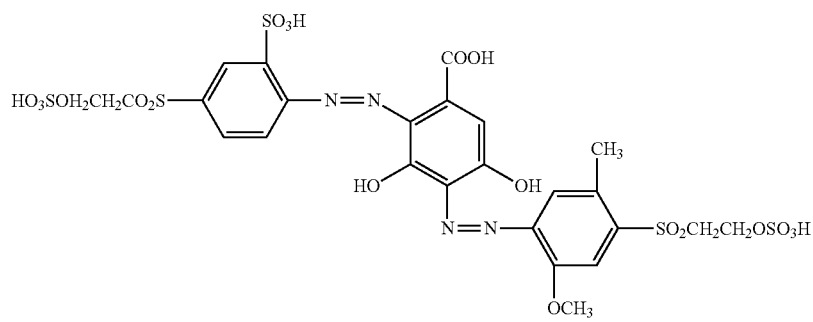
(I-11)

-continued
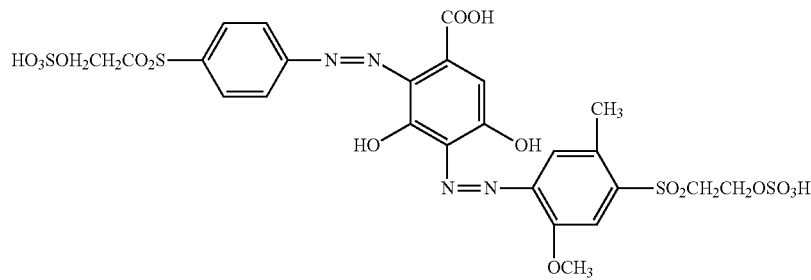
(I-12)
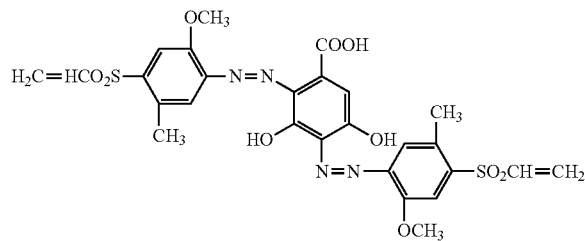
(I-13)
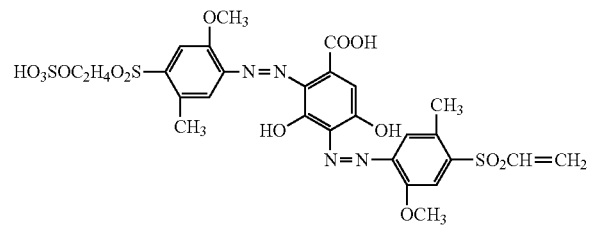
(I-14)
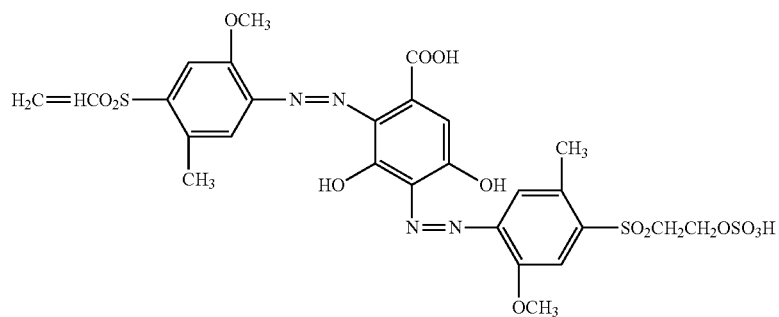
(I-15)
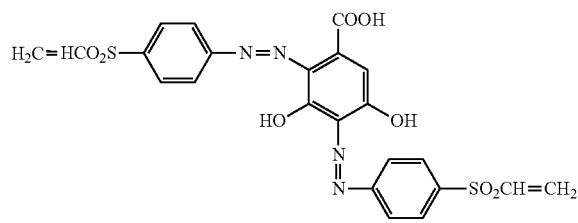
(I-16)
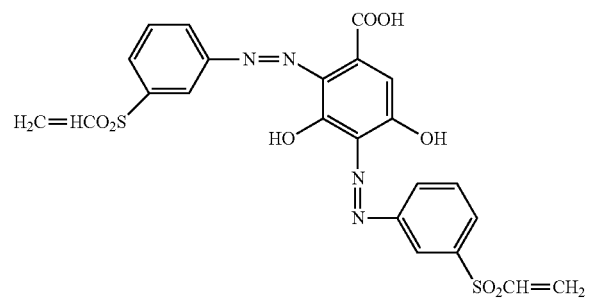
(I-17)
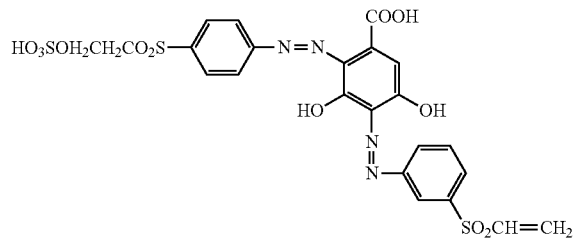
(I-18)
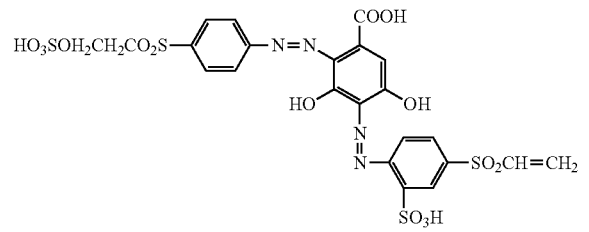
(I-19)

-continued
(I-20) 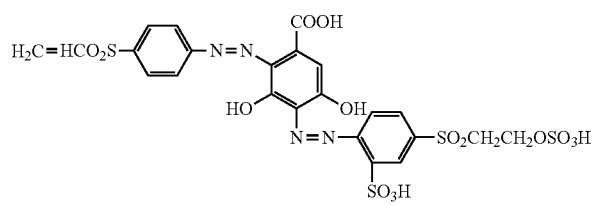
(I-21) 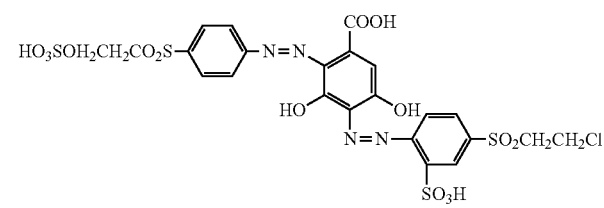
(I-22) 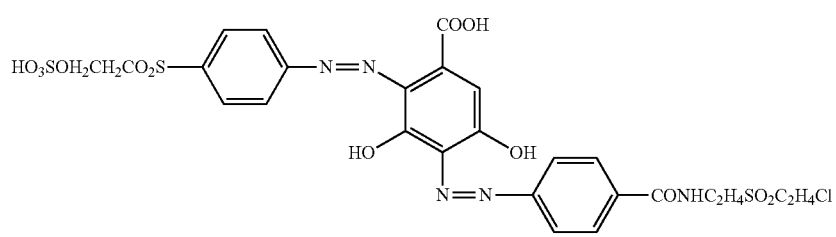
(I-23) 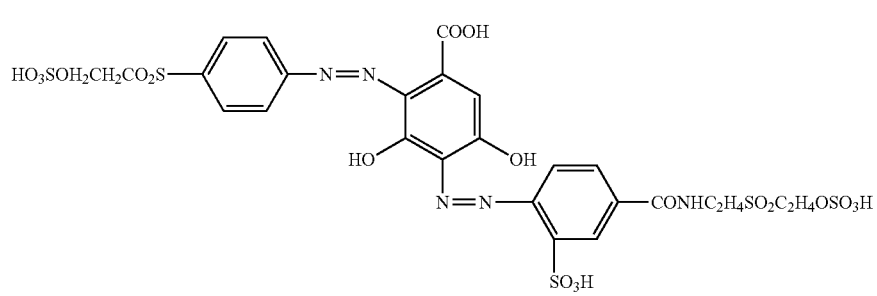
(I-24) 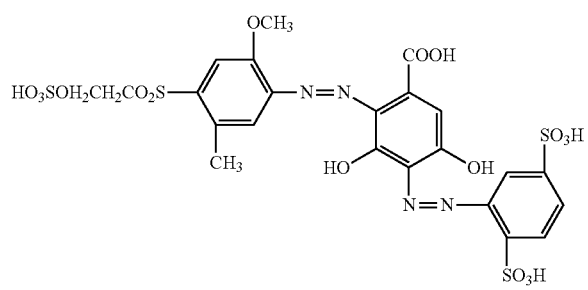
(I-25) 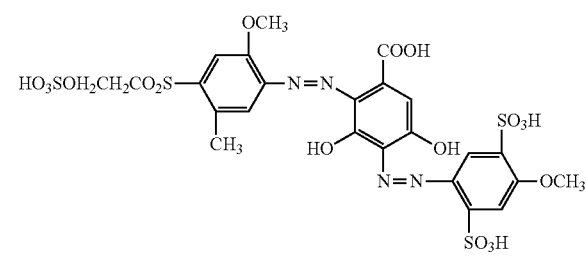
(I-26) 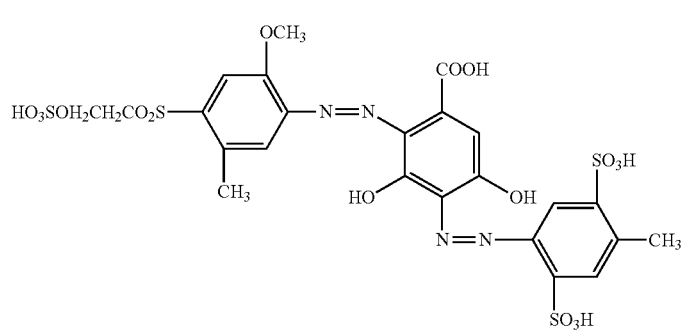

-continued
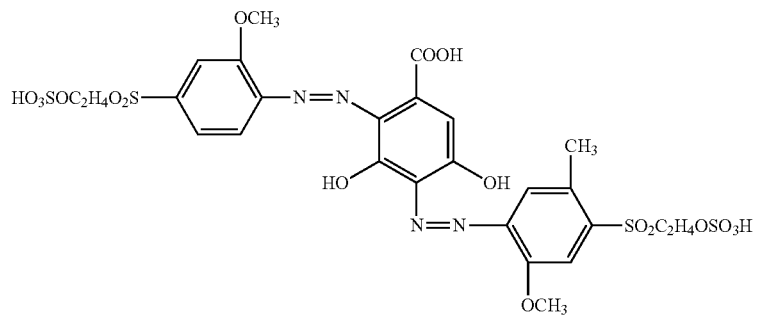
(I-27)
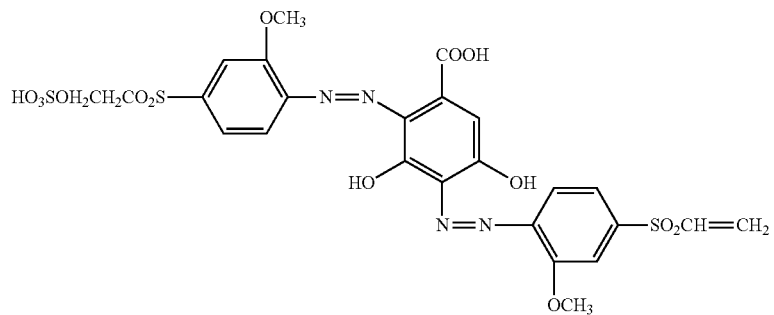
(I-28)
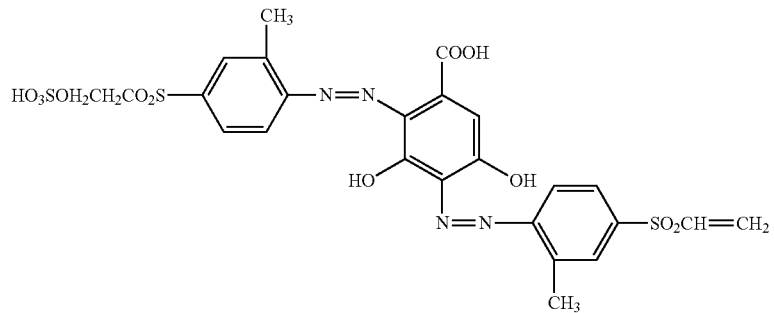
(I-29)
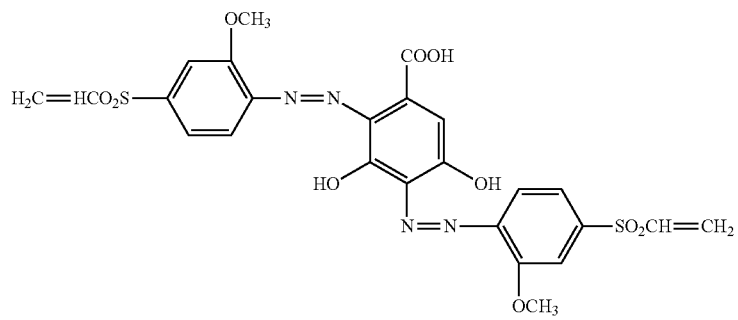
(I-30)
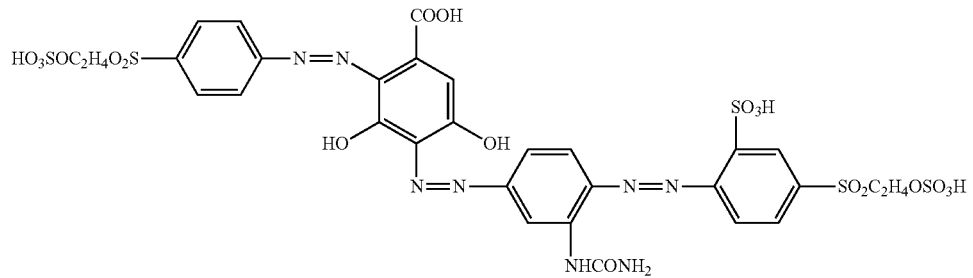
(I-31)

-continued
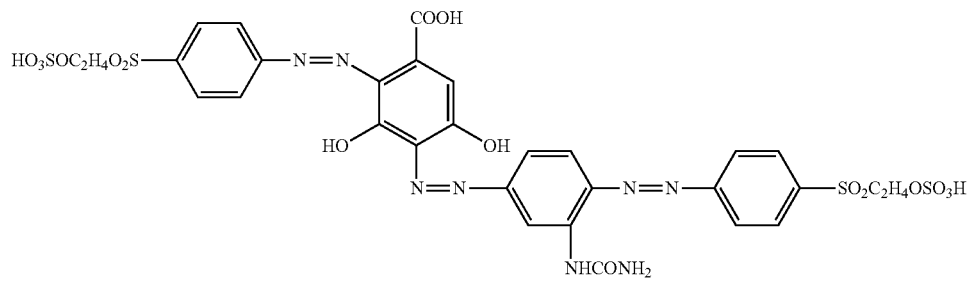
(I-32)
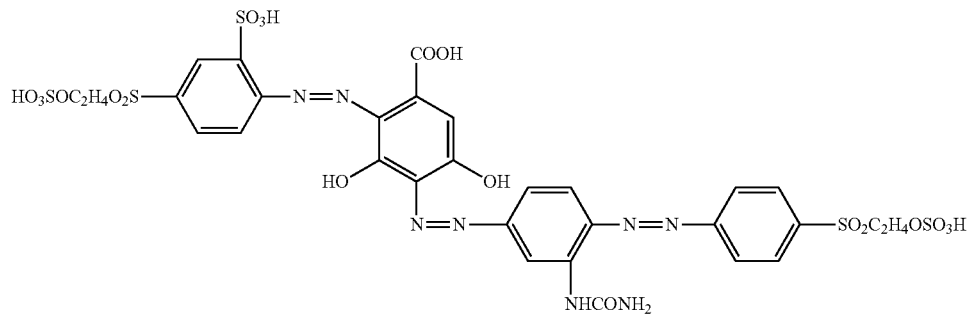
(I-33)
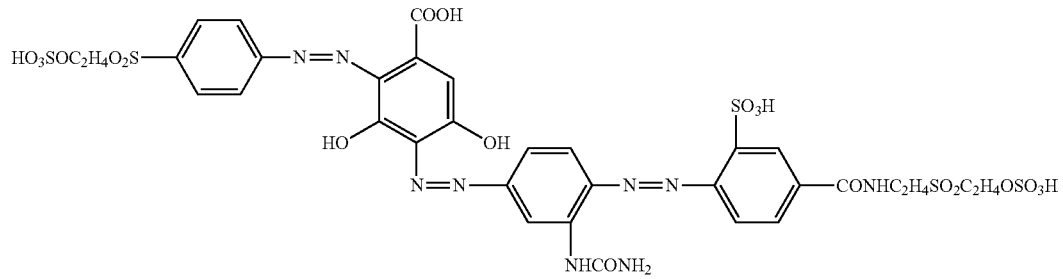
(I-34)
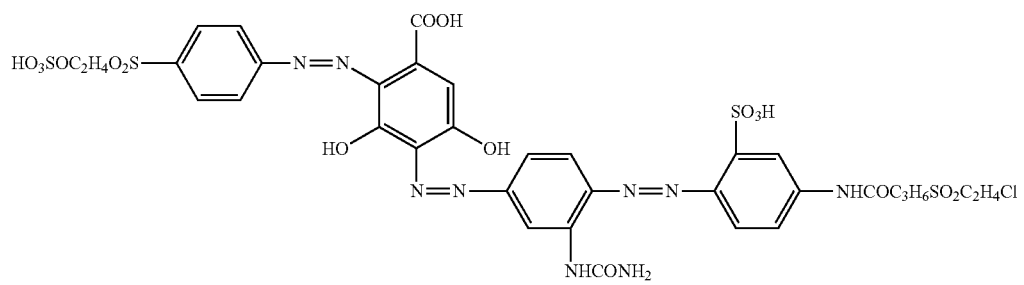
(I-35)
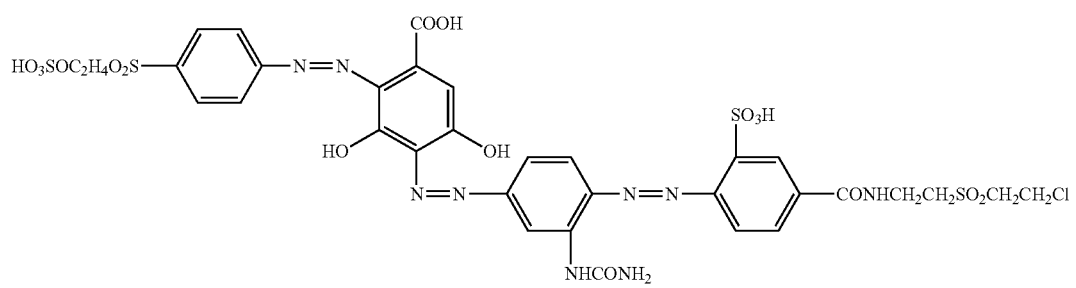
(I-36)

-continued
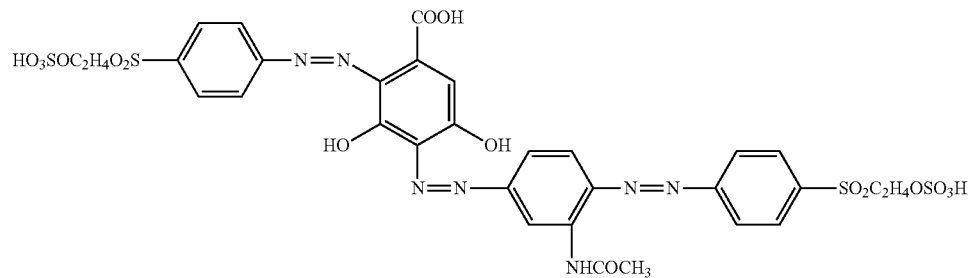
(I-37)
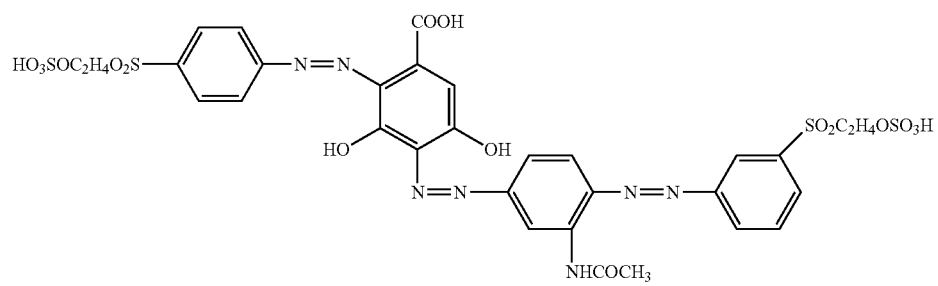
(I-38)
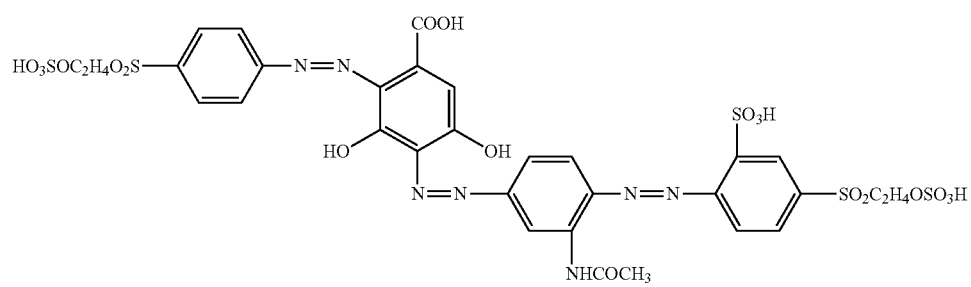
(I-39)
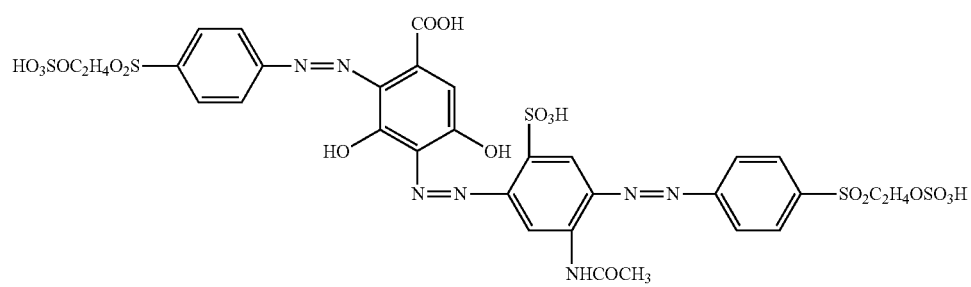
(I-40)
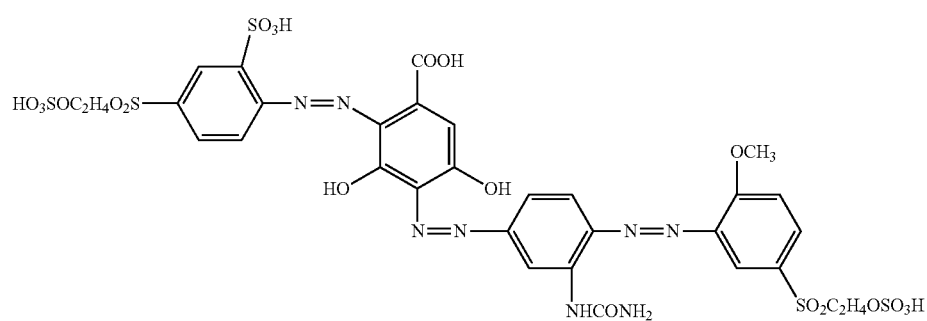
(I-41)

-continued
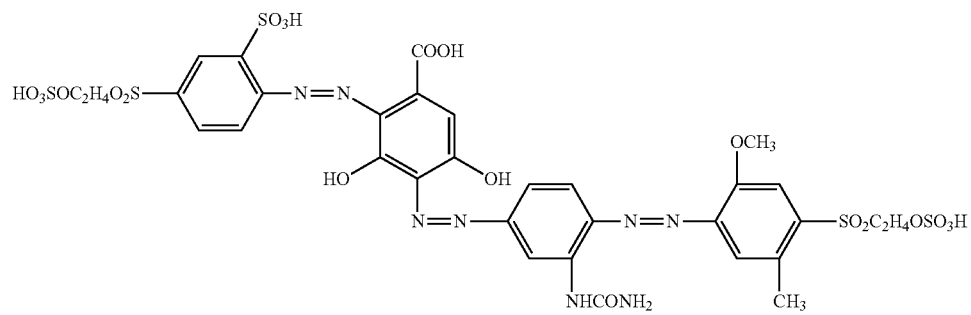
(I-42)
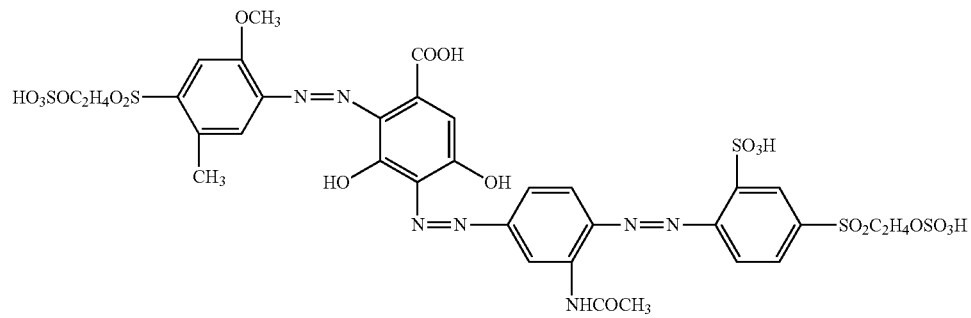
(I-43)
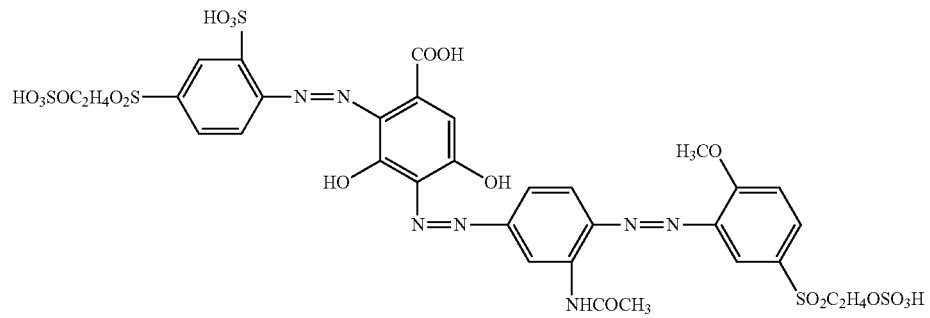
(I-44)
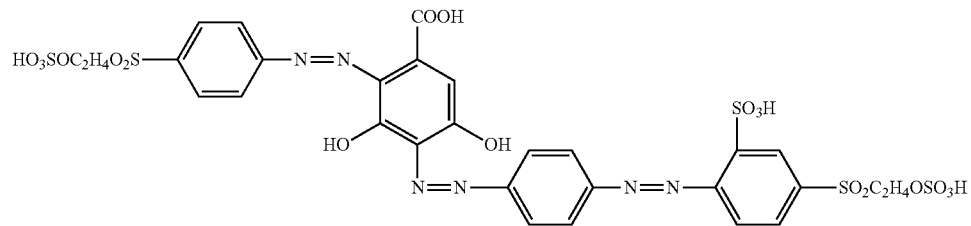
(I-45)
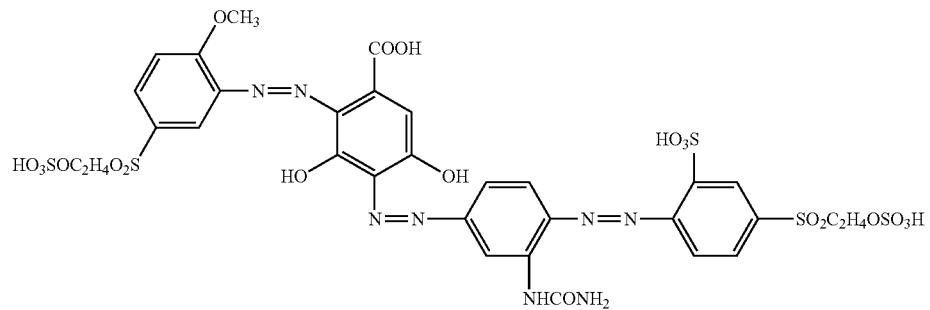
(I-46)

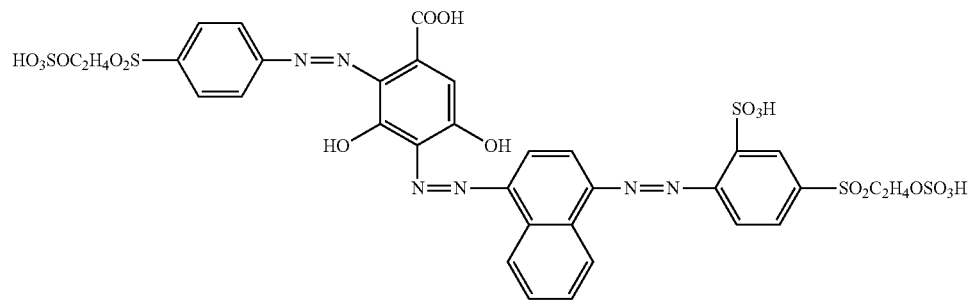
(I-47)
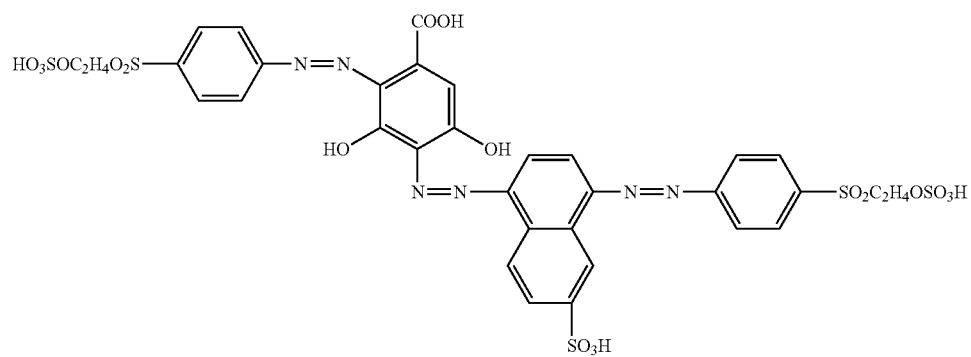
(I-48)
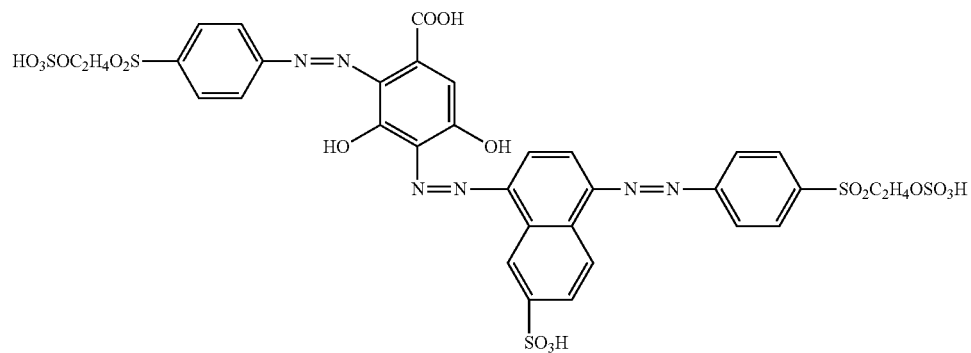
(I-49)
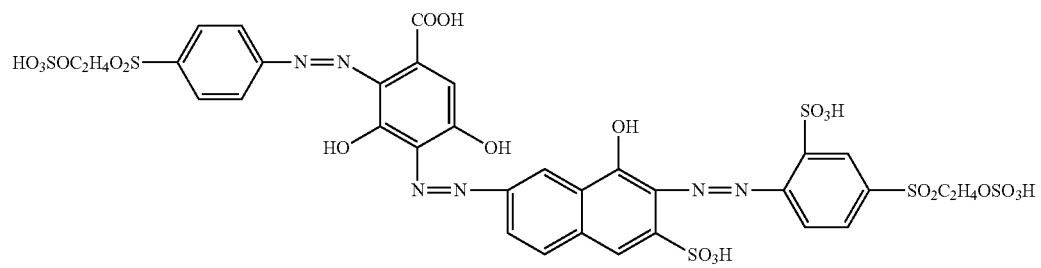
(I-50)
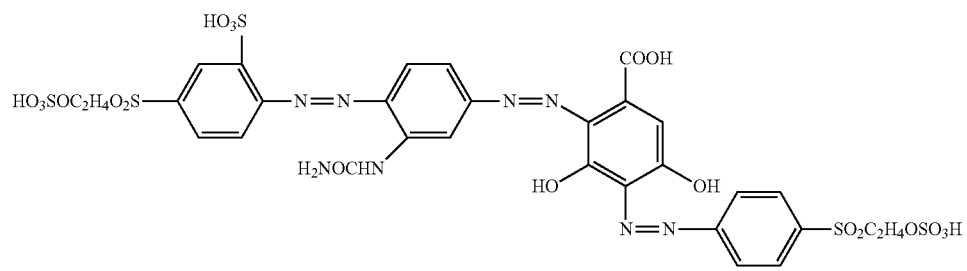
(I-51)

-continued
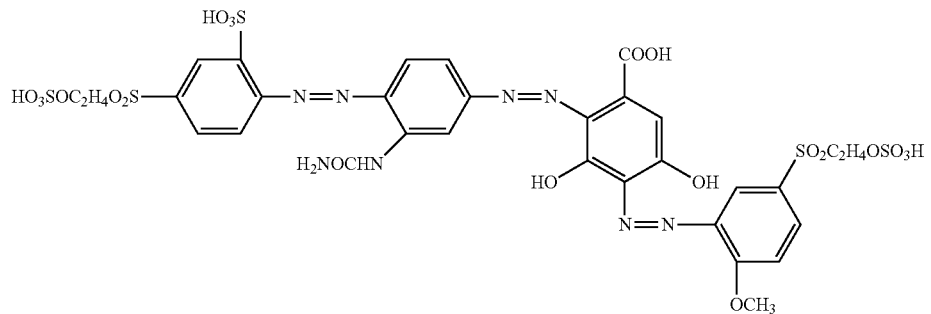
(I-52)
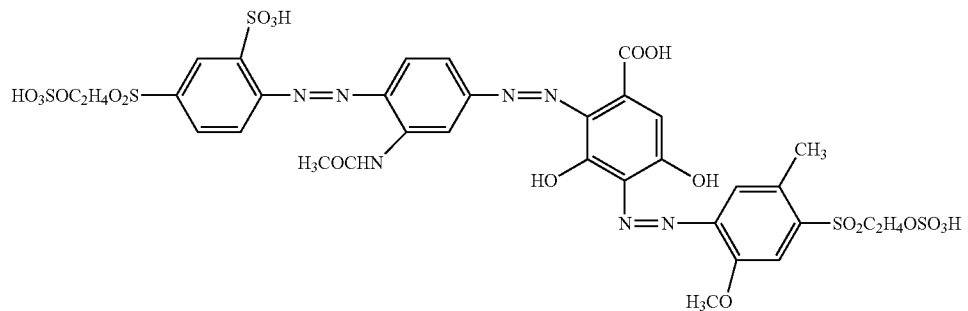
(I-53)
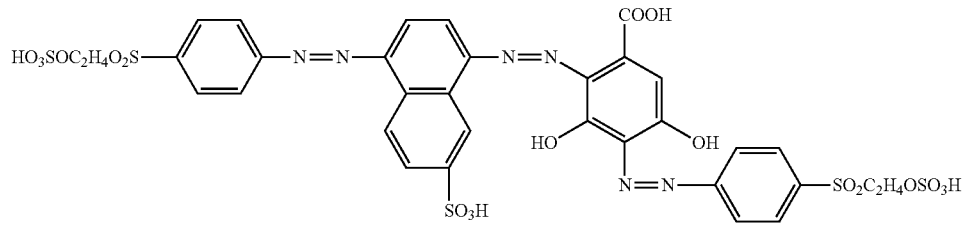
(I-54)
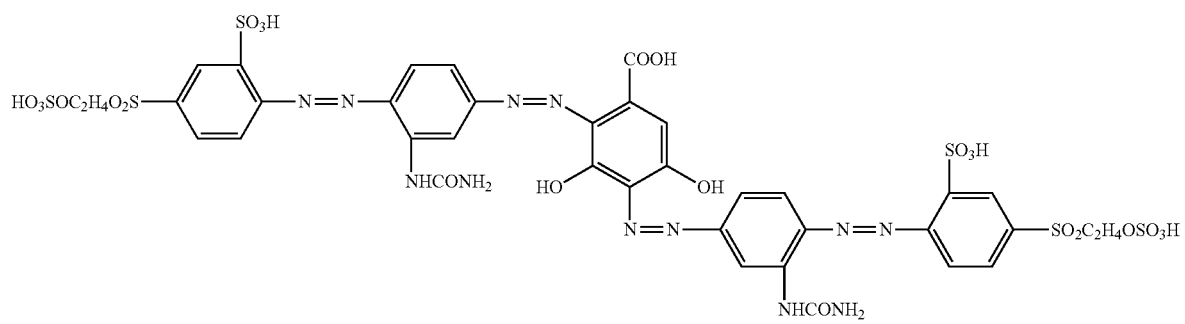
(I-55)
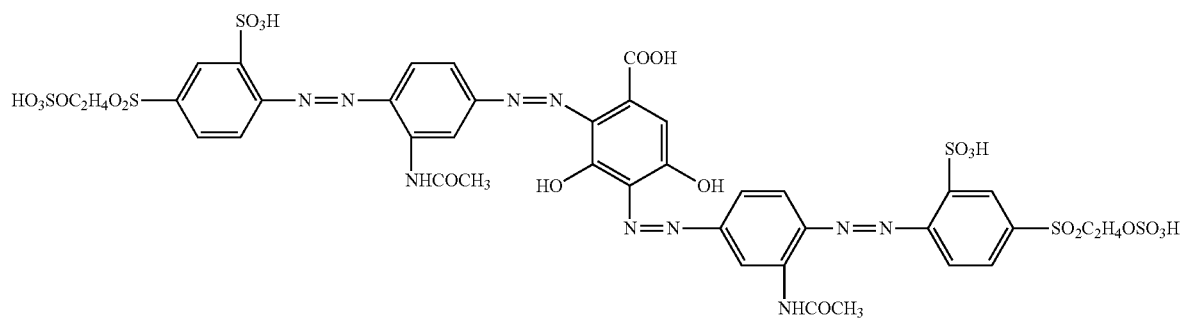
(I-56)

-continued
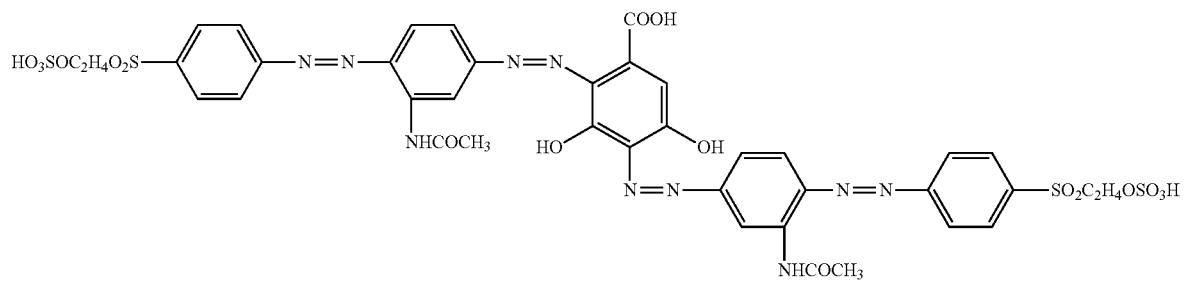
(I-57)
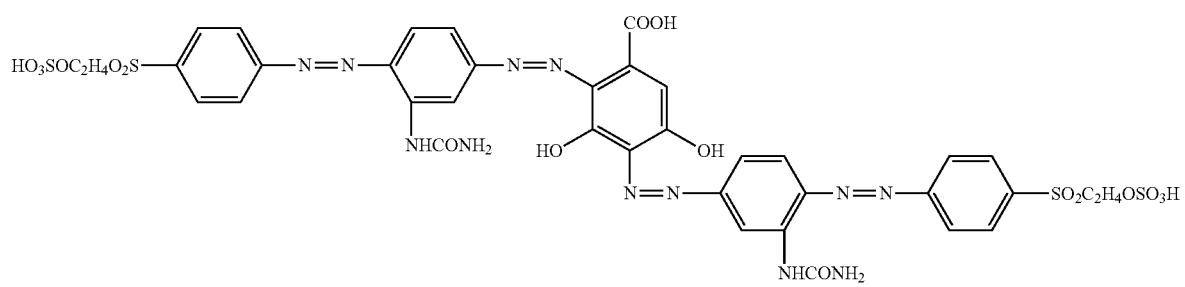
(I-58)
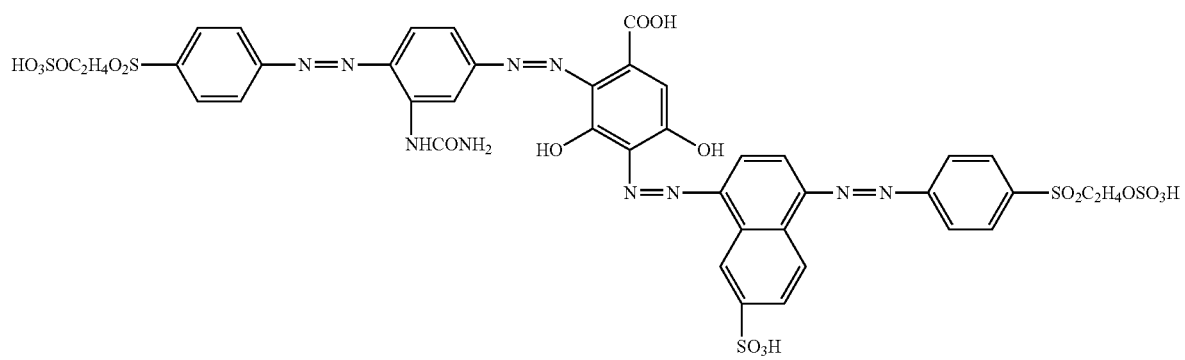
(I-59)
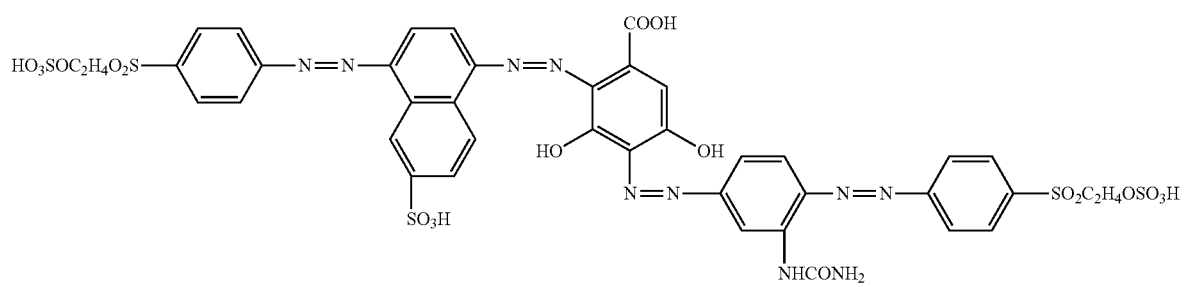
(I-60)
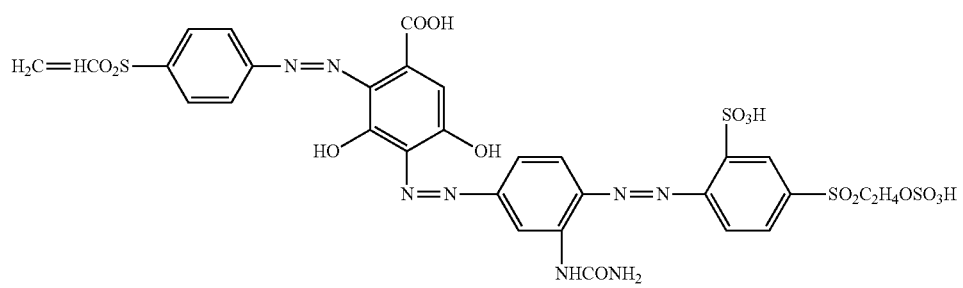
(I-61)

-continued
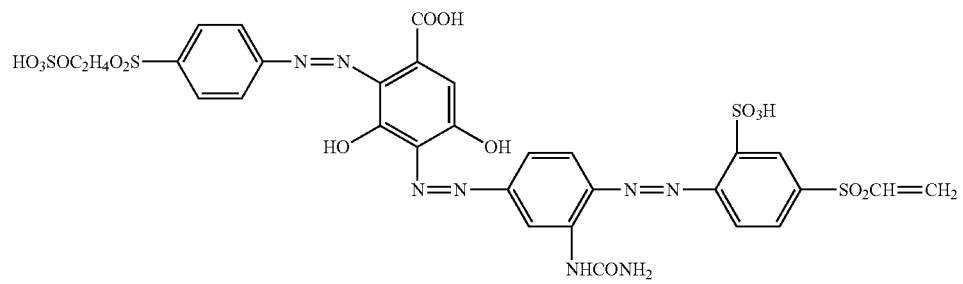
(I-62)
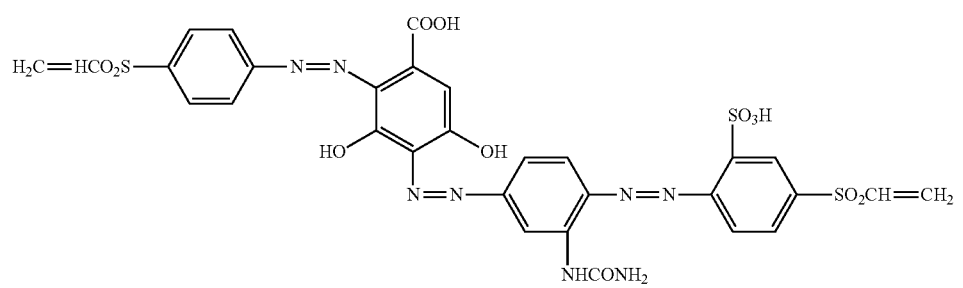
(I-63)
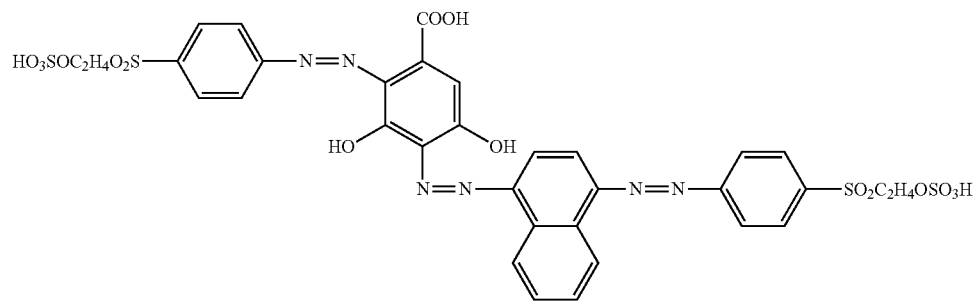
(I-64)
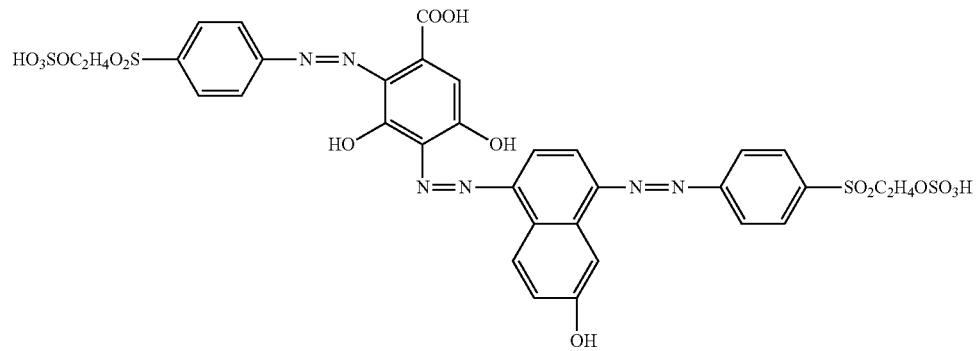
(I-65)
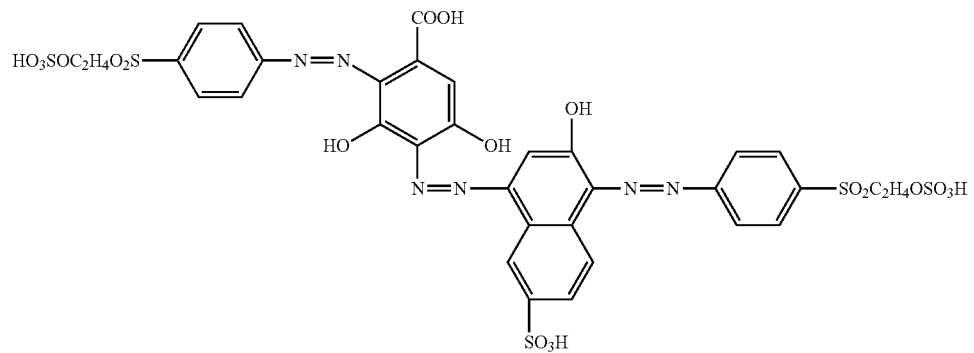
(I-66)

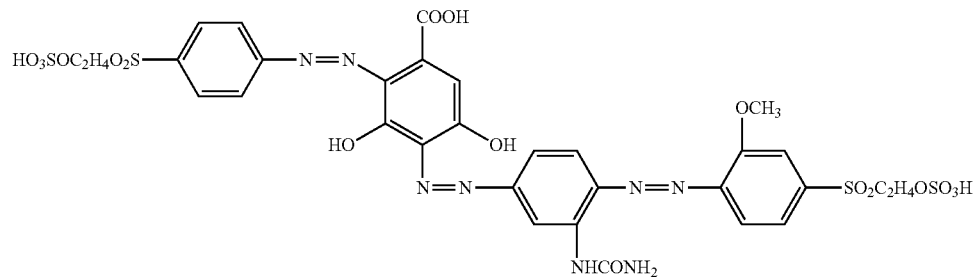
(I-67)
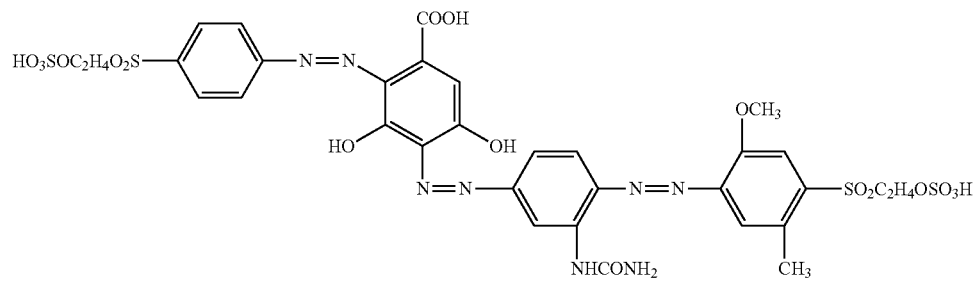
(I-68)
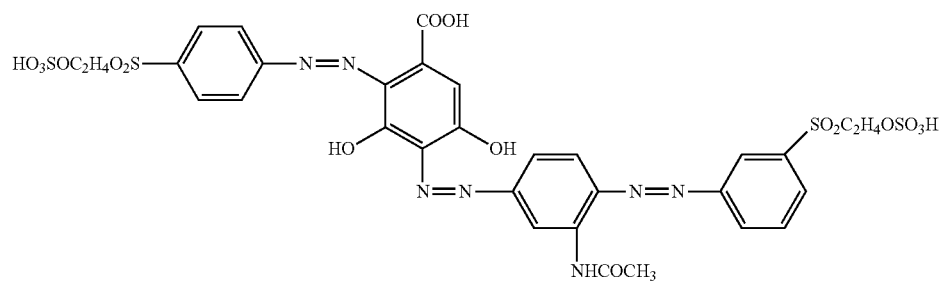
(I-69)
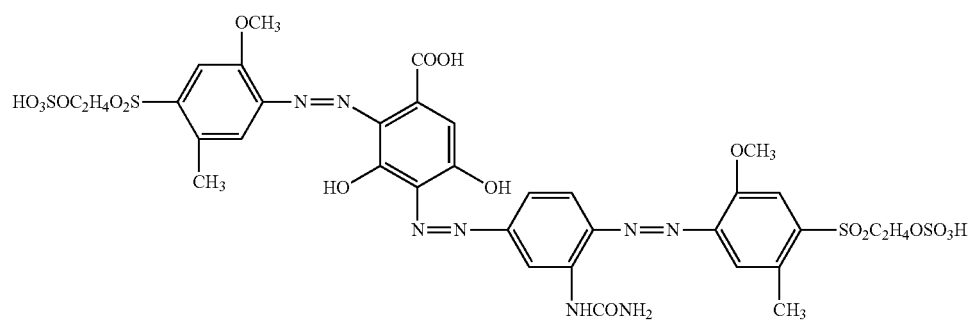
(I-70)
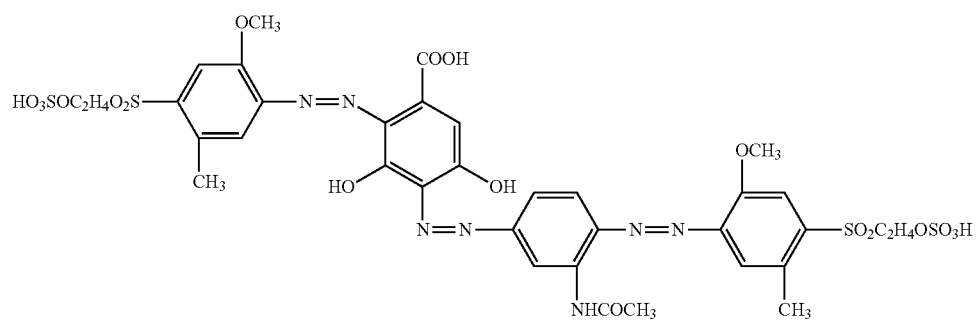
(I-71)

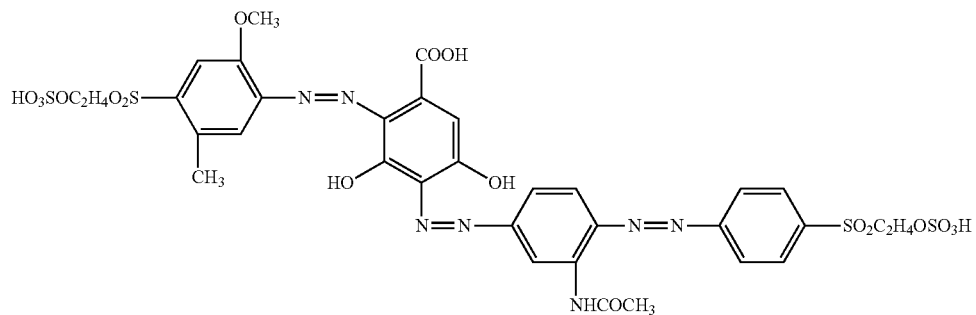
(I-72)
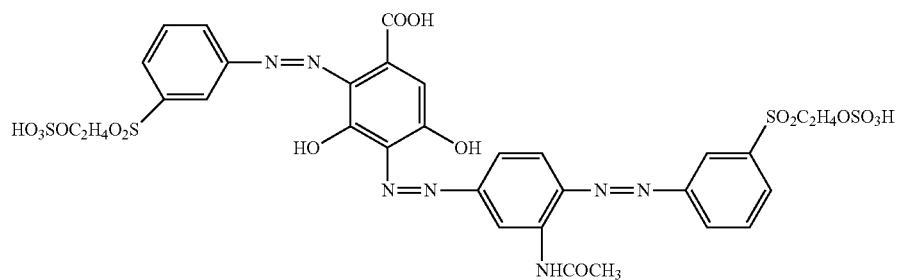
(I-73)
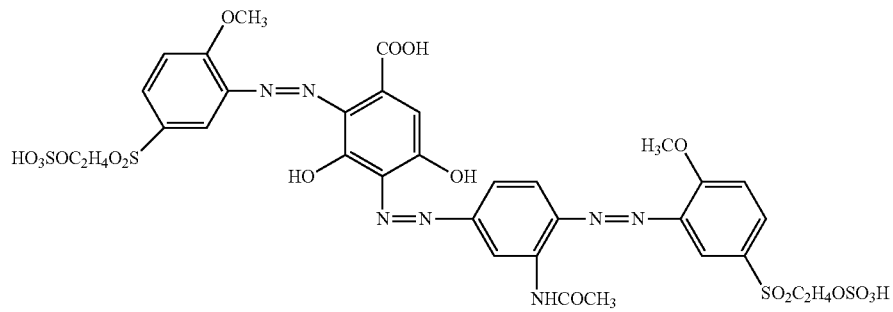
(I-74)
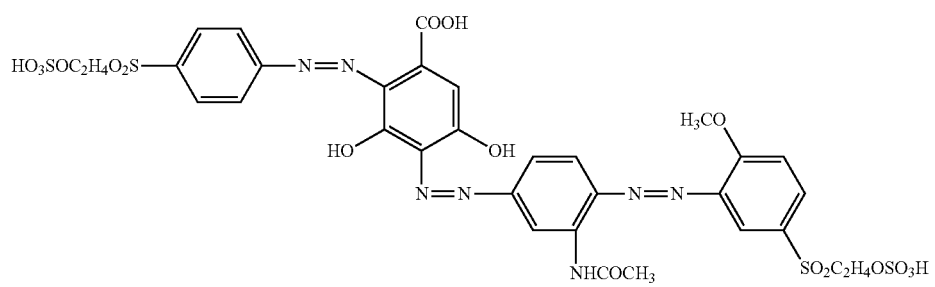
(I-75)
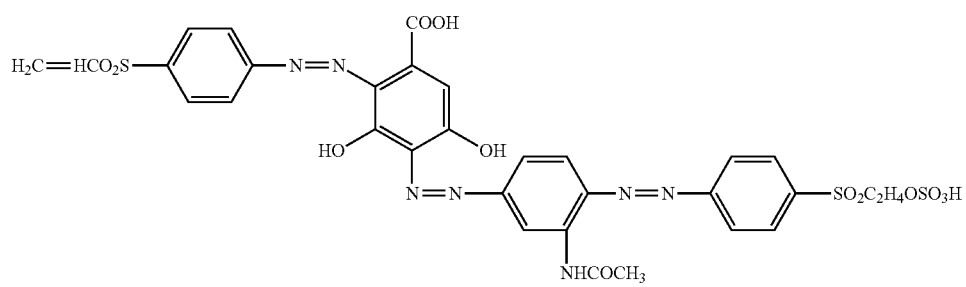
(I-76)

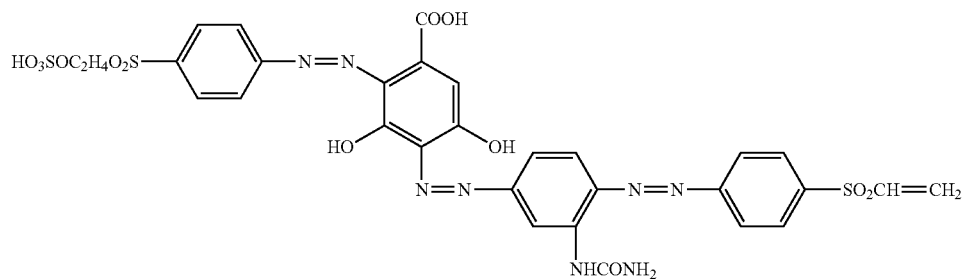
(I-77)
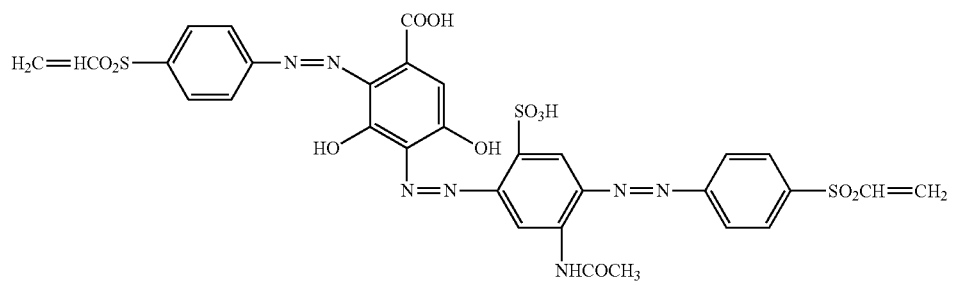
(I-78)
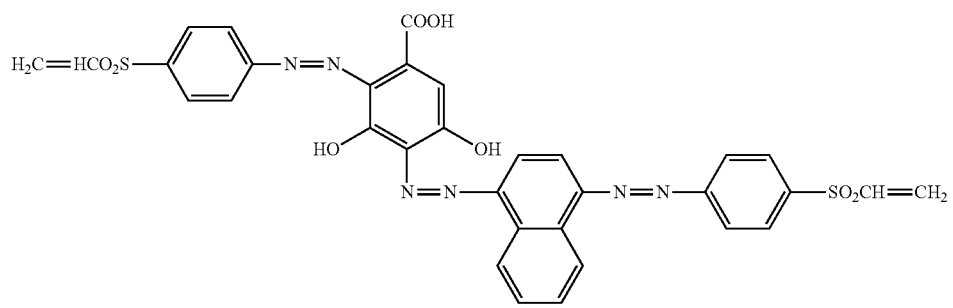
(I-79)
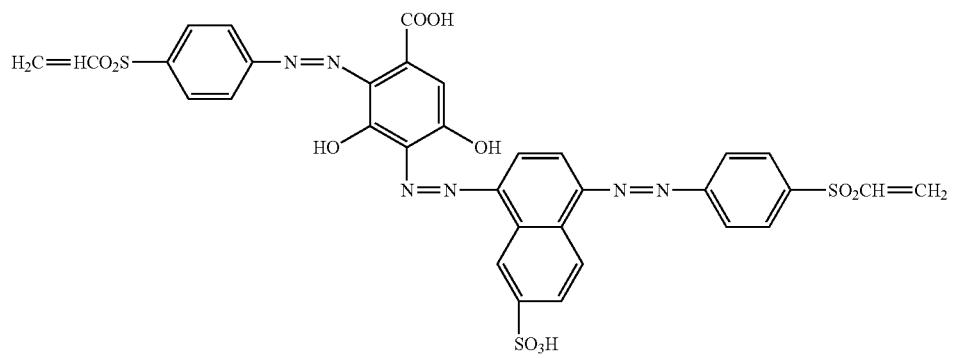
(I-80)
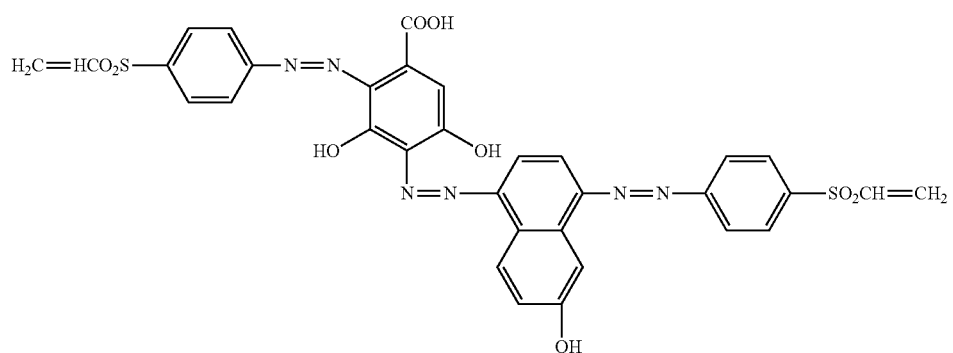
(I-81)

-continued
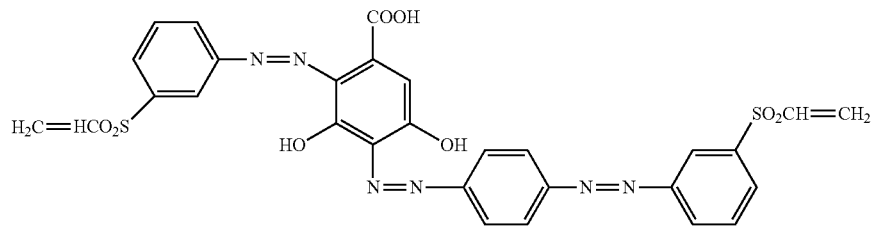
(I-82)
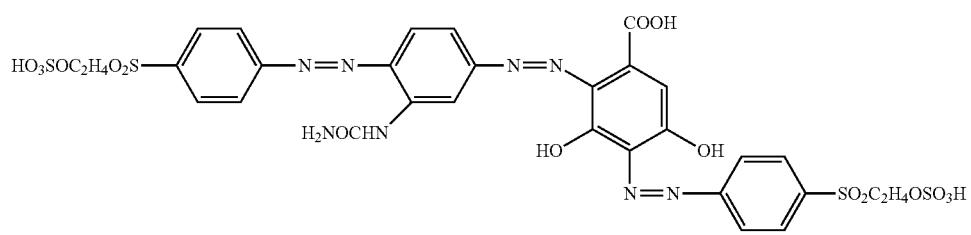
(1A-83)
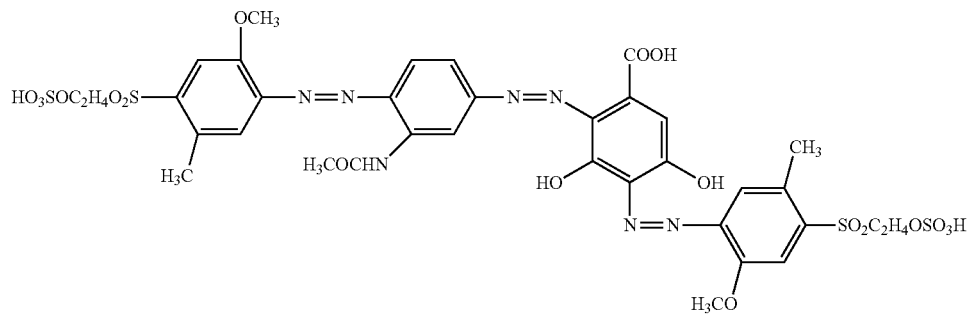
(I-84)
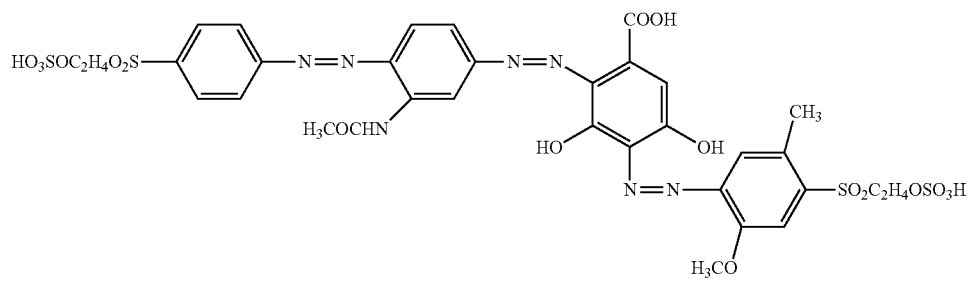
(I-85)
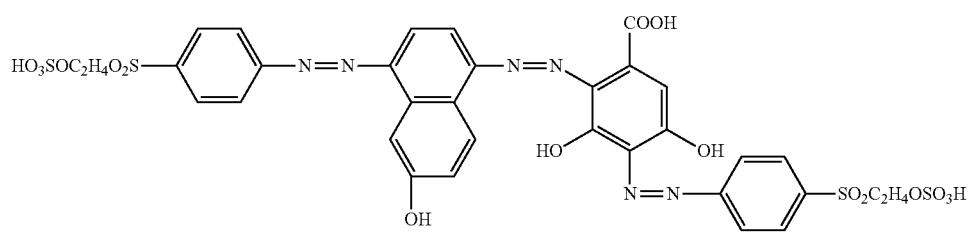
(I-86)
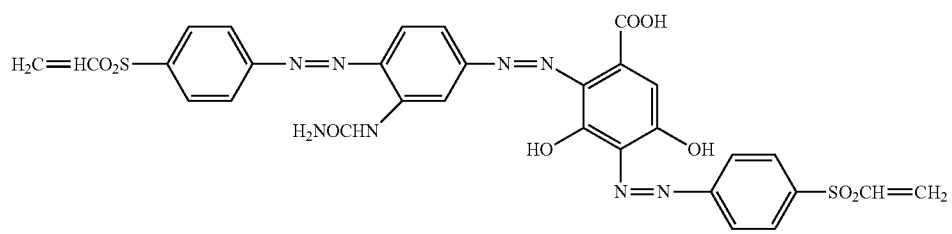
(I-87)

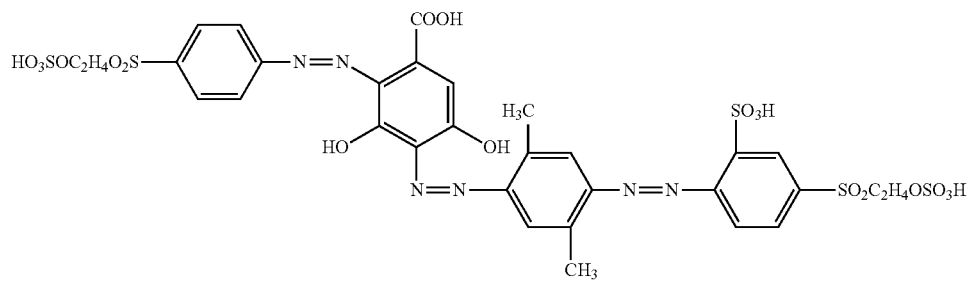

(I-88)

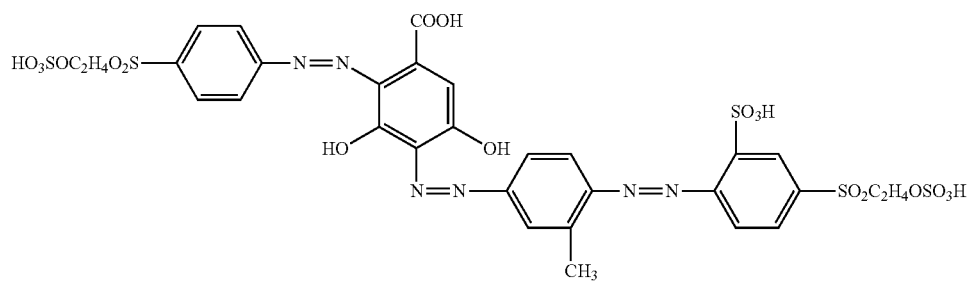

(I-89)

More preferably, component A is selected from at least one of formulae (I-1) (I-63), (I-88) and (I-89), even more preferably selected from at least one of formulae (I-1)~(I-21), (I-27)~(I-33), (I-41)~(I-63), (I-88) and (I-89), still even more preferably selected from at least one of formulae (I-1), (I-3), (I-4), (I-31), (I-32), (I-41), (I-48), (I-51), (I-52), (I-55) and (I-88), most particularly preferably selected from at least one of formulae (I-31), (I-32), (I-51) and (I-52).

Specifically, component B is preferably one or more dye compounds of the following formulae:

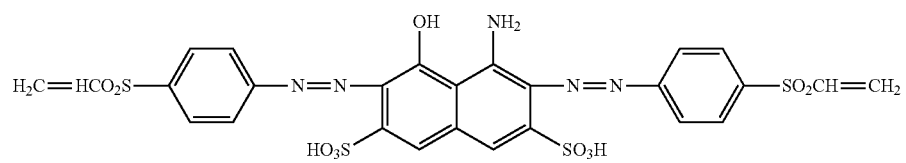

(II-1)

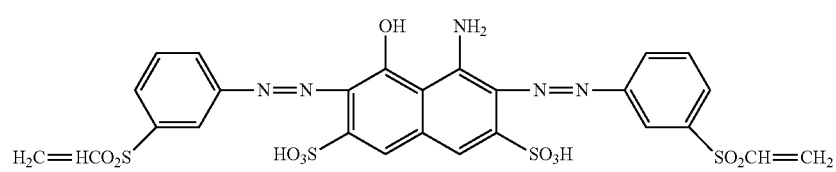

(II-2)

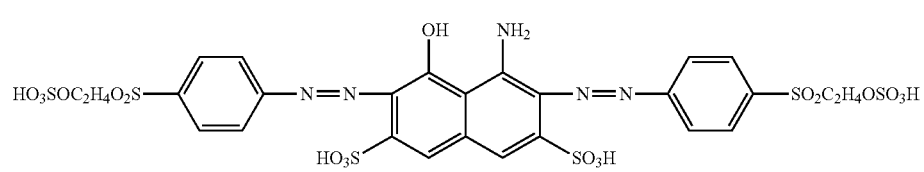

(II-3)

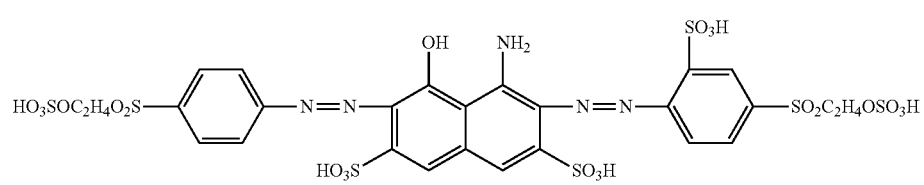

(II-4)

-continued
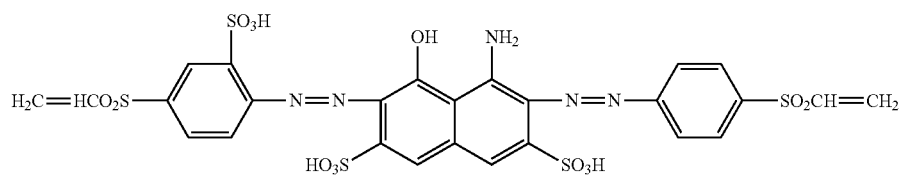
(II-5)
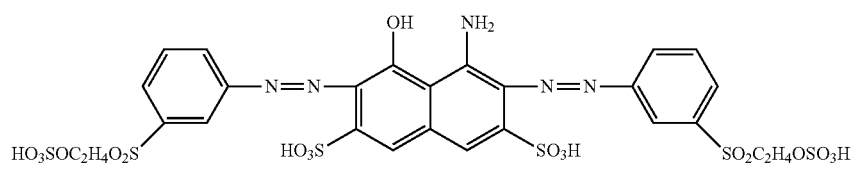
(II-6)
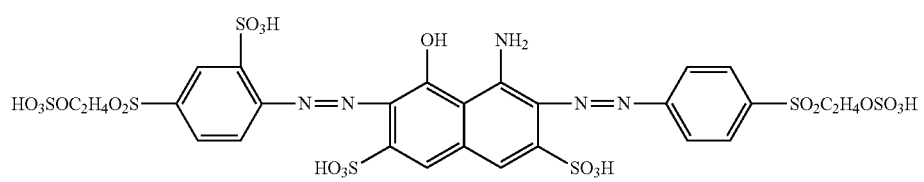
(II-7)
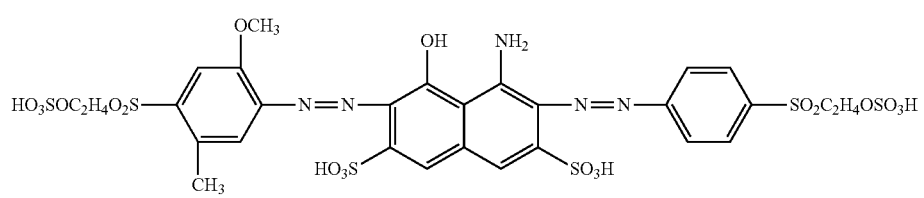
(II-8)
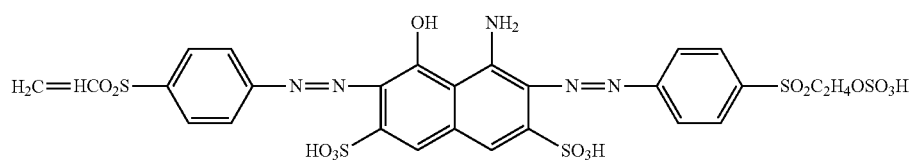
(II-9)
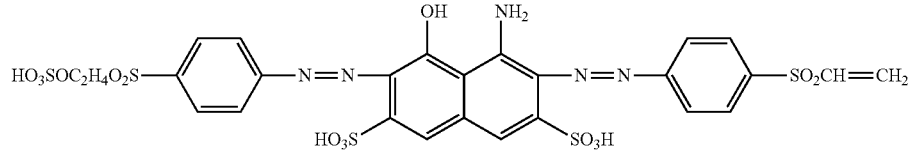
(II-10)
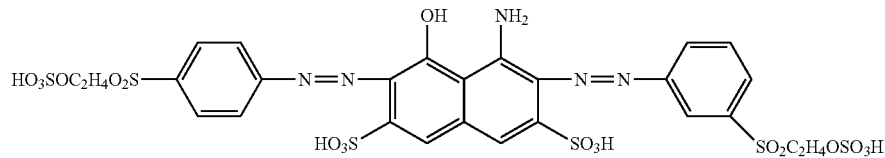
(II-11)
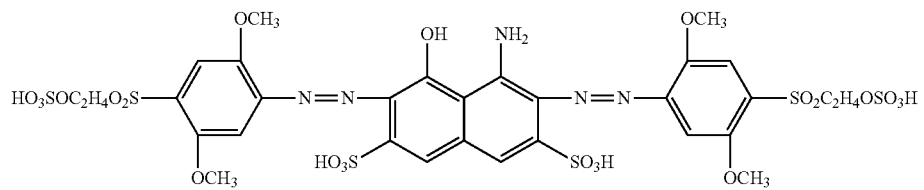
(II-12)
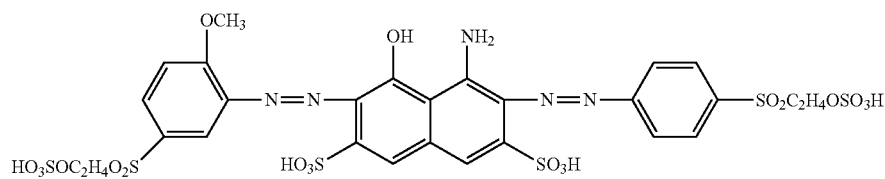
(II-13)

More preferably, component B is selected from formula (II-1), formula (II-3) or composition thereof.
Specifically, component C is preferably one or more dye compounds of the following formulae:
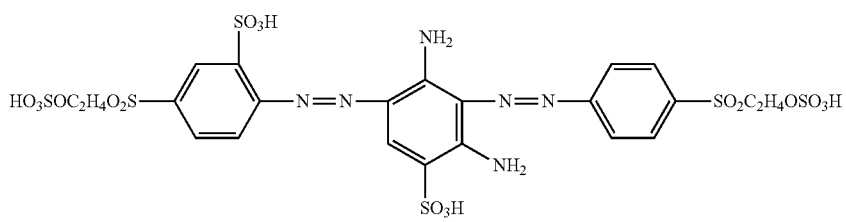
(III-1)
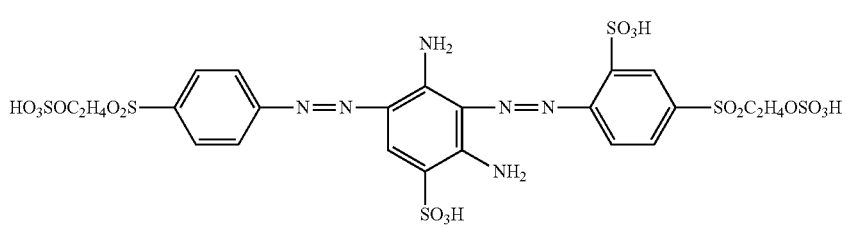
(III-2)
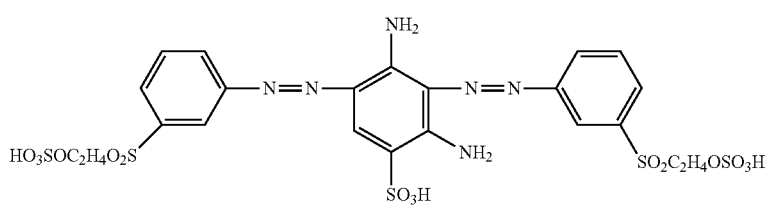
(III-3)
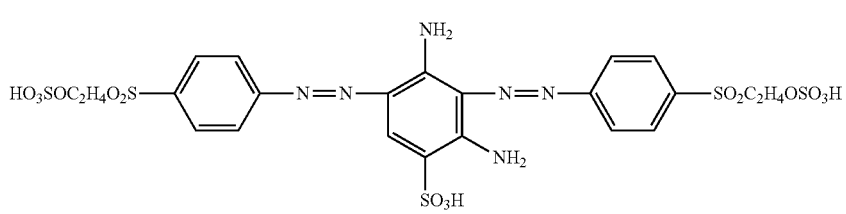
(III-4)
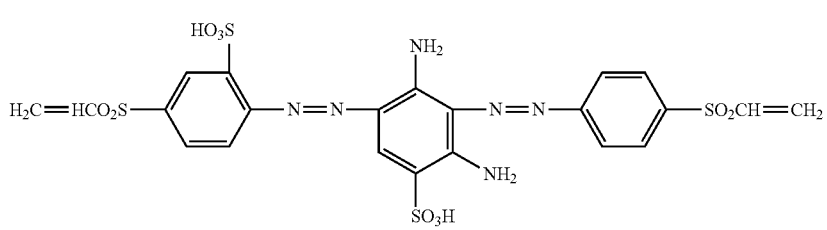
(III-5)
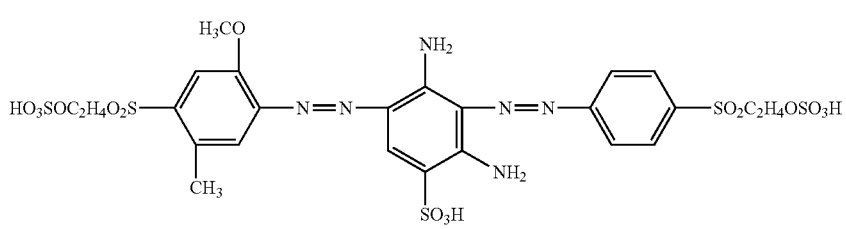
(III-6)
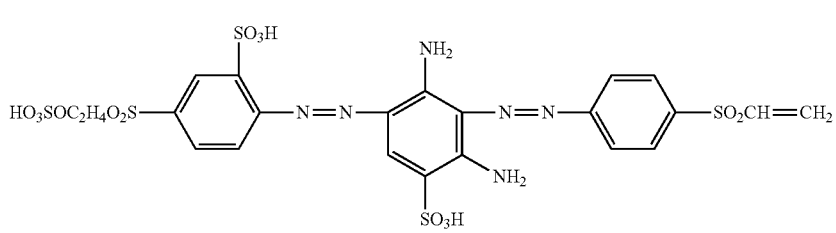
(III-7)

-continued
(III-8)
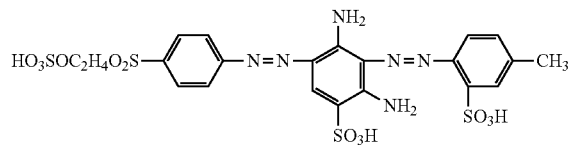
(III-8a)
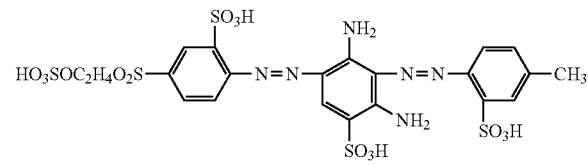
(III-8b)
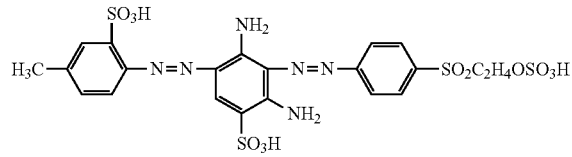
(III-9)
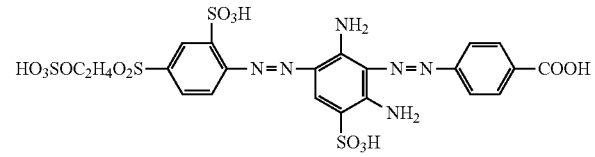
(III-10)
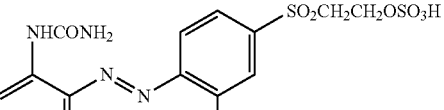
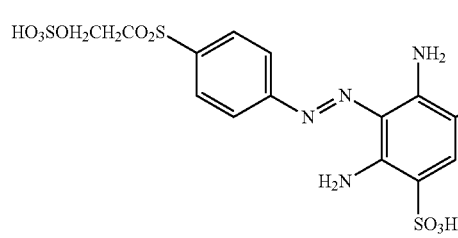
(III-11)
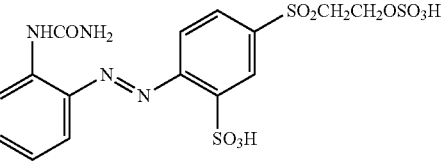
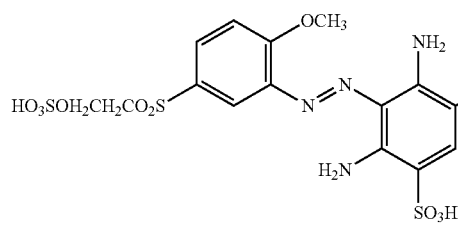
(III-12)
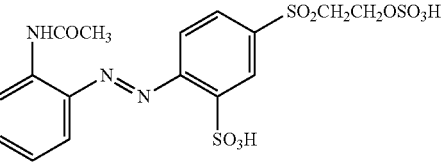
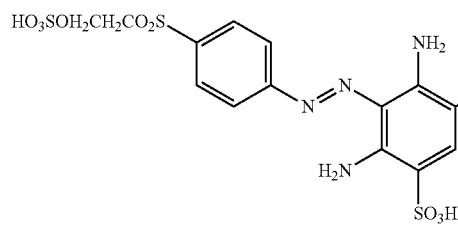
(III-13)
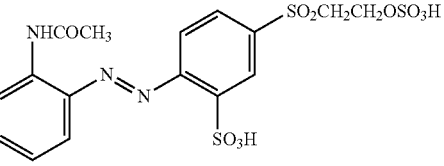
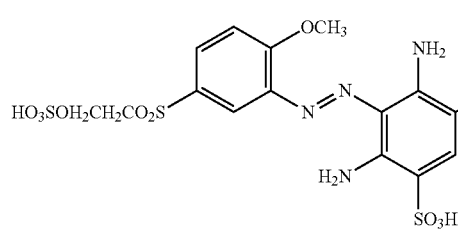

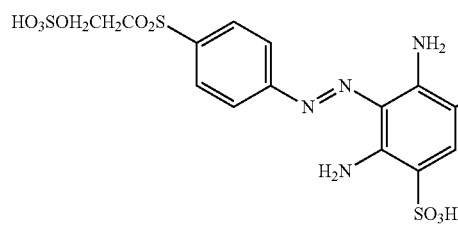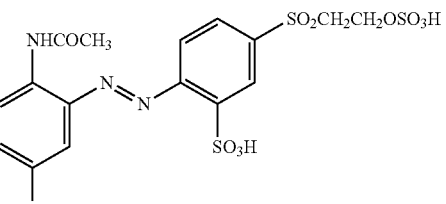
(III-14)
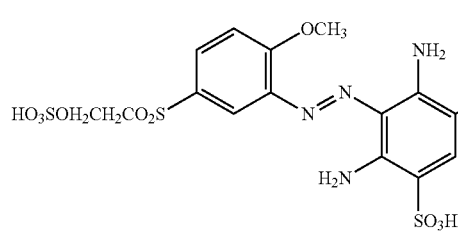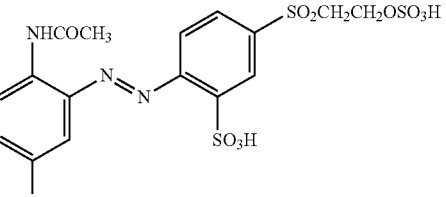
(III-15)
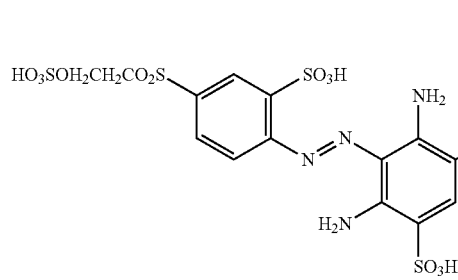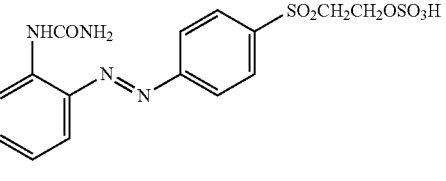
(III-16)
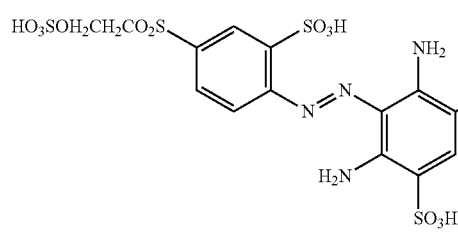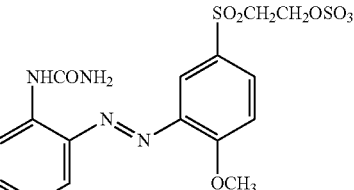
(III-17)
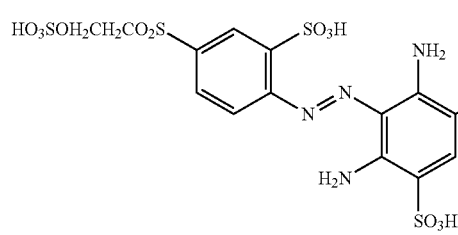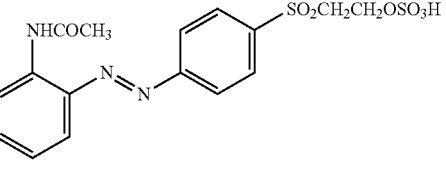
(III-18)

-continued
(III-19)
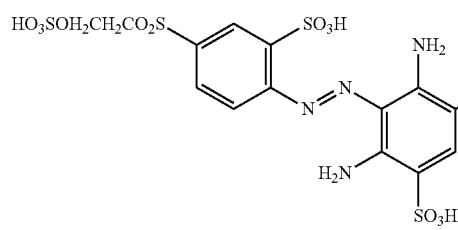
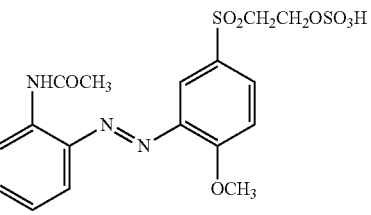
(III-20)
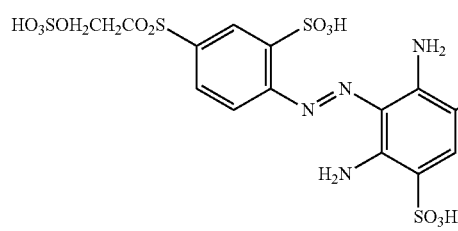
(III-21)
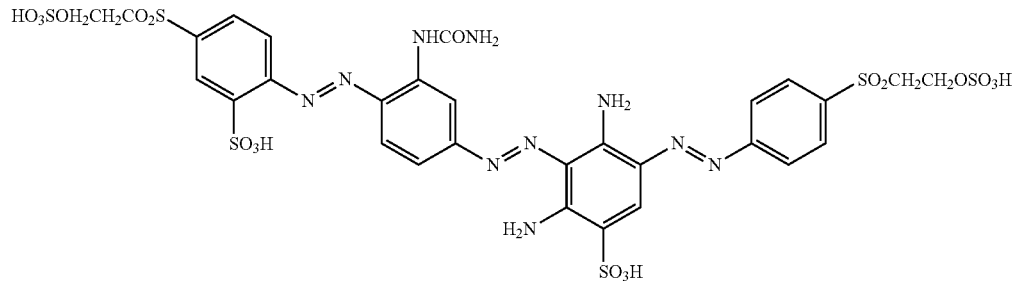
(III-22)
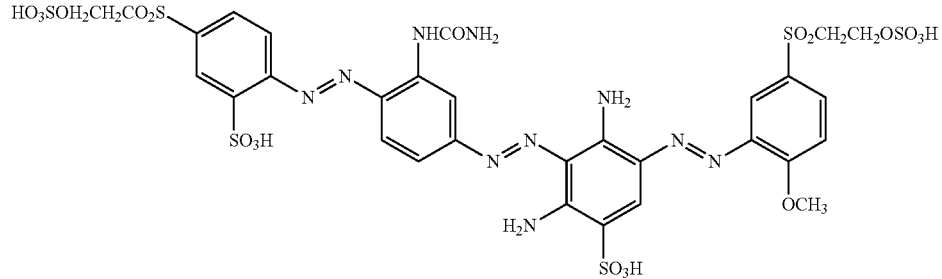
(III-23)
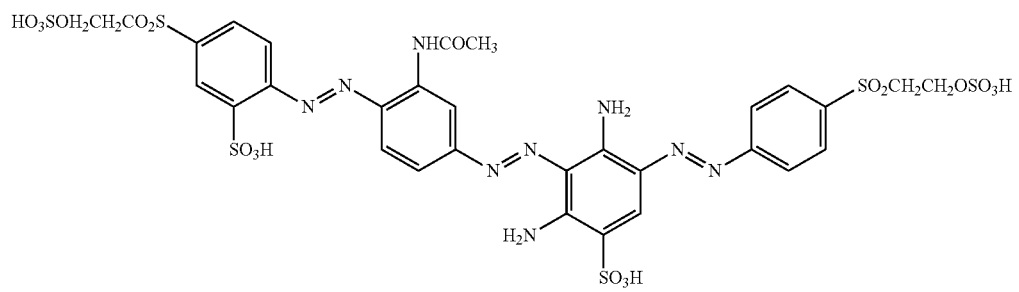

-continued
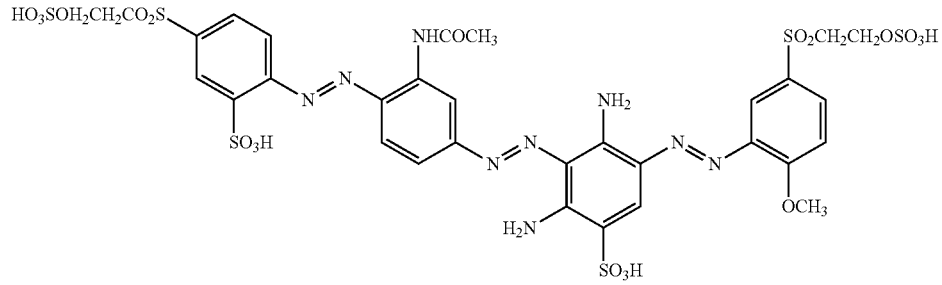
(III-24)
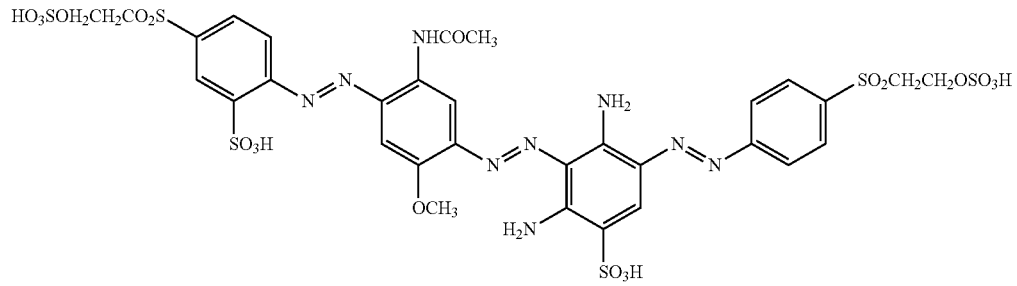
(III-25)
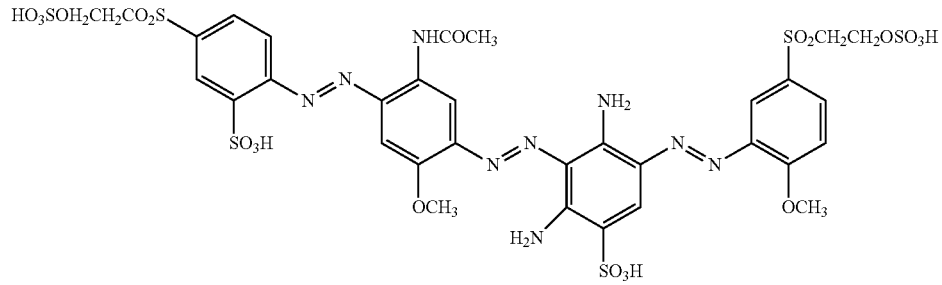
(III-26)
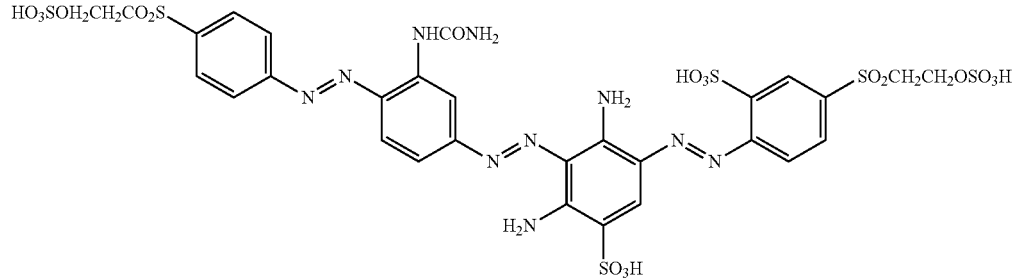
(III-27)
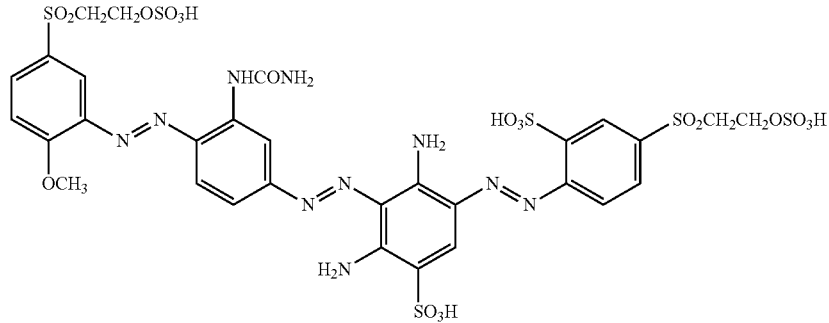
(III-28)

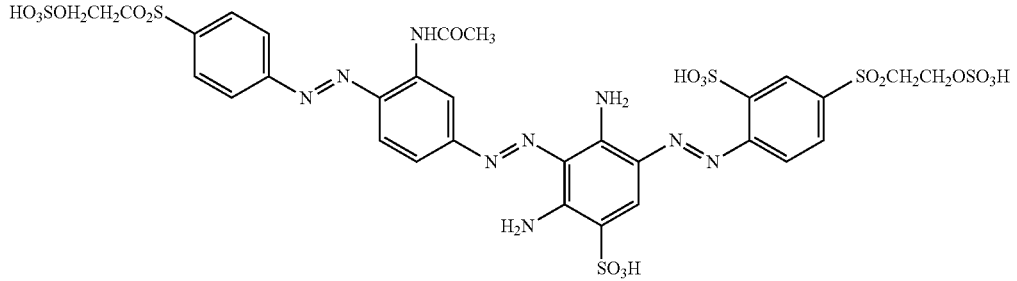
(III-29)
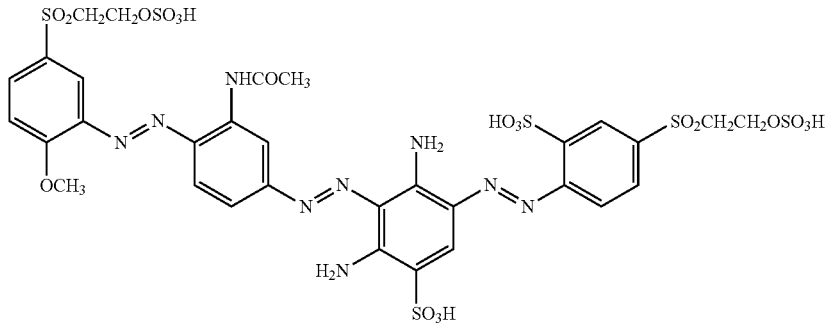
(III-30)
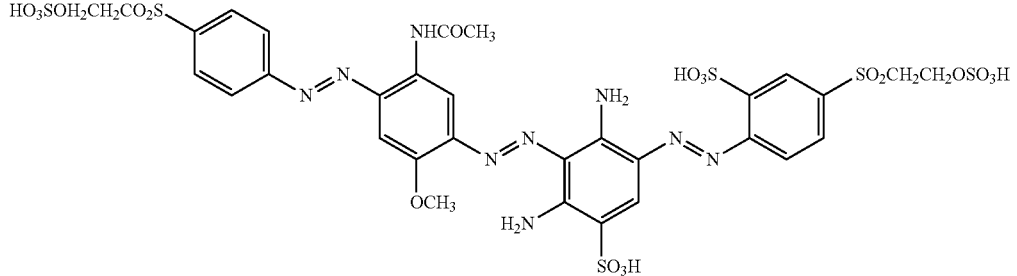
(III-31)
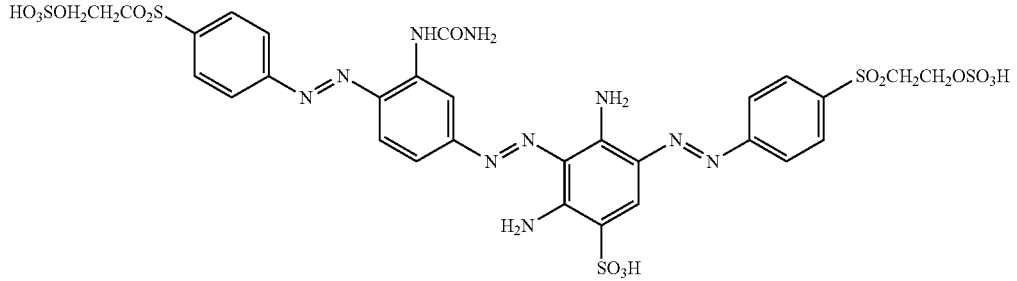
(III-31a)
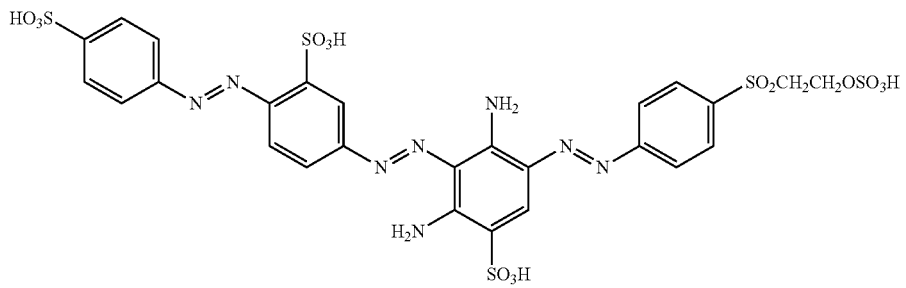
(III-31b)

-continued
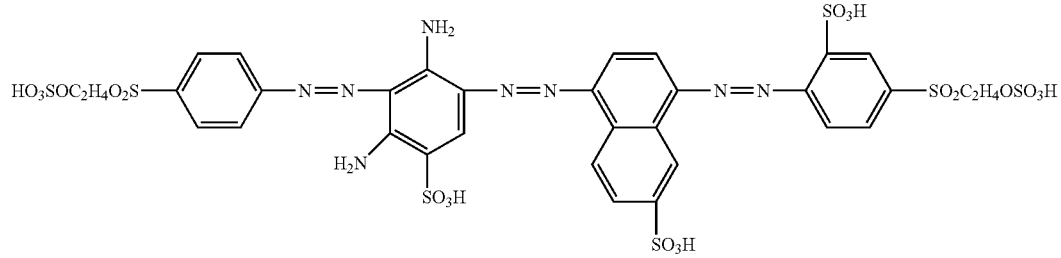
(III-32)
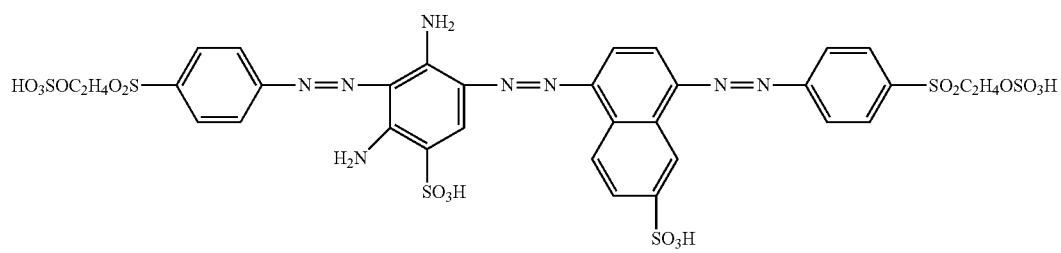
(III-33)
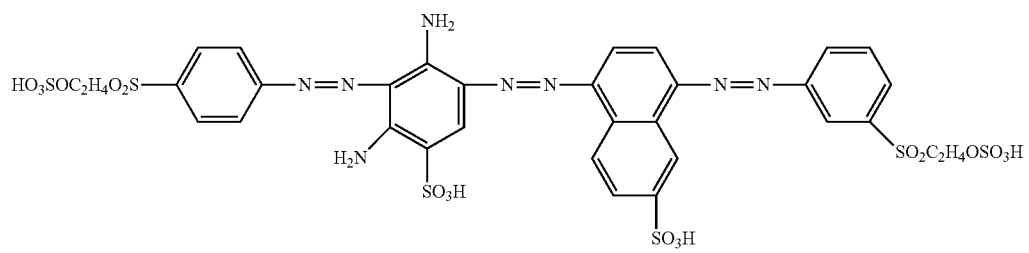
(III-34)
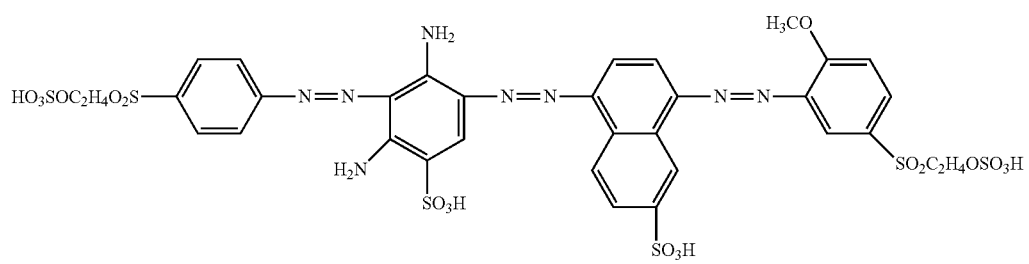
(III-35)
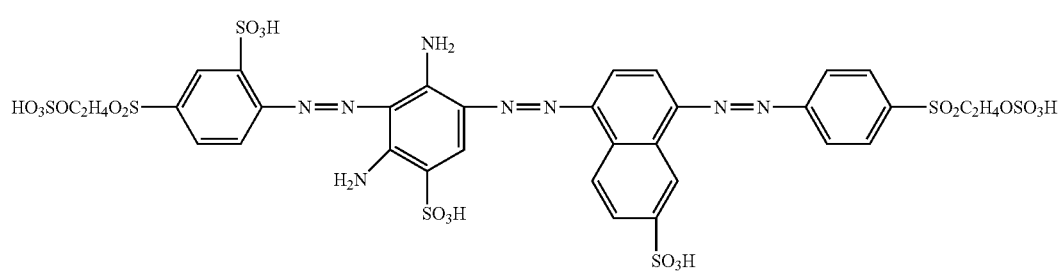
(III-36)
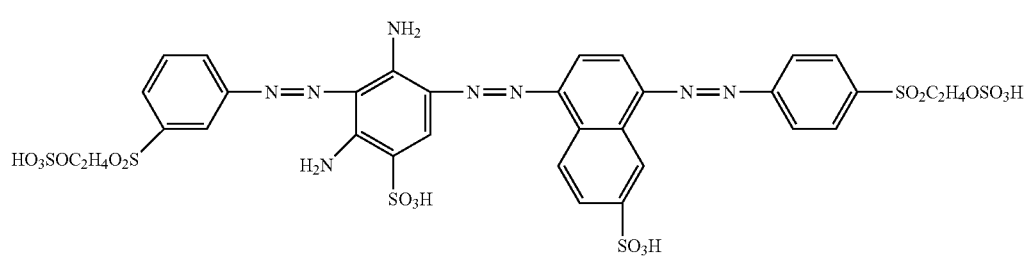
(III-37)

-continued
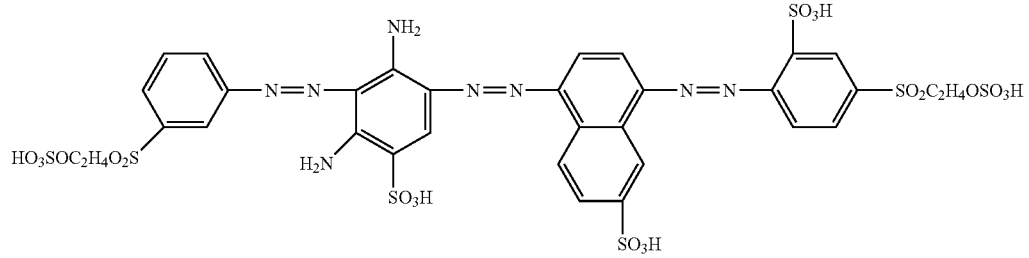
(III-38)
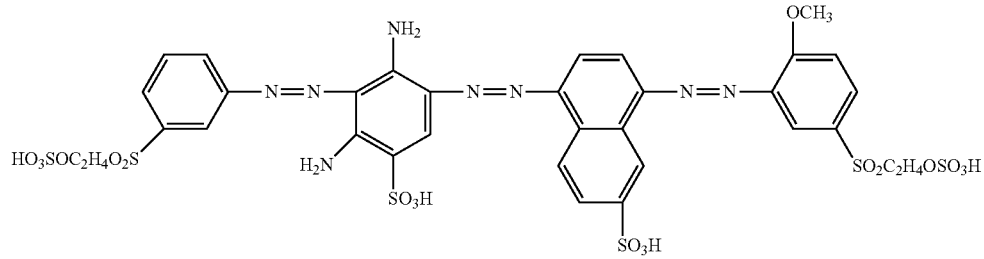
(III-39)
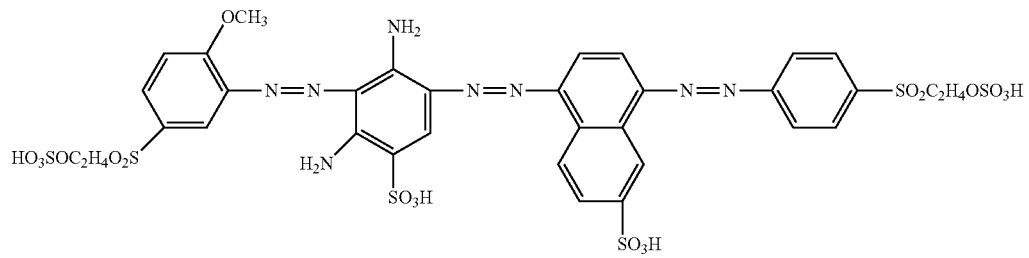
(III-40)
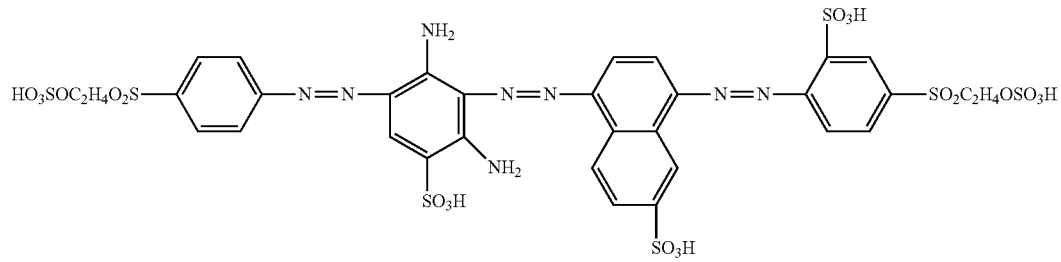
(III-41)
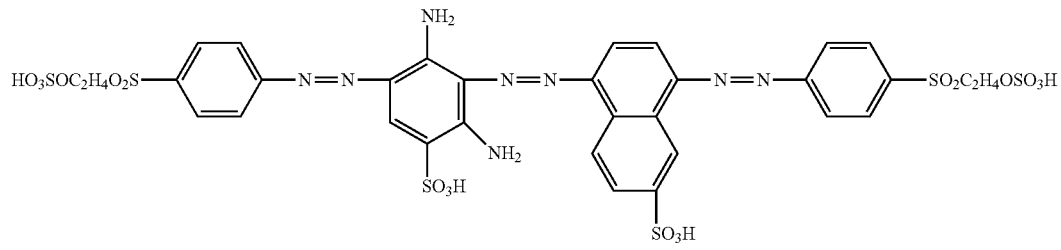
(III-42)
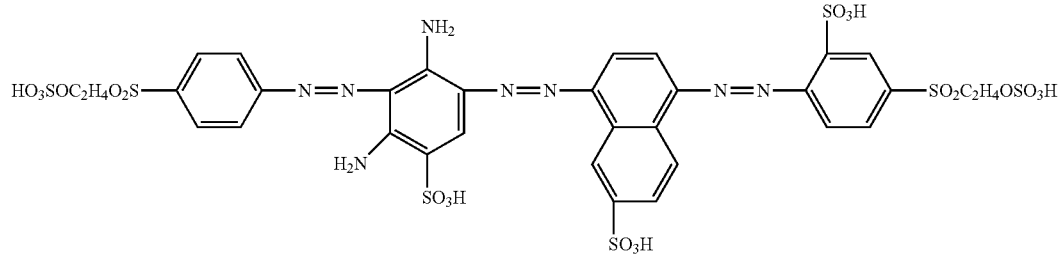
(III-43)

-continued
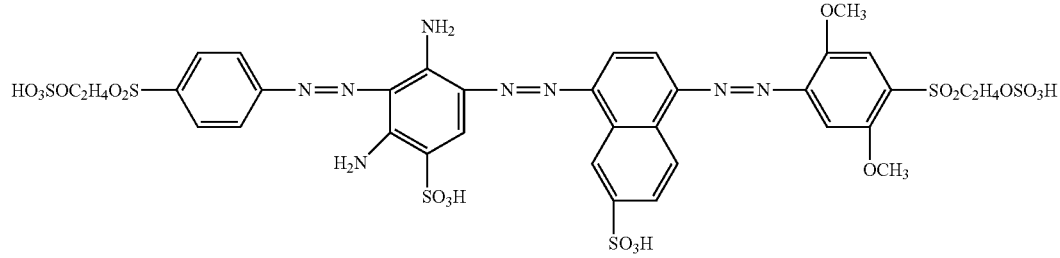
(III-44)
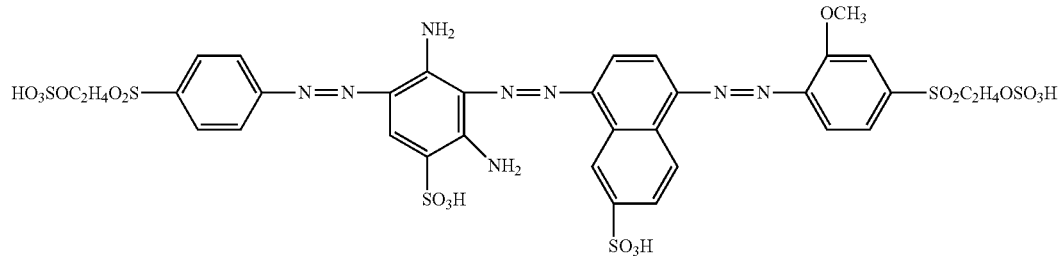
(III-45)
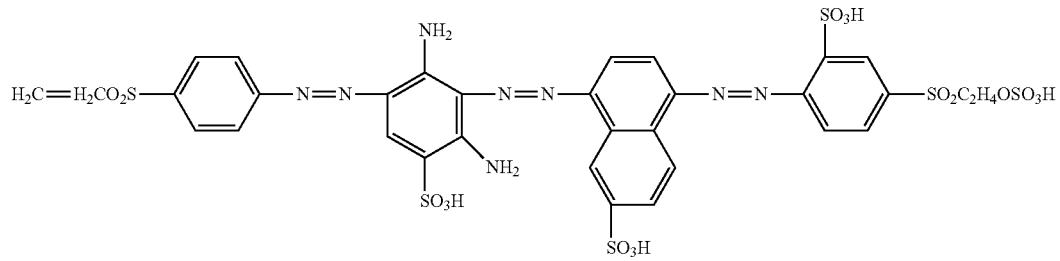
(III-46)
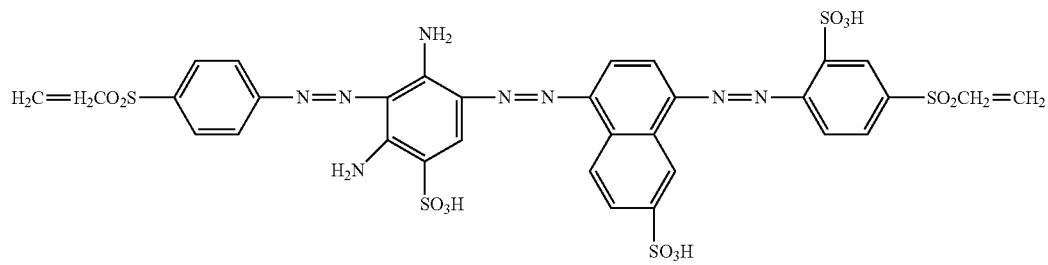
(III-47)
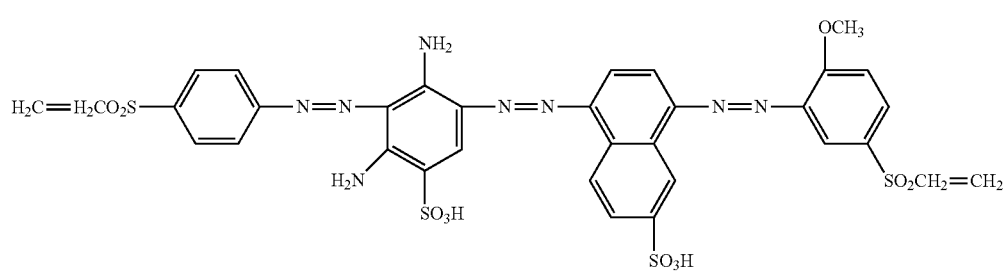
(III-48)

-continued
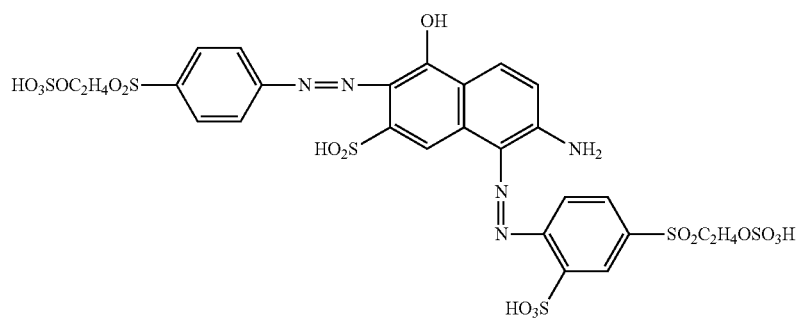
(IV-1)
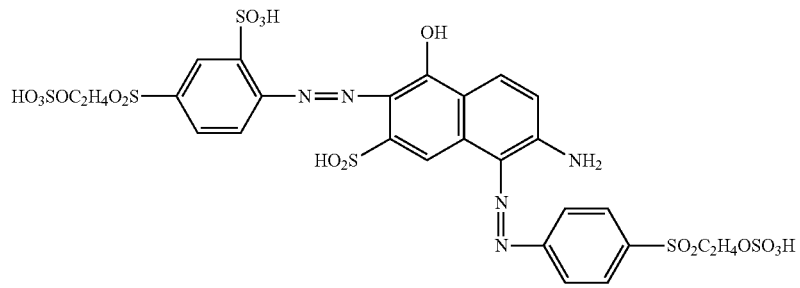
(IV-2)
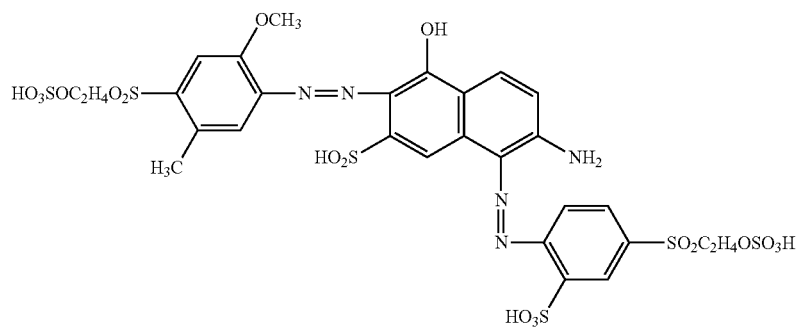
(IV-3)
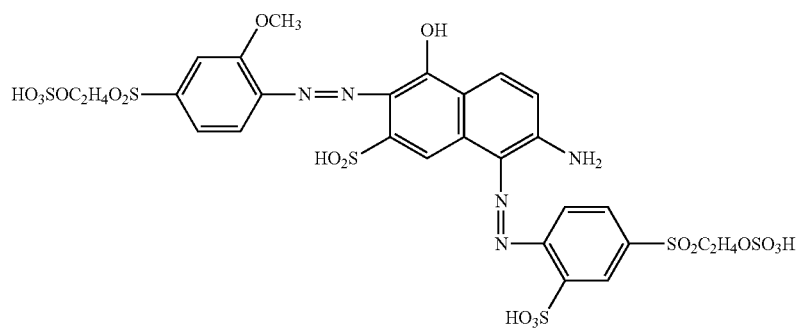
(IV-4)
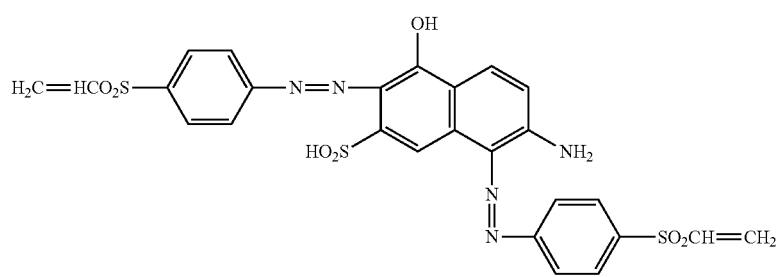
(IV-5)

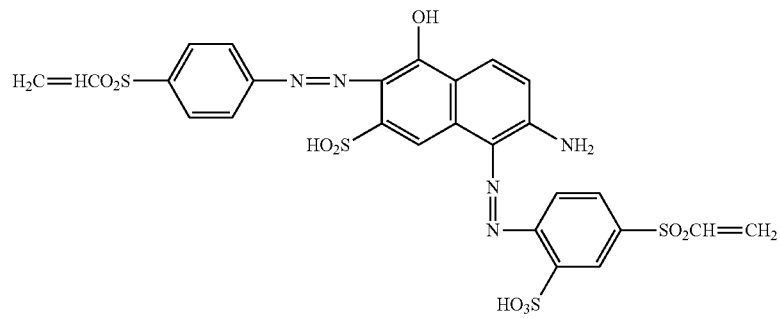
(IV-6)
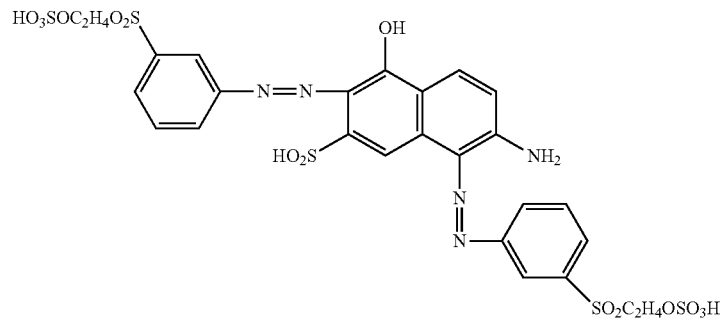
(IV-7)
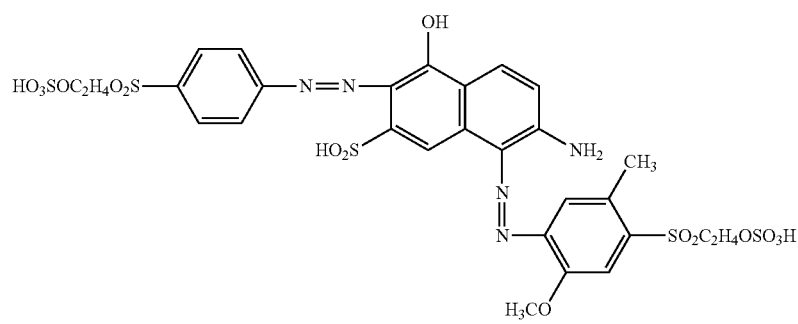
(IV-8)
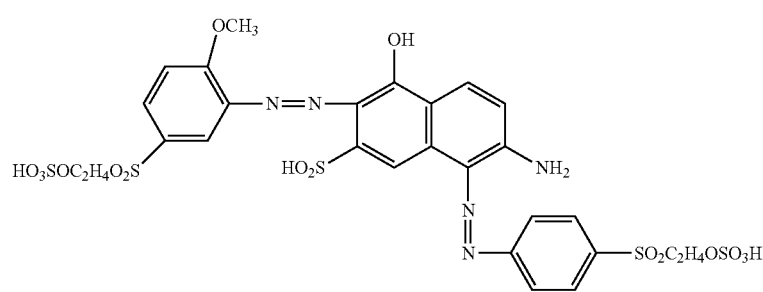
(IV-9)
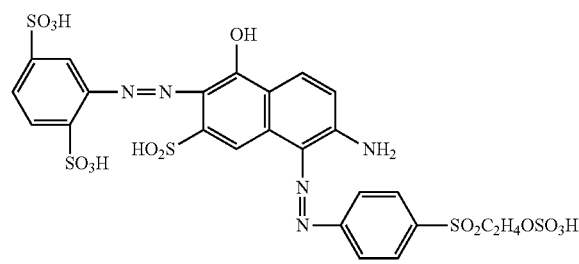
(IV-10)
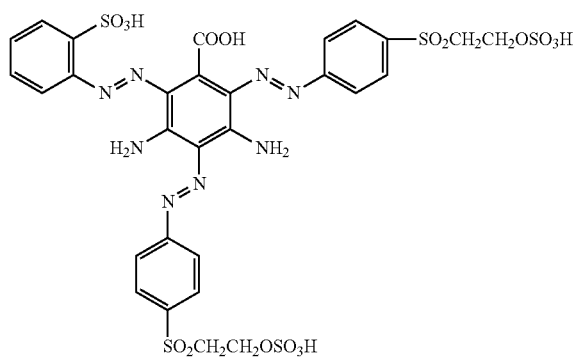
(V-1)

-continued
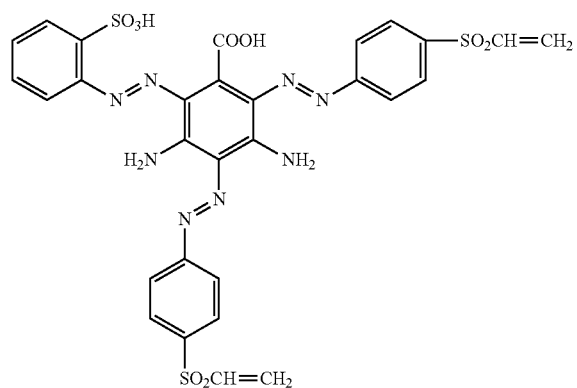
(V-2)
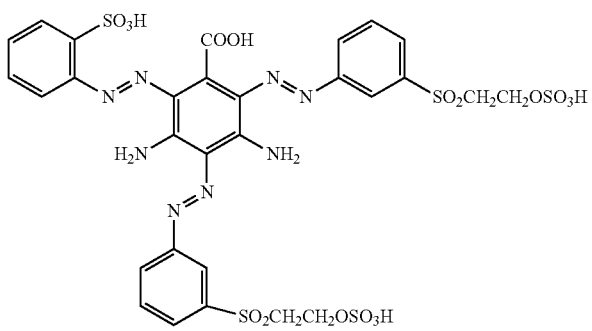
(V-3)
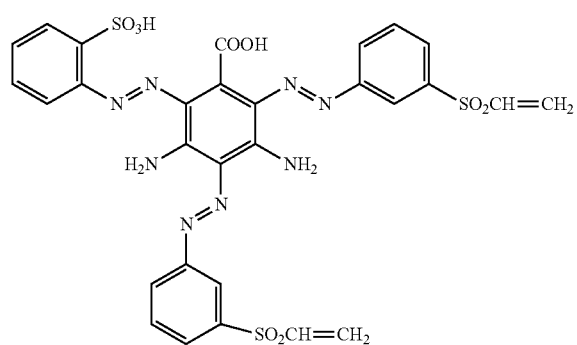
(V-4)
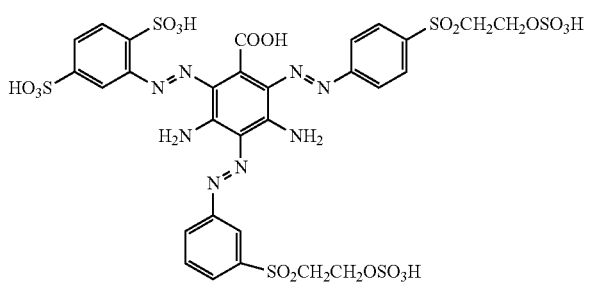
(V-5)
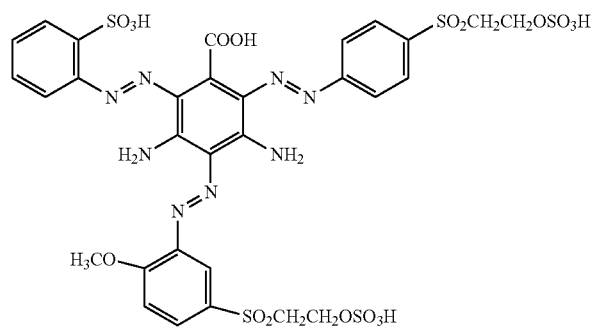
(V-6)
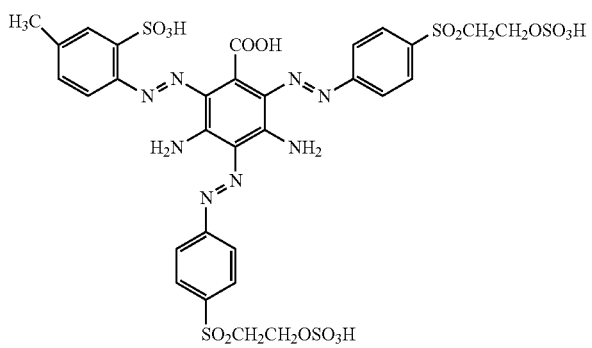
(V-7)
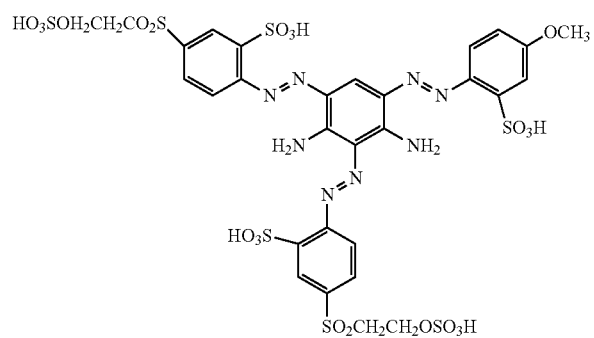
(V-8)
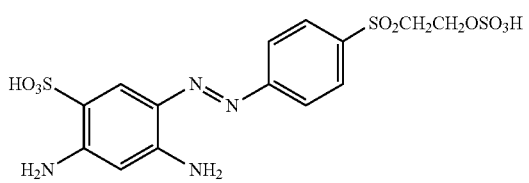
(VI-1)

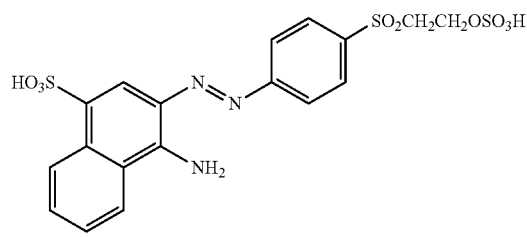 (VI-2)

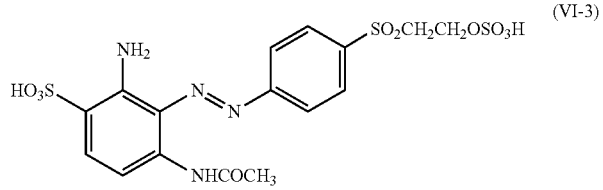 (VI-3)

More preferably, component C is selected from one or more dye compounds of formulae (III-1)~(III-31) and (IV-1)~(IV-9), even more preferably selected from at least one of formulae (III-1), (III-2), (III-4), (IV-1) and (IV-3). Particularly preferably, the dye composition of the present invention comprises component A and component B:

wherein component A is selected from at least one dye of formulae (I-1), (I-3), (I-4), (I-31), (I-32), (I-41), (I-48), (I-51), (I-52), (I-55) and (I-88), most particularly preferably selected from at least one dye of formulae (I-31), (I-32), (I-51) and (I-52); component B is selected from the dye of formula (II-1) and/or the dye of formula (II-3);

based on the sum of the mass of component A and component B, the mass percentage of component A is 5% to 50%, and the mass percentage of component B is 50% to 95%.

The dye composition of the present invention also particularly preferably comprises component A, component B and component C:

wherein component A is selected from at least one dye of formulae (I-1), (I-3), (I-4), (I-31), (I-32), (I-41), (I-48), (I-51), (I-52), (I-55) and (I-88), more particularly preferably selected from at least one dye of formulae (I-31), (I-32), (I-51) and (I-52);

component B is selected from the dye of formula (II-1) and/or the dye of formula (II-3);

and component C is selected from at least one dye of formulae (III-1), (III-2), (III-4), (IV-1) and (N-3);

based on the sum of the mass of component A and component B, the mass percentage of component A is 5% to 50%, the mass percentage of component B is 50% to 95%, and the mass of component C is 1% to 50% of the total mass of component A and component B.

In the reactive navy to black dye composition of the present invention, the dyes of formulae (II)~(VI) used are all known dyes, and can be synthesized by conventional methods, for example, synthesized by using suitable components well known to those skilled in the art in necessary proportions by means of conventional diazotization and coupling reactions, or prepared according to the methods described in the applications CN101250334A, CN1163291A and CN105176139A or the like. The compound of formula (I) can also be prepared by the conventional diazotization and coupling reactions for reactive dyes, for example:

(1) diazotization reaction: the compounds represented by the following formula (a0), formula (b0) and/or formula (c0) are each beaten with ice water for 1 to 2 hours; after the beating, a certain amount of hydrochloric acid is added, and then a sodium nitrite solution is added within 20-30 min, the diazotization reaction is carried out by controlling pH at between 0.5 and 3.0 (preferably between 0.5 and 2.0) and temperature T at 0° C. to 30° C. (preferably 0° C. to 20° C.), the end point is detected with an ethanol solution of 4-dimethylaminobenzaldehyde (that is, no color change within 5 s); after the diazotization, the excess sodium nitrite is eliminated with sulfamic acid, and the diazo solution is stored for use; wherein the molar ratio of each of the compounds of formula (a0), formula (b0) or formula (c0) to hydrochloric acid and sodium nitrite is 1:(1-3):(1-1.1), preferably is 1:(1-1.8):(1-1.02).

(2) Coupling Reaction:

3,5-dihydroxybenzoic acid is added with water and beaten, and the resulting 3,5-dihydroxybenzoic acid solution is subjected to stepwise coupling with one of the diazonium salts obtained in the step (1) as needed, in the first-coupling the coupling reaction is preferably carried out at pH between 3 and 4.5 and the temperature of 0-30° C. (preferably 0-20° C.), and the reaction is ended when the content of the free 3,5-dihydroxybenzoic acid is detected to be below 3% by HPLC; then the first-coupling product is subjected to the second-coupling with one of the diazonium salts obtained in step (1) as needed, in the second-coupling the coupling reaction is preferably carried out at pH between 5.0 and 8.0 and the temperature of 0-30° C. (preferably 0-20° C.), when the content of the first-coupling product is detected to be below 3% by HPLC the second-coupling reaction is ended, and the reactive dye compound (I) is obtained; wherein, the molar ratio of 3,5-dihydroxybenzoic acid to the diazonium salt used for the two couplings is controlled to be 1:(0.95-1.2), preferably controlled to be 1:(0.98-1.08); or further added with alkali for adjusting the pH value to 10~11 for hydrolysis to the form of vinyl sulfone, and then acidified;

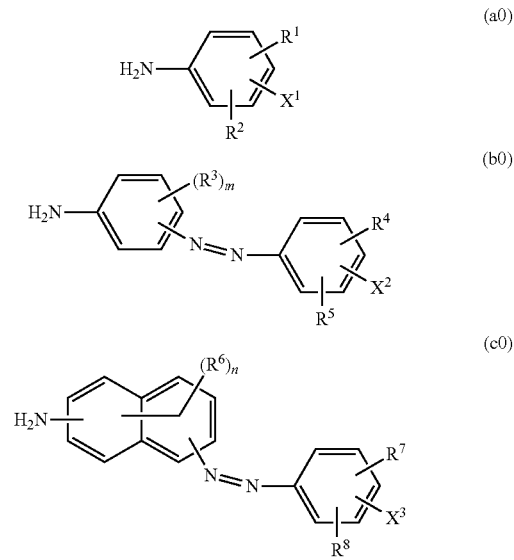

each substituent of formulae (a0), (b0) and (c0) is as defined in formula (I). It should be emphasized that in the reactive navy to black dye composition of the present invention, the dye compounds coupled at the ortho-position of the phenolic hydroxyl, often exist in a stable state of quinohydrazone, that is, the dyes of the general formula (I) substantially contain a quinohydrazone structure of the following formula (Ia) and/or formula (Ib) and/or (Ic) and/or (Id), and the dyes of the general formulae (II) and (IV) substantially contain quinohydrazone structure of the following formulae (IIa) and (IVa), respectively. In view of the writing habits of those skilled in the art, azo-form is also used as the written form in the summary of the invention and the examples, which does not affect the essence of the present invention:

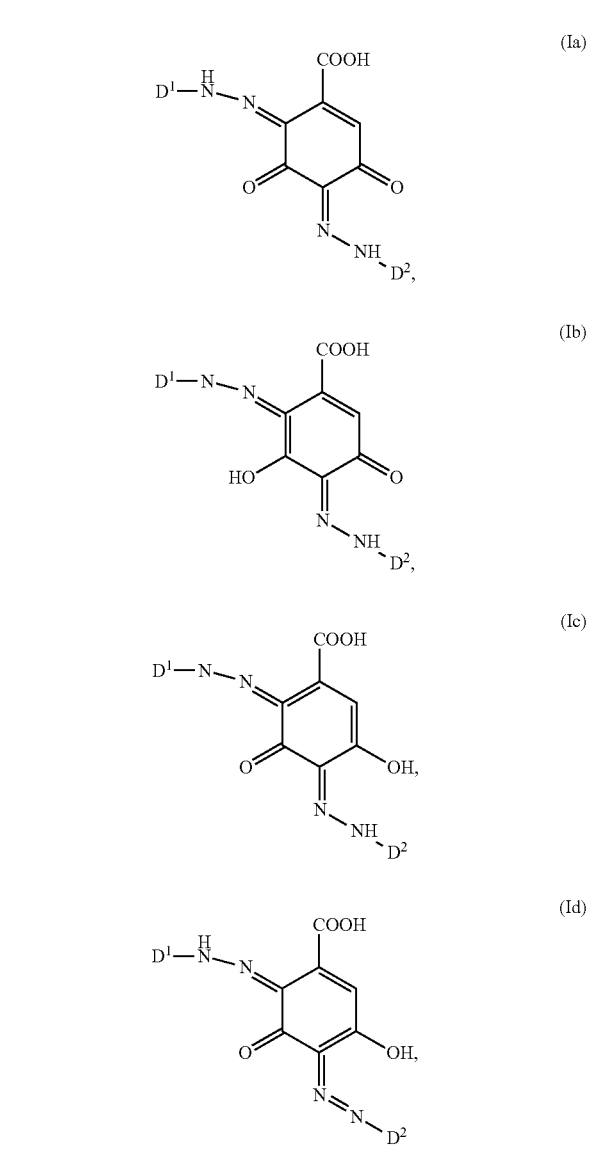

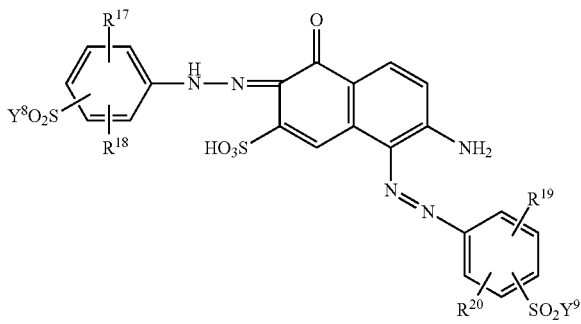

the definitions of the substituents of the above formulae (Ia)~(Id) are the same as that of formula (I), and the definitions of the substituents of formulae (IIa) and (IVa) are respectively the same as that of formulae (II) and (IV).

In addition, each monochromatic dye compound of the reactive navy to black dye composition of the present invention, is represented by the form of free acid, however, in the actual synthesis process, they are usually prepared and isolated in the form of alkali metal salt (such as sodium or potassium salt) and also used for dyeing in the form of salt, which is also well known to those skilled in the art, that is, the carboxyl and sulfo groups in formula (I)~formula (VI) may exist in the form of sodium carboxylate and sodium sulfonate, respectively.

The preparation method of the reactive navy to black dye composition of the present invention comprises mixing the dye components A and B, or A, B and C according to the said ratio. The mixing can adopt a conventional mechanical means, such as performing in a grinder, a kneading machine or a homogenizer. In the mixing process, the individual dye compound of (I)~(VI) may be present in the form of powder, granule, aqueous solution or synthetic solution. When the individual dye compound is mixed in the form of a synthetic solution, separation of the reactive navy to black dye composition of the present invention from the synthetic solution can be carried out by a generally known method, for example, the dye is salted out and filtered from a reaction medium with the electrolyte (such as sodium chloride or potassium chloride), or the mixture is evaporated and spray dried. Hence, the dye components A, B, C and their dye compositions generally contain the conventional electrolyte salts (such as sodium chloride, sodium sulfate, etc.) in the reactive dyes.

While the reactive navy to black dye composition of the present invention is sold as a commodity, it can be without an auxiliary, and can also be added with a conventional auxiliary in commercial dyes, such as a cosolvent, a dispersant, an alkali-resistant auxiliary, a dustproof agent, a surfactant, a buffer, and an accelerant. Therefore, the present invention also provides a reactive navy to black dye product comprising the reactive navy to black dye composition. Preferably, the reactive navy to black dye product contains the reactive navy to black dye composition and an auxiliary. The weight of the auxiliary does not exceed 45%, preferably 40% of the weight of the reactive navy to black dye composition. The auxiliary is preferably selected from one or more of the following auxiliaries: a naphthalene sulfonic acid formaldehyde condensate (NNO), a methylnaphthalenesulfonic acid formaldehyde condensate (dispersant MF), a diffusing agent CNF (benzylnaphthalenesulfonate formaldehyde condensate), Yuanming powder (industrial sodium sulfate), lignosulfonate, sodium acetate, sodium hydrogencarbonate, sodium citrate, sodium dihydrogen phosphate, disodium hydrogen phosphate, thickener, and the like. All the auxiliaries are commercially available conventional varieties.

The reactive navy to black dye product of the present invention is suitable for printing of nitrogen-containing and/or hydroxyl-containing fiber materials, which may be cellulose fibers, polyamide fibers and fabrics thereof. Wherein, the cellulose fibers are preferably cotton fibers or regenerated fibers, and of course may include other vegetable fibers such as hemp fibers or fabrics; the polyamide fibers preferably include animal fiber materials including skin, wool or silk, and synthetic fiber materials such as nylon 6 and nylon 66. When the above-mentioned fiber materials are printed by using the reactive navy to black dye product of the present invention, it can be carried out according to known reactive dye dyeing methods, such as a commonly used reactive dye dip dyeing method and pad dyeing method, and the dip dyeing method is a method of immersing a fabric in a dyeing solution to gradually dye the dye onto the fabric, which usually requires a process of dyeing-fixing-washing-soaping-washing-dehydration-drying and so on.

The pad dyeing method is a method of firstly immersing the fabric in a dyeing solution, then passing the fabric through a roll, uniformly rolling the dye solution into the interior of the fabric, and then treating the fabric by steaming, hot-melting or other treatments, which usually requires a process of padding with a dye solution—drying—(padding with a fixing solution)—steaming or curing—washing—soaping—washing—drying and so on.

Generally, due to different requirements for the dyeing color of fabrics, the usage amount of dyes is different. When dyeing by dip dyeing, the dyeing depth (owf) is generally between 0.1% and 10% (which means the dye accounts for 0.1%~10% of the fabric weight), the bath ratio is 1:2 to 1:60 (weight ratio of fabric to dyeing solution, preferably from 1:10 to 1:30), the initial dyeing temperature is controlled at 30° C. to 60° C., the dyeing time is 10 minutes to 30 minutes, the soaping temperature is 85° C. to 95° C., the soaping time is 10 minutes to 15 minutes, the fixing temperature is 60° C. to 100° C., the fixing time is 10 minutes to 50 minutes, and the fixing pH is 9 to 11. When dyeing by the pad dyeing method, the pickup of cellulose fiber is generally 60% to 80%, the steaming temperature is 100° C. to 103° C., and the steaming time is 1 minute to 3 minutes. In padding method, cold pad-batch dyeing method is widely used, in which a dye and an alkaline substance are introduced into a pad dyeing machine, batched onto a roll and the roll which is covered is turned slowly for 2 hours to 30 hours at room temperature for fixation, and then thoroughly rinsed. The advantages of the present invention are mainly embodied in that when used for dyeing and printing of nitrogen-containing and/or hydroxyl-containing fiber materials, the reactive navy to black dye composition and product of the present invention have the properties of good build-up, good compatibility, high degree of fixation and dye-uptake, clear remanent dyeing liquor, excellent washing fastness, and the like.

SPECIFIC EMBODIMENTS

Figure 1:
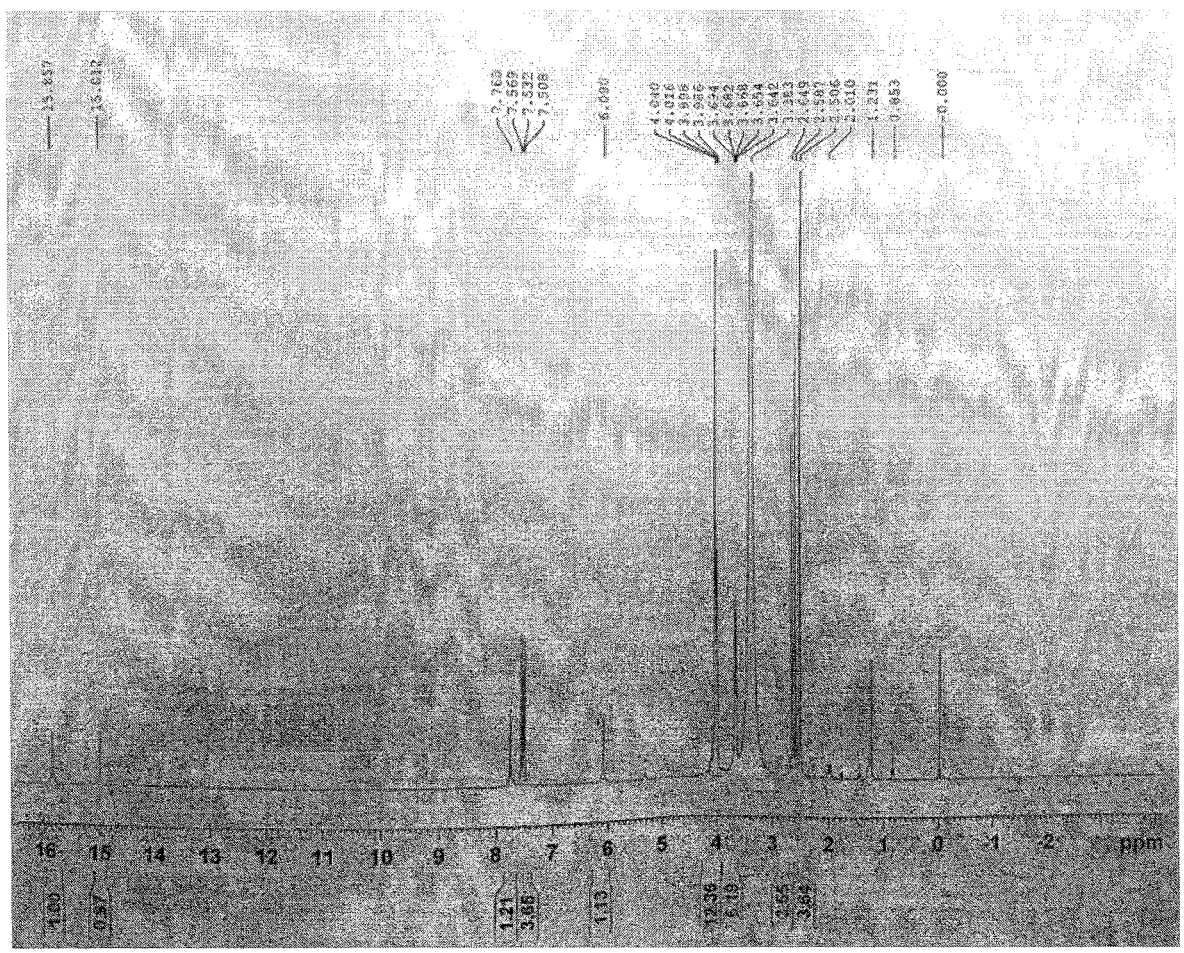
FIG. 1 is the 1HNMR spectrum of the reactive orange dye compound (I-1) obtained in example 1.
Figure 2:
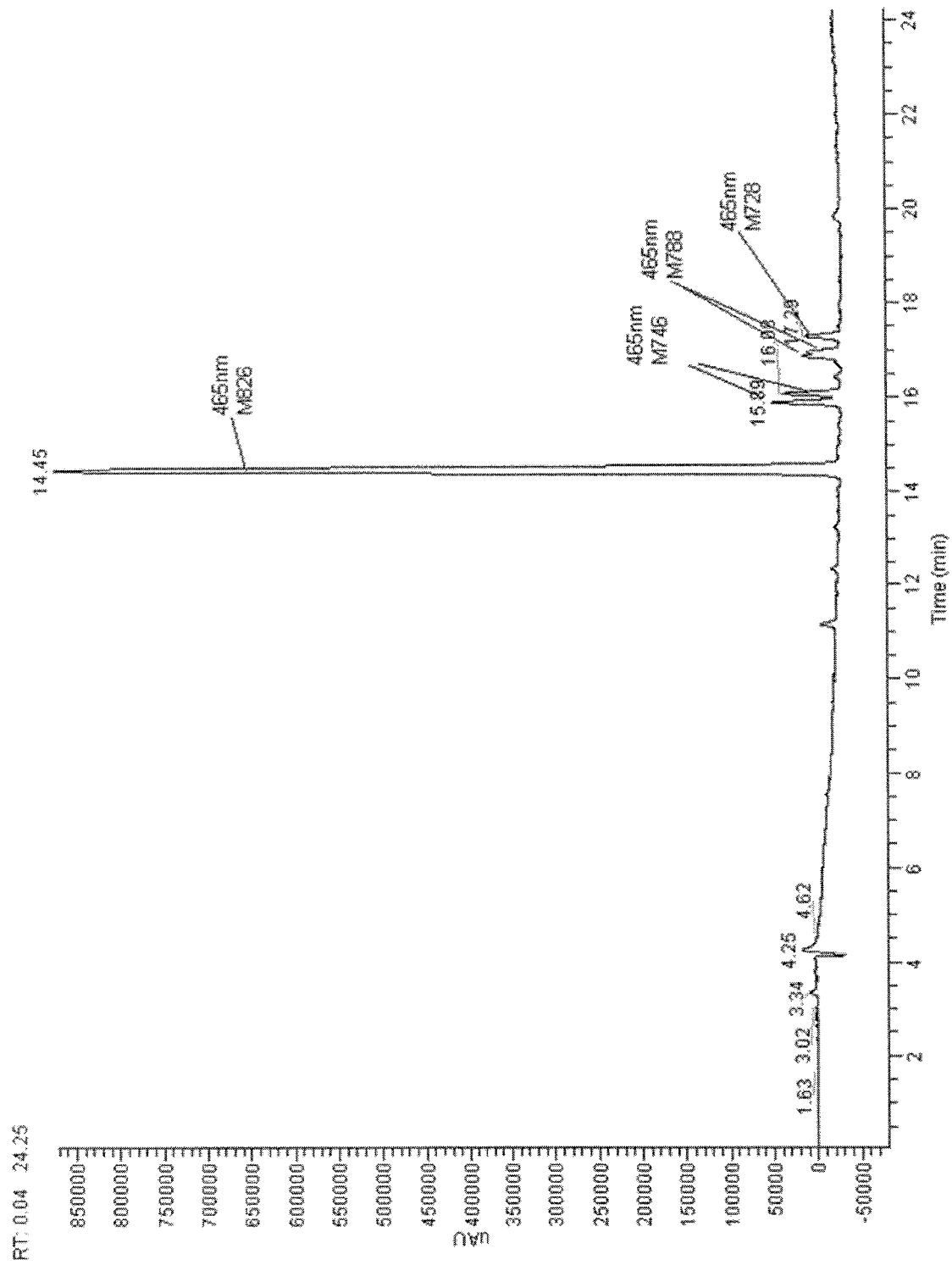
FIG. 2 is the LC-MS spectrum of the reactive orange dye compound (I-1) obtained in example 1.
Figure 3:
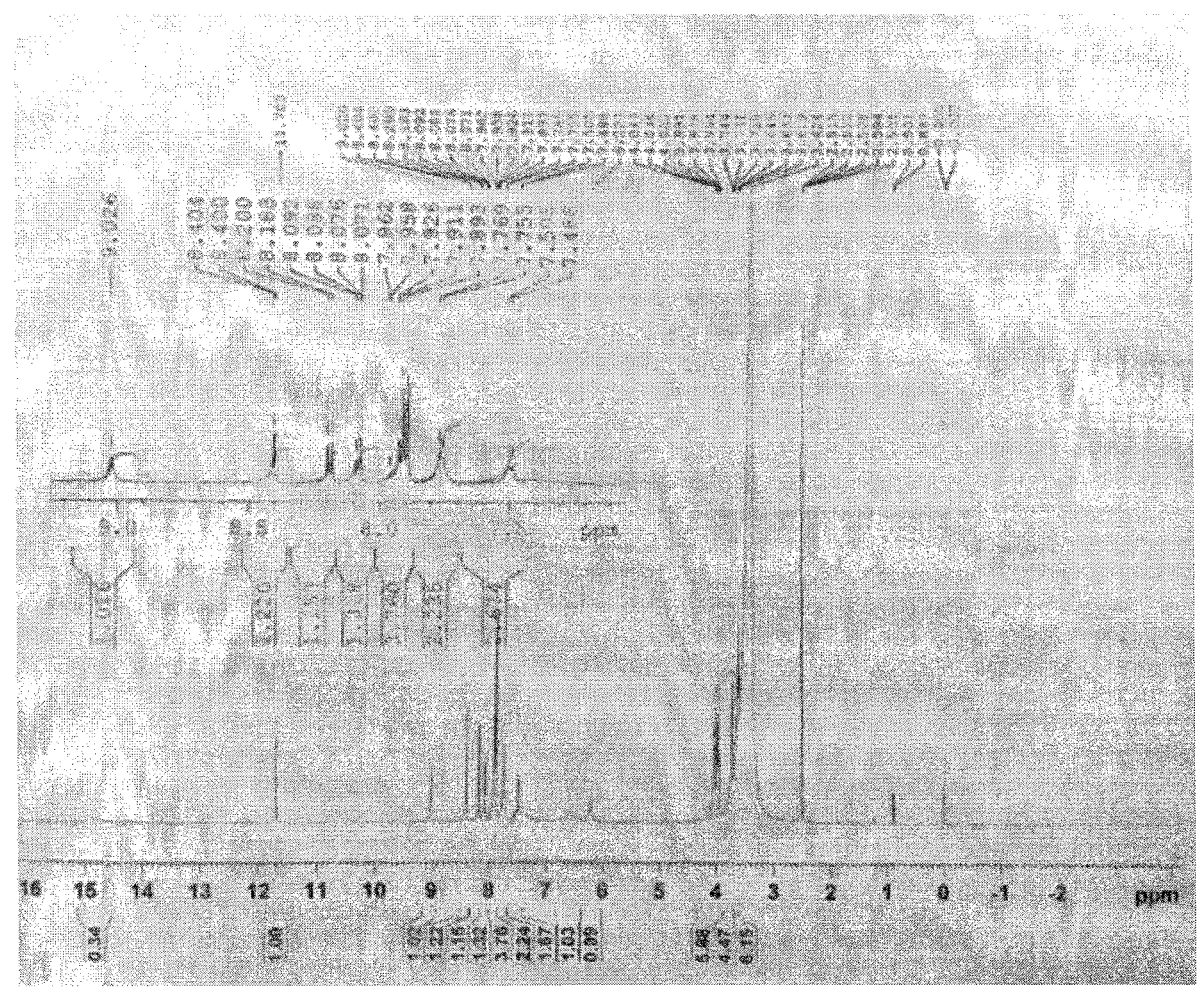
FIG. 3 is the 1HNMR spectrum of the compound (I-31) obtained in example 1.
Figure 4:
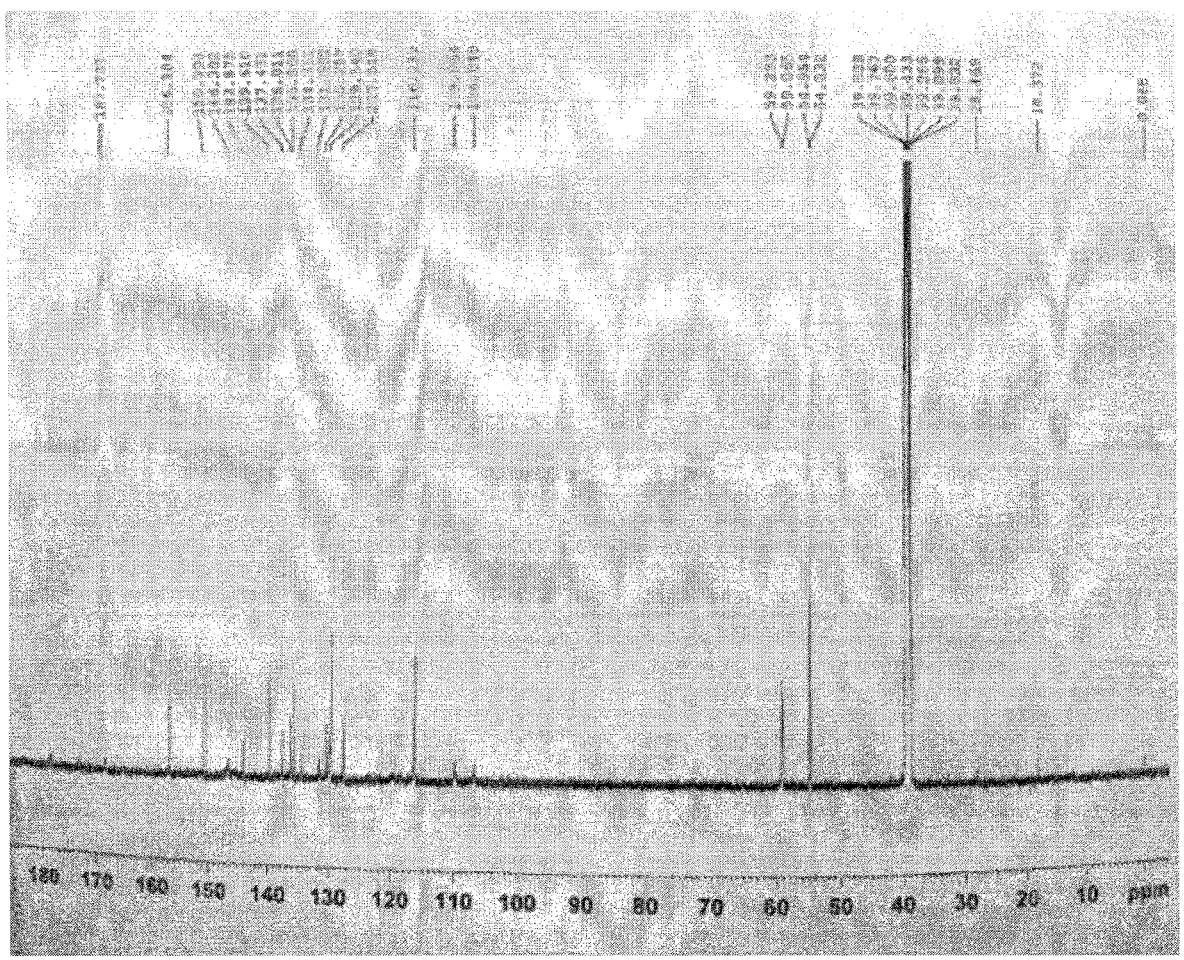
FIG. 4 is the 13C NMR spectrum of the compound (I-31) obtained in example 1.

The present invention will be further described in conjunction with the specific examples, but the scope of protection of the present invention is not limited thereto. In the range of the general formulae of the present invention, dye compositions having similar properties obtained by corresponding group replacement should be included in the scope of protection of the present invention.

Example 1

1) Diazotization: 100 g of water and 100 g of ice were added into 32.5 g (0.2 mol) of cristidine para-ester (2-methoxy-5-methyl-para-ester) and beaten for 1 h, then 40 g of 31% hydrochloric acid (containing 0.34 mol of HCl) were added, 48 g of a 30% sodium nitrite solution (containing 0.208 mol of sodium nitrite) were added within 20-30 minutes, the diazotization reaction was carried out by controlling pH between 0.5 and 2.0 and temperature T at 0° C. to 20° C., and the end point was detected using an ethanol solution of 4-dimethylaminobenzaldehyde (ie, no color change within 5 s). After the diazotization, the excess sodium nitrite was eliminated with sulfamic acid, and the diazo solution was stored for use.

2) First-coupling: 15.4 g (0.1 mol) of 3,5-dihydroxybenzoic acid were added to 200 g of water for beating. After the beating, the diazo solution of 0.1 mol cristidine di-ester was added to 3,5-dihydroxybenzoic acid solution. Meanwhile, the pH was controlled at 4.0 with 30% liquid alkali, the temperature was controlled at 0° C. to 20° C., the reaction was carried out for 0.5-2 h, and when the content of the free 3,5-dihydroxybenzoic acid was detected to be below 3% by HPLC, the reaction was ended. Otherwise, the reaction time was extended until the reaction came to the end. And the obtained first-coupling product was stored for use.

3) Second-coupling: the diazo solution of 0.1 mol cristidine di-ester was added to the first-coupling product, the pH was controlled at 5.0 to 8.0 with 30% liquid alkali, the temperature was controlled at 0° C. to 20° C., the reaction was carried out for 0.5-2 h, when the content of the free 3,5-dihydroxybenzoic acid was detected to be below 3% by HPLC, the reaction was ended. And the mixture was dried to obtain the orange reactive dye compound (I-1), whose $\lambda_{max}$ in water was 465 nm.

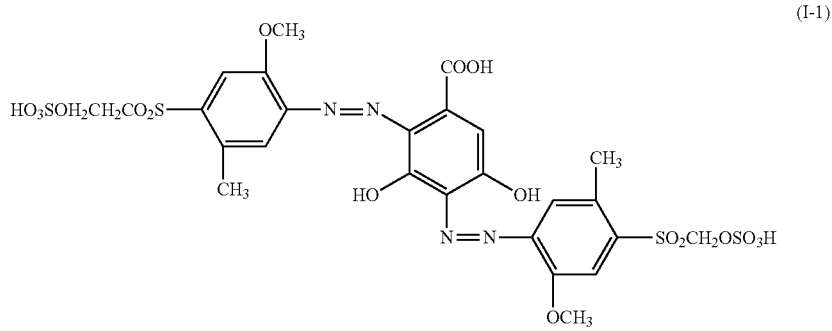

(I-1)

Examples 2~30

Referring to the preparation method of the disazo dye described in example 1, the dye compounds of the structures shown in table 1 and table 2 were obtained by stepwise coupling:

表1 TABLE 1

| Examples | Reactive dye compound | Wavelength λ(nm) |
|---|---|---|
| 2 | (I-2) | 430 |
| 3 | (I-3) | 420 |
| 4 | (I-4) | 425 |
| 5 | (I-5) | 425 |

TABLE 1-continued
| Examples | Reactive dye compound | Wavelength λ(nm) |
|---|---|---|
| 6 | 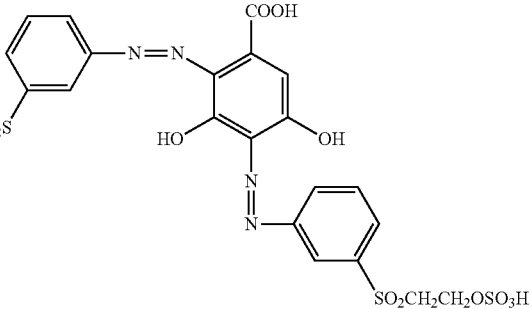 (I-6) | 420 |
| 7 | 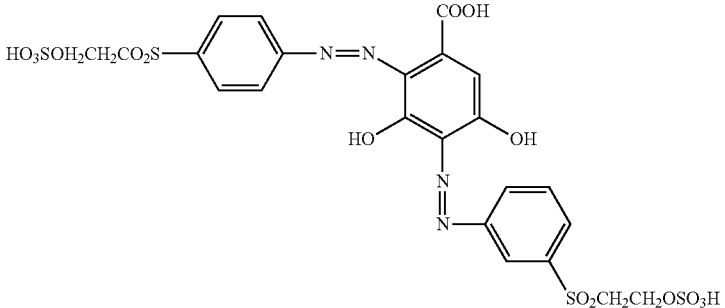 (I-7) | 420 |
| 8 | 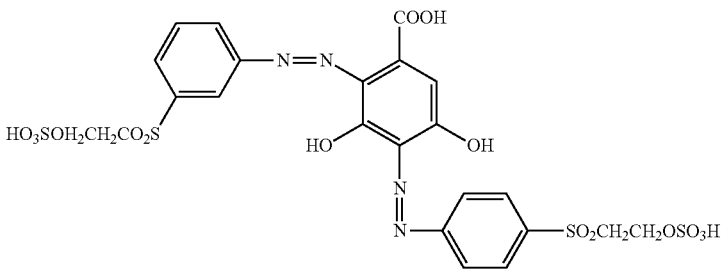 (I-8) | 420 |
| 9 | 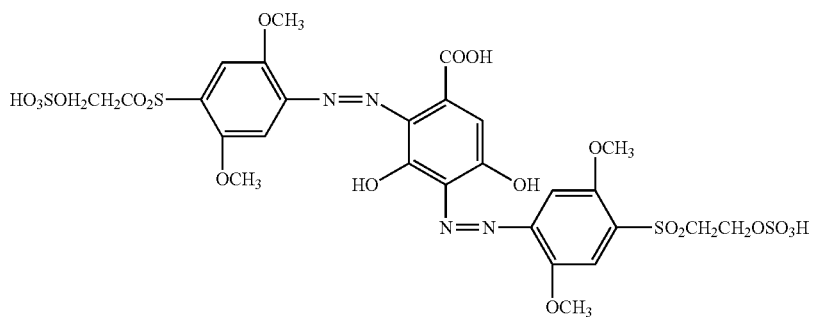 (I-9) | 455 |

TABLE 1-continued

| Examples | Reactive dye compound | Wavelength λ(nm) |
|---|---|---|
| 10 | (I-10) | 435 |
| 11 | (I-11) | 440 |
| 12 | (I-12) | 435 |
| 13 | (I-27) | 445 |

TABLE 1-continued
| Examples | Reactive dye compound | Wavelength λ(nm) |
|---|---|---|
| 14 | 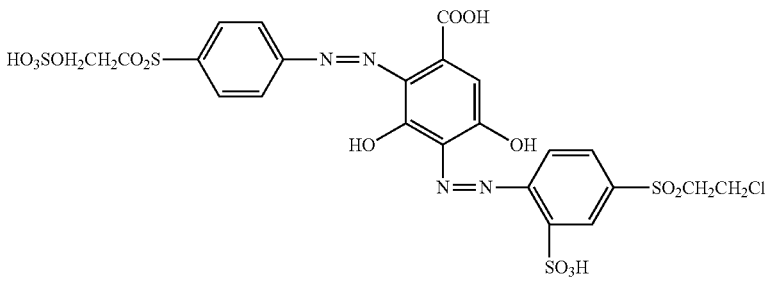 (I-21) | 425 |
| 15 | 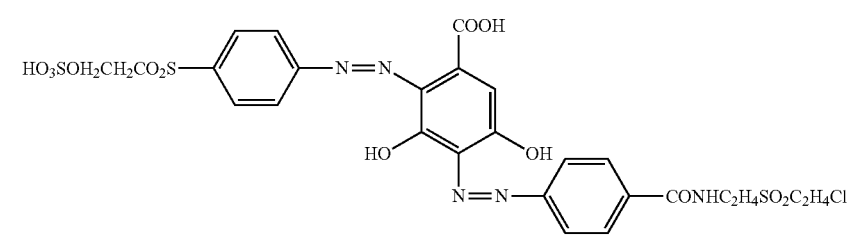 (I-22) | 420 |
| 16 | 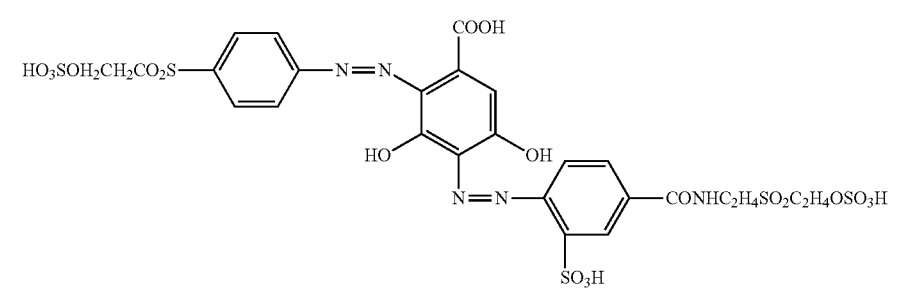 (I-23) | 425 |
| 17 | 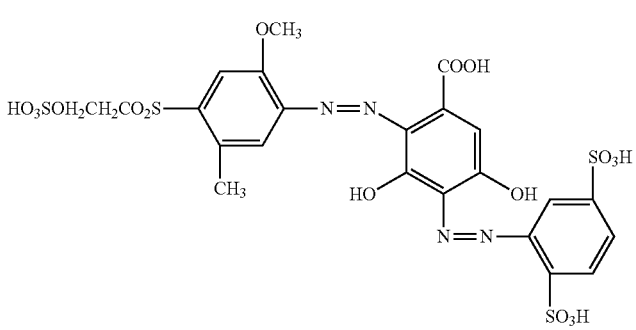 (I-24) | 430 |

TABLE 1-continued
| Examples | Reactive dye compound | Wavelength λ(nm) |
|---|---|---|
| 18 | (I-25) 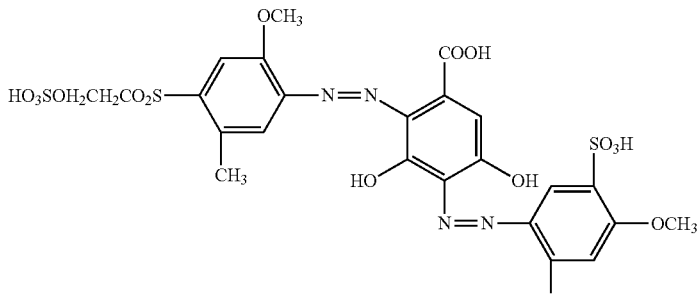 | 435 |
| 19 | (I-26) 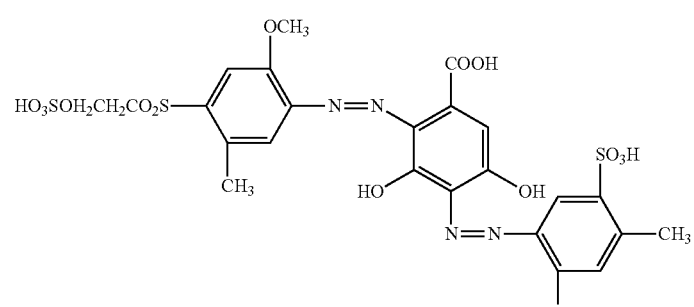 | 435 |
Table 2
| Examples | Reactive dye compounds | Wavelength λ(nm) |
|---|---|---|
| 20 | (I-13) 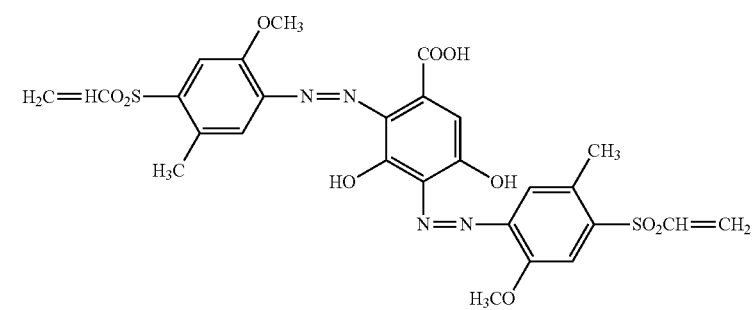 | 450 |

Table 2-continued
| Examples | Reactive dye compounds | Wavelength λ(nm) |
|---|---|---|
| 21 | 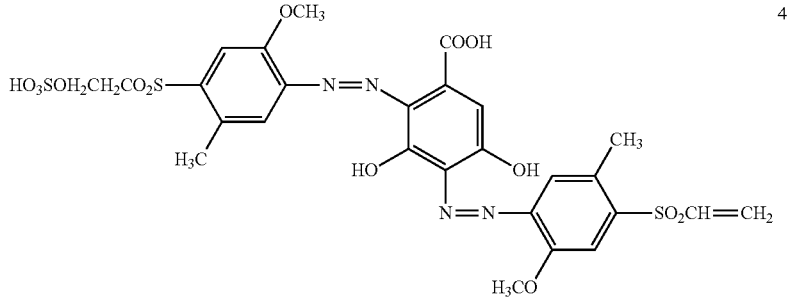<br>(I-14) | 450 |
| 22 | 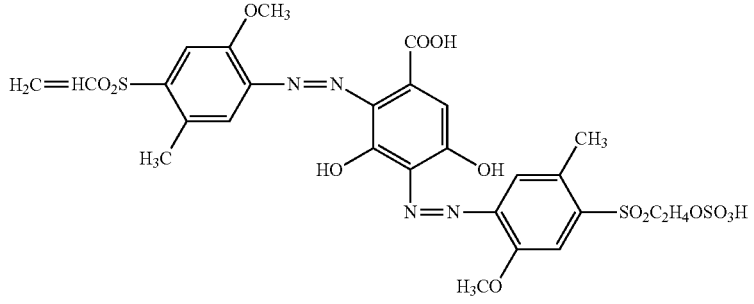<br>(I-15) | 450 |
| 23 | 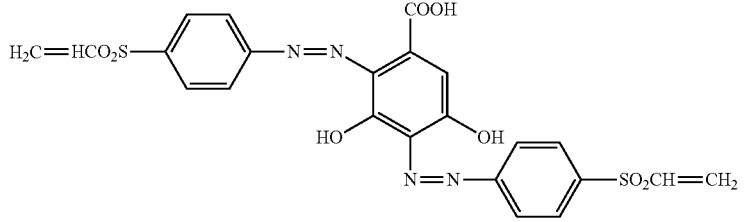<br>(I-16) | 420 |
| 24 | 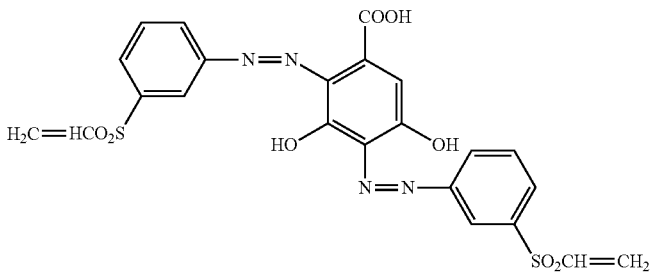<br>(I-17) | 420 |

Table 2-continued

| Examples | Reactive dye compounds | Wavelength λ(nm) |
|---|---|---|
| 25 | (I-18) | 420 |
| 26 | (I-19) | 425 |
| 27 | (I-20) | 425 |
| 28 | (I-28) | 435 |

Table 2-continued

| Examples | Reactive dye compounds | Wavelength λ(nm) |
|---|---|---|
| 29 | 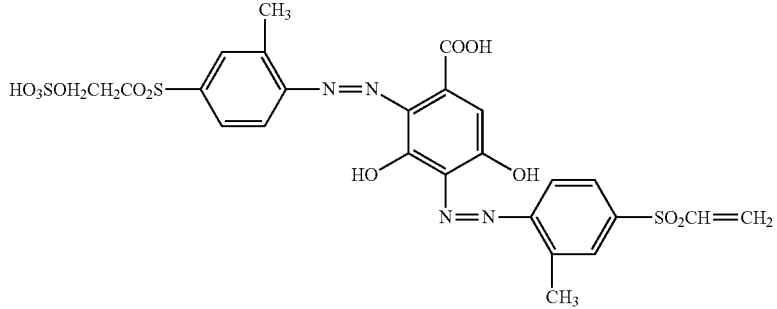 (I-29) | 435 |
| 30 | 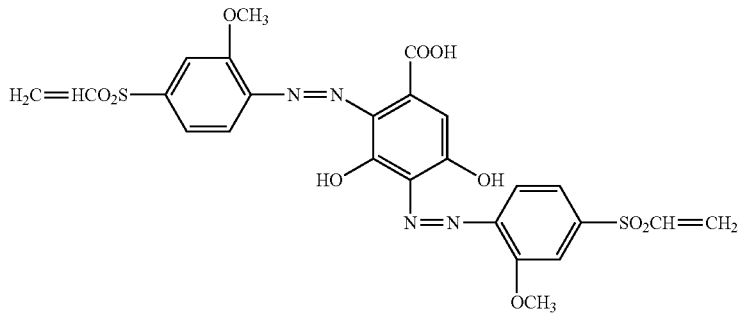 (I-30) | 435 |

Example 31

1) Diazotization:

28.1 g (0.1 mol) of para-ester (p-β-hydroxyethylsulfone sulfate aniline) were added into 100 g of water and 100 g of ice, beaten for about 1 h, added with 20 g of 31% hydrochloric acid (containing 0.17 mol of HCl), and added with 24 g of a 30% sodium nitrite solution (containing 0.104 mol of sodium nitrite) within 20 min to 30 min. The diazotization reaction was carried out for 1-2 hours by controlling pH between 0.5 and 2.0 and temperature T at 0° C. to 20° C., and the end point was detected using an ethanol solution of 4-dimethylaminobenzaldehyde (ie, no no color change within 5 s). After the diazotization, the excess sodium nitrite was eliminated with sulfamic acid, and the obtained diazo solution of para-ester was stored for use.

36.1 g (0.1 mol) of sulfonated para-ester (2-sulfonic acid-4-β-hydroxyethylsulfone sulfate aniline) were added into 100 g of water and 100 g of ice, beaten for about 1 h, added with 20 g of 31% hydrochloric acid (containing 0.17 mol of HCl), and added with 24 g of a 30% sodium nitrite solution (containing 0.104 mol of sodium nitrite) within 20 min to 30 min. The diazotization reaction was carried out for 1 hour to 2 hours by controlling pH between 0.5 and 2.0 and temperature T at 0° C. to 20° C., and the end point was detected using an ethanol solution of 4-dimethylaminobenzaldehyde (ie, no color change within 5 s). After the diazotization, the excess sodium nitrite was eliminated with sulfamic acid, and the obtained diazo solution of sulfonated para-ester was stored for use.

The above diazo solution of 0.1 mol sulfonated para-ester was added to 15.1 g (0.1 mol) of m-urea (m-ureidoaniline), the pH was controlled between 4.0 and 6.0 with 30% liquid alkali, and the temperature T was controlled at 0° C. to 20° C., the coupling reaction was carried out for 0.5 h to 2 h. The reaction solution was tested with H acid test solution, if the bleed circle was colorless, it meant that the diazo had been reacted completely to the end point (if not, the reaction continued to the end point), thereby obtaining chromophore 1. Chromophore 1 was added with 20 g of 31% hydrochloric acid (containing 0.17 mol of HCl), added with 24 g of a 30% sodium nitrite solution (containing 0.104 mol of sodium nitrite) within 20-30 min. The diazotization reaction was carried out for 1 hour to 2 hours by controlling pH between 0.5 and 2.0 and temperature T at 0° C. to 20° C., and the end point was detected using an ethanol solution of 4-dimethylaminobenzaldehyde (ie, no color change within 5 s). After the diazotization, the excess sodium nitrite was eliminated with sulfamic acid, and the obtained solution of chromophore 1 in diazo was stored for use.

2) Coupling:

Firstly, 154 g (0.1 mol) of 3,5-dihydroxybenzoic acid were added to 200 g of water for beating, pH was adjusted to 8.0-9.0 with soda ash, the temperature was 20° C. to 25° C., and the beaten 3,5-dihydroxybenzoic acid solution was added to the diazo solution of 0.1 mol para-ester obtained in step 1), the pH was controlled at 4.0 with 30% liquid alkali, the temperature was controlled at 0° C. to 20° C., the reaction was carried out for 0.5 h to 2.5 h, and when the content of the free 3,5-dihydroxybenzoic acid was detected to be below 3% by HPLC, the reaction was ended, and chromophore 2 represented by the following formula (A) was obtained, and characterized by H1-NHR spectra [$^1$HNMR (DMSO-d6) [3.68-3.71 ppm 2H(t), 3.98-4.01 ppm 2H(t), 6.42 ppm 1H(s), 6.62 ppm 1H(s), 7.96-7.97 ppm 2H (d), 8.05-8.07 ppm 2H (d)].

(A)

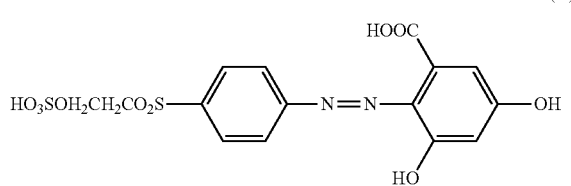

The diazo solution of chromophore 1 obtained in step (1) was added to the chromophore 2, the pH was controlled between 5.0 and 8.0 with 30% liquid alkali, and the temperature T was controlled at 0° C. to 20° C., the coupling reaction was further carried out for 0.5 h to 10 h. The diazotization was tested with H acid test solution, and if the bleed circle was colorless, it meant that the diazo had been reacted completely to the end point, thereby obtaining the orange reactive dye compound (I-31). In aqueous solution its λmax=485 nm, the mass spectrum (ESI-MS) m/z (−): 325.84 ($[M-3H]^{3-}/3$), 488.96 ($[M-2H]^{2-}/2$), 978.89 ($[M-H]^{-1}$). The dye (in terms of free sulfonic acid) had the molecular weight M of 980.0, and was characterized by H1-NHR spectra[$^{1}$HNMR(DMSO-d6)[3.61-3.74 ppm 4H(m), 3.96-4.04 ppm 4H(m), 6.22 ppm 1H(s), 7.48-8.20 ppm 8H(m), 8.40 ppm 1H(s), 9.02 ppm 1H (s), 11.1 ppm 1H (s)].

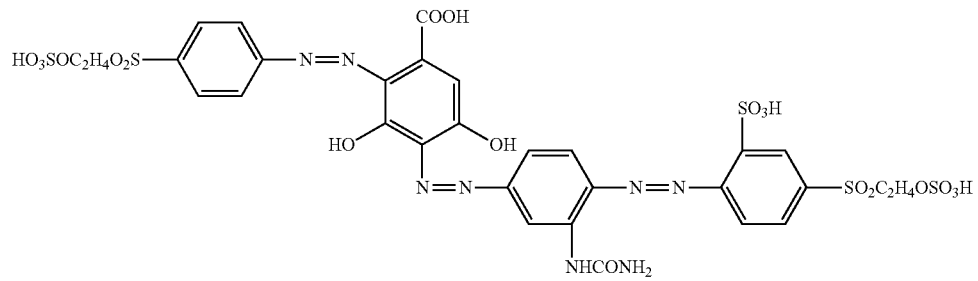

(I-31)

Example 32~90

Referring to the preparation method of the azo dye described in example 31, the dye compounds of the structures shown in the following tables 3~7 were respectively obtained by stepwise diazotization and coupling reactions as needed.

TABLE 3

| Example | Reactive dye compounds | Wavelength λ(nm) |
|---|---|---|
| 32 | (I-32) | 480 |
| 33 | (I-33) | 485 |

TABLE 3-continued
| Example | Reactive dye compounds | Wavelength λ(nm) |
|---|---|---|
| 34 | 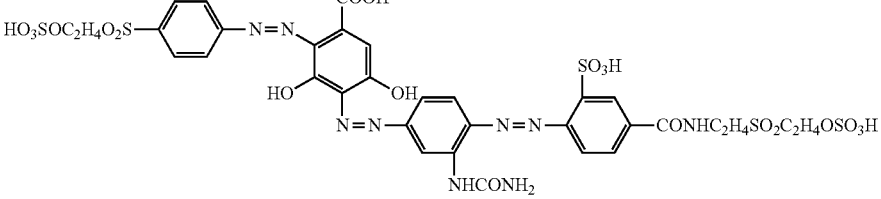 (I-34) | 490 |
| 35 | 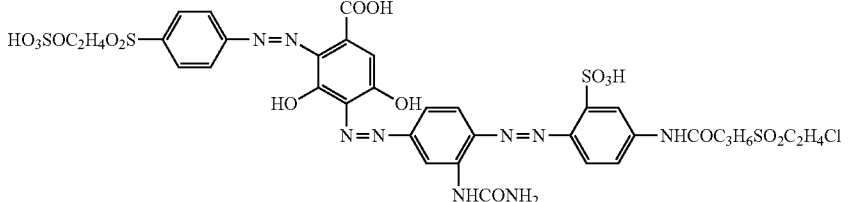 (I-35) | 495 |
| 36 | 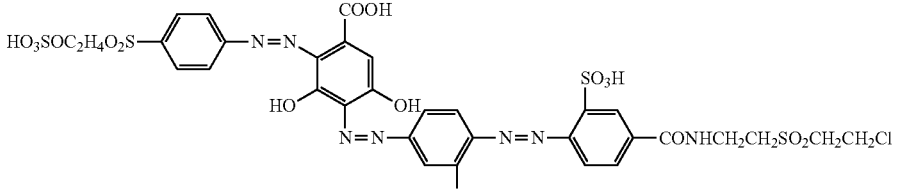 (I-36) | 490 |
| 37 | 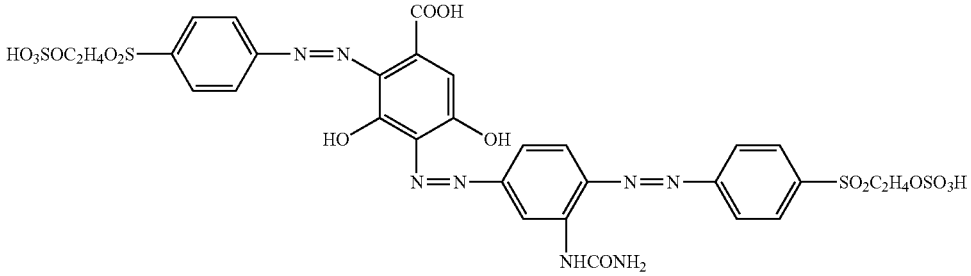 (I-37) | 465 |
| 38 | 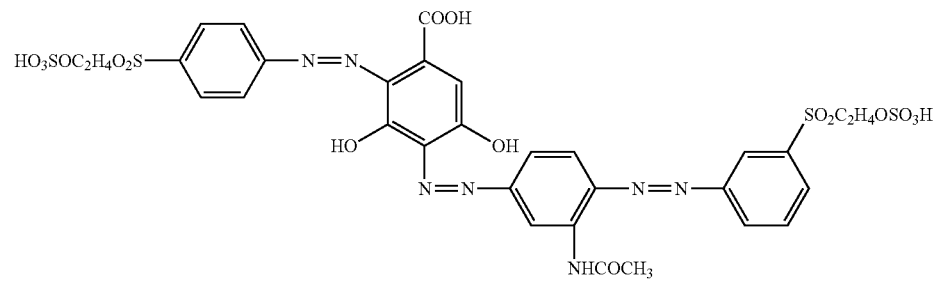 (I-38) | 470 |

TABLE 3-continued

| Example | Reactive dye compounds | Wavelength λ(nm) |
|---|---|---|
| 39 | (I-39) | 465 |
| 40 | (I-40) | 465 |
| 41 | (I-41) | 480 |
| 42 | (I-42) | 480 |

TABLE 3-continued
| Example | Reactive dye compounds | Wavelength λ(nm) |
|---|---|---|
| 43 | 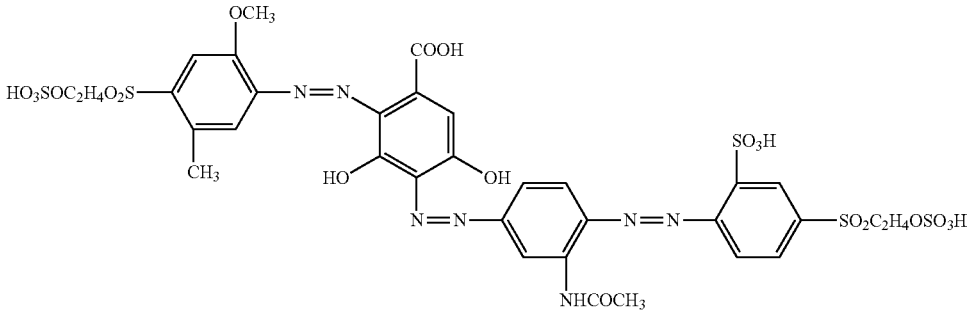 (I-43) | 475 |
| 44 | 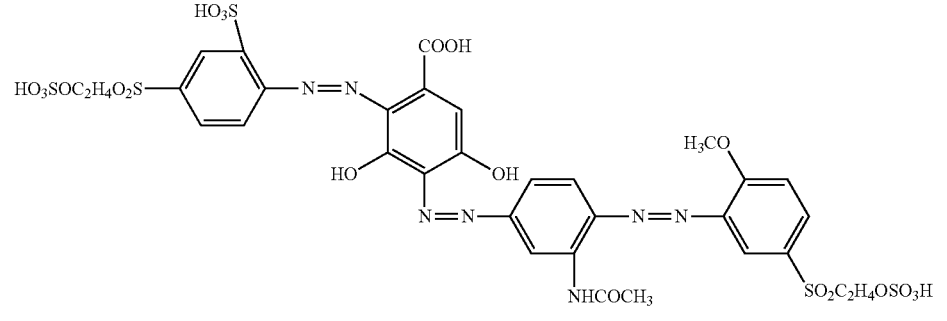 (I-44) | 470 |
| 45 | 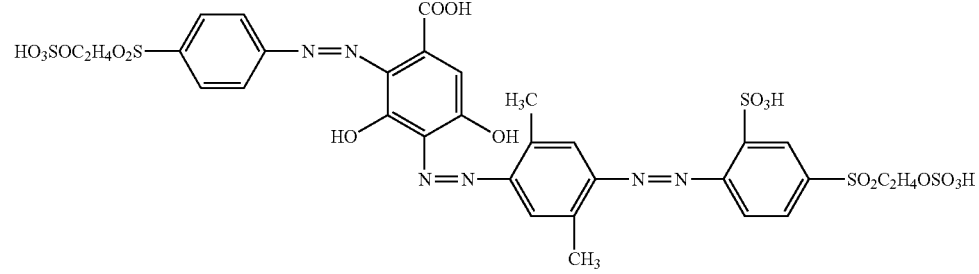 (I-88) | 485 |
| 46 | 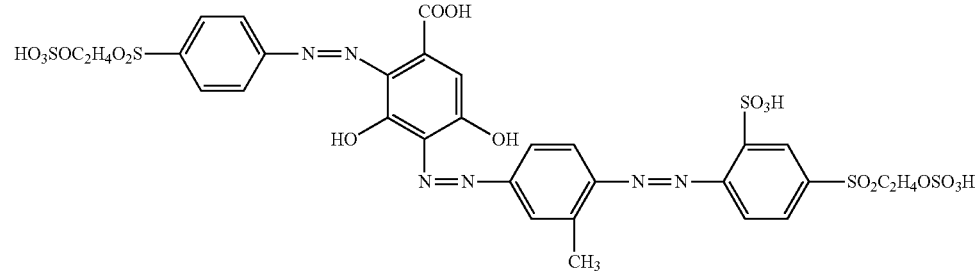 (I-89) | 475 |

TABLE 3-continued

| Example | Reactive dye compounds | Wavelength λ(nm) |
|---|---|---|
| 47 | (I-45) | 470 |
| 48 | (I-46) | 485 |
| 49 | (I-47) | 520 |
| 50 | (I-48) | 510 |

TABLE 3-continued
| Example | Reactive dye compounds | Wavelength λ(nm) |
|---|---|---|
| 51 | 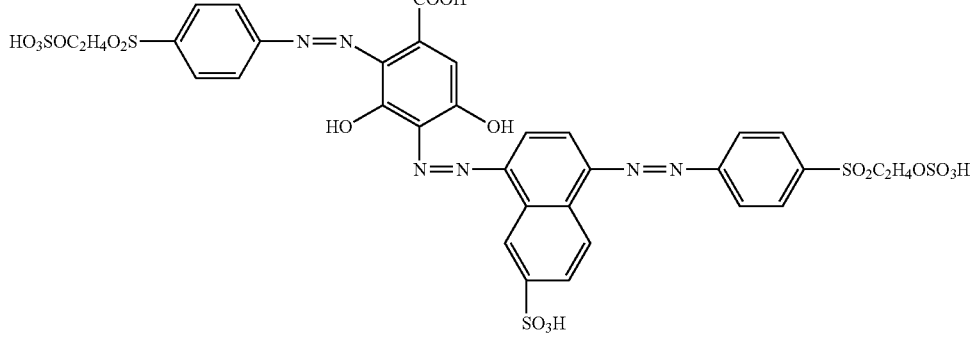<br>(I-49) | 510 |
| 52 | 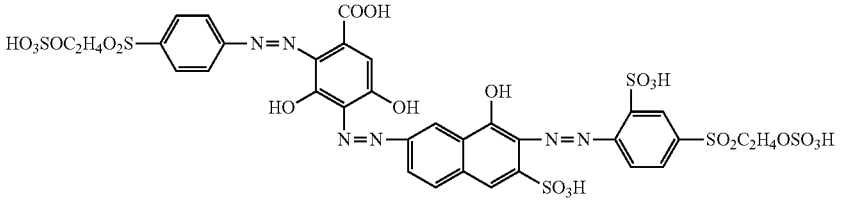<br>(I-50) | 525 |
| Example | Reactive dye compounds | Wavelength λ(nm) |
|---|---|---|
| 53 | 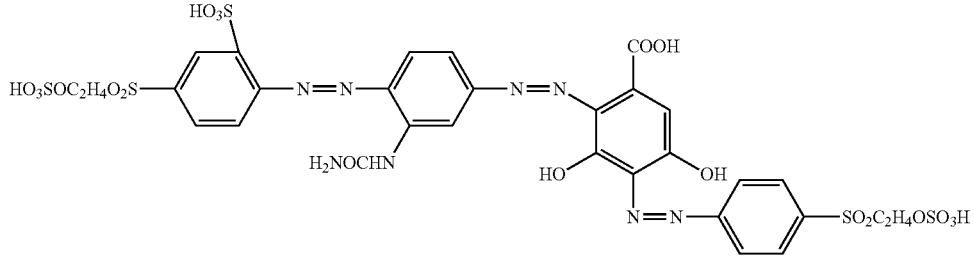<br>(I-51) | 500 |
| 54 | 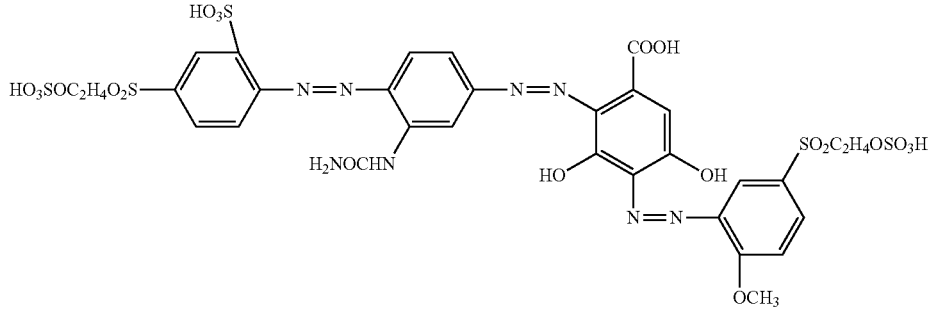<br>(I-52) | 510 |

-continued

| Example | Reactive dye compounds | Wavelength λ(nm) |
|---|---|---|
| 55 | (I-53) | 470 |
| 56 | (I-54) | 510 |
| 57 | (I-55) | 520 |
| 58 | (I-56) | 510 |
| 59 | (I-57) | 500 |

-continued
| Example | Reactive dye compounds | Wavelength λ(nm) |
|---|---|---|
| 60 | 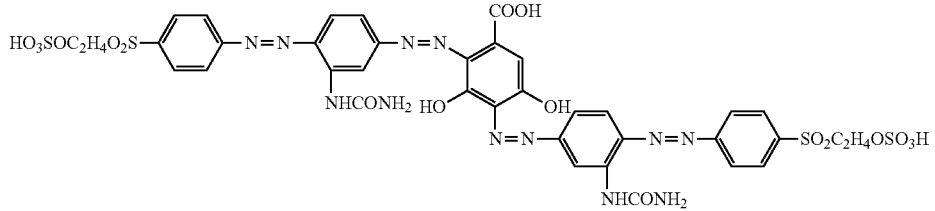 (I-58) | 510 |
| 61 | 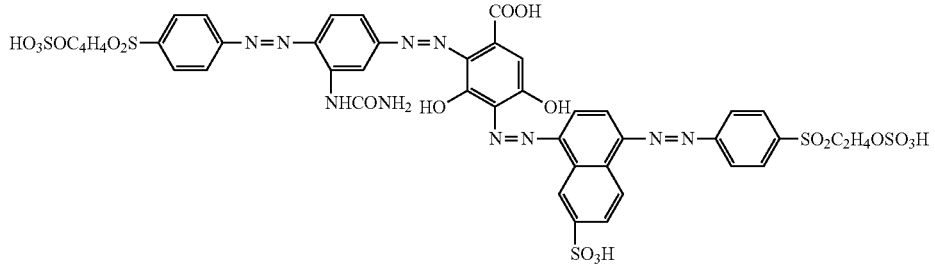 (I-59) | 535 |
| 62 | 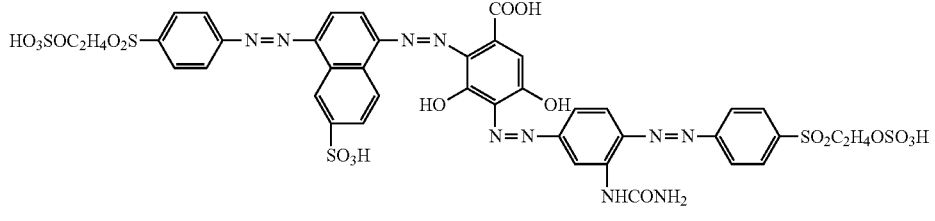 (I-60) | 535 |
| 63 | 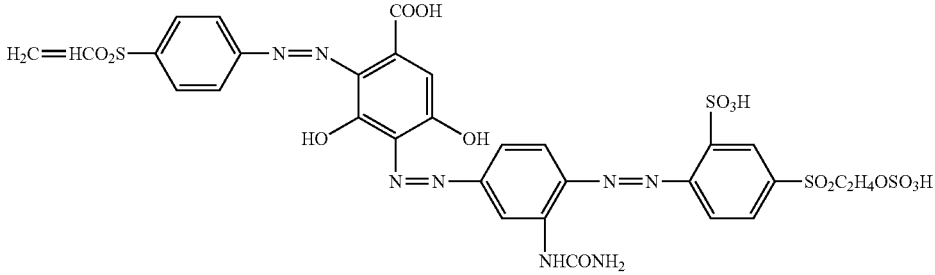 (I-61) | 485 |

-continued

| Example | Reactive dye compounds | Wavelength λ(nm) |
|---|---|---|
| 64 | (I-62) | 485 |
| 65 | (I-63) | 485 |

TABLE 5

| Example | Reactive dye compounds | Wavelength λ(nm) |
|---|---|---|
| 66 | (I-64) | 500 |

TABLE 5-continued
| Example | Reactive dye compounds | Wavelength λ(nm) |
|---|---|---|
| 67 | (I-65) | 510 |
| 68 | (I-66) | 515 |
| 69 | (I-67) | 475 |
| 70 | (I-68) | 480 |
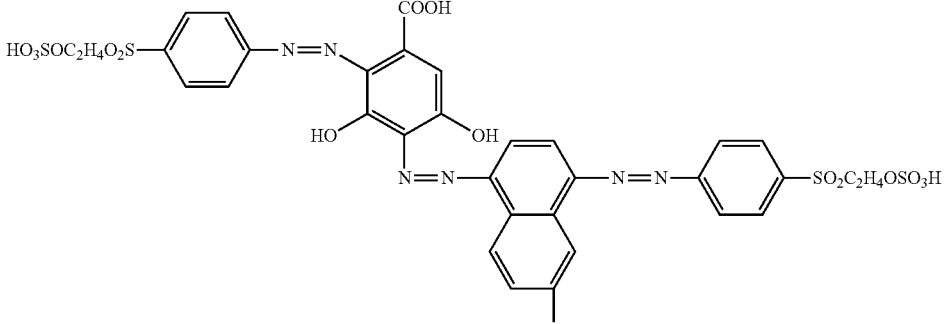
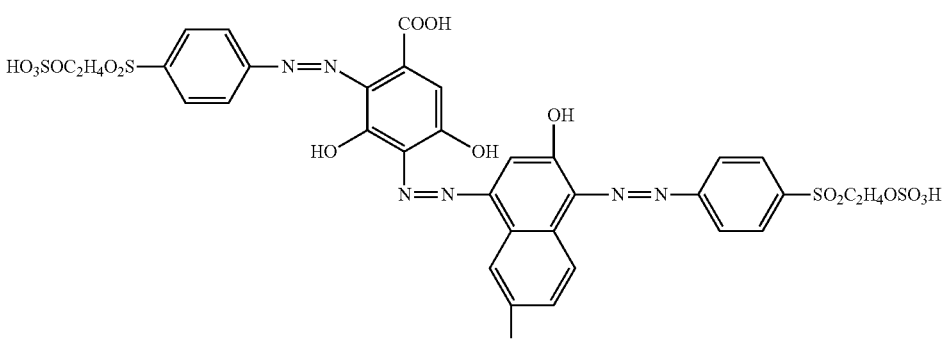
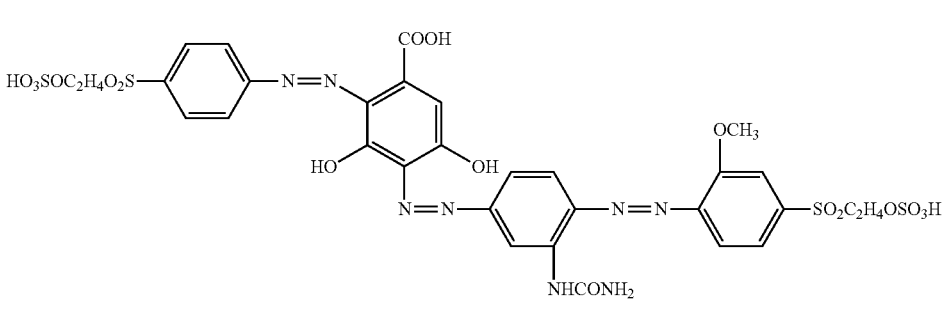
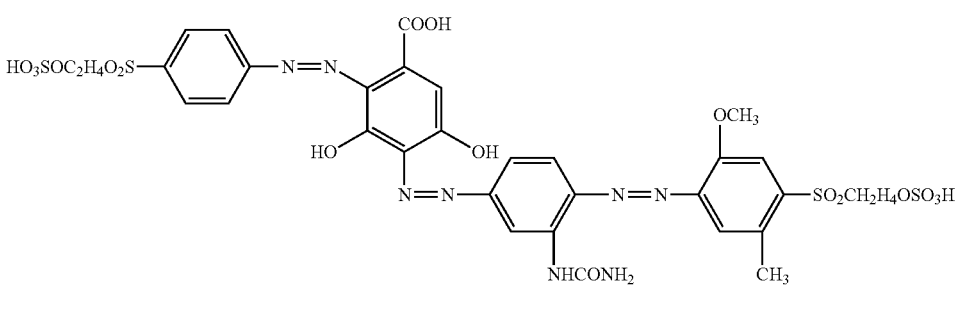

TABLE 5-continued

| Example | Reactive dye compounds | Wavelength λ(nm) |
|---|---|---|
| 71 | (I-69) | 465 |
| 72 | (I-70) | 485 |
| 73 | (I-71) | 485 |
| 74 | (I-72) | 480 |

TABLE 5-continued
| Example | Reactive dye compounds | Wavelength λ(nm) |
|---|---|---|
| 75 | 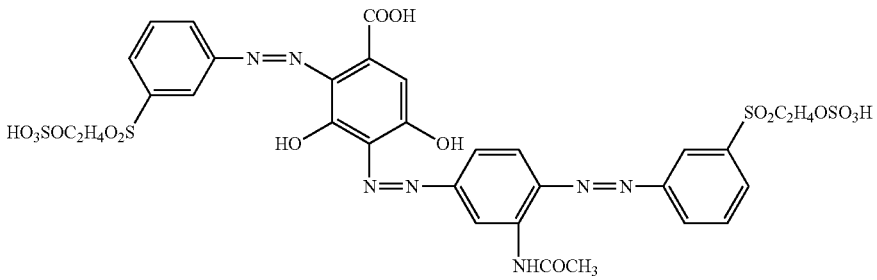<br>(I-73) | 465 |
| 76 | 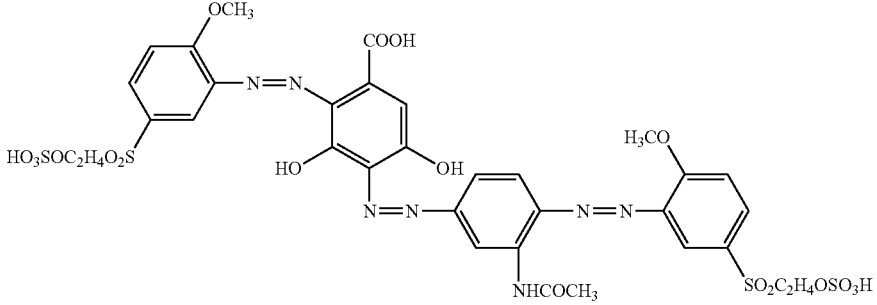<br>(I-74) | 480 |
| 77 | 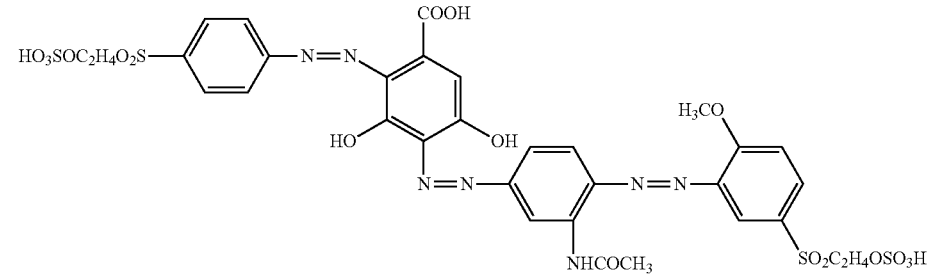<br>(I-75) | 475 |

TABLE 6
| Example | Reactive dye compounds | Wavelength λ(nm) |
|---|---|---|
| 78 | 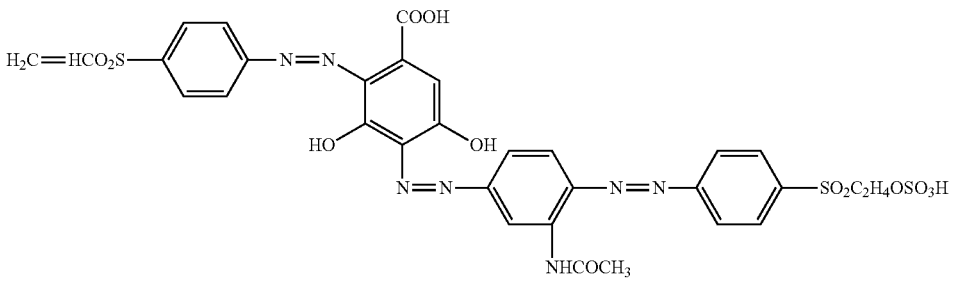 (I-76) | 455 |
| 79 | 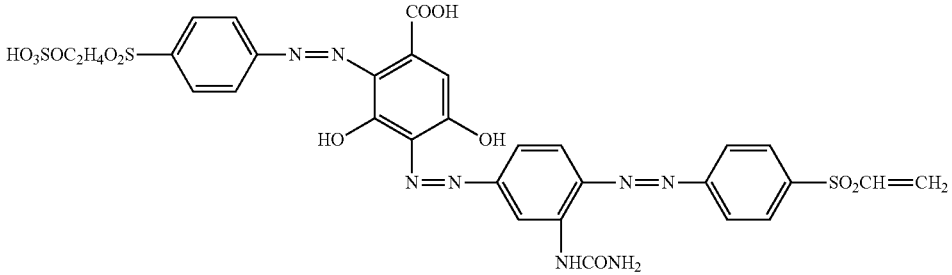 (I-77) | 455 |
| 80 | 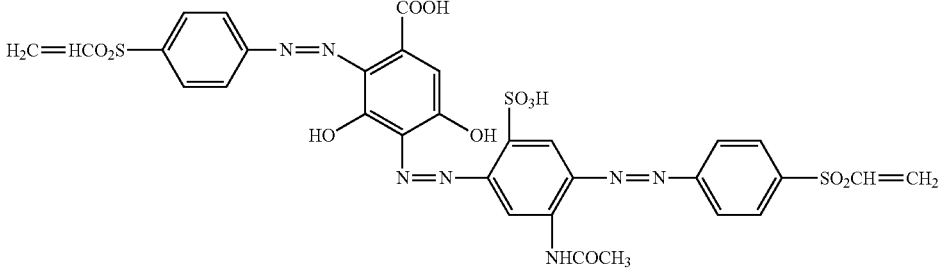 (I-78) | 465 |
| 81 | 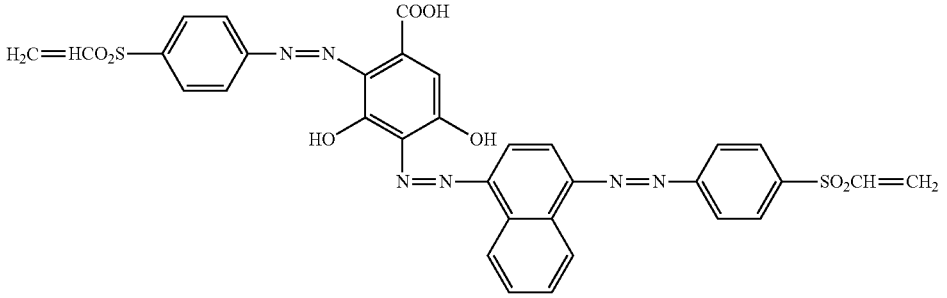 (I-79) | 500 |

TABLE 6-continued
| Example | Reactive dye compounds | Wavelength λ(nm) |
|---|---|---|
| 82 | (I-80) | 505 |
| 83 | (I-81) | 510 |
| 84 | (I-82) | 455 |
TABLE 7
| Example | Reactive dye compounds | Wavelength λ(nm) |
|---|---|---|
| 85 | (I-83) | 465 |
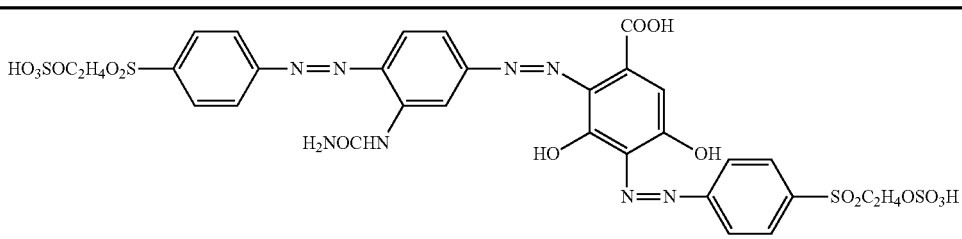

TABLE 7-continued

| Example | Reactive dye compounds | Wavelength λ(nm) |
|---|---|---|
| 86 | (I-84) | 485 |
| 87 | (I-85) | 480 |
| 88 | (I-86) | 500 |
| 89 | (I-87) | 455 |

TABLE 7-continued

| Example | Reactive dye compounds | Wavelength λ(nm) |
|---|---|---|
| 90 | 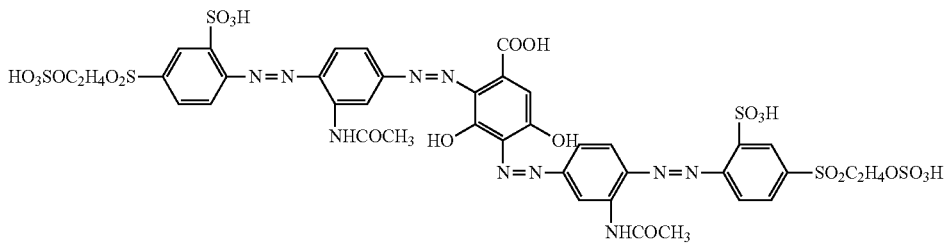 (I-90) | 520 |

Example 91

25 parts of the dye of formula (I-1), 75 parts of the dye of formula (II-3) and 10 parts of sodium sulfate powder were mechanically mixed, and the obtained dye mixture dyed cotton black by the conventional dip dyeing method, and the staining fastness to washing of the dyeings, especially on nylon, polyester and acrylon, was not lower than grade 4~5 (referring to ISO 105 C10-2006), and the build-up and degree of fixation were excellent (referring to GB/T21875-2016 and GB/T2391-2014).

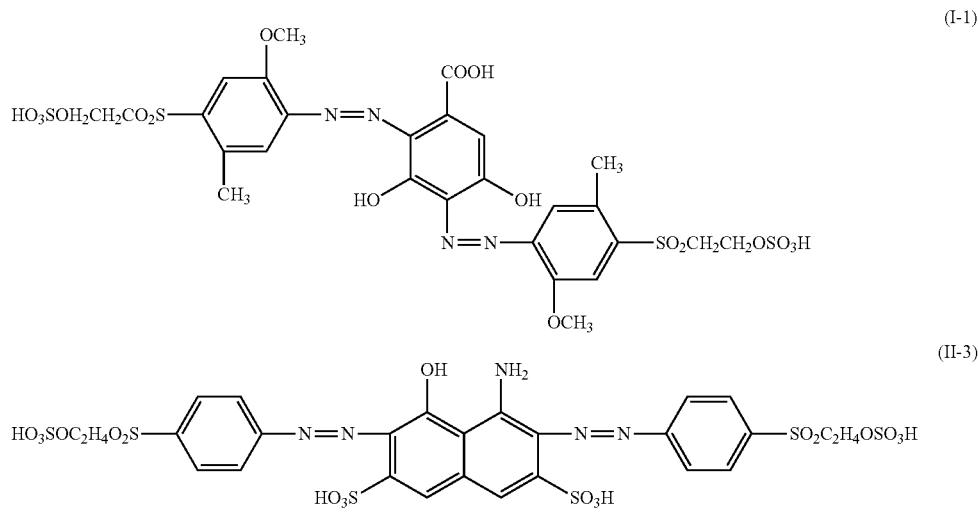

(I-1)

(II-3)

Example 92

35 parts of the dye of formula (I-31), 65 parts of the dye of formula (II-3) and 10 parts of sodium sulfate powder were mechanically mixed, and the obtained dye mixture dyed cotton black by the conventional dip dyeing method, and the staining fastness to washing of the dyeings especially on nylon, polyester and acrylon was not lower than grade 4~5 (referring to ISO 105 C10-2006), and the build-up and degree of fixation were excellent (referring to GB/T21875-2016 and GB/T2391-2014).

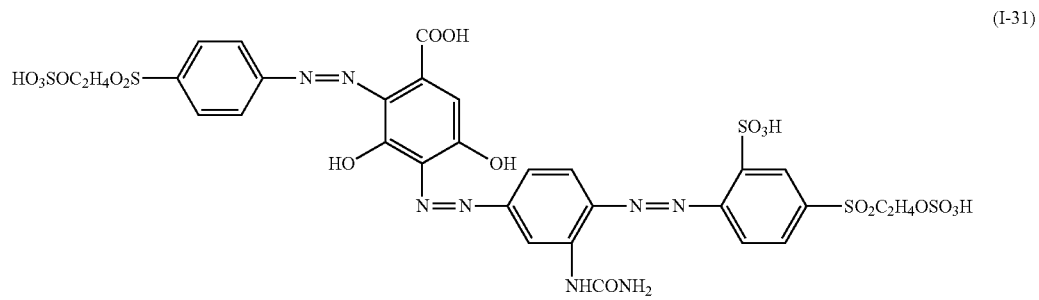

(I-31)

(II-3)

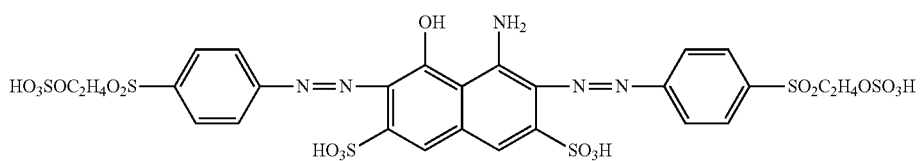

Example 93

30 parts of the dye of formula (I-31), 5 parts of the dye of formula (I-4), 65 parts of the dye of formula (II-3) and 10 parts of sodium sulfate powder were mechanically mixed, and the obtained dye mixture dyed cotton black by the conventional dip dyeing method, and the staining fastness to washing of the dyeings, especially on nylon, polyester and acrylon, was not lower than grade 4~5 (referring to ISO 105 C10-2006), and the build-up and degree of fixation were excellent (referring to GB/T21875-2016 and GB/T2391-2014).

(I-31)

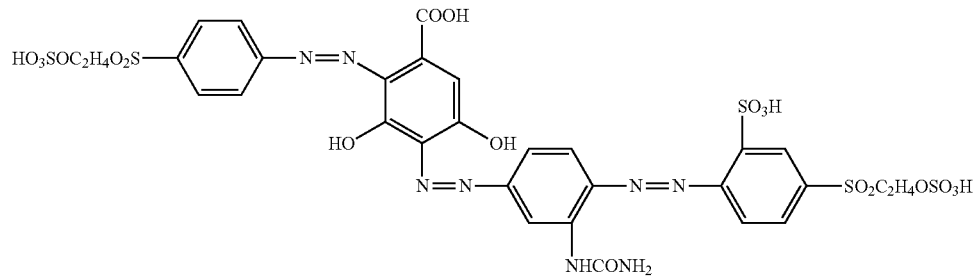

(I-4)

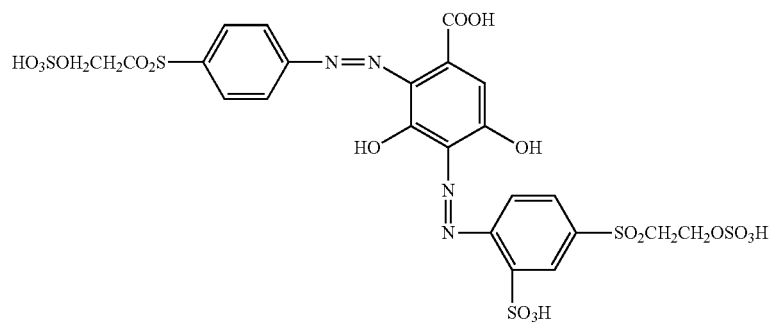

(II-3)

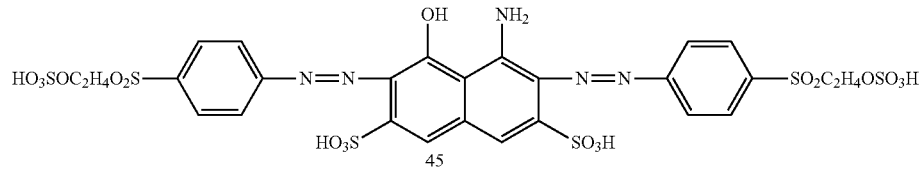

Example 94

30 parts of the dye of formula (I-31), 5 parts of the dye of formula (I-3), 65 parts of the dye of formula (II-3) and 10 parts of sodium sulfate powder were mechanically mixed, and the obtained dye mixture dyed cotton black by the conventional dip dyeing method, and the staining fastness to washing of the dyeings, especially on nylon, polyester and acrylon, was not lower than grade 4~5 (referring to ISO 105 C10-2006), and the build-up and degree of fixation were excellent (referring to GB/T21875-2016 and GB/T2391-2014).

(I-31)

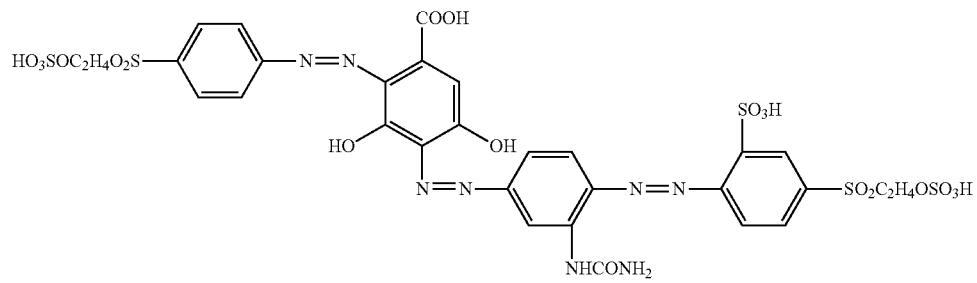

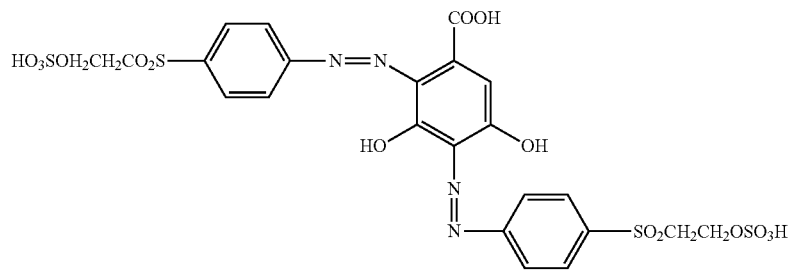

(I-3)

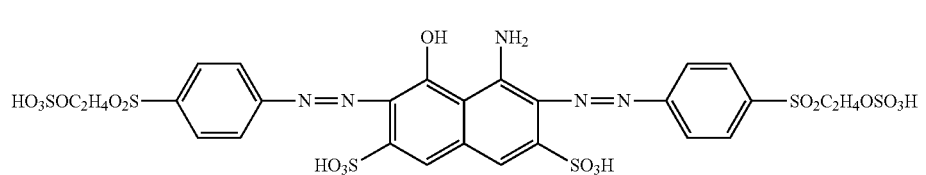

(II-3)

Example 95

20 parts of the dye of formula (I-31), 65 parts of the dye of formula (I-3), 15 parts of the dye of formula (III-1) and 10 parts of sodium sulfate powder were mechanically mixed, and the obtained dye mixture dyed cotton dark black by the conventional dip dyeing method, and the staining fastness to washing of the dyeings, especially on nylon, polyester and acrylon was not lower than grade 4~5 (referring to ISO 105 C10-2006), and the build-up and degree of fixation were excellent (referring to GB/T21875-2016 and GB/T2391-2014).

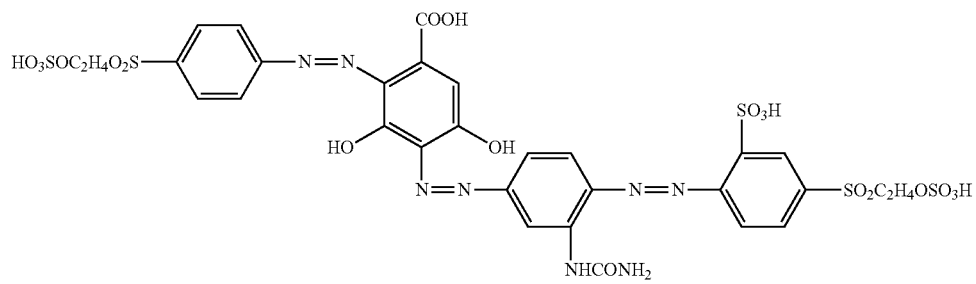

(I-31)

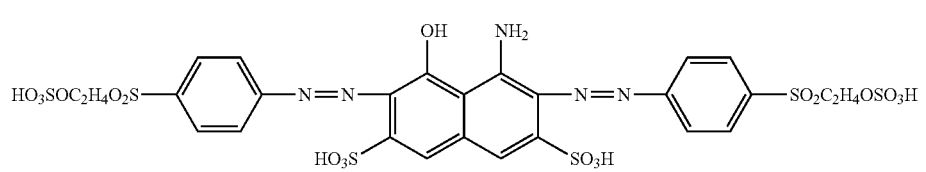

(II-3)

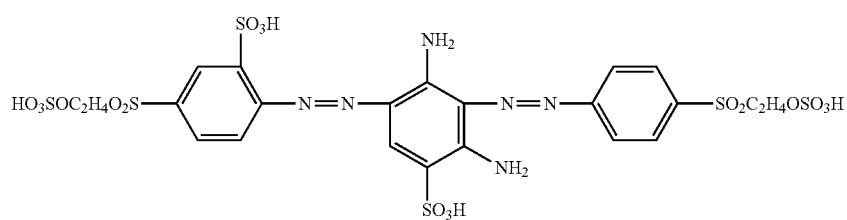

(III-1)

Example 96

20 parts of the dye of formula (I-31), 65 parts of the dye of formula (I-3), 10 parts of the dye of formula (IV-1), 10 parts of sodium sulfate powder, and 10 parts of dispersant MF were mechanically mixed, and the obtained dye mixture dyed cotton dark black, and the staining fastness to washing of the dyeings, especially on nylon, polyester and acrylon was not lower than grade 4~5 (referring to ISO 105 C10-2006), and the build-up and degree of fixation were excellent (referring to GB/T21875-2016 and GB/T2391-2014).

and the build-up and degree of fixation were excellent (referring to GB/T21875-2016 and GB/T2391-2014).

TABLE 7

| Example | Component A | Component B | Component C | Ratio | Shade |
|---|---|---|---|---|---|
| 97 | (I-31) | (II-3) | (III-1) (IV-1) | 5:95:(35 + 20) | Black |
| 98 | (I-31) | (II-3) | (V-1) | 10:90:15 | Navy |

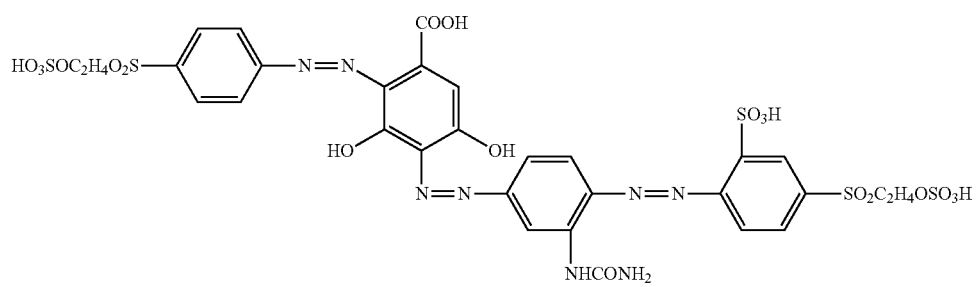

(I-31)

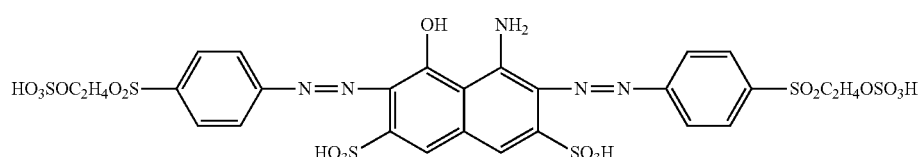

(II-3)

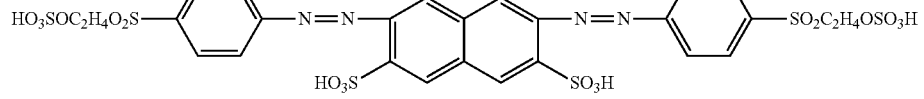

(IV-1)

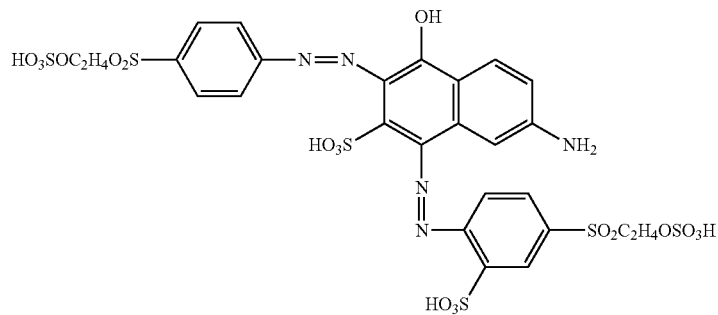

Example 97~286

According to the method described in example 91 or example 96, the dyes with listed ratio in table 7 and 8 were mechanically mixed, and the obtained dye mixture dyed cotton dark blue to black by the conventional reactive dyeing method, and the staining fastness to washing of the dyeings especially on nylon, polyester and acrylon was not lower than grade 4~5 (referring to ISO 105 C10-2006), and the build-up was excellent (referring to GB/T21875-2016),

TABLE 7-continued

| Example | Component A | Component B | Component C | Ratio | Shade |
|---|---|---|---|---|---|
| 99 | (I-31) | (II-3) | (V-7) | 15:85:20 | Black |
| 100 | (I-31) | (II-3) | (V-8) | 20:80:25 | Black |
| 101 | (I-31) | (II-3) | (III-8) | 25:75:10 | Black |
| 102 | (I-31) | (II-3) | (III-9) | 30:70:20 | Black |
| 103 | (I-31) | (II-3) | (III-10) | 35:65:5 | Black |

TABLE 7-continued

| Example | Component A | Component B | Component C | Ratio | Shade |
|---|---|---|---|---|---|
| 104 | (I-31) | (II-3) | (III-33) | 40:60:10 | Black |
| 105 | (I-31) | (II-3) | (III-32) | 45:55:5 | Black |
| 106 | (I-31) | (II-3) | (III-31a) | 50:50:5 | Black |
| 107 | (I-31) | (II-3) | (III-31b) | 35:65:1 | Black |
| 108 | (I-31) | (II-13) | (III-1) | 5:95:30 | Black |
| 109 | (I-31) | (II-13) | (IV-1) | 5:95:35 | Black |
| 110 | (I-31) | (II-13) | (III-1) (IV-1) | 5:95:(20 + 20) | Black |
| 111 | (I-31) | (II-12) | (III-1) | 10:90:15 | Black |
| 112 | (I-31) | (II-12) | (IV-1) | 15:85:20 | Black |
| 113 | (I-31) | (II-12) | (III-1) (IV-1) | 15:85:15 | Black |
| 114 | (I-31) | (II-3) | (IV-3) | 20:80:5 | Black |
| 115 | (I-31) | (II-3) | (IV-10) | 25:75:5 | Black |
| 116 | (I-1) | (II-3) | (III-1) | 25:75:10 | Black |
| 117 | (I-2) | (II-1) | (III-1) (IV-1) | 30:70:(5 + 5) | Black |
| 118 | (I-3) | (II-3) | (III-1) | 30:70:10 | Black |
| 119 | (I-4) | (II-3) | (III-1) | 25:75:15 | Black |
| 120 | (I-5) (I-6) | (II-3) | (III-1) | (10 + 25):65:5 | Black |
| 121 | (I-7) | (II-3) | (III-1) | 9:91:15 | Navy |
| 122 | (I-8) | (II-3) | (III-1) | 19:81:5 | Black |
| 123 | (I-9) | (II-3) | (III-1) | 30:70:10 | Black |
| 124 | (I-10) | (II-3) | (III-1) | 25:75:10 | Black |
| 125 | (I-11) | (II-3) | (III-1) | 35:65:5 | Black |
| 126 | (I-12) | (II-3) | (III-1) | 25:75:10 | Black |
| 127 | (I-13) | (II-3) | (III-1) | 25:75:15 | Black |
| 128 | (I-14) (I-15) | (II-3) | (III-1) | (10 + 25):65:5 | Black |
| 129 | (I-31) (I-16) | (II-3) | (III-1) | (10 + 10):80:10 | Black |
| 130 | (I-33) (I-17) | (II-3) | (III-1) | (30 + 15):55:5 | Black |
| 131 | (I-34) (I-18) | (II-3) | (III-1) | (10 + 10):80:10 | Black |
| 132 | (I-35) (I-19) | (II-3) | (III-1) | (10 + 15):75:5 | Black |
| 133 | (I-36) (I-20) | (II-3) | (III-1) | (10 + 10):80:20 | Black |
| 134 | (I-37) (I-21) | (II-3) | (III-1) | (15 + 15):70:5 | Black |
| 135 | (I-38) (I-22) | (II-3) | (III-1) | (15 + 15):70:5 | Black |
| 136 | (I-39) (I-23) | (II-3) | (III-1) | (10 + 10):80:20 | Black |
| 137 | (I-40) (I-24) | (II-3) | (III-1) | (10 + 10):80:10 | Black |
| 138 | (I-41) (I-25) | (II-3) | (III-1) | (10 + 15):75:5 | Black |
| 139 | (I-42) (I-26) | (II-3) | (III-1) | (10 + 10):80:10 | Black |
| 140 | (I-43) (I-27) | (II-3) | (III-1) | (20 + 15):65:5 | Black |
| 141 | (I-44) (I-28) | (II-3) | (III-1) | (10 + 10):80:10 | Black |
| 142 | (I-88) (I-29) | (II-3) | (III-1) | (15 + 15):70:10 | Black |
| 143 | (I-89) (I-30) | (II-1) | (III-2) | (15 + 15):70:5 | Black |
| 144 | (I-31) | (II-1) | (III-3) | 25:75:10 | Black |
| 145 | (I-32) | (II-1) | (III-4) | 30:70:20 | Black |
| 146 | (I-33) | (II-1) | (III-5) | 35:65:5 | Black |
| 147 | (I-34) | (II-1) | (III-6) | 25:75:10 | Black |
| 148 | (I-35) | (II-1) | (III-7) | 30:70:20 | Black |
| 150 | (I-36) | (II-1) | (III-31) | 35:65:5 | Black |
| 151 | (I-37) | (II-2) | (III-11) | 25:75:10 | Black |
| 152 | (I-38) | (II-2) | (III-12) | 30:70:20 | Black |
| 153 | (I-39) | (II-2) | (III-13) | 35:65:5 | Black |
| 154 | (I-40) | (II-2) | (III-14) (III-15) | 25:75:(5 + 15) | Black |
| 155 | (I-41) | (II-2) | (III-16) (III-17) | 25:75:(5 + 5) | Black |
| 156 | (I-42) | (II-2) | (III-18) (III-19) | 20:80:(5 + 15) | Black |
| 157 | (I-43) | (II-3) | (III-20) | 30:70:20 | Black |
| 158 | (I-44) | (II-3) | (III-21) (III-22) | 30:70:(5 + 8) | Black |
| 160 | (I-88) | (II-3) | (III-23) (III-24) | 25:75:(15 + 5) | Black |
| 161 | (I-89) | (II-3) | (III-25) (III-26) | 20:80:(10 + 5) | Black |
| 162 | (I-45) | (II-3) | (III-27) (III-28) | 35:65:(5 + 5) | Black |
| 163 | (I-46) | (II-4) | (III-29) (III-30) | 30:70:(5 + 15) | Black |
| 164 | (I-47) | (II-4) | (III-31) (III-32) | 20:80:(10 + 5) | Black |
| 165 | (I-48) | (II-4) | (III-33) | 35:65:20 | Black |
| 166 | (I-49) | (II-4) | (III-34) | 30:70:20 | Black |
| 167 | (I-50) | (II-5) | (III-35) | 35:65:5 | Black |
| 168 | (I-51) | (II-5) | (III-36) | 25:75:10 | Black |
| 169 | (I-52) | (II-5) | (III-37) | 35:65:20 | Black |
| 170 | (I-53) | (II-5) | (III-38) | 30:70:20 | Black |
| 171 | (I-54) | (II-6) | (III-39) | 35:65:5 | Black |
| 172 | (I-55) | (II-6) | (III-40) | 25:75:10 | Black |
| 173 | (I-56) | (II-6) | (III-41) | 35:65:5 | Black |
| 174 | (I-57) | (II-6) | (III-42) | 30:70:20 | Black |
| 175 | (I-58) | (II-6) | (III-43) | 35:65:5 | Black |
| 176 | (I-59) (I-60) | (II-6) | (III-44) | (10 + 10):80:10 | Black |
| 177 | (I-61) (I-2) | (II-6) | (III-45) | (10 + 15):75:5 | Black |
| 178 | (I-62) (I-4) | (II-7) | (III-46) | (10 + 10):80:10 | Black |
| 179 | (I-63) (I-3) | (II-7) | (III-47) | (10 + 15):75:15 | Black |
| 180 | (I-55) (I-10) | (II-7) | (III-48) | (10 + 10):80:10 | Black |
| 181 | (I-55) (I-12) | (II-7) | (IV-1) | (10 + 15):75:20 | Black |
| 182 | (I-52) (I-15) | (II-8) | (IV-2) | (15 + 15):70:5 | Black |
| 183 | (I-51) (I-1) | (II-8) | (IV-3) | (10 + 10):80:10 | Black |
| 184 | (I-48) (I-22) | (II-9) | (IV-4) | (10 + 15):75:20 | Black |
| 185 | (I-6) (I-60) | (II-9) | (IV-5) | (10 + 10):80:10 | Black |
| 186 | (I-3) (I-2) | (II-10) | (IV-6) | (10 + 15):75:20 | Black |
| 187 | (I-1) (I-31) | (II-10) | (IV-7) | (10 + 10):80:10 | Black |
| 188 | (I-1) (I-32) | (II-11) | (IV-8) | (10 + 15):75:20 | Black |
| 189 | (I-32) (I-59) | (II-11) | (IV-9) | (15 + 15):70:5 | Black |
| 190 | (I-32) (I-2) | (II-1) | (IV-10) | (10 + 15):(40 + 35):10 | Black |
| 191 | (I-31) (I-6) | (II-1) (II-3) | (V-1) | (10 + 10):(40 + 40):10 | Black |
| 192 | (I-88) | (II-1) (II-3) | (V-2) | 25:(40 + 35):15 | Black |
| 193 | (I-32) | (II-3) (II-10) | (V-3) | 25:(40 + 35):15 | Black |
| 194 | (I-41) | (II-4) (II-5) | (V-4) | 25:(40 + 35):15 | Black |
| 195 | (I-32) | (II-13) (II-1) | (V-5) | 25:(40 + 35):15 | Black |
| 196 | (I-32) | (II-13) | (V-6) | 30:70:20 | Black |
| 197 | (I-32) | (II-12) | (V-7) | 35:65:5 | Black |
| 198 | (I-89) (I-30) | (II-1) | (V-8) | (10 + 10):80:10 | Black |
| 199 | (I-31) | (II-1) | (III-1) (VI-1) | 30:70:(5 + 8) | Black |
| 200 | (I-32) | (II-1) | (III-1) (VI-2) | 25:75:(15 + 5) | Black |
| 201 | (I-33) | (II-1) | (III-1) (VI-3) | 20:80:(10 + 5) | Black |
| 202 | (I-34) | (II-1) | (III-1) (IV-1) | 25:75:(15 + 5) | Black |
| 203 | (I-35) | (II-1) | (III-1) (V-1) | 40:60:(5 + 5) | Black |

TABLE 7-continued

| Example | Component A | Component B | Component C | Ratio | Shade |
|---|---|---|---|---|---|
| 204 | (I-62) (I-4) | (II-7) | (VI-1) (V-1) | (20 + 10):70:(5 + 8) | Black |
| 205 | (I-63) (I-3) | (II-7) | (III-1) (IV-1) (V-1) | (5 + 20):75:(5 + 5 + 5) | Black |
| 206 | (I-1) (I-31) | (II-1) | | (15 + 5):80 | Navy |
| 207 | (I-2) | (II-1) (II-3) | | 45:(25 + 30) | Black |
| 208 | (I-32) | (II-1) (II-5) | | 40:(30 + 30) | Black |
| 209 | (I-3) | (II-1) (II-3) | | 45:(25 + 30) | Black |
| 210 | (I-5) | (II-1) (II-3) | | 40:(30 + 30) | Black |
| 211 | (I-41) | (II-1) (II-3) | | 35:(30 + 35) | Black |
| 212 | (I-49) | (II-1) | | 20:80 | Navy |
| 213 | (I-1) (I-32) | (II-1) | | (15 + 5):80 | Navy |
| 214 | (I-31) | (II-1) (II-5) | | 40:(30 + 30) | Black |
| 215 | (I-66) | (II-1) (II-3) | | 35:(30 + 35) | Black |
| 216 | (I-74) | (II-1) | | 20:80 | Navy |

TABLE 8

| Example | Component A | Component B | Component C | Ratio | Shade |
|---|---|---|---|---|---|
| 217 | (I-32) (I-16) | (II-3) | (III-1) | (10 + 10):80:10 | Black |
| 218 | (I-56) (I-17) | (II-3) | (III-1) | (30 + 15):55:5 | Black |
| 219 | (I-37) (I-18) | (II-3) | (III-1) | (10 + 10):80:10 | Black |
| 220 | (I-39) (I-19) | (II-3) | (III-1) | (10 + 15):75:5 | Black |
| 221 | (I-40) (I-20) | (II-3) | (III-1) | (10 + 10):80:20 | Black |
| 222 | (I-64) (I-21) | (II-3) | (III-1) | (15 + 15):70:5 | Black |
| 223 | (I-65) (I-22) | (II-3) | (III-1) | (15 + 15):70:5 | Black |
| 224 | (I-48) (I-23) | (II-3) | (III-1) | (10 + 10):80:20 | Black |
| 225 | (I-49) (I-24) | (II-3) | (III-1) | (10 + 10):80:10 | Black |
| 226 | (I-66) (I-25) | (II-3) | (III-1) | (10 + 15):75:5 | Black |
| 227 | (I-67) (I-26) | (II-3) | (III-1) | (10 + 10):80:10 | Black |
| 228 | (I-68) (I-27) | (II-3) | (III-1) | (20 + 15):65:5 | Black |
| 229 | (I-69) (I-28) | (II-3) | (III-1) | (10 + 10):80:10 | Black |
| 230 | (I-32) | (II-1) | (III-3) | 25:75:10 | Black |
| 231 | (I-31) | (II-1) | (III-4) | 30:70:20 | Black |
| 232 | (I-56) | (II-1) | (III-5) | 35:65:5 | Black |
| 233 | (I-37) | (II-1) | (III-6) | 25:75:10 | Black |
| 234 | (I-39) | (II-1) | (III-7) | 30:70:20 | Black |
| 235 | (I-40) | (II-1) | (III-31) | 35:65:5 | Black |
| 236 | (I-64) | (II-2) | (III-11) (III-12) | 25:75:10 | Black |
| 237 | (I-65) | (II-2) | (III-12) | 30:70:20 | Black |
| 238 | (I-48) | (II-2) | (III-13) | 35:65:5 | Black |
| 239 | (I-49) | (II-2) | (III-14) (III-15) | 25:75:(5 + 15) | Black |
| 240 | (I-66) | (II-2) | (III-16) (III-17) | 25:75:(5 + 5) | Black |
| 241 | (I-67) | (II-2) | (III-18) (III-19) | 20:80:(5 + 15) | Black |
| 242 | (I-68) | (II-3) | (III-20) | 30:70:20 | Black |
| 243 | (I-69) | (II-3) | (III-21) (III-22) | 30:70:(5 + 8) | Black |
| 244 | (I-70) | (II-3) | (III-27) (III-28) | 35:65:(5 + 5) | Black |
| 245 | (I-71) | (II-4) | (III-29) (III-30) | 30:70:(5 + 15) | Black |
| 246 | (I-72) | (II-4) | (III-31) (III-32) | 20:80:(10 + 5) | Black |
| 247 | (I-73) | (II-4) | (III-33) | 35:65:20 | Black |
| 248 | (I-74) | (II-4) | (III-34) | 30:70:20 | Black |
| 249 | (I-75) | (II-5) | (III-35) | 35:65:5 | Black |
| 250 | (I-76) | (II-5) | (III-36) | 25:75:10 | Black |
| 251 | (I-77) | (II-5) | (III-37) | 35:65:20 | Black |
| 252 | (I-63) | (II-5) | (III-38) | 30:70:20 | Black |
| 253 | (I-78) | (II-6) | (III-39) | 35:65:5 | Black |
| 254 | (I-79) | (II-6) | (III-40) | 25:75:10 | Black |
| 255 | (I-80) | (II-6) | (III-41) | 35:65:5 | Black |
| 256 | (I-81) | (II-6) | (III-42) | 30:70:20 | Black |
| 257 | (I-82) | (II-6) | (III-43) | 35:65:5 | Black |
| 258 | (I-83) (I-84) | (II-6) | (III-44) | (10 + 10):80:10 | Black |
| 259 | (I-85) (I-2) | (II-6) | (III-45) | (10 + 15):75:5 | Black |
| 260 | (I-86) (I-4) | (II-7) | (III-46) | (10 + 10):80:10 | Black |
| 261 | (I-54) (I-3) | (II-7) | (III-47) | (10 + 15):75:15 | Black |
| 262 | (I-87) (I-10) | (II-7) | (III-48) | (10 + 10):80:10 | Black |
| 263 | (I-57) (I-12) | (II-7) | (IV-1) | (10 + 15):75:20 | Black |
| 264 | (I-58) (I-15) | (II-8) | (IV-2) | (15 + 15):70:5 | Black |
| 265 | (I-59) (I-1) | (II-8) | (IV-3) | (10 + 10):80:10 | Black |
| 266 | (I-60) (I-22) | (II-9) | (IV-4) | (10 + 15):75:20 | Black |
| 267 | (I-6) (I-84) | (II-9) | (IV-5) | (10 + 10):80:10 | Black |
| 268 | (I-89) (I-30) | (II-1) | (V-8) | (10 + 10):80:10 | Black |
| 269 | (I-1) (I-32) | (II-10) | (IV-7) | (10 + 10):80:10 | Black |
| 270 | (I-1) (I-31) | (II-11) | (IV-8) | (10 + 15):75:20 | Black |
| 271 | (I-31) (I-83) | (II-11) | (IV-9) | (15 + 15):70:5 | Black |
| 272 | (I-31) (I-2) | (II-1) (II-3) | (IV-10) | (10 + 15):(40 + 35):10 | Black |
| 273 | (I-32) (I-6) | (II-1) (II-3) | (V-1) | (10 + 10):(40 + 40):10 | Black |
| 274 | (I-31) | (II-1) (II-3) | (V-2) | 25:(40 + 35):15 | Black |
| 275 | (I-31) | (II-3) (II-10) | (V-3) | 25:(40 + 35):15 | Black |
| 276 | (I-31) | (II-4) (II-5) | (V-4) | 25:(40 + 35):15 | Black |
| 277 | (I-31) | (II-13) (II-1) | (V-5) | 25:(40 + 35):15 | Black |
| 278 | (I-31) | (II-13) | (V-6) | 30:70:20 | Black |
| 279 | (I-31) | (II-12) | (V-7) | 35:65:5 | Black |
| 280 | (I-32) | (II-1) | (III-1) (VI-1) | 30:70:(5 + 8) | Black |
| 281 | (I-31) | (II-1) | (III-1) (VI-2) | 25:75:(15 + 5) | Black |
| 282 | (I-56) | (II-1) | (III-1) (VI-3) | 20:80:(10 + 5) | Black |
| 283 | (I-37) | (II-1) | (III-1) (IV-1) | 25:75:(15 + 5) | Black |
| 284 | (I-39) | (II-1) | (III-1) (V-1) | 40:60:(5 + 5) | Black |
| 285 | (I-86) (I-4) | (II-7) | (VI-1) (V-1) | (20 + 10):70:(5 + 8) | Black |
| 286 | (I-54) (I-3) | (II-7) | (III-1) (IV-1) (V-1) | (5 + 20):75:(5 + 5 + 5) | Black |

Comparative Example 1
according to example 2 in patent CN1858118, the reactive black dye comprising the following three components was prepared:
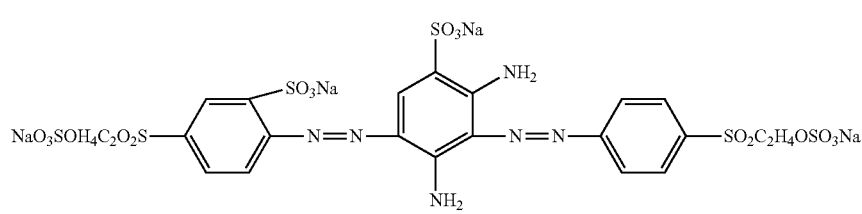
(5)
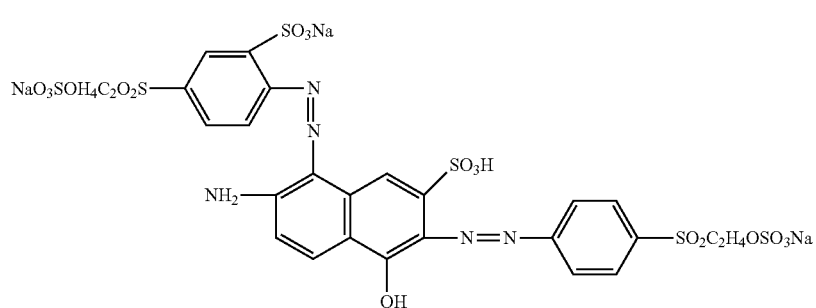
(7)
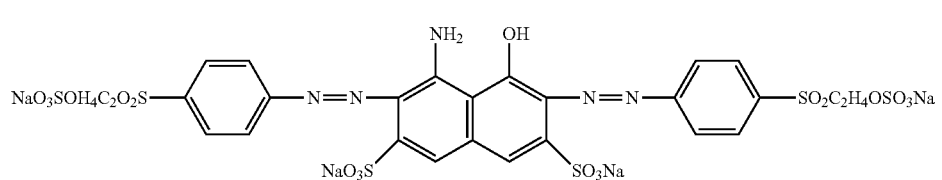
(10)
Comparative Example 2
according to example 6 in patent CN1730566, the reactive black dye comprising the following three components was prepared:
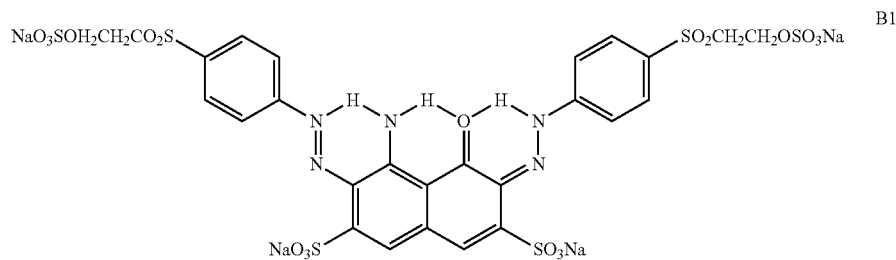
B1

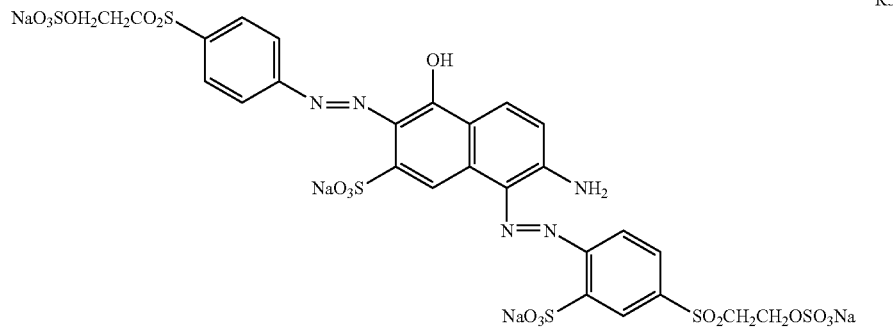

R3

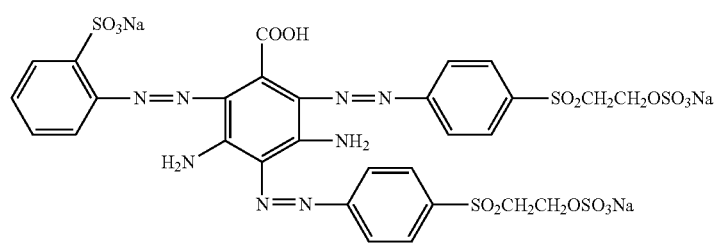

Y2

Application Example 1

The dried reactive black dyes obtained in examples 91~96 (closest to the prior art) and comparative examples 1 and 2 were respectively dissolved in water, and sodium sulfate powder was added to prepare a dyeing solution with a final concentration of 50 g/L. The dyeing concentration (dye to cloth weight) was set at 4%, the bath ratio (gram weight of cloth to milliliter volume of dyeing solution) was set at 1:20, cotton was placed in the bath for adsorption at 60° C. for 30 minutes, alkali (sodium carbonate 20 g/L) was added for dye fixation for 45 minutes, the dyed fabric was washed with water, soaped, and dried to obtain a navy to black dyed fabric. The staining fastness to washing test was carried out according to the method of ISO 105 C10-2006. The results were shown in table 9:

TABLE 9

| Examples | Dyeing depth | Staining fastness to Washing (ISO 105 C10-2006) 95° C. × 30 min | | | | | |
|---|---|---|---|---|---|---|---|
| | | Vinegar fiber | Cotton | Nylon | Polyester | Acrylon | Wool |
| 91 | 4.0% | 4~5 | 4~5 | 5 | 5 | 4~5 | 4 |
| 92 | 4.0% | 4~5 | 4~5 | 4~5 | 5 | 4~5 | 4 |
| 93 | 4.0% | 4~5 | 4~5 | 5 | 5 | 4~5 | 4 |
| 94 | 4.0% | 4~5 | 4~5 | 5 | 5 | 4~5 | 4 |
| 95 | 4.0% | 4~5 | 4~5 | 5 | 5 | 4~5 | 4 |
| 96 | 4.0% | 4~5 | 4~5 | 4~5 | 5 | 4~5 | 4 |
| Comparative example 1 | 4.0% | 4 | 3~4 | 3~4 | 4 | 4 | 3 |

TABLE 9-continued

| Examples | Dyeing depth | Staining fastness to Washing (ISO 105 C10-2006) 95° C. × 30 min | | | | | |
|---|---|---|---|---|---|---|---|
| | | Vinegar fiber | Cotton | Nylon | Polyester | Acrylon | Wool |
| Comparative example 2 | 4.0% | 4 | 3~4 | 3~4 | 4 | 3~4 | 3 |

Application Example 2

The build-up property of the reactive dyes obtained in the representative examples 91~96 of the present invention and comparative examples 1~2 was tested according to the method specified in the GB/T 21875-2016 standard, and it was found that the build-up of the reactive dyes of examples 91-96 was obviously better than that of the comparative examples 1~2, and that under the same dyeing conditions, the amount of dye can be reduced by 5% to 15%, which led to remarkable economic effect.

Application Example 3

The degree of fixation of the reactive dyes obtained in examples 91-96 of the present invention and comparative examples 1-2 was tested according to the method specified in the GB/T2391-2014 standard, and the results were shown as table 10:

TABLE 10

| | Examples | | | | | | | |
|---|---|---|---|---|---|---|---|---|
| | 91Example 91 | Example 92 | Example 93 | Example 94 | Example 95 | Example 96 | Comparative example 1 | Comparative example 2 |
| Degree of fixation | 76.1% | 75.9% | 75.2% | 76.5% | 75.7% | 76.3% | 71.6% | 70.5% |

In summary, the dye of the present invention was significantly superior to that of the comparative examples, and for the industry it has a significant improvement in fastness, build-up and degree of fixation.

The invention claimed is:

1. A reactive navy to black dye composition, comprising component A and component B, wherein component A is selected from one or more dye compounds of formula (I) or alkali metal salts of formula (I), component B is selected from one or more dye compounds of formula (II) or alkali metal salts of formula (II); and based on component A and component B, component A has a mass percentage of 5% to 50%, and component B has a mass percentage of 50% to 95%;

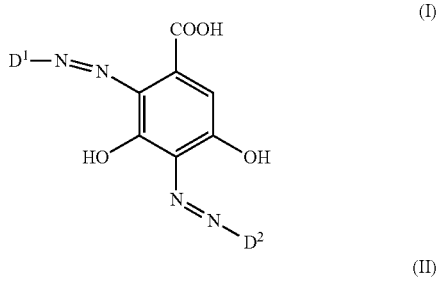

(I)

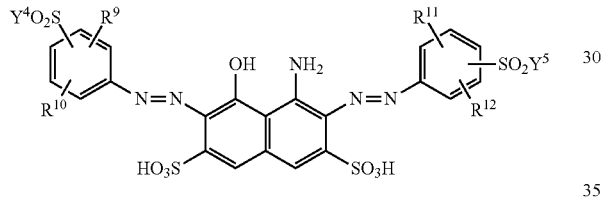

(II)

in formula (I):
$D^1$ and $D^2$ are each independently a group represented by the following formula (a) or (b) or (c);

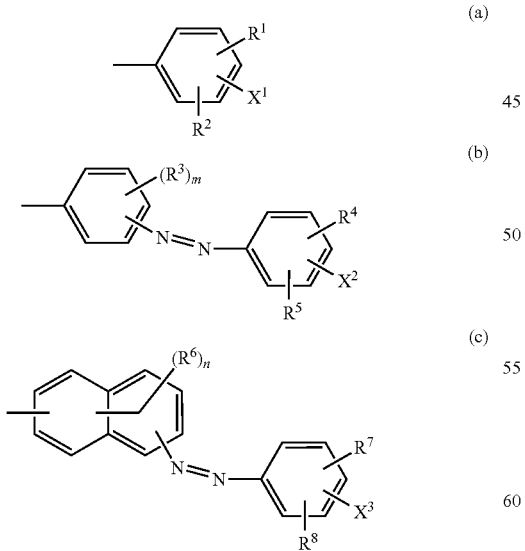

in the above formulae (a)~(c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and every $R^3$ is each independently selected from the group consisting of amino, sulfo, ureido, $C_1$~$C_4$ alkanoylamino, $C_1$~$C_4$ alkoxy and $C_1$~$C_4$ alkyl; n=0-3, and every $R^6$ is each independently selected from the group consisting of amino, hydroxyl and sulfo; $X^1$, $X^2$ and $X^3$ are each independently H, linear or branched $C_1$~$C_4$ alkyl, $C_1$~$C_4$ alkoxy, —$SO_2Y^1$, —$NHCO(CH_2)_pSO_2Y^2$ or —$CONH(CH_2)_qSO_2Y^3$, and at least one of $D^1$ and $D^2$ contains a fiber-reactive group, that is, —$SO_2Y^1$, —$NHCO(CH_2)_pSO_2Y^2$ or —$CONH(CH_2)_qSO_2Y^3$, wherein p=1-3, q=1-3, and $Y^1$~$Y^3$ are each independently —$CH=CH_2$, —$C_2H_4OSO_3H$ or —$CH_2CH_2Cl$;

in formula (II):
$R^9$, $R^{10}$, $R^{11}$ and $R^{12}$ are each independently H, linear or branched $C_1$~$C_4$ alkyl, $C_1$~$C_4$ alkoxy or sulfo; $Y^4$ and $Y^5$ are each independently —$CH=CH_2$, —$C_2H_4OSO_3H$ or —$C_2H_4Cl$.

2. The reactive navy to black dye composition as claimed in claim 1, wherein the composition comprises component A and component B, wherein component A is selected from one or more dye compounds of formula (IA) or alkali metal salts of formula (IA), component B is selected from one or more dye compounds of formula (II) or alkali metal salts of formula (II); based on component A and component B, component A has a mass percentage of 5% to 50%, and component B has a mass percentage 50% to 95%;

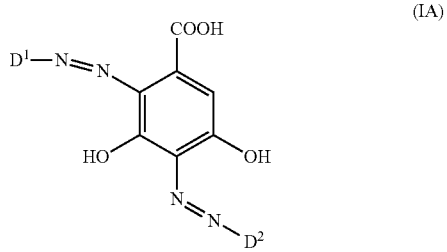

(IA)

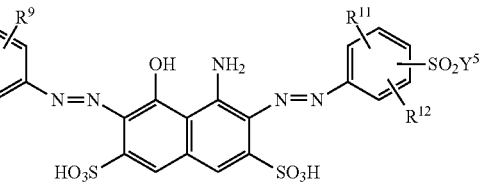

(II)

in formula (IA):
$D^1$ and $D^2$ are each independently a group represented by the following formula (a) or (b) or (c);

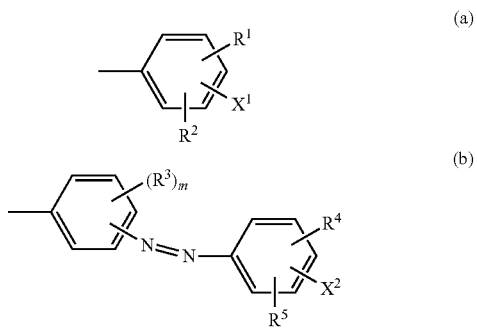

-continued

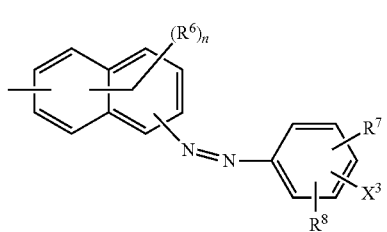
(c)

in the above formulae (a)~(c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and every $R^3$ is each independently selected from the group consisting of sulfo, ureido and $C_1$~$C_4$ alkanoylamino; n=0-3, and every $R^6$ is each independently selected from the group consisting of hydroxyl and sulfo; $X^1$, $X^2$ and $X^3$ are each independently —$SO_2Y^1$, —$NHCO(CH_2)_pSO_2Y^2$ or —$CONH(CH_2)_qSO_2Y^3$, wherein p=1-3, q=1-3, and $Y^1$~$Y^3$ are each independently —CH=$CH_2$, —$C_2H_4OSO_3H$ or —$CH_2CH_2Cl$;

in formula (II):

$R^9$, $R^{10}$, $R^{11}$ and $R^{12}$ are each independently H, linear or branched $C_1$~$C_4$ alkyl, $C_1$~$C_4$ alkoxy or sulfo; $Y^4$ and $Y^5$ are each independently —CH=$CH_2$, —$C_2H_4OSO_3H$ or —$C_2H_4Cl$.

3. The reactive navy to black dye composition as claimed in claim 1, wherein both $D^1$ and $D^2$ are the group of the general formula (a) wherein the substituents are the same or different; or $D^1$ is selected from the group of formula (a), and $D^2$ is selected from the group of formula (b) or formula (c).

4. The reactive navy to black dye composition as claimed in claim 1, wherein component A is selected from one or more dye compounds of the following formulae:

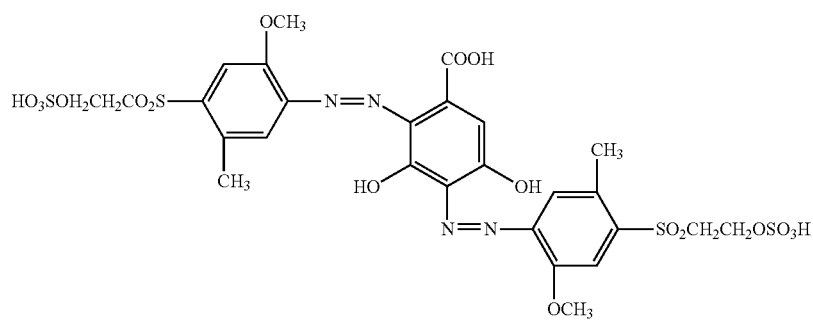
(I-1)

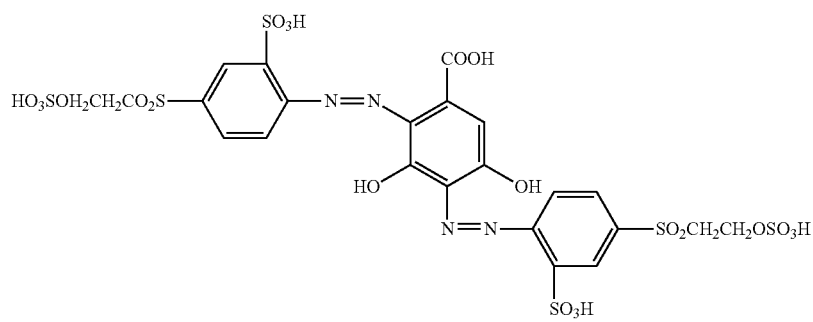
(I-2)

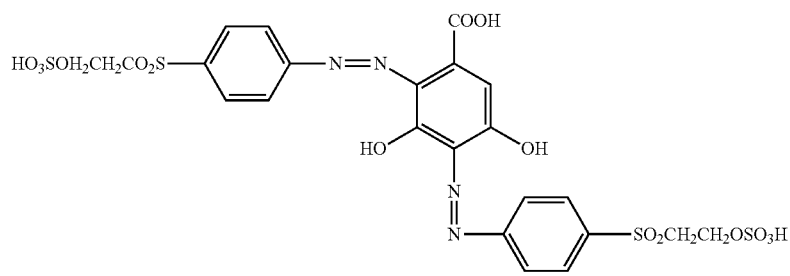
(I-3)

-continued
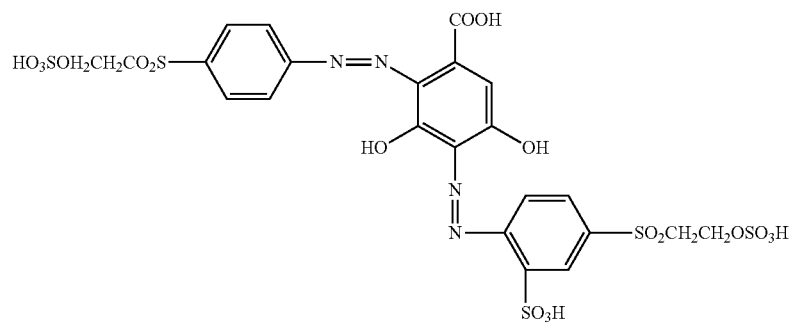
(I-4)
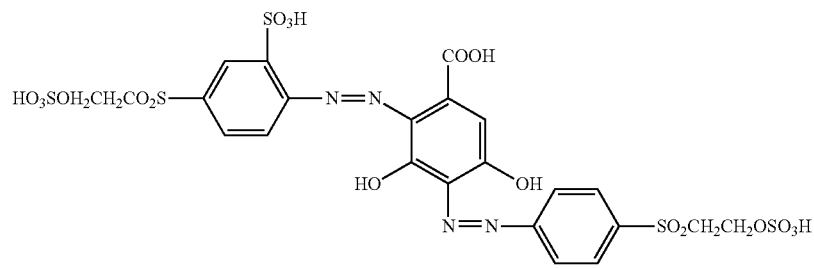
(I-5)
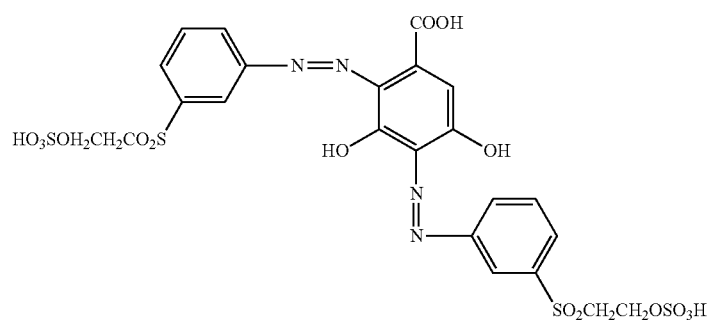
(I-6)
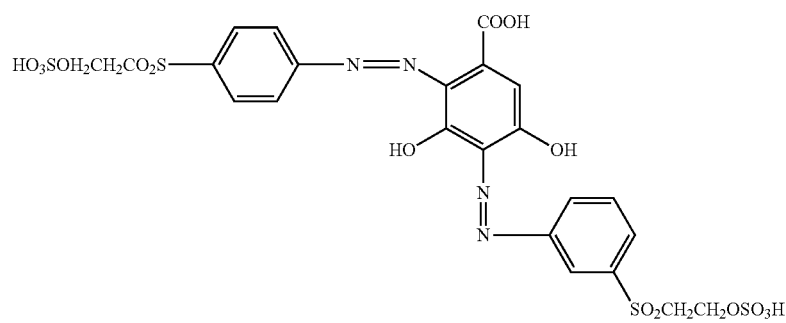
(I-7)
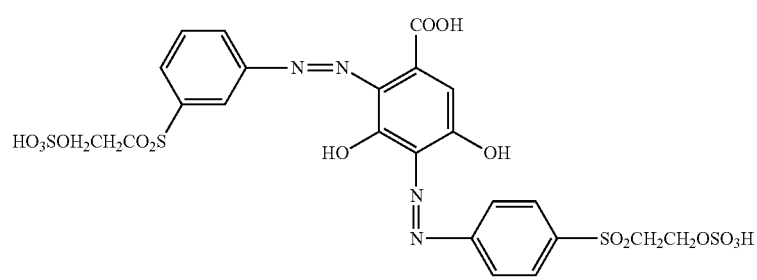
(I-8)

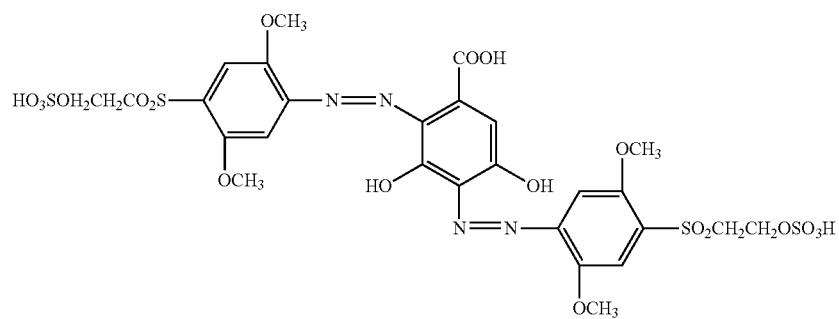
(I-9)
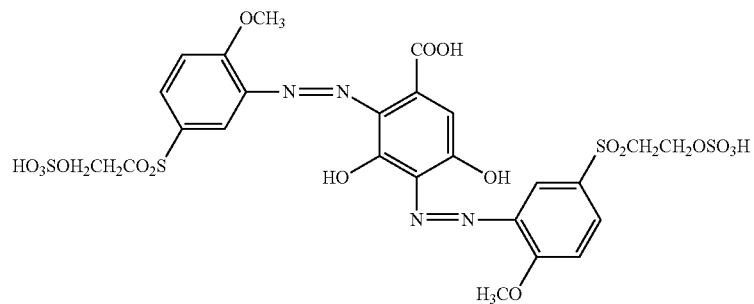
(I-10)
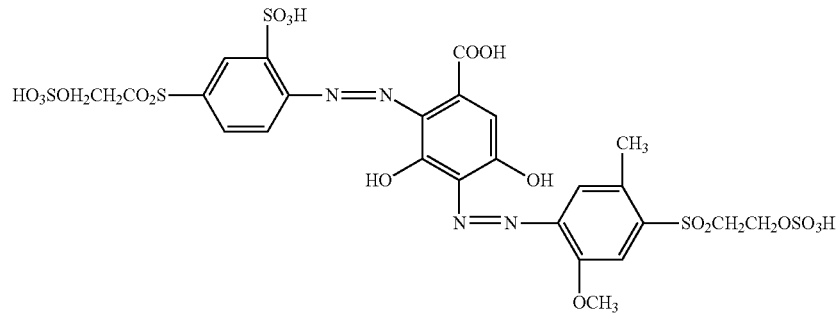
(I-11)
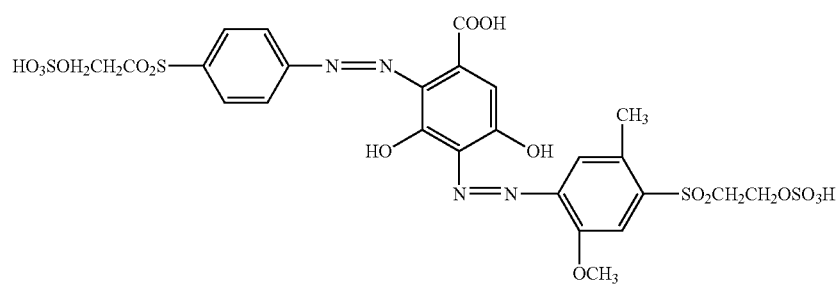
(I-12)
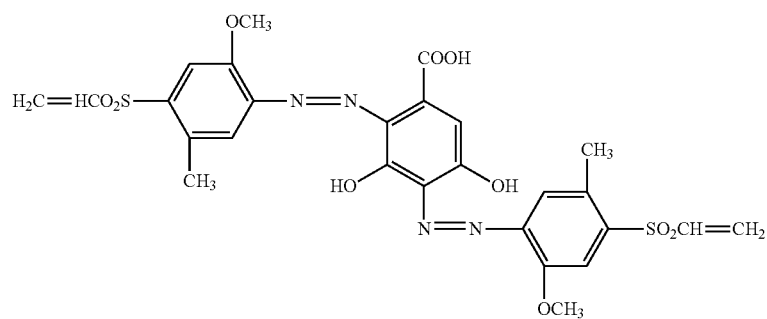
(I-13)

-continued
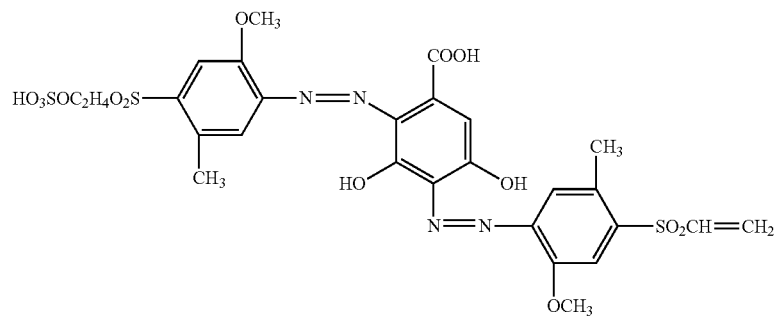
(I-14)
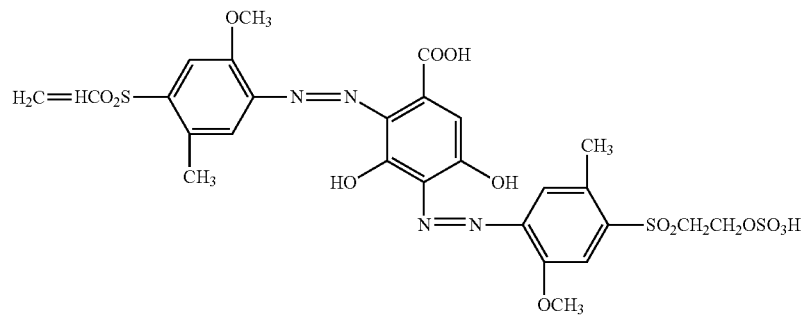
(I-15)
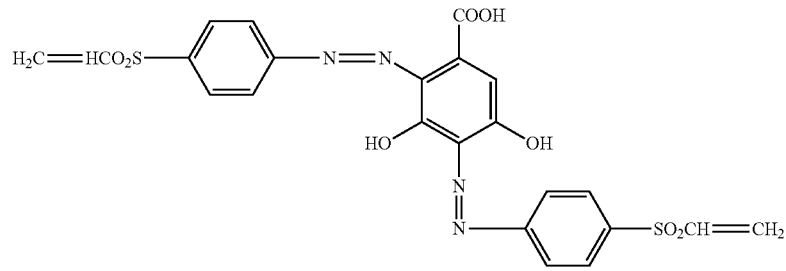
(I-16)
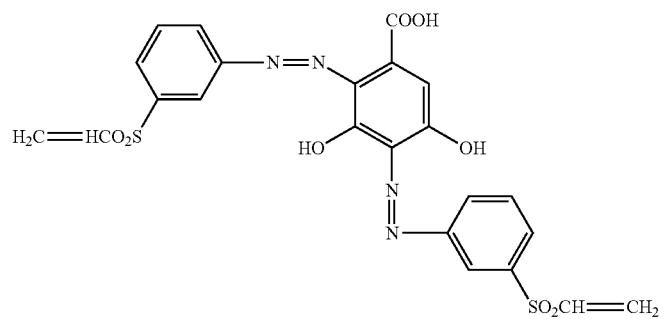
(I-17)
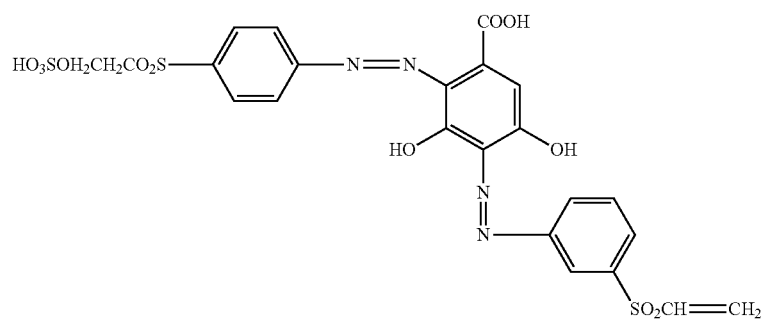
(I-18)

-continued
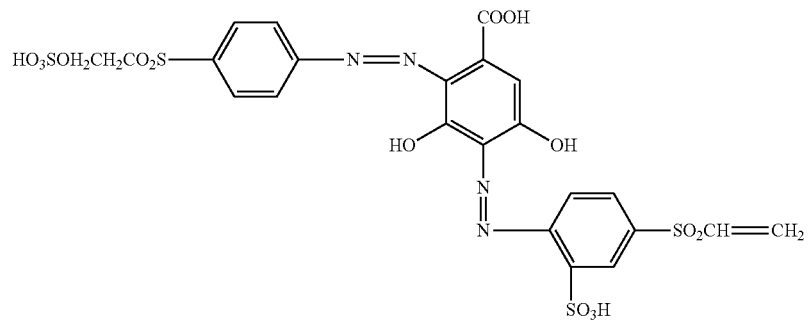
(I-19)
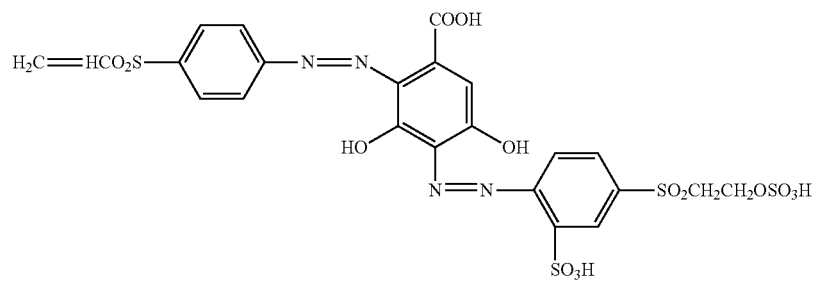
(I-20)
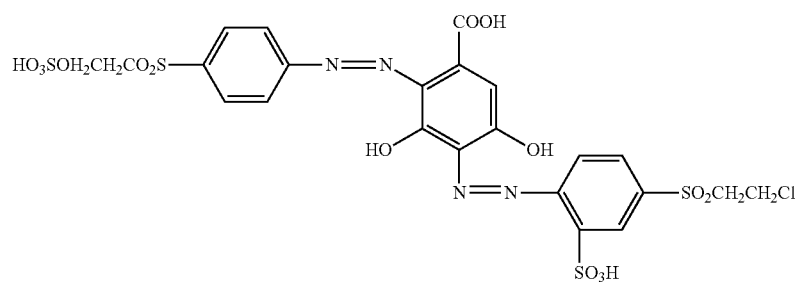
(I-21)
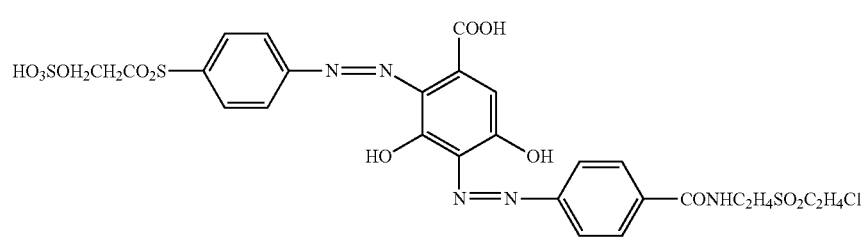
(I-22)
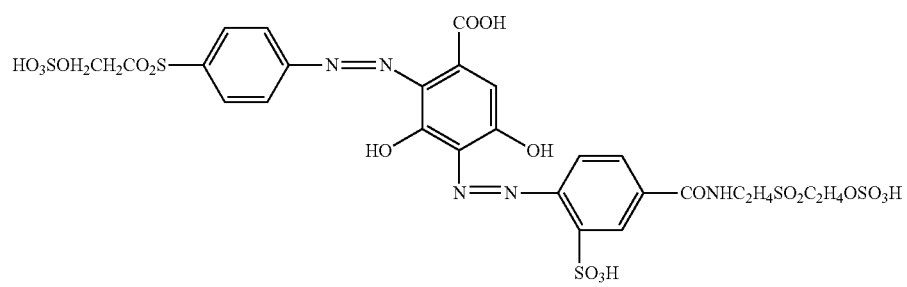
(I-23)

-continued
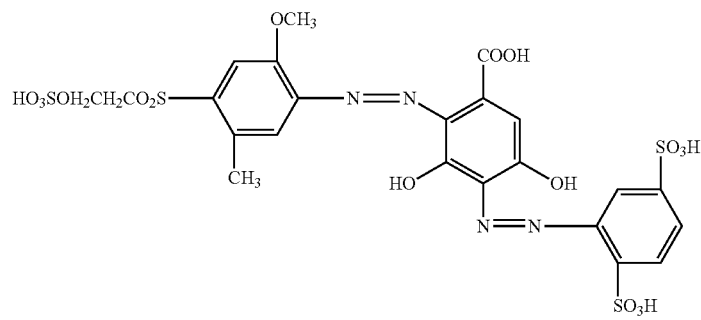
(I-24)
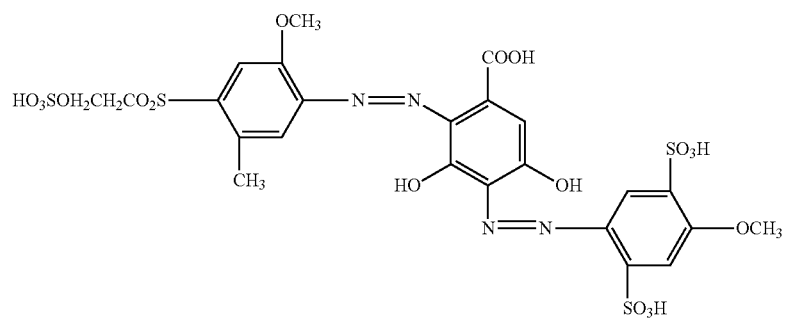
(I-25)
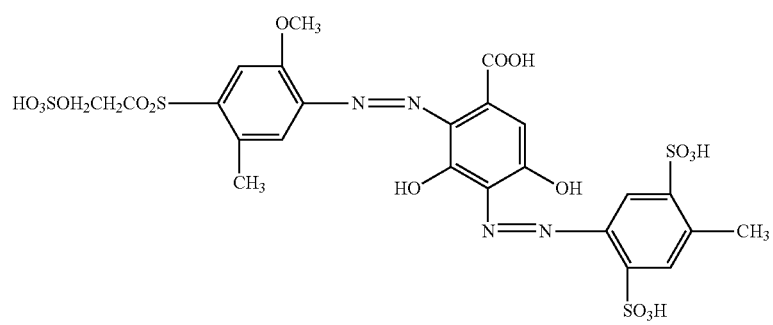
(I-26)
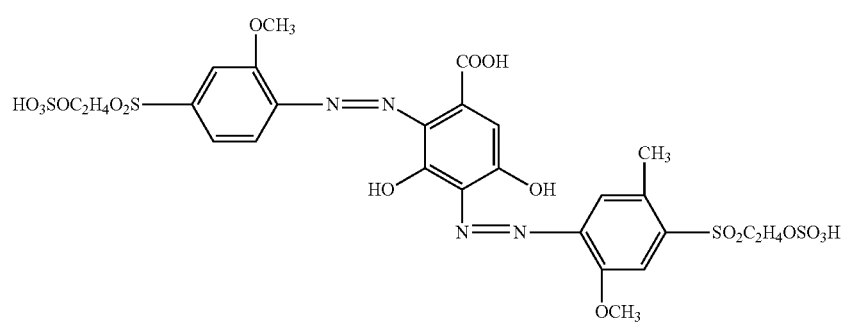
(I-27)
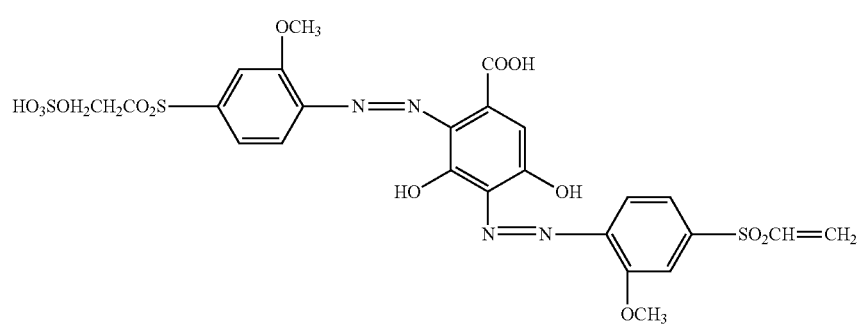
(I-28)

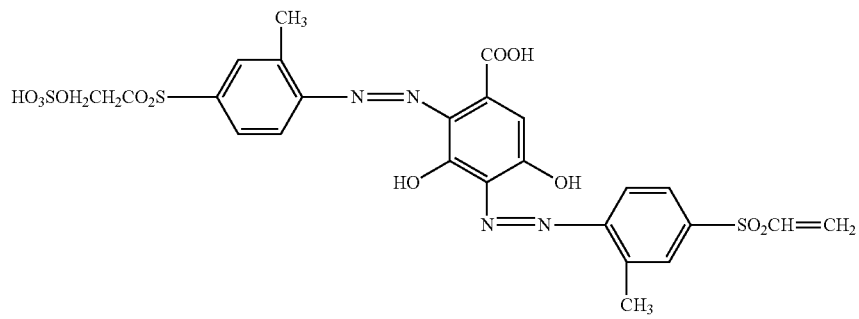
(I-29)
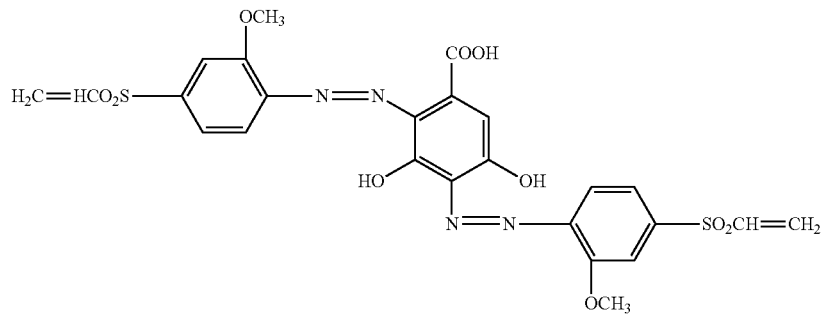
(I-30)
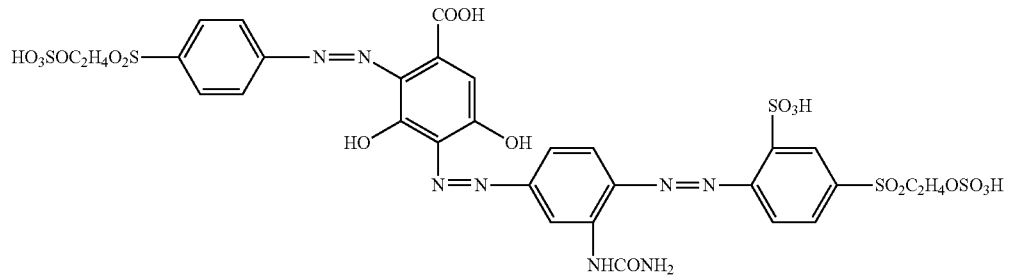
(I-31)
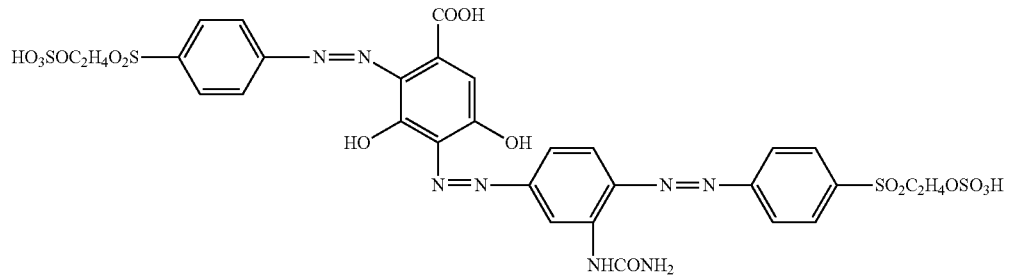
(I-32)
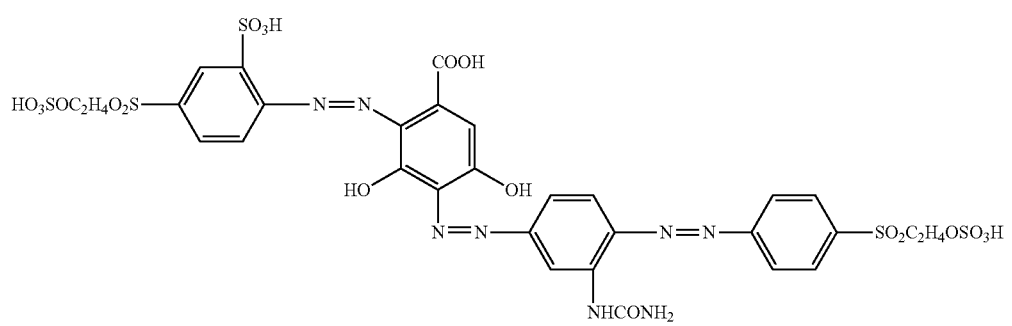
(I-33)

-continued
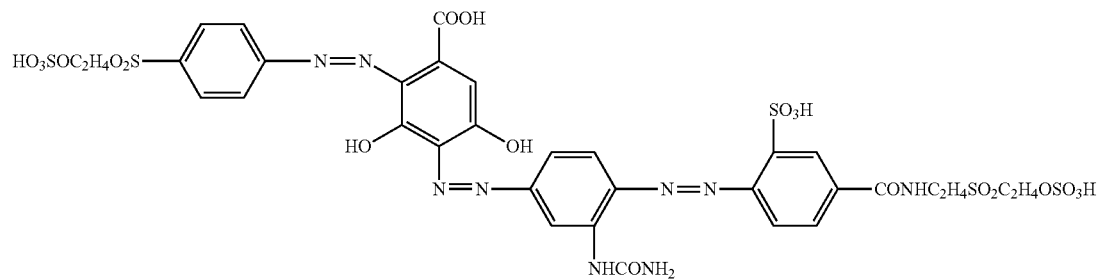
(I-34)
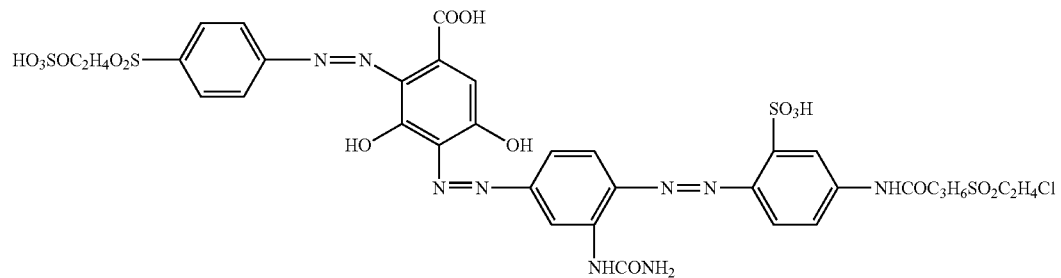
(I-35)
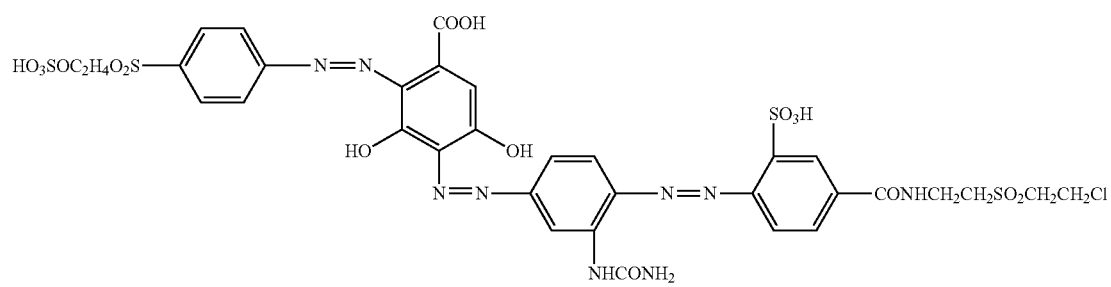
(I-36)
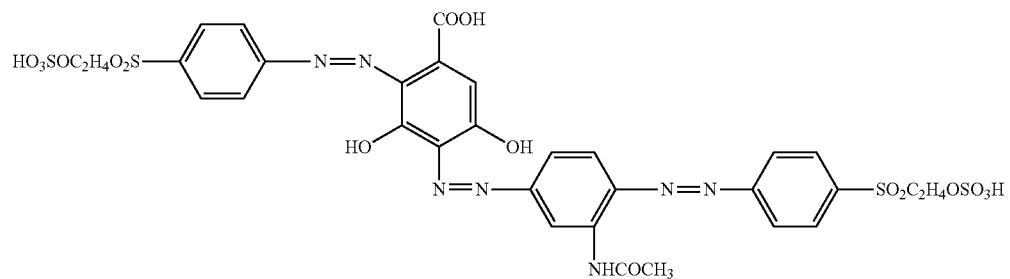
(I-37)
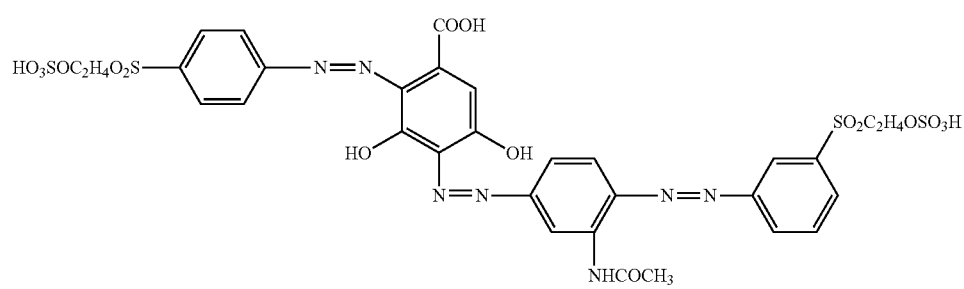
(I-38)

-continued
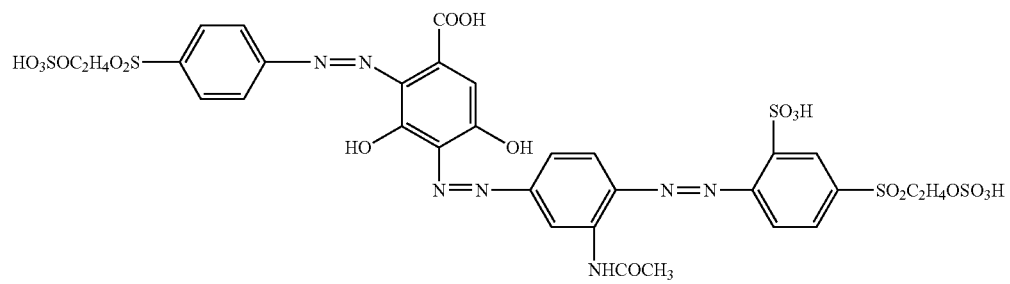
(I-39)
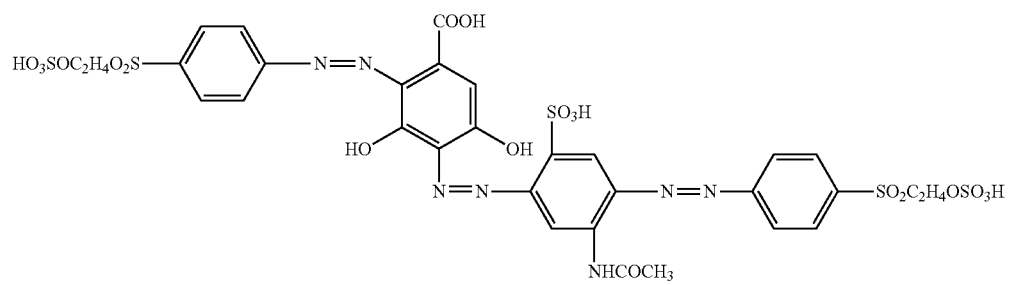
(I-40)
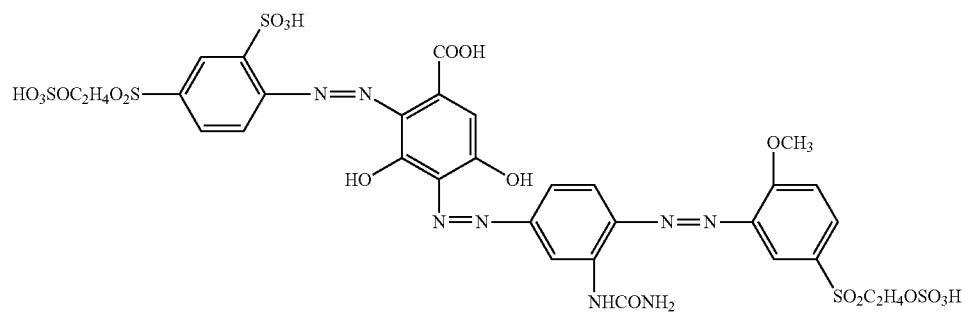
(I-41)
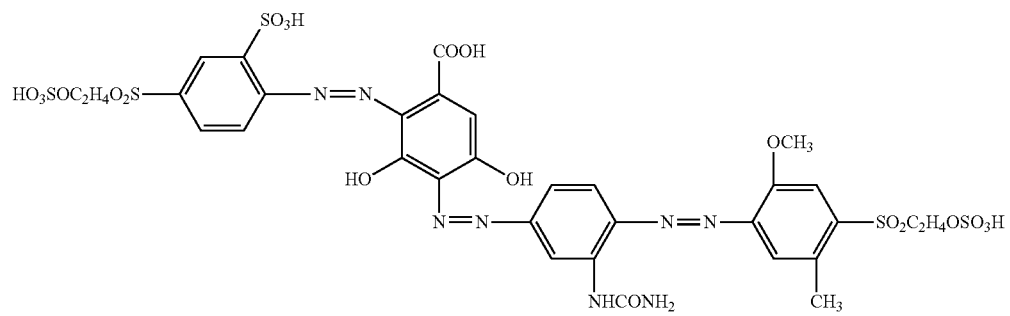
(I-42)
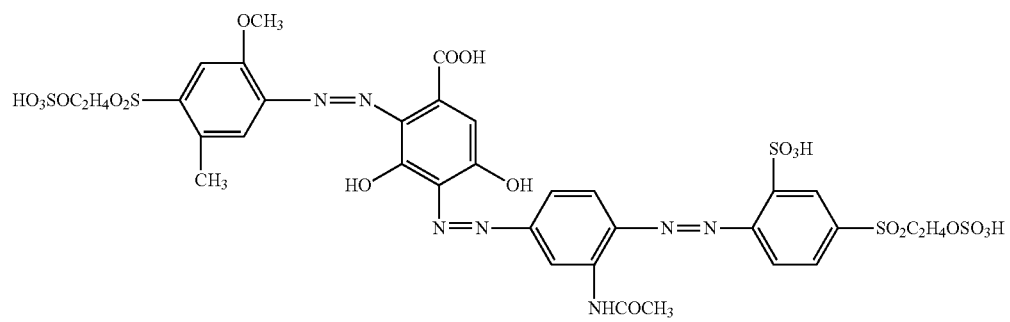
(I-43)

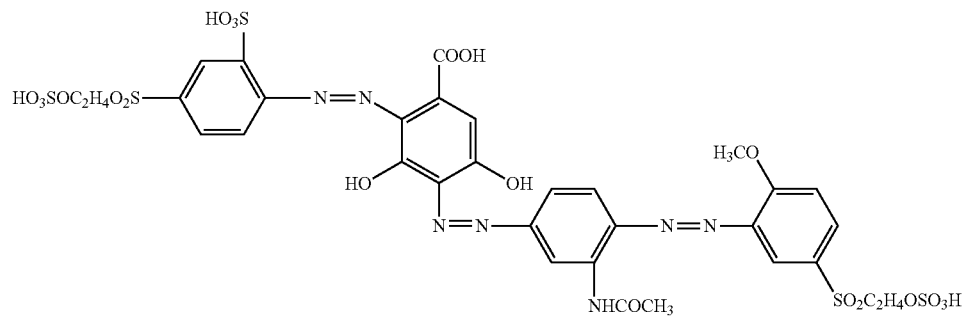
(I-44)
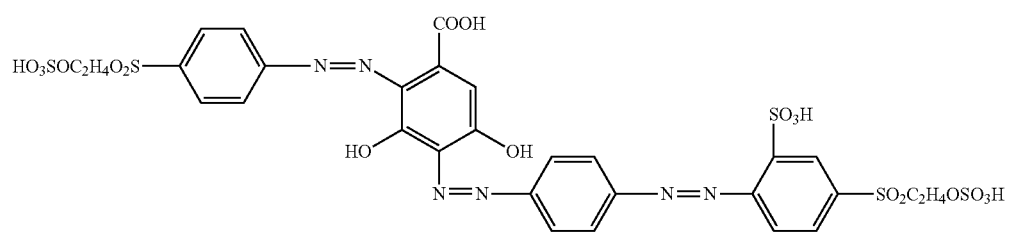
(I-45)
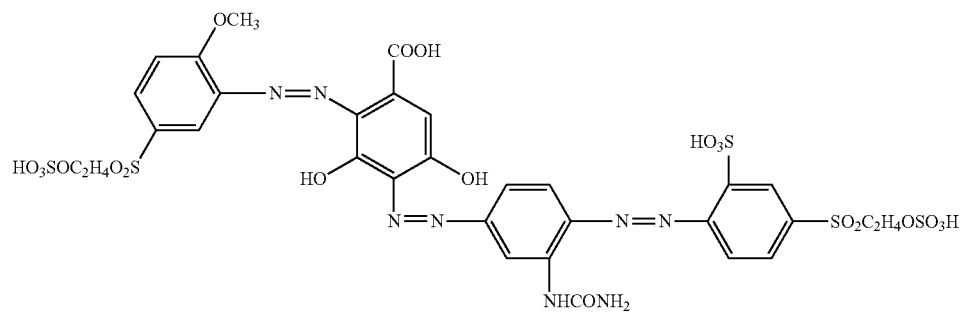
(I-46)
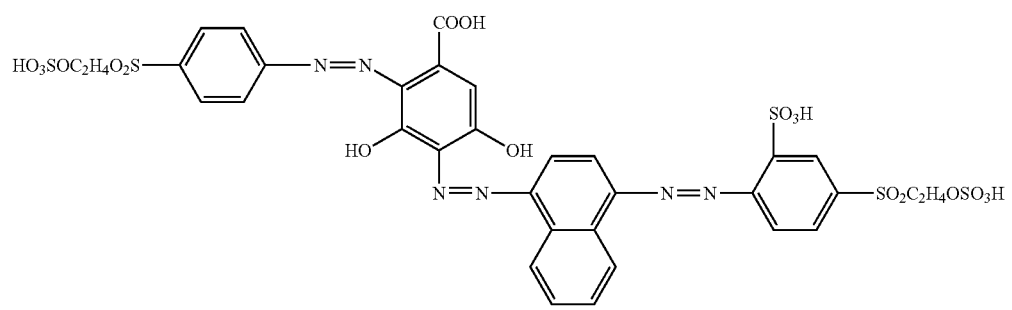
(I-47)
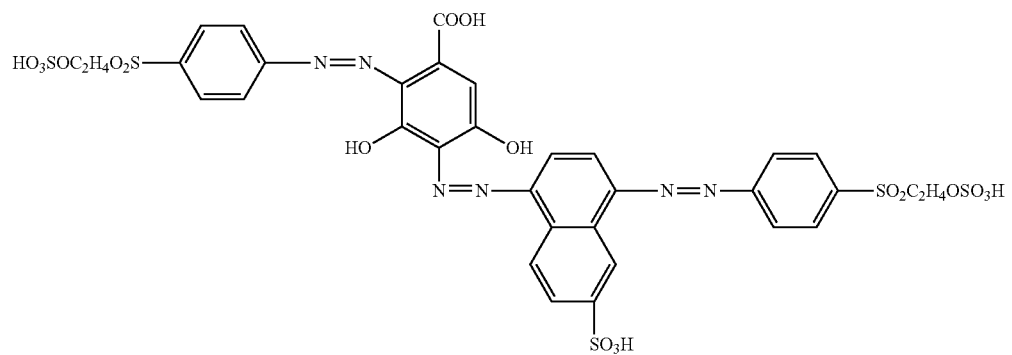
(I-48)

-continued
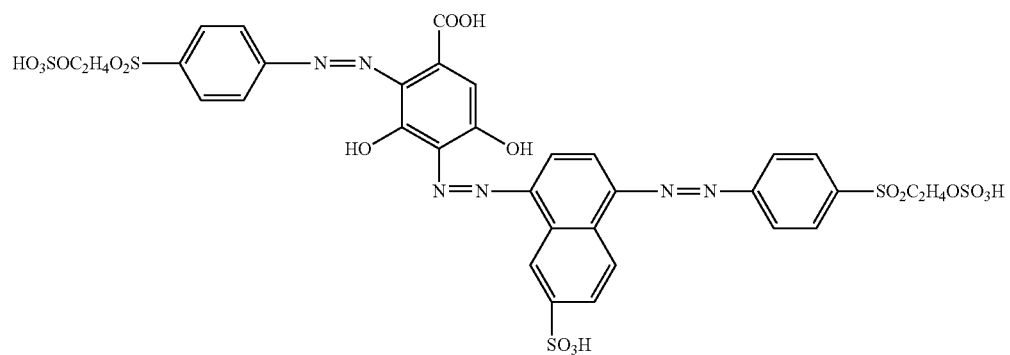
(I-49)
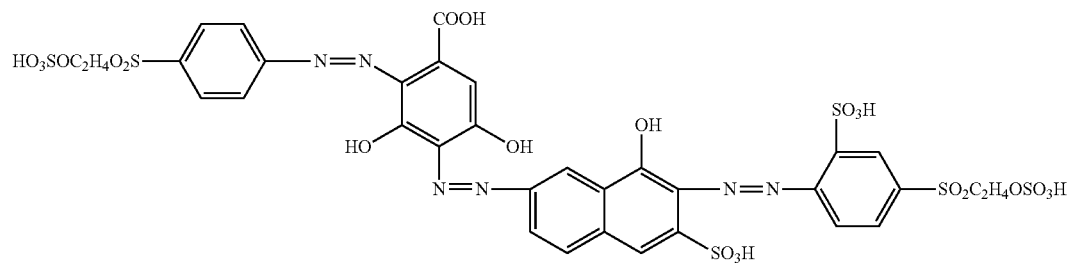
(I-50)
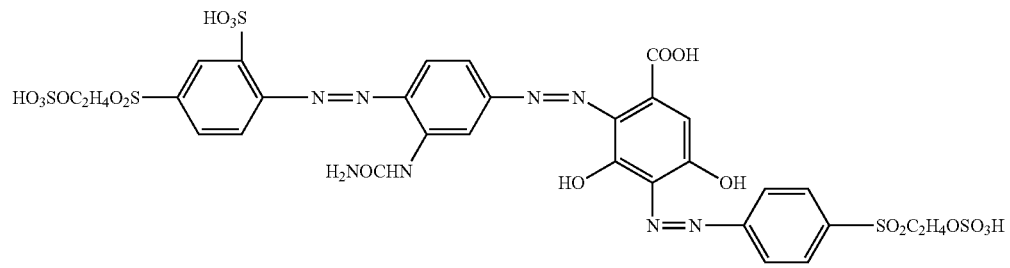
(I-51)
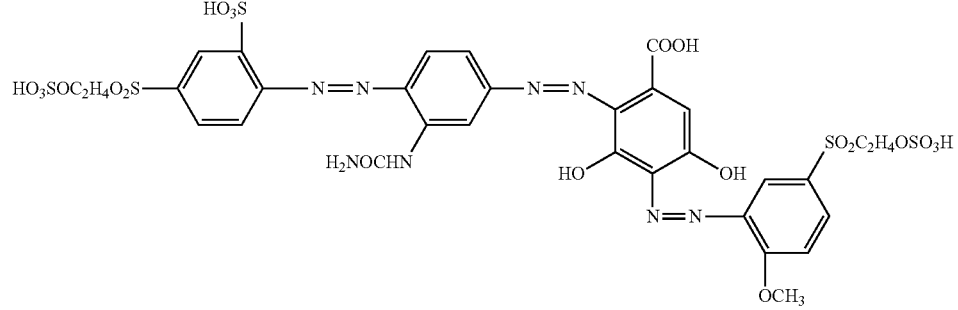
(I-52)
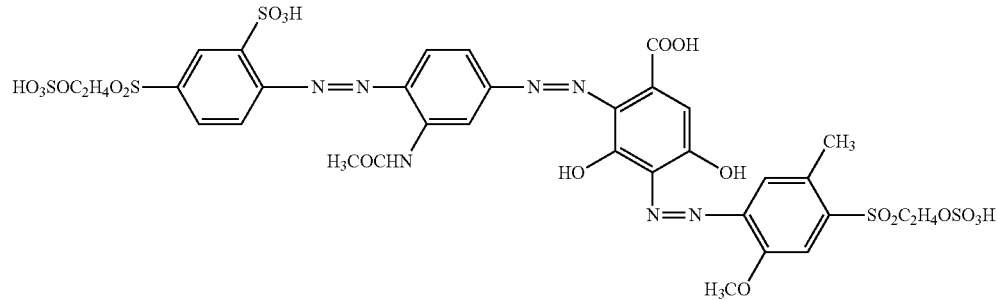
(I-53)

-continued
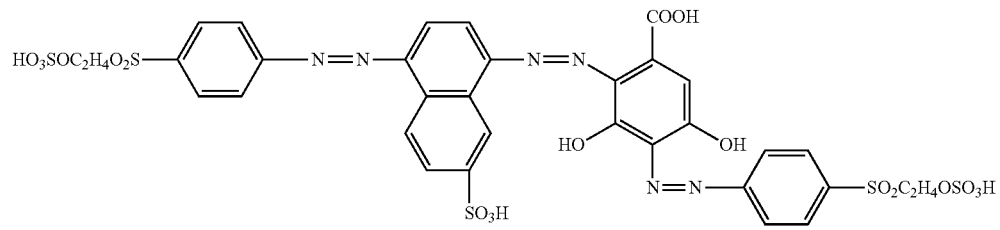
(I-54)
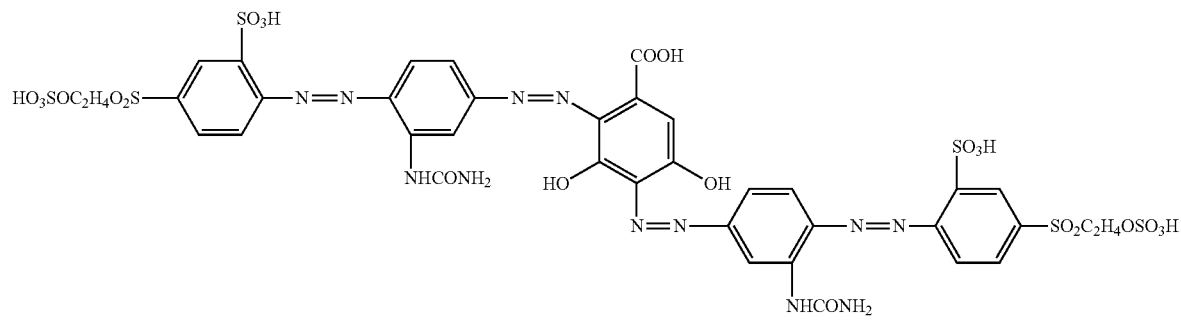
(I-55)
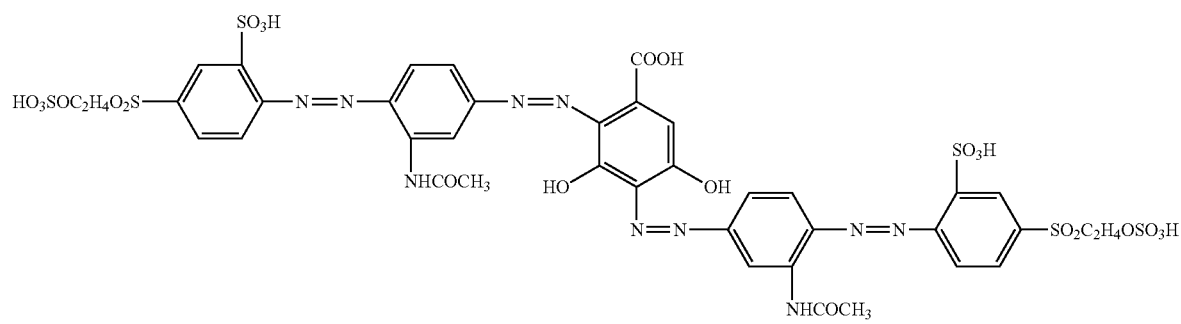
(I-56)
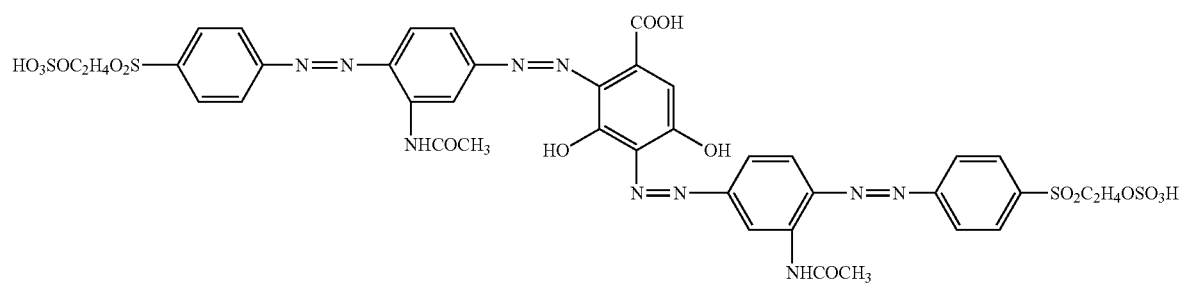
(I-57)
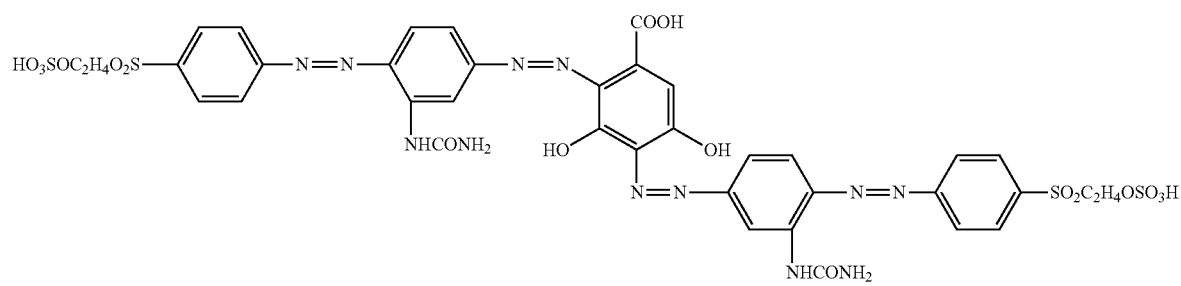
(I-58)

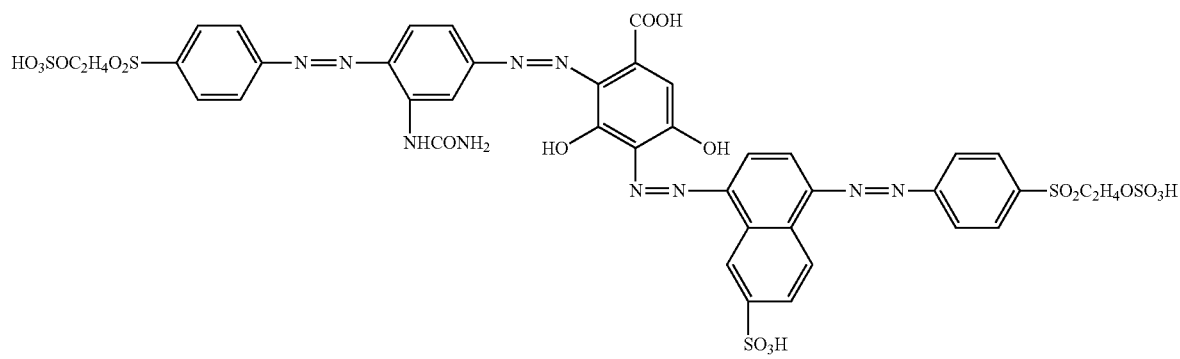
(I-59)
(I-60)
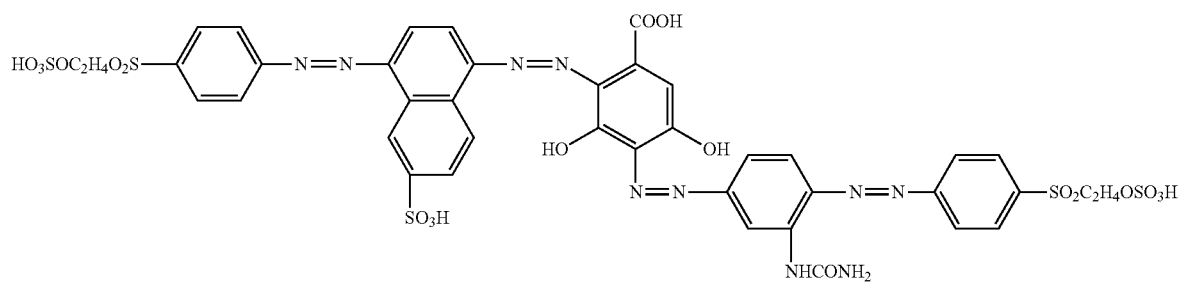
(I-61)
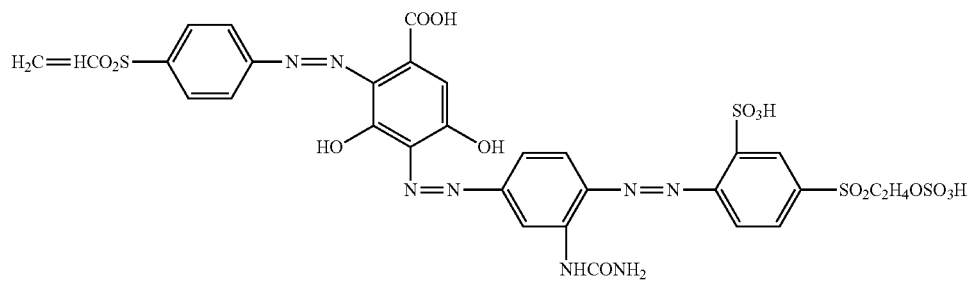
(I-62)
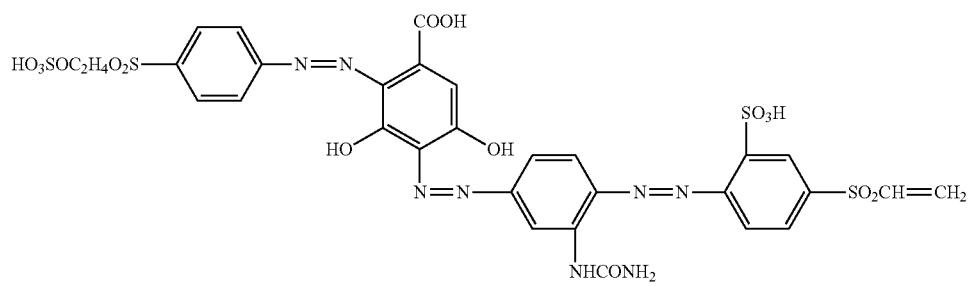
(I-63)
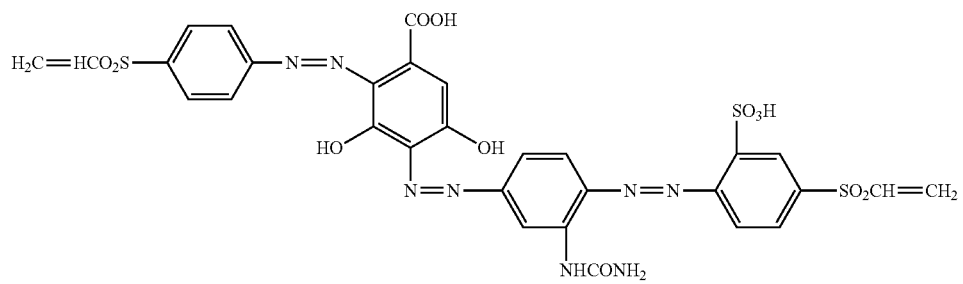

-continued
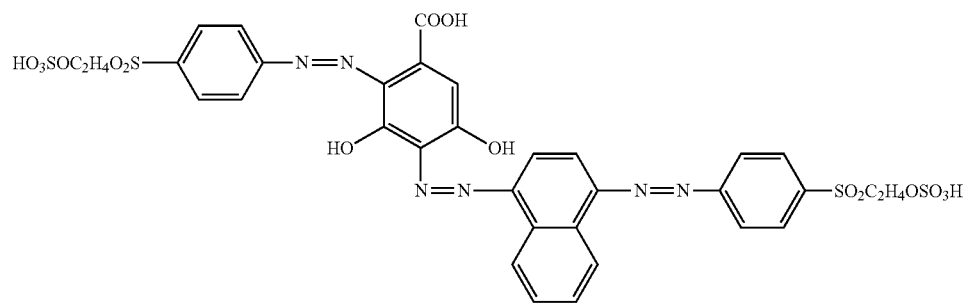
(I-64)
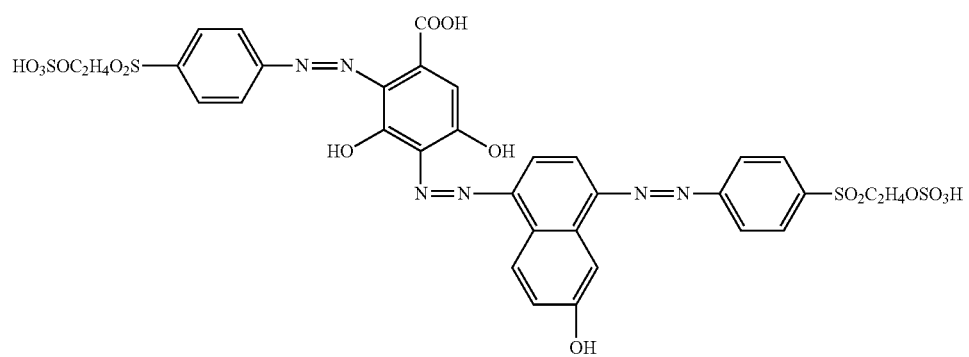
(I-65)
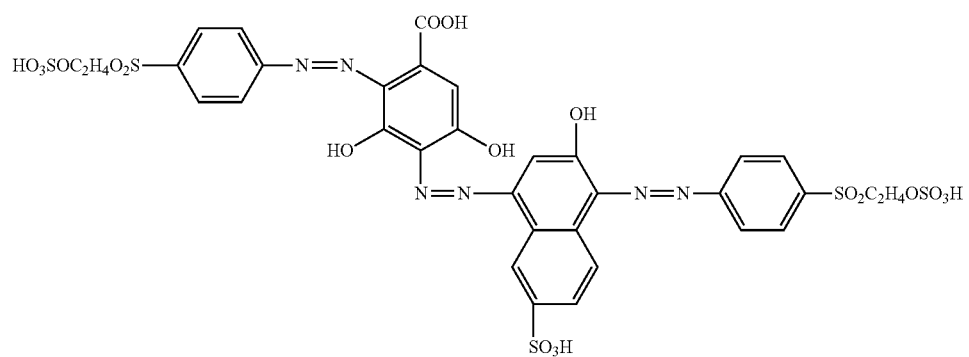
(I-66)
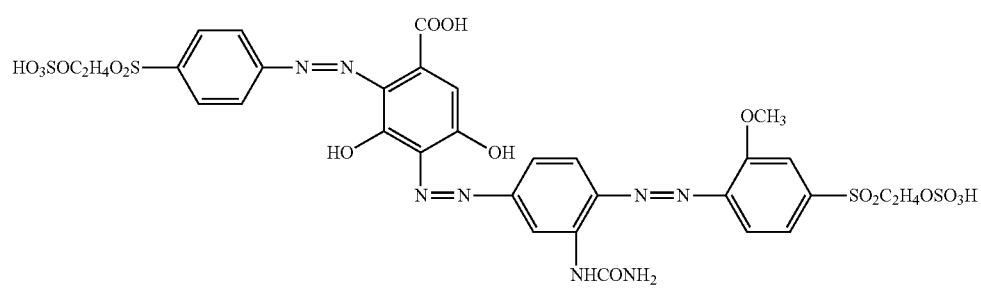
(I-67)
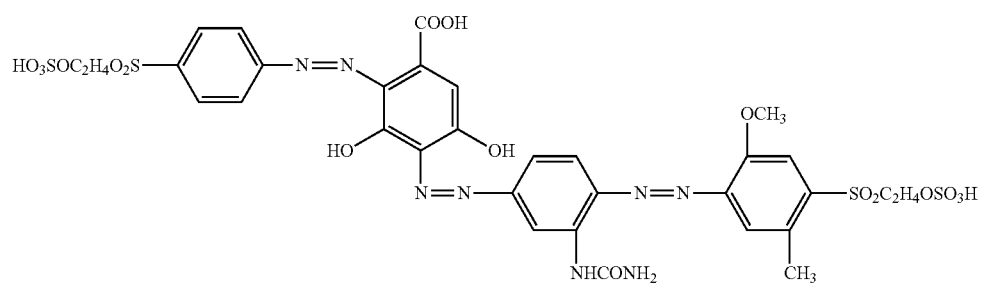
(I-68)

-continued
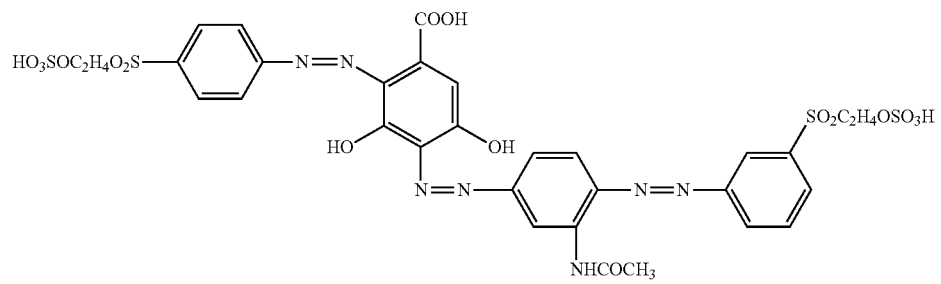
(I-69)
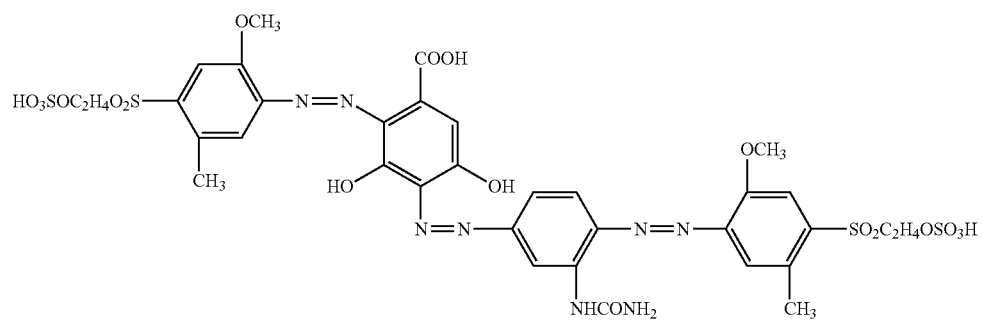
(I-70)
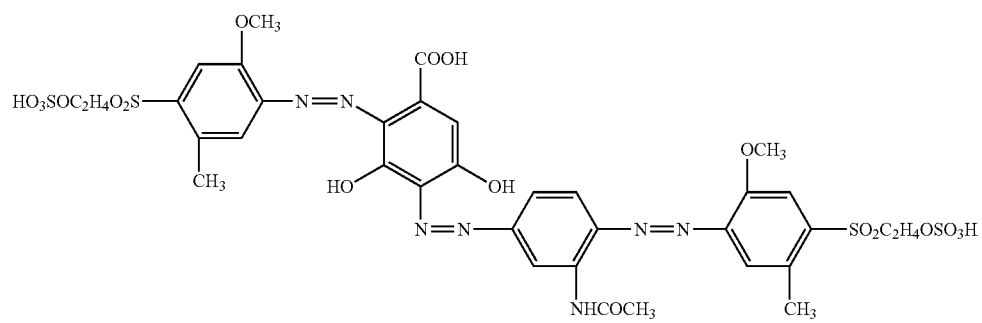
(I-71)
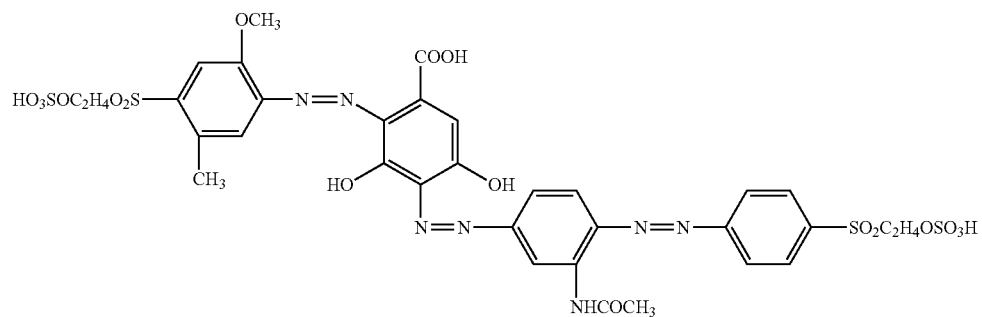
(I-72)
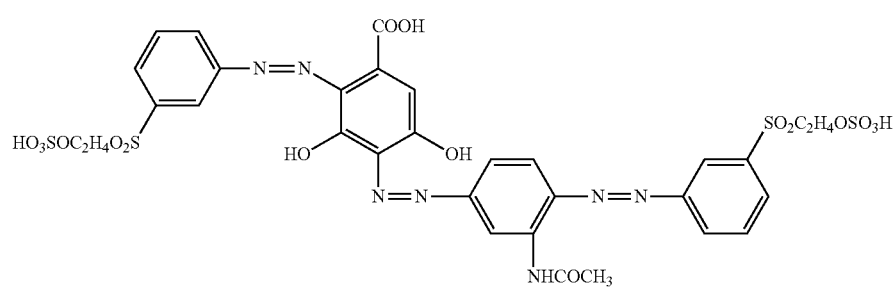
(I-73)

-continued
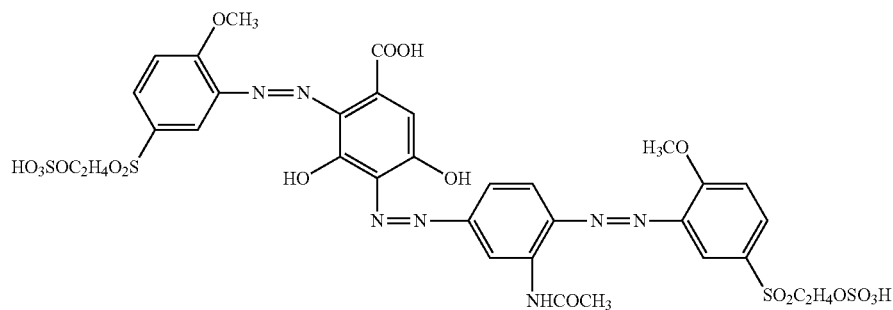
(I-74)
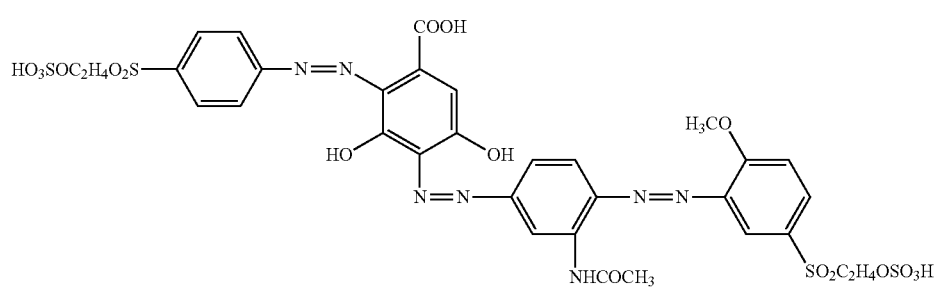
(I-75)
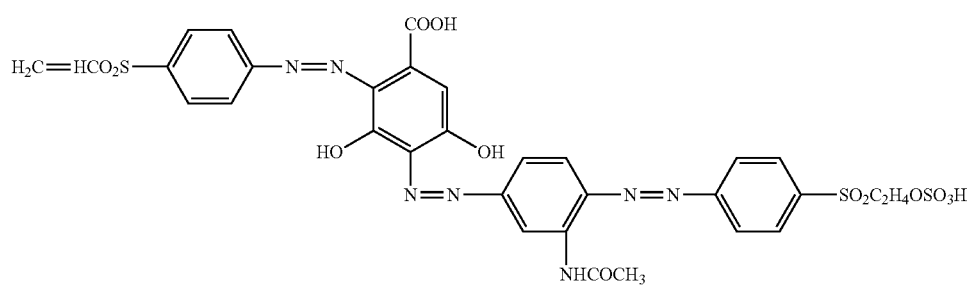
(I-76)
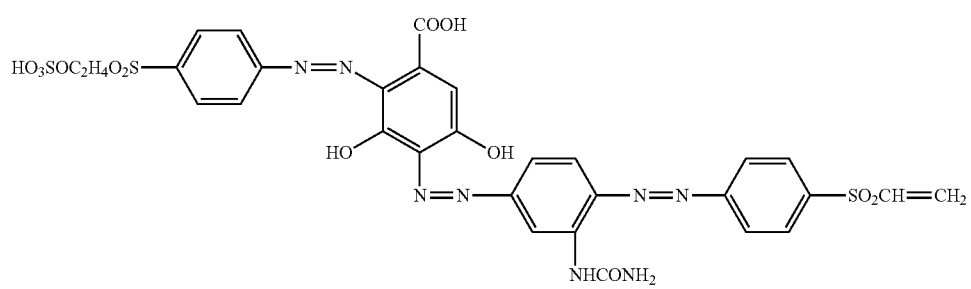
(I-77)
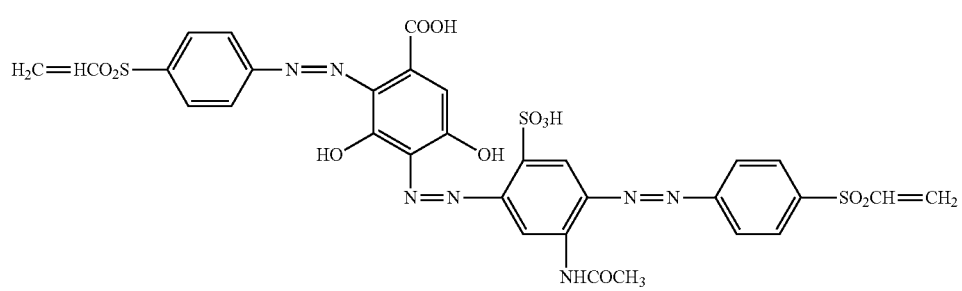
(I-78)

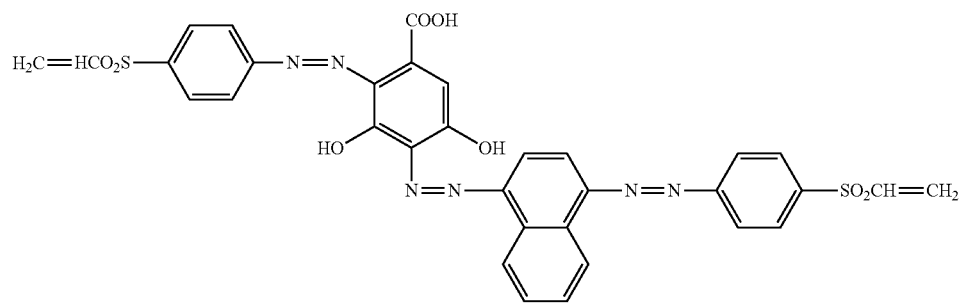
(I-79)
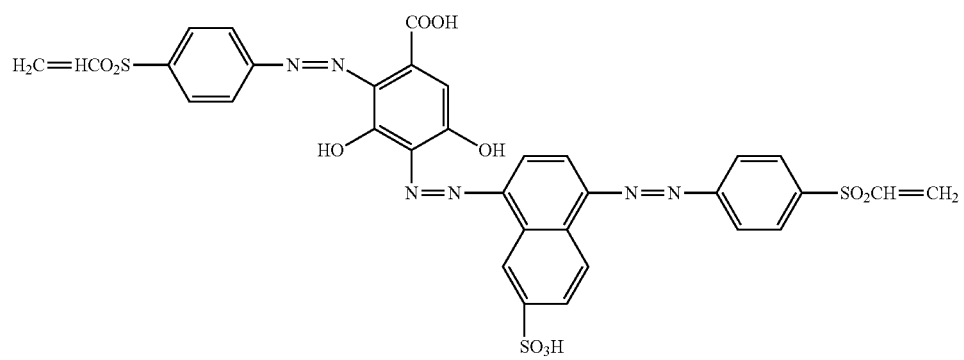
(I-80)
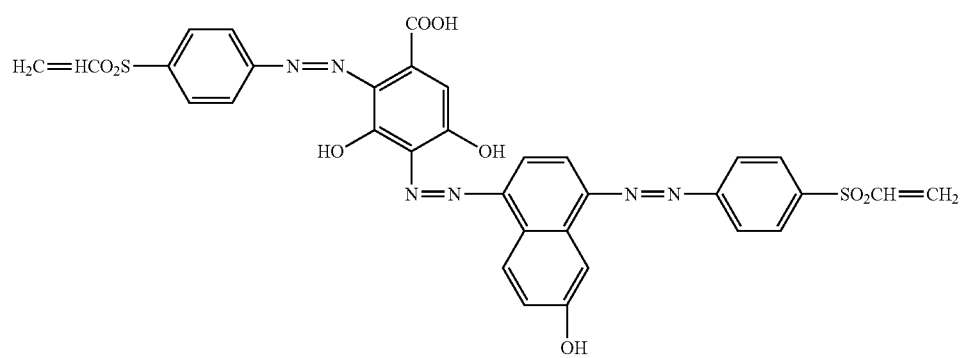
(I-81)
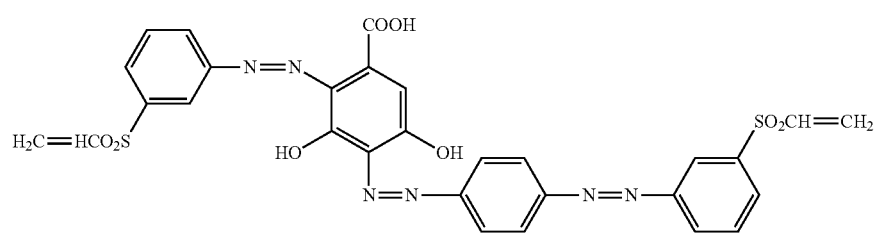
(I-82)
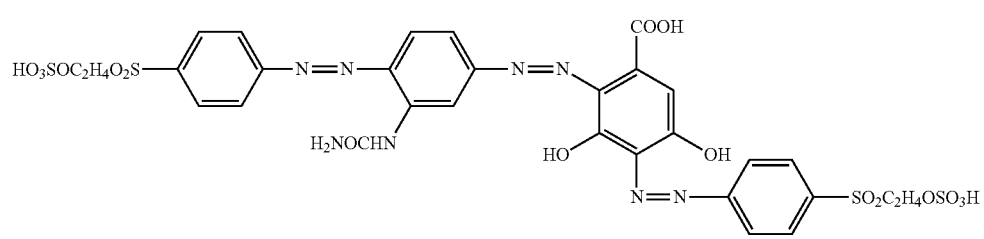
(I-83)

-continued
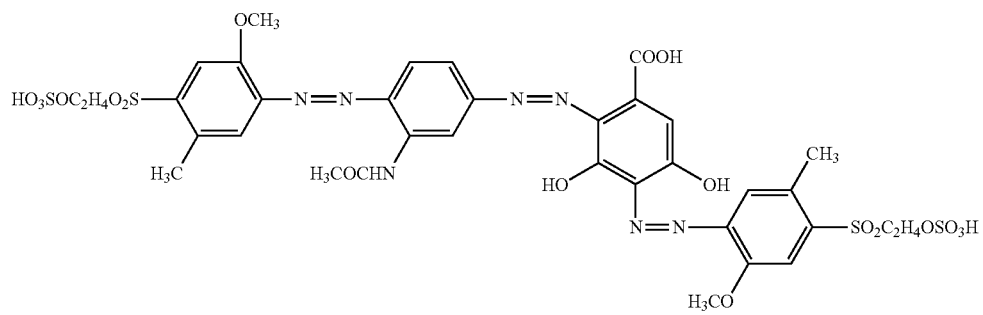
(I-84)
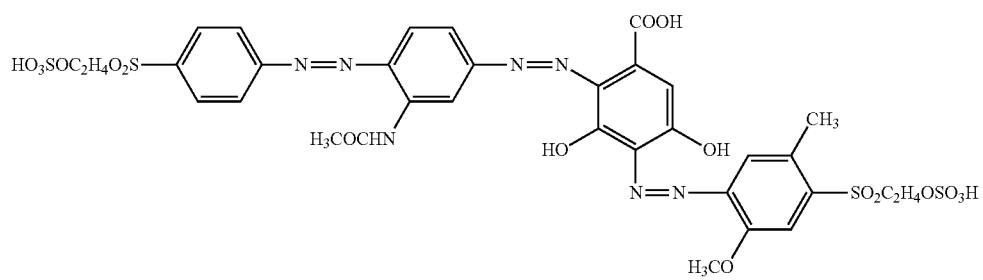
(I-85)
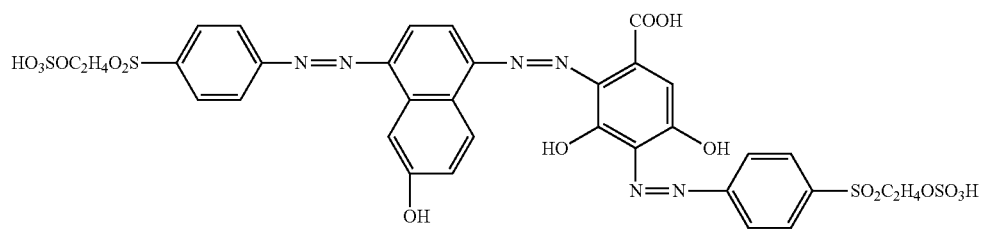
(I-86)
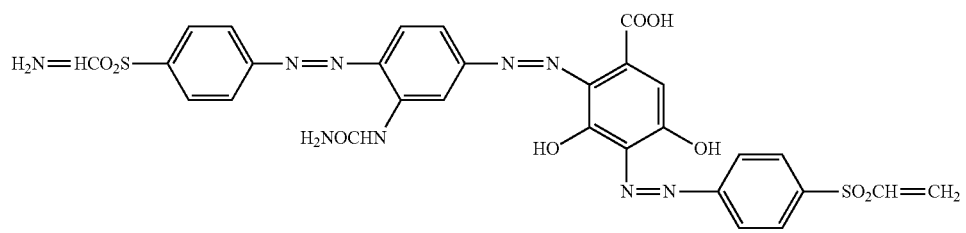
(I-87)
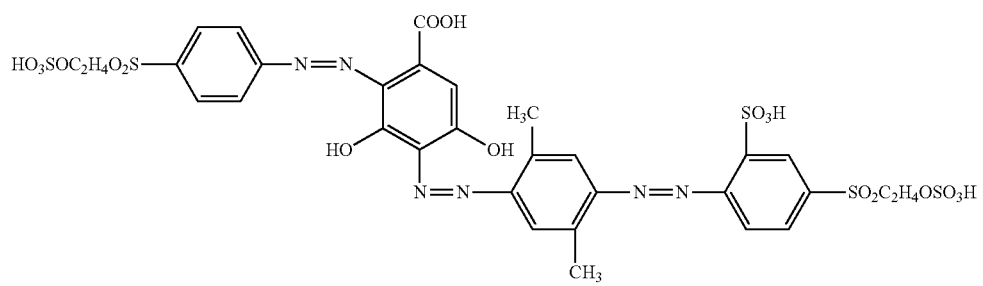
(I-88)
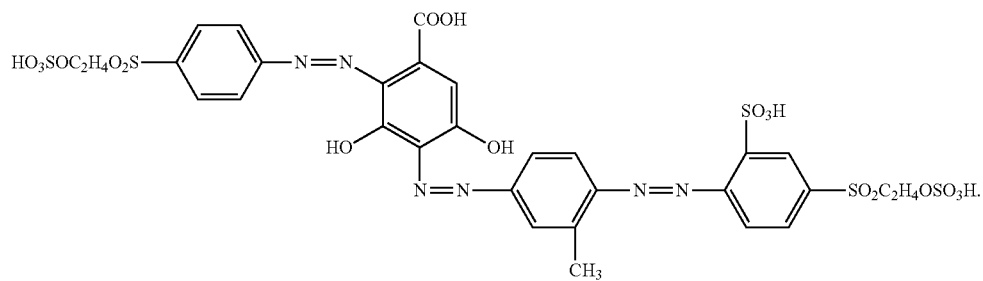
(I-89)

5. The reactive navy to black dye composition as claimed in claim 4, wherein component A is selected from at least one of formulae (I-1)~(I-63), (I-88) and (I-89).
6. The reactive navy to black dye composition as claimed in claim 1, wherein component B is selected from one or more dye compounds of the following formulae:
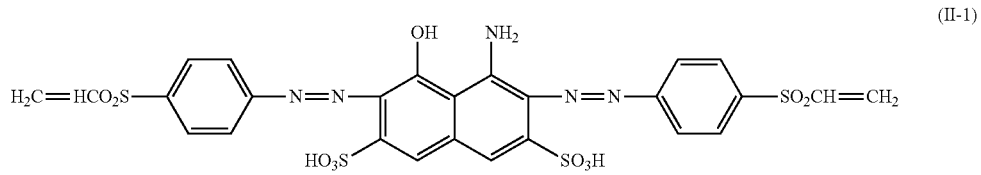
(II-1)
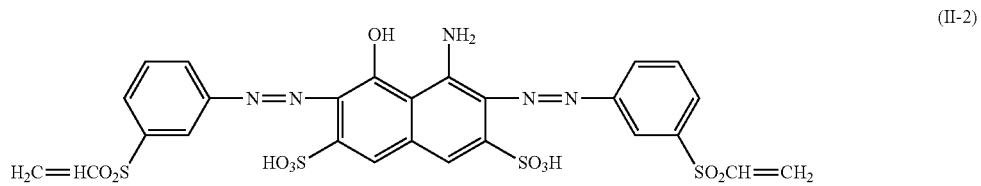
(II-2)
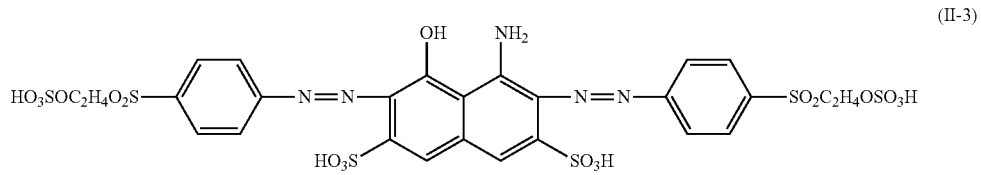
(II-3)
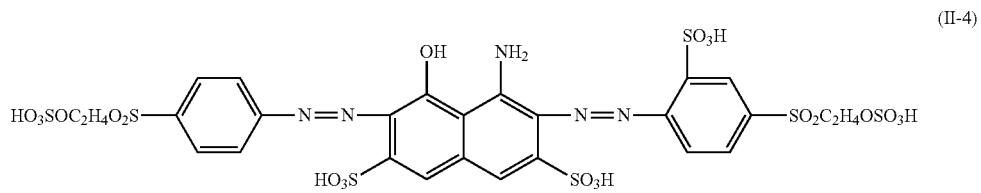
(II-4)
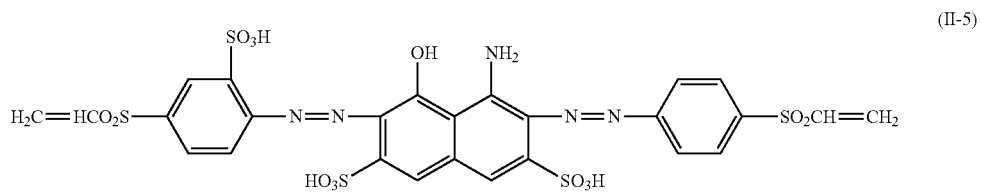
(II-5)
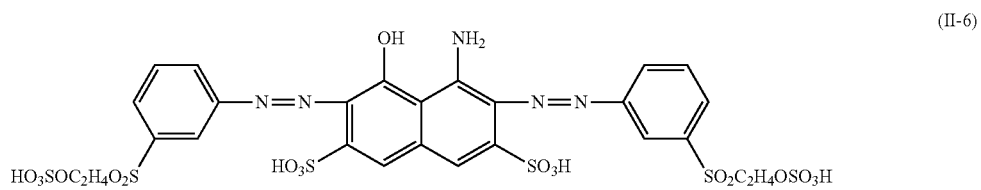
(II-6)
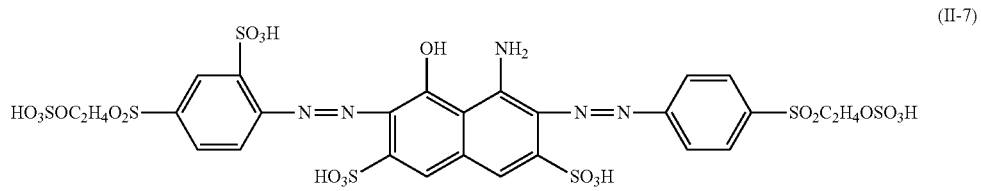
(II-7)
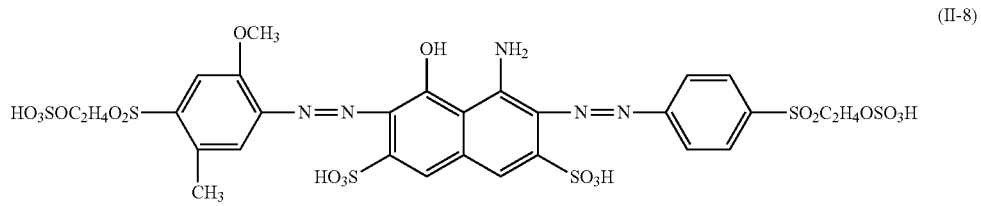
(II-8)

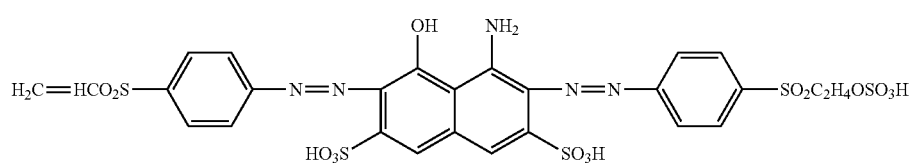

(II-9)

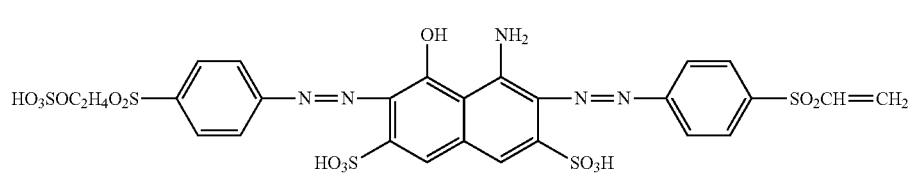

(II-10)

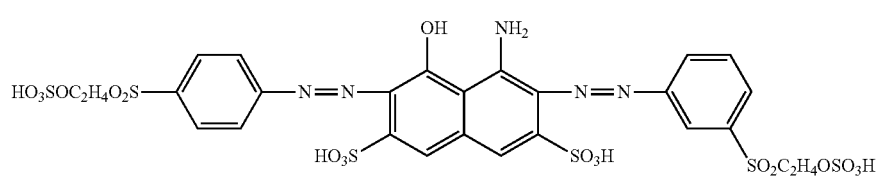

(II-11)

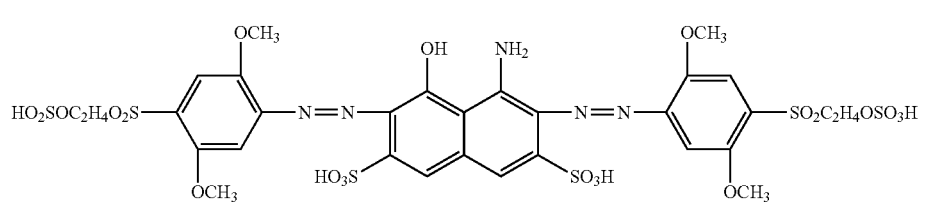

(II-12)

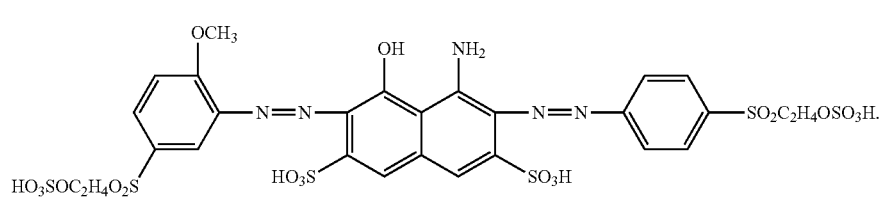

(II-13)

7. The reactive navy to black dye composition as claimed in claim 1, wherein the reactive navy to black dye composition consists of component A and component B.

8. The reactive navy to black dye composition as claimed in claim 1, wherein the reactive navy to black dye composition further comprises component C, and component C is selected from one or more compounds of formulae (III)~(VI) or alkali metal salts of formulae (III)~(VI), the mass of component C in the composition is 1% to 50% of the total mass of component A and component B;

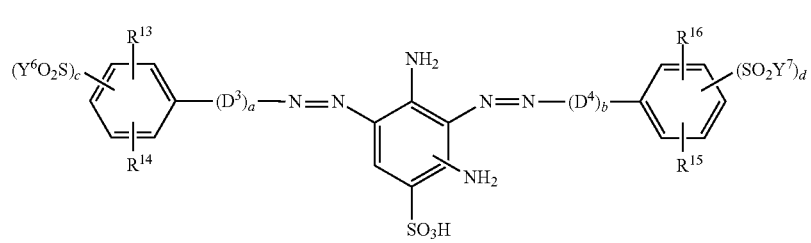

(III)

-continued

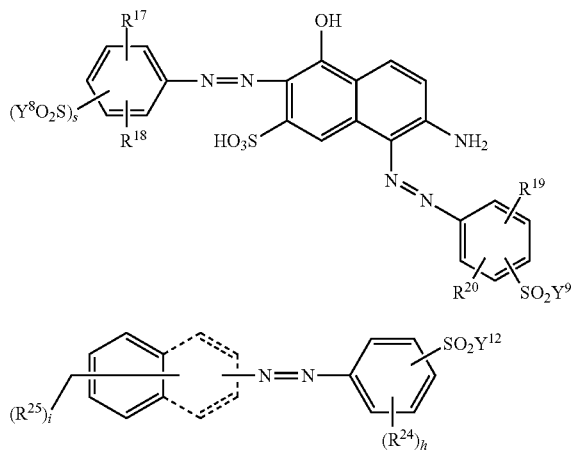
(IV)

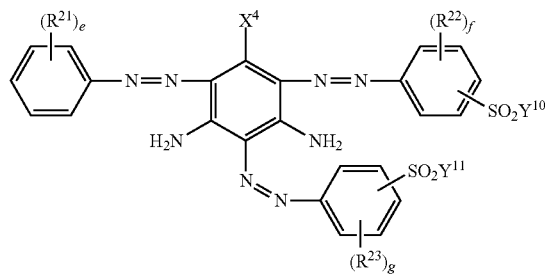
(V)

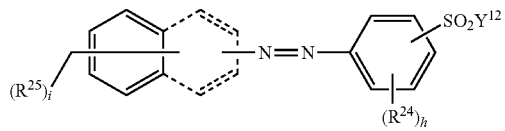

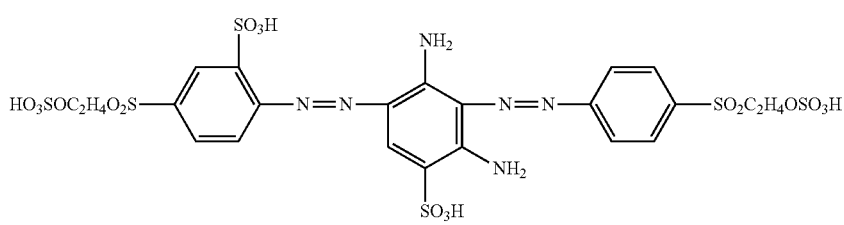
(VI)

in formula (III):
R$^{13}$, R$^{14}$, R$^{15}$ and R$^{16}$ are each independently H, linear or branched C$_1$~C$_4$ alkyl, C$_1$~C$_4$ alkoxy, carboxyl or sulfo; Y$^6$ and Y$^7$ are each independently —CH=CH$_2$, —C$_2$H$_4$OSO$_3$H or —C$_2$H$_4$Cl; a is 0 or 1; b is 0 or 1; c and d are each independently 0 or 1; every D$^3$ and D$^4$ is each independently substituted phenyl, unsubstituted phenyl, substituted naphthyl or unsubstituted naphthyl, and the number of the substituents of the substituted phenyl and the substituted naphthyl is 1-3, respectively, and each of the substituents is independently selected from the group consisting of amino, sulfo, ureido, C$_1$~C$_4$ alkanoylamino, C$_1$~C$_4$ alkoxy and hydroxyl;

in formula (IV):
R$^{17}$~R$^{20}$ are each independently H, linear or branched C$_1$~C$_4$ alkyl, C$_1$~C$_4$ alkoxy or sulfo; s=0-1, and Y$^8$ and Y$^9$ are each independently —CH=CH$_2$, —C$_2$H$_4$OSO$_3$H or —CH$_2$CH$_2$Cl;

in formula (V):
e, f and g are each independently selected from 0-3, and every R$^{21}$, R$^{22}$ and R$^{23}$ is each independently linear or branched C$_1$~C$_4$ alkyl, C$_1$~C$_4$ alkoxy and sulfo; X$^4$ is hydrogen or carboxyl; and Y$^{10}$ and Y$^{11}$ are each independently —CH=CH$_2$, —C$_2$H$_4$OSO$_3$H or —C$_2$H$_4$Cl;

in formula (VI):
h=0-2, and every R$^{24}$ is each independently linear or branched C$_1$~C$_4$ alkyl, alkoxy or sulfo; i=1-3, and every R$^{25}$ is each independently selected from the group consisting of amino, sulfo, ureido, C$_1$~C$_4$ alkanoylamino, C$_1$~C$_4$ alkoxy and hydroxyl; Y$^{12}$ is —CH=CH$_2$, —C$_2$H$_4$OSO$_3$H or —C$_2$H$_4$Cl.

9. The reactive navy to black dye composition as claimed in claim 8, wherein component C is selected from at least one dye of formula (III) and/or formula (VI), wherein both a and b are 0, or one of a and b is 0, while the other is 1, c is 1, and d is 0 or 1.

10. The reactive navy to black dye composition as claimed in claim 8, wherein the reactive navy to black dye composition comprises the following components:
component A which is selected from at least one dye of formula (I), wherein D$^1$ and D$^2$ are each independently the group of the general formula (a), and the substituents are the same or different; or D$^1$ is the group of formula (a), D$^2$ is the group of formula (b) or formula (c); and at least one of D$^1$ and D$^2$ contains —SO$_2$Y$^1$;
component B which is selected from at least one dye of formula (II);
and component C which is selected from at least one dye of formula (III) and/or formula (IV), wherein both a and b are 0, or one of a and b is 0, while the other is 1, c is 1, and d is 0 or 1.

11. The reactive navy to black dye composition as claimed in 8, wherein component C is selected from one or more dyes of the following formulae:

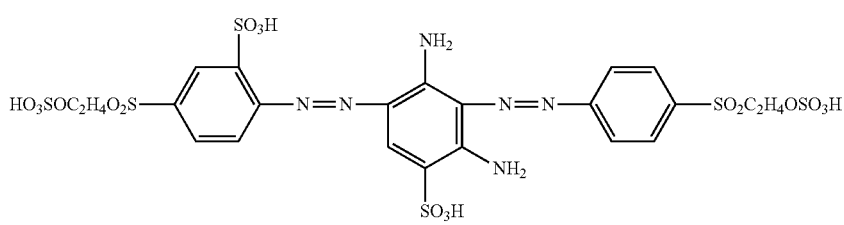
(III-1)

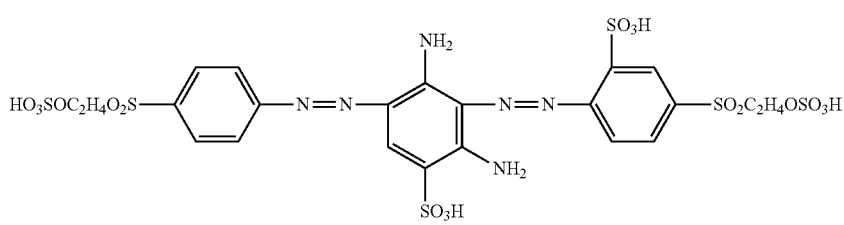
(III-2)

-continued
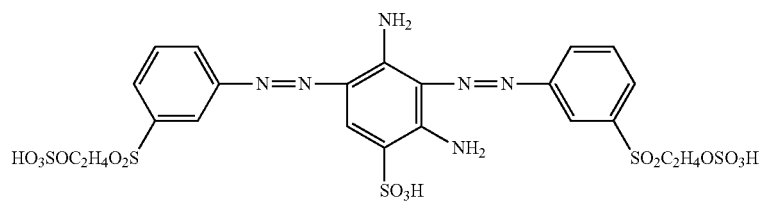
(III-3)
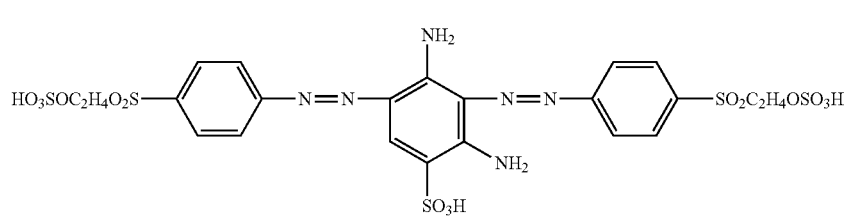
(III-4)
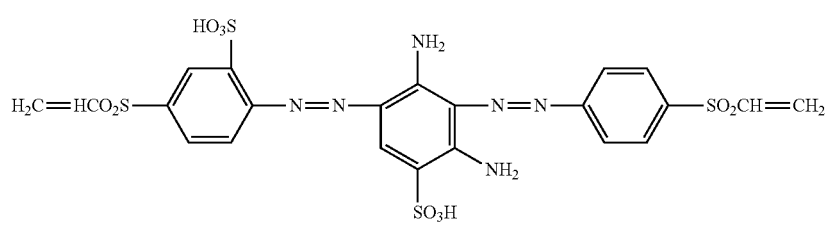
(III-5)
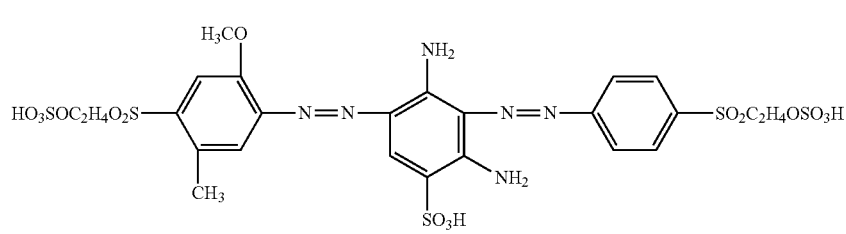
(III-6)
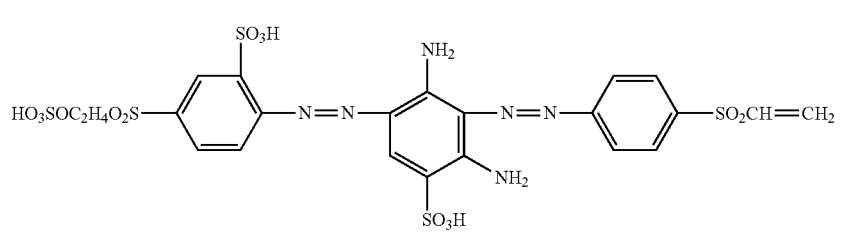
(III-7)
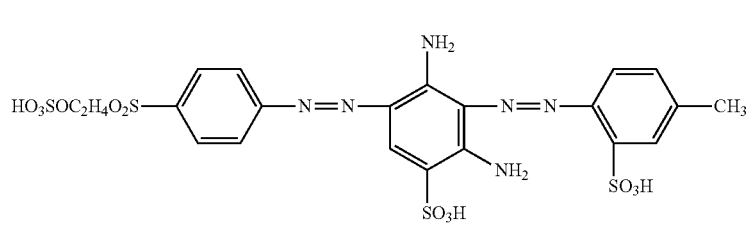
(III-8)
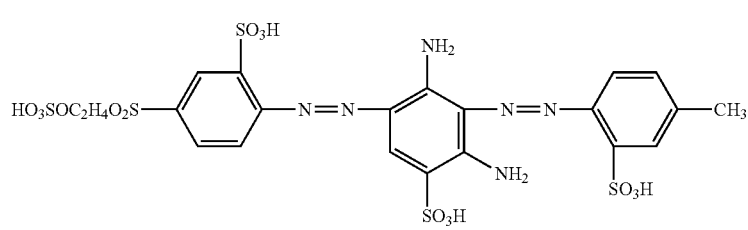
(III-8a)

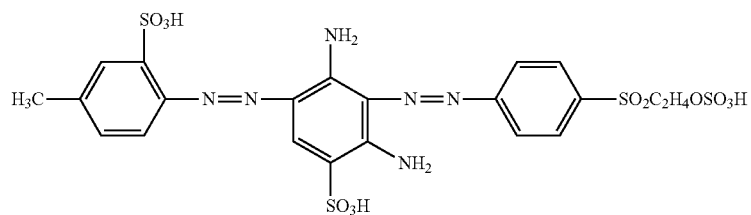
(III-8b)
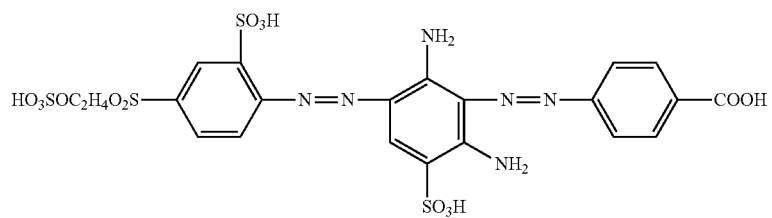
(III-9)
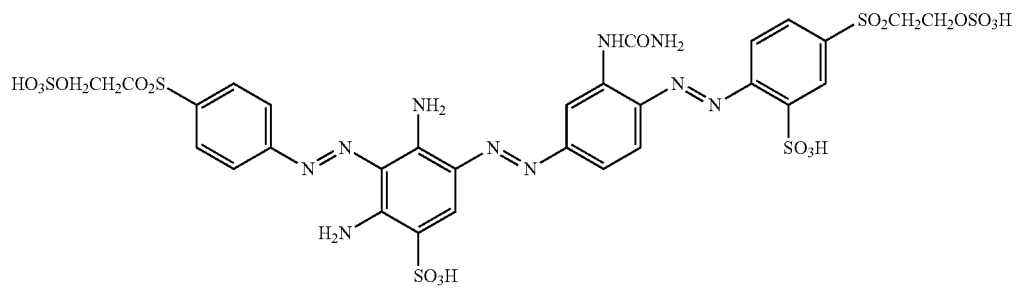
(III-10)
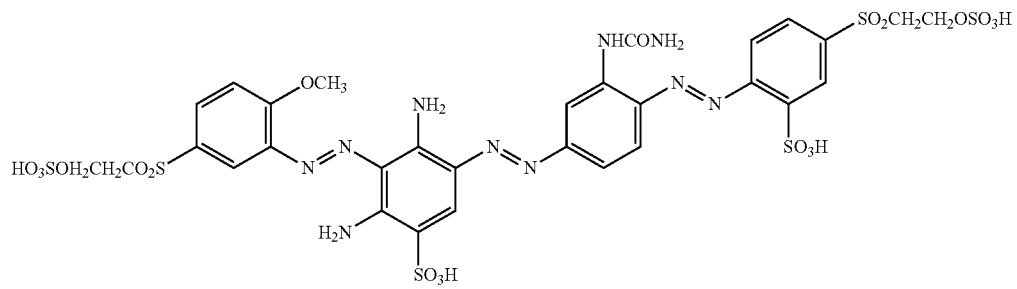
(III-11)
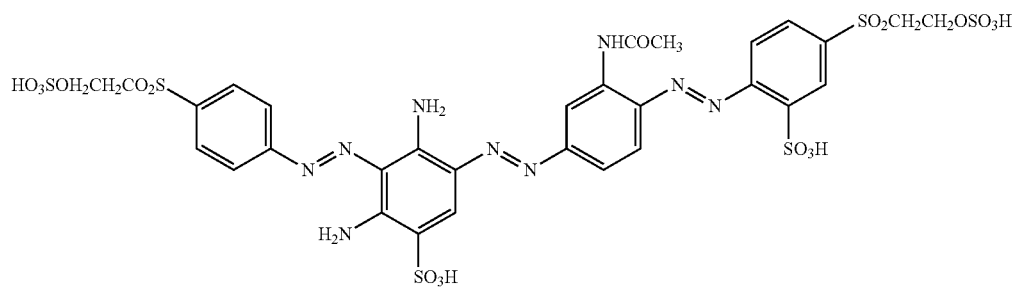
(III-12)
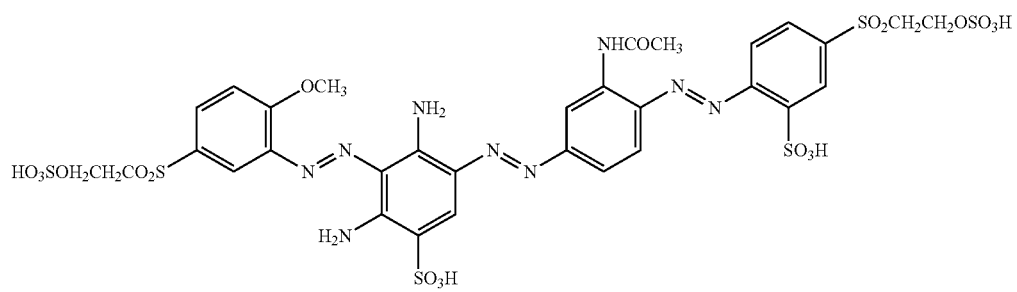
(III-13)

-continued
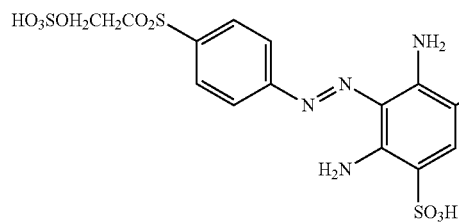
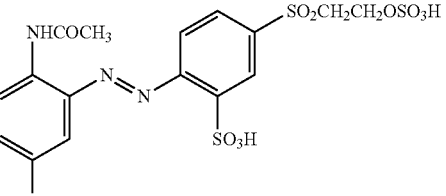
(III-14)
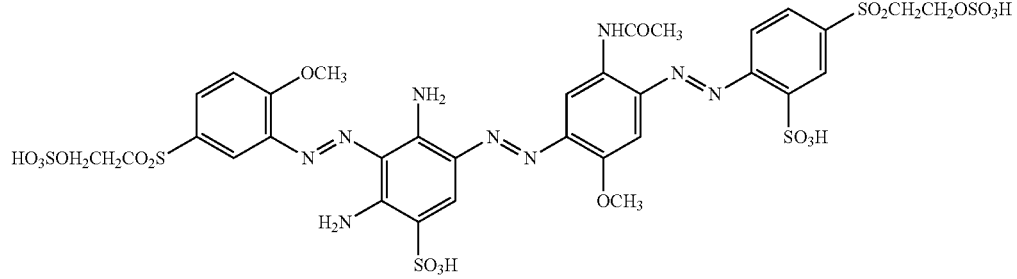
(III-15)
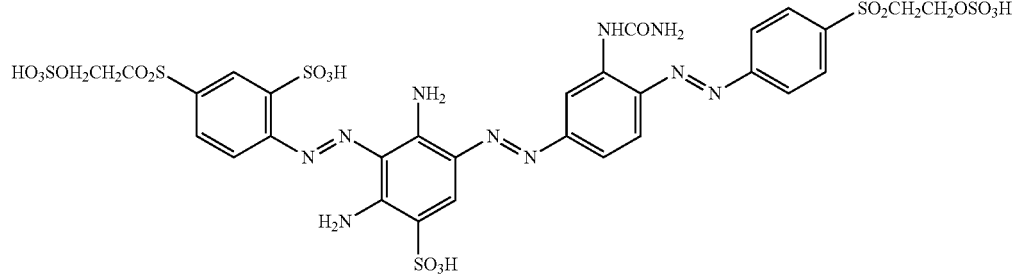
(III-16)
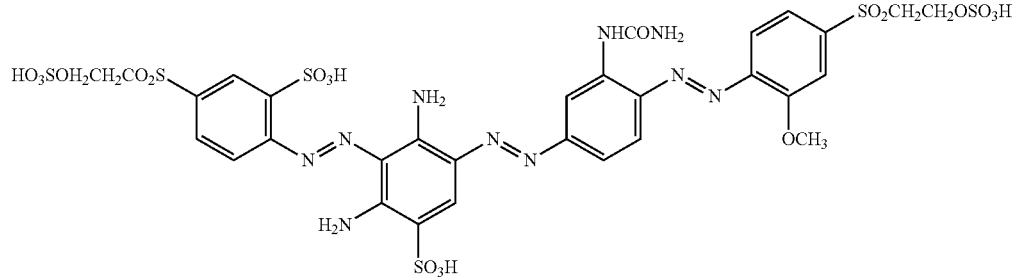
(III-17)
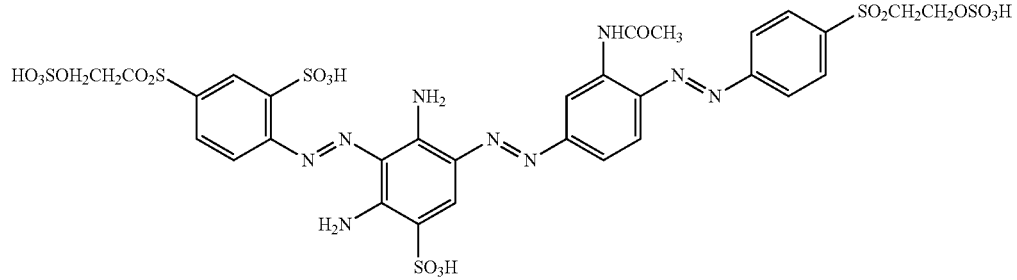
(III-18)

-continued
(III-19)
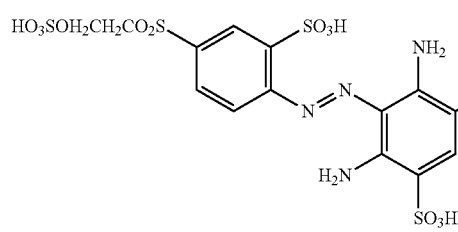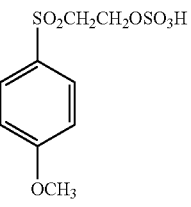
(III-20)
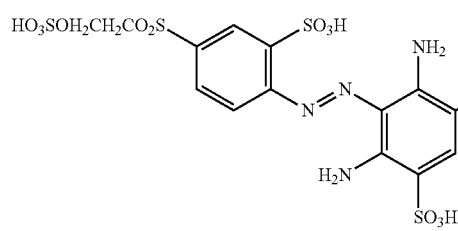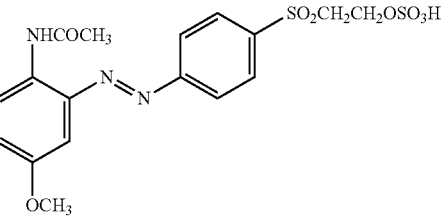
(III-21)
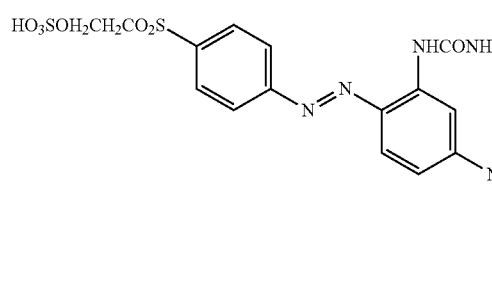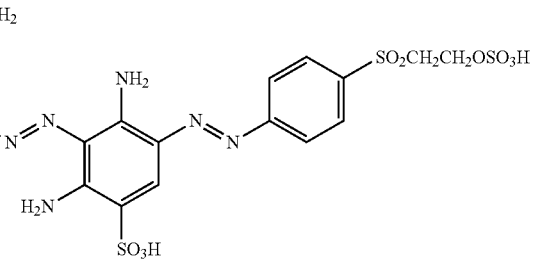
(III-22)
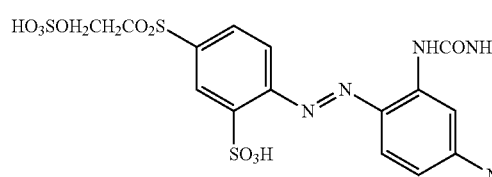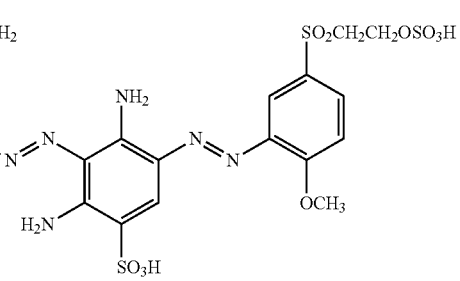
(III-23)
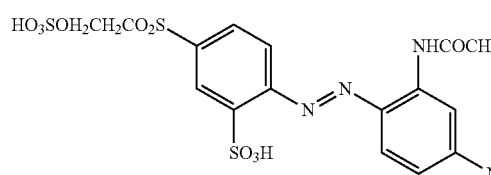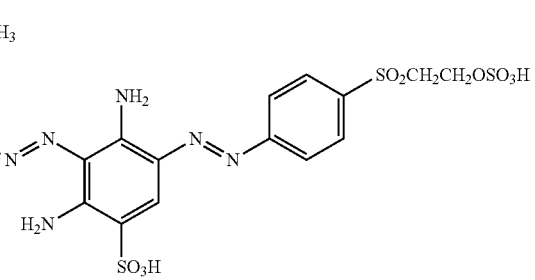

-continued
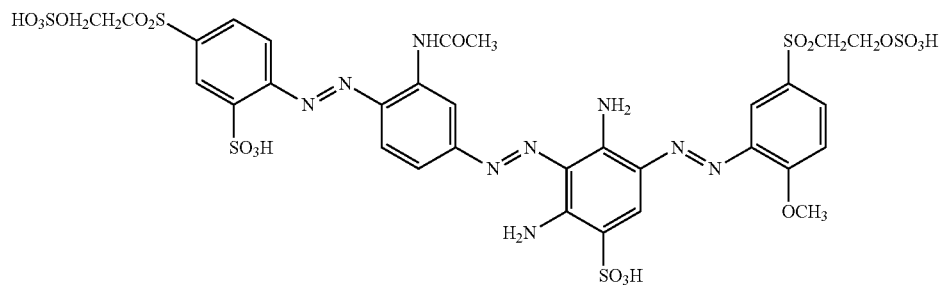
(III-24)
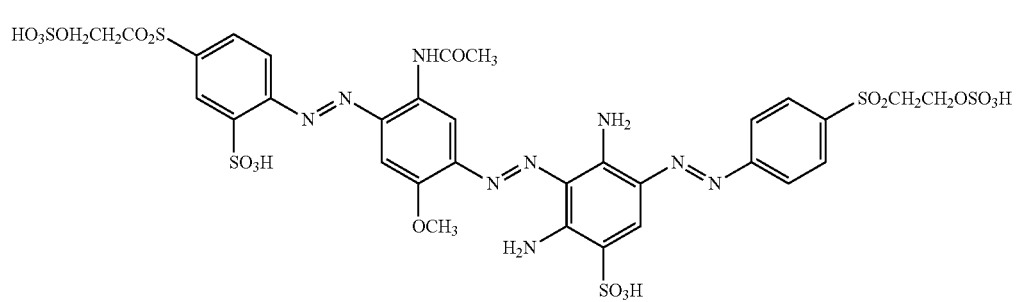
(III-25)
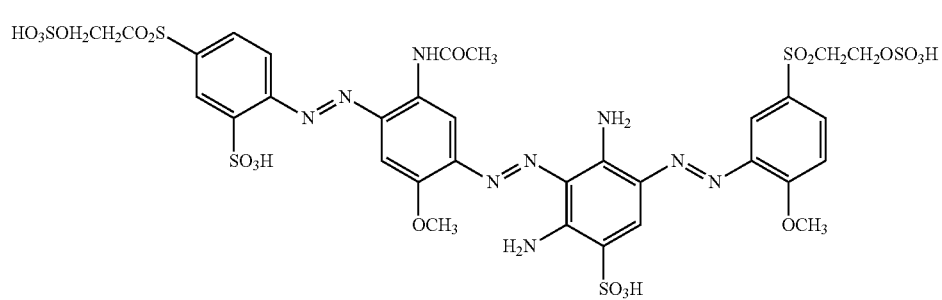
(III-26)
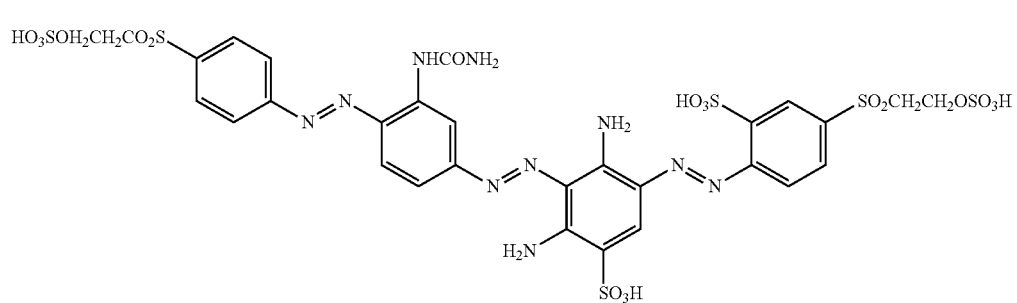
(III-27)
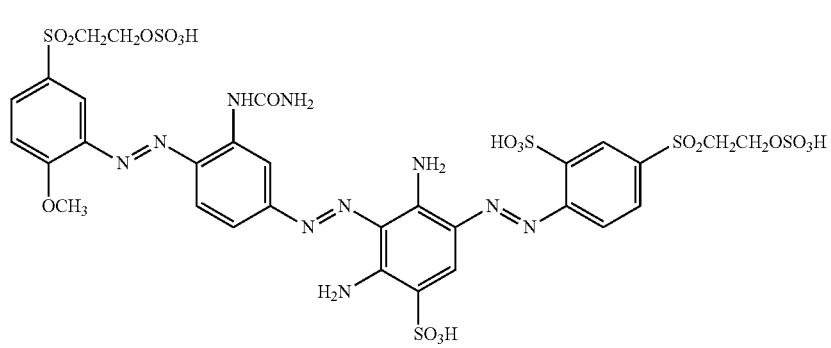
(III-28)

-continued
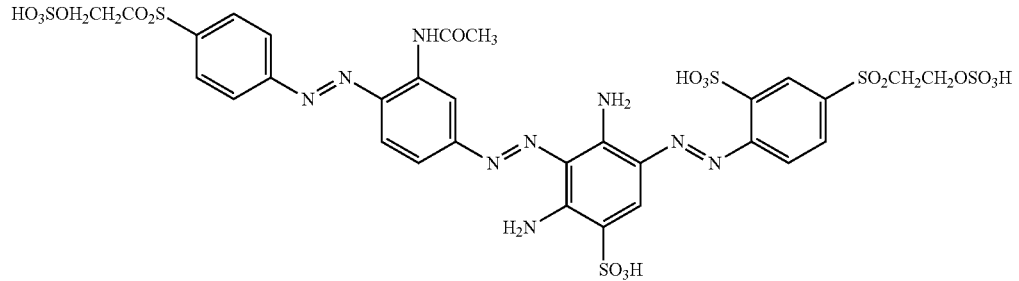
(III-29)
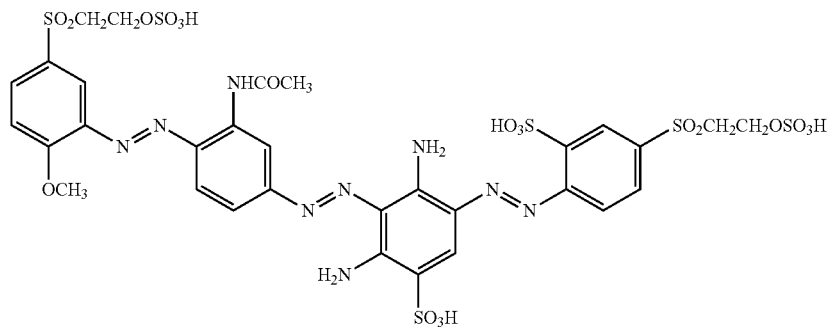
(III-30)
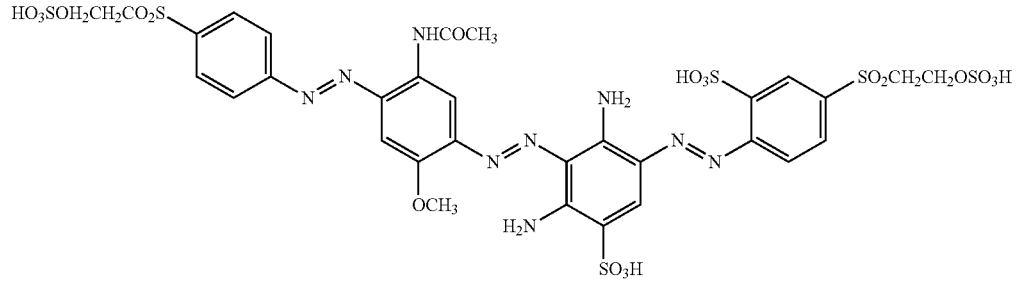
(III-31)
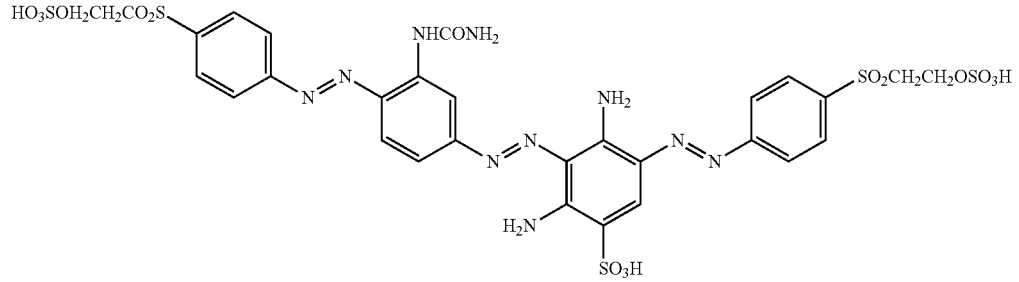
(III-31a)
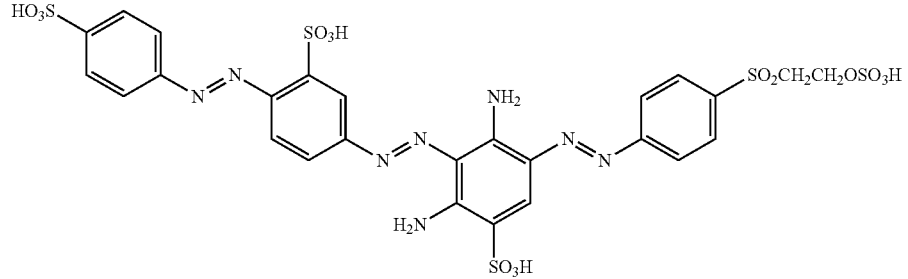
(III-31b)

-continued
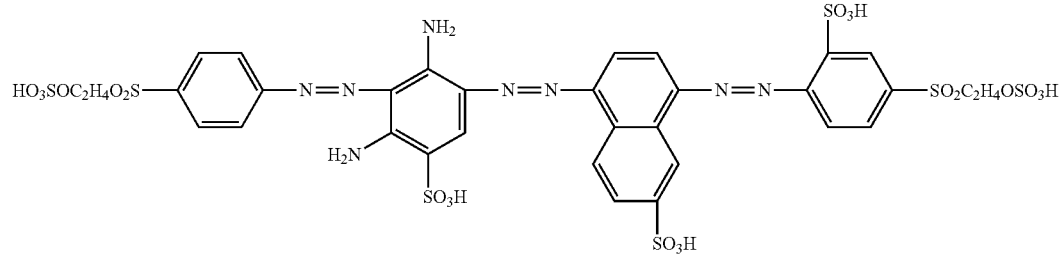
(III-32)
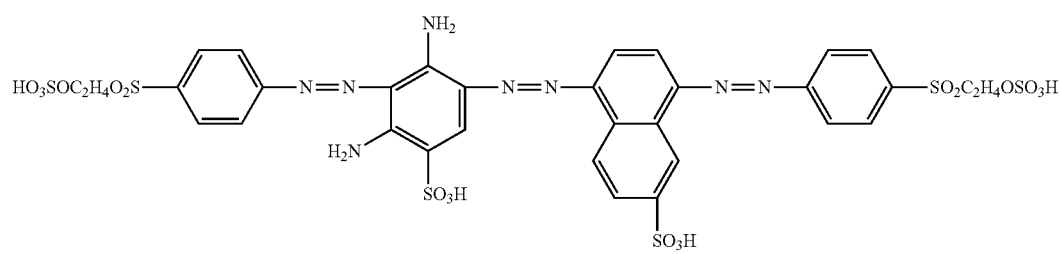
(III-33)
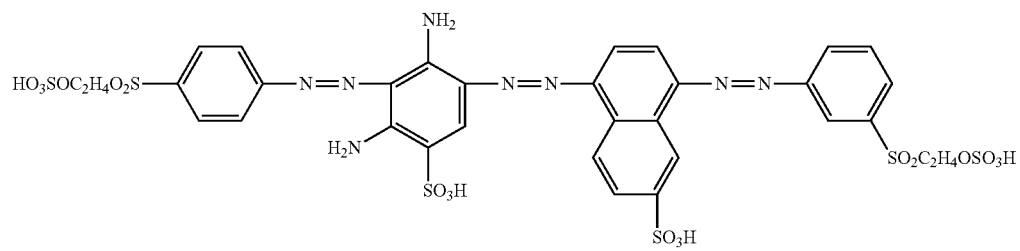
(III-34)
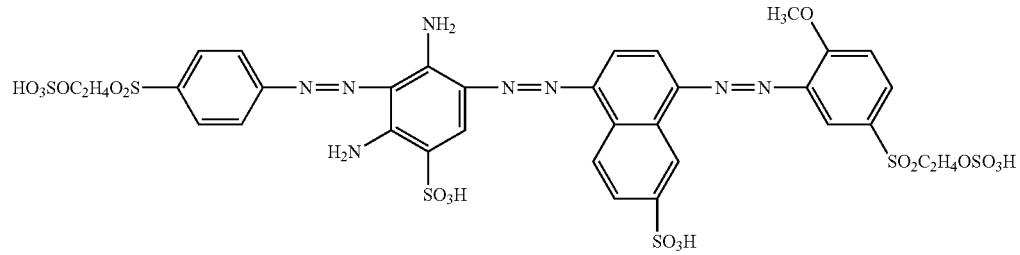
(III-35)
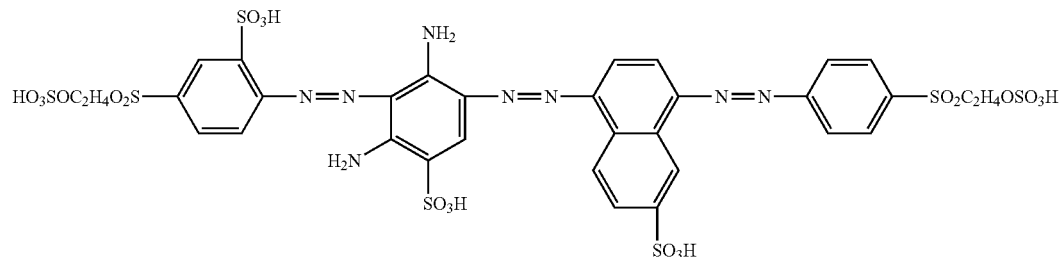
(III-36)
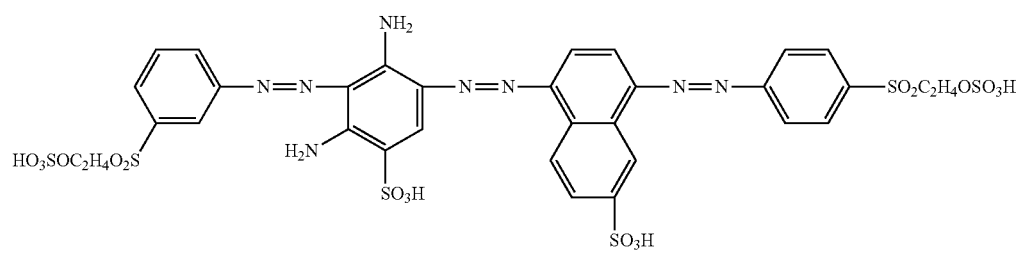
(III-37)

-continued
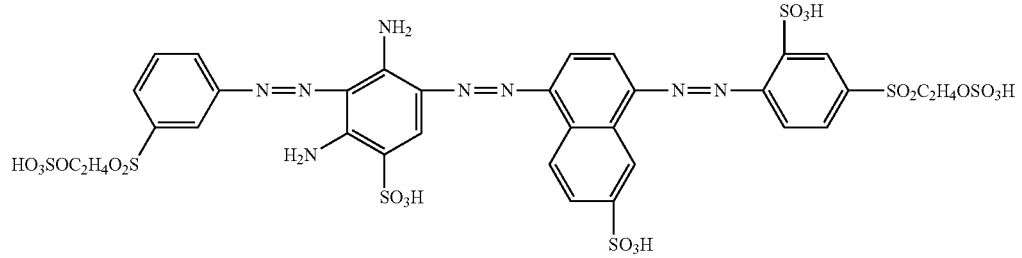
(III-38)
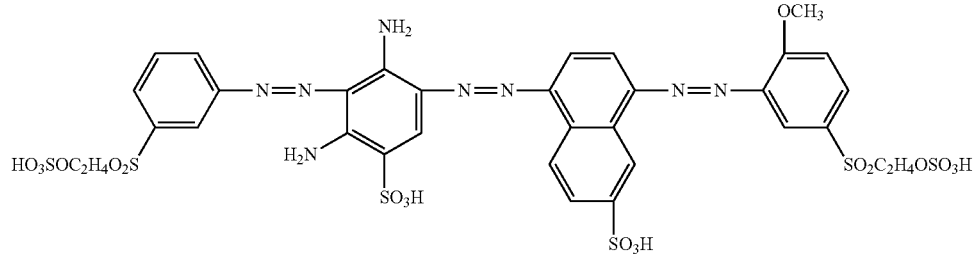
(III-39)
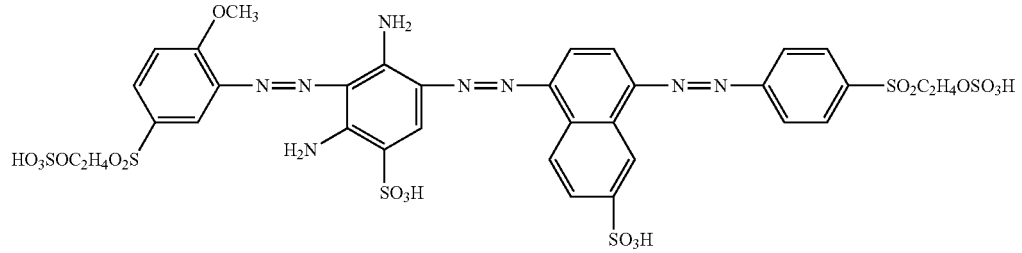
(III-40)
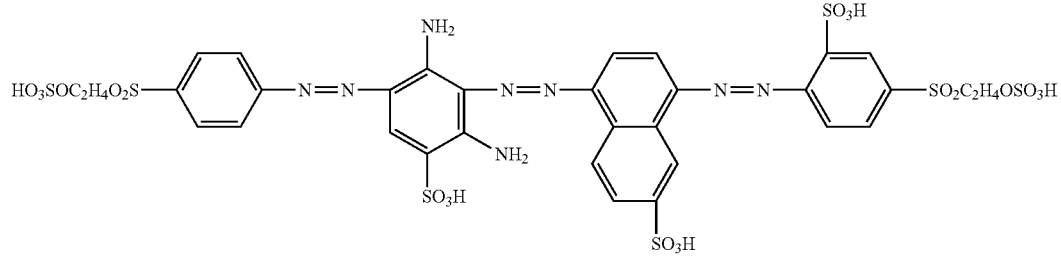
(III-41)
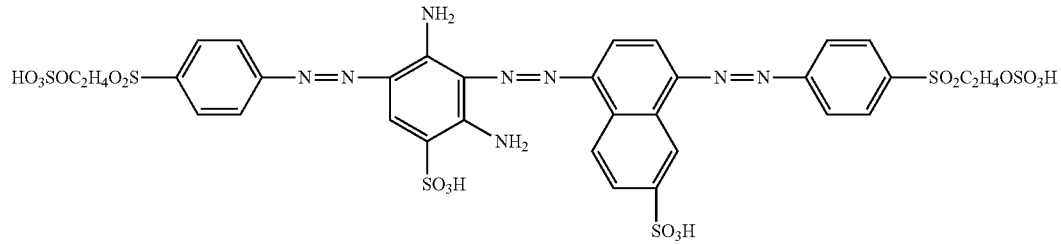
(III-42)
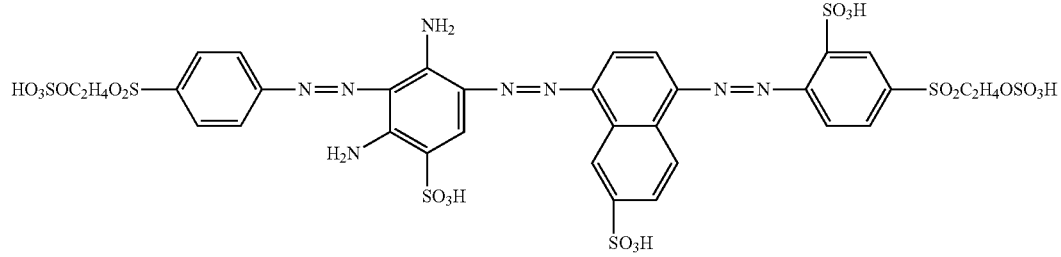
(III-43)

-continued
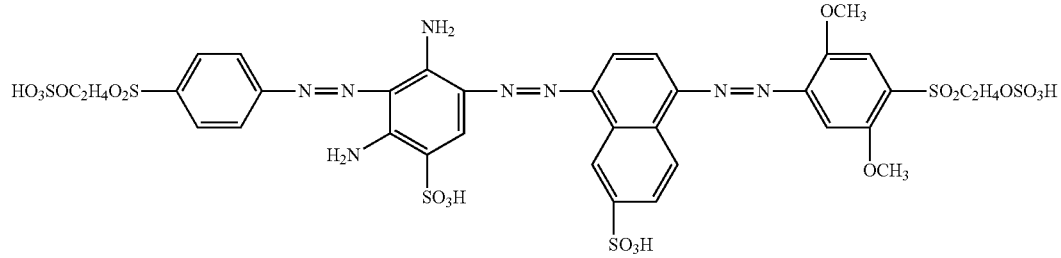
(III-44)
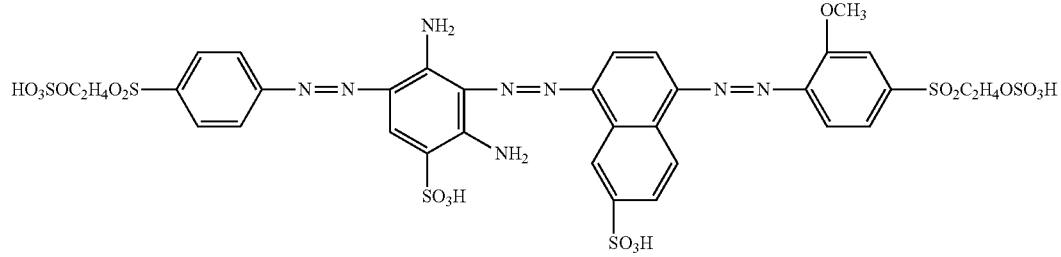
(III-45)
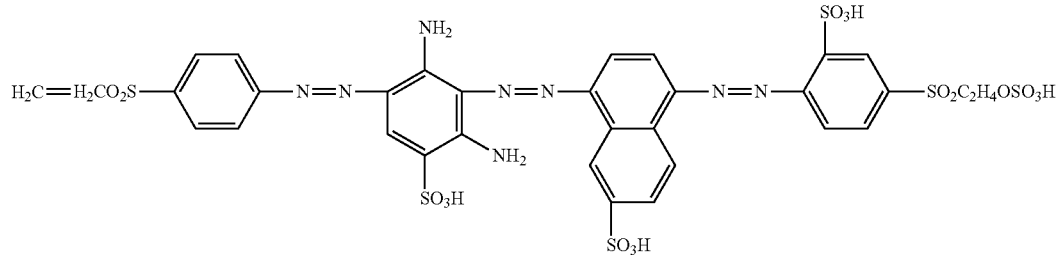
(III-46)
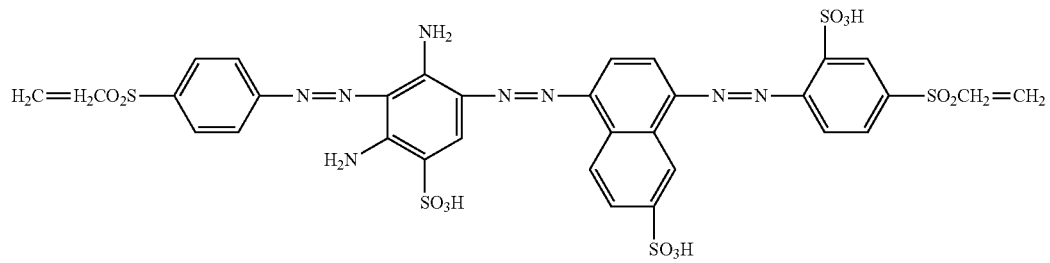
(III-47)
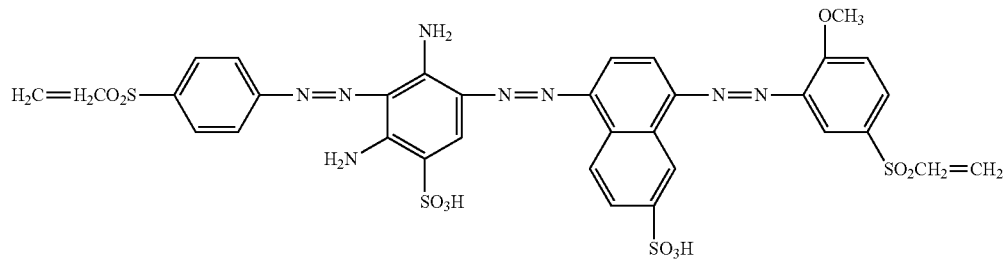
(III-48)

-continued
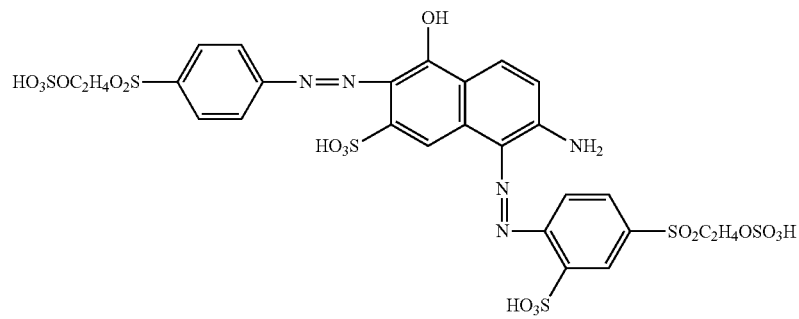
(IV-1)
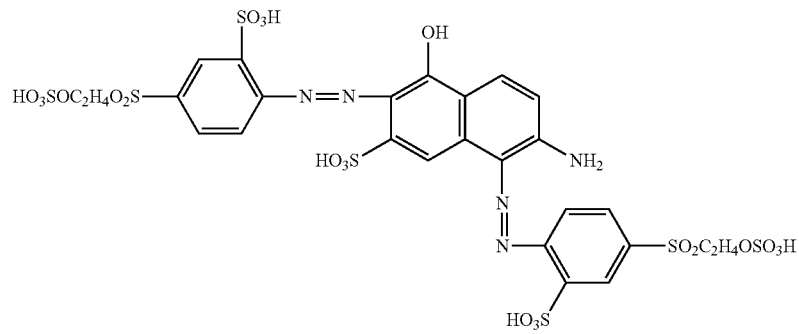
(IV-2)
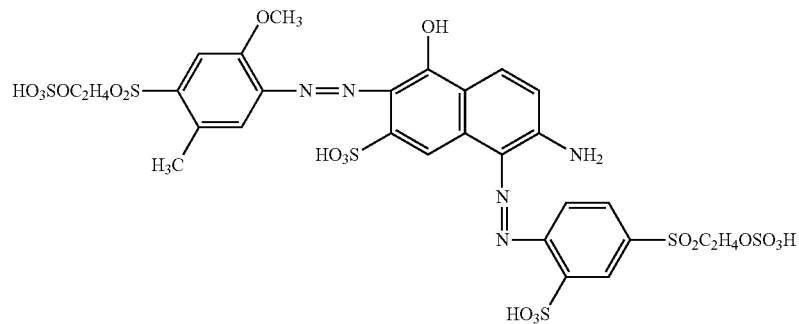
(IV-3)
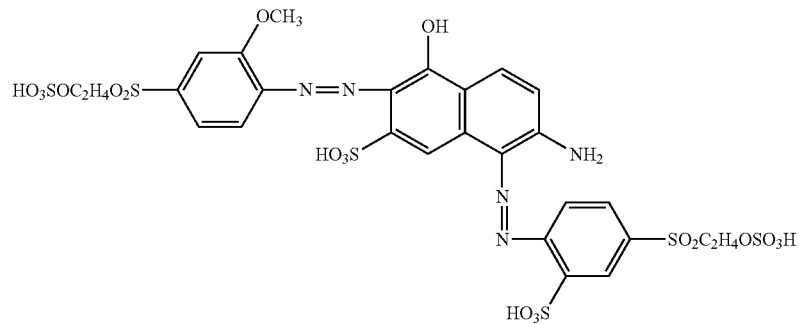
(IV-4)
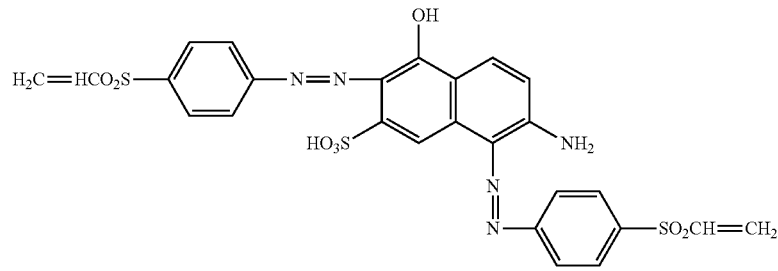
(IV-5)

-continued
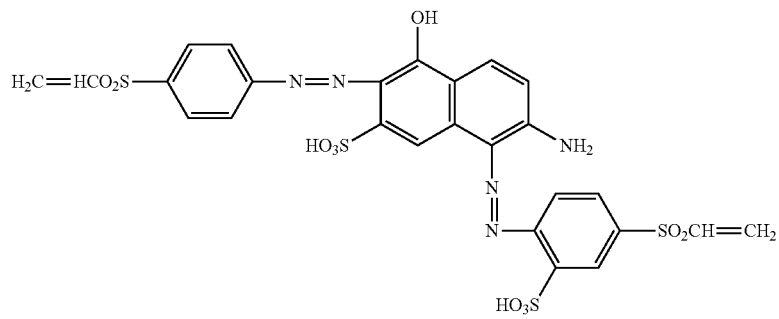
(IV-6)
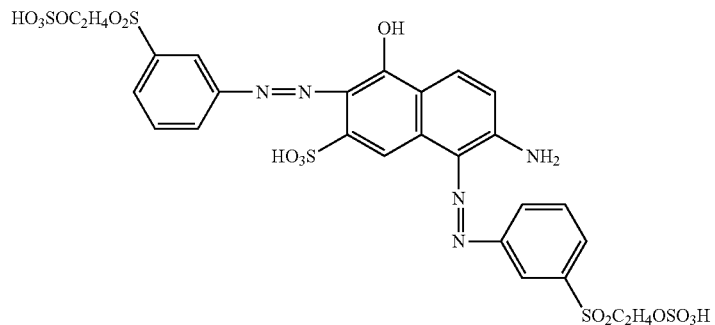
(IV-7)
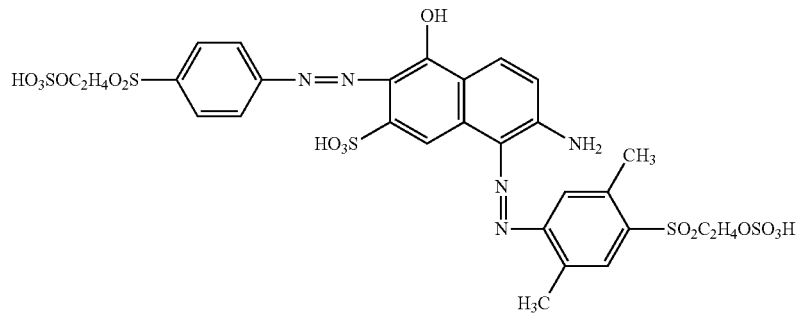
(IV-8)
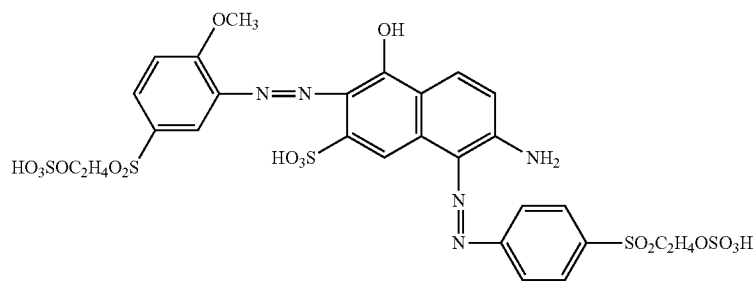
(IV-9)
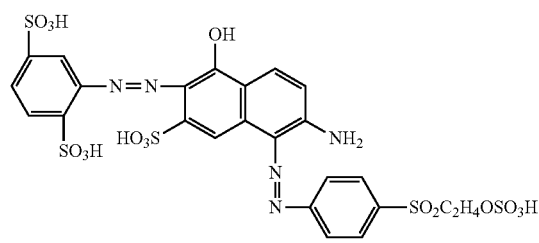
(IV-10)
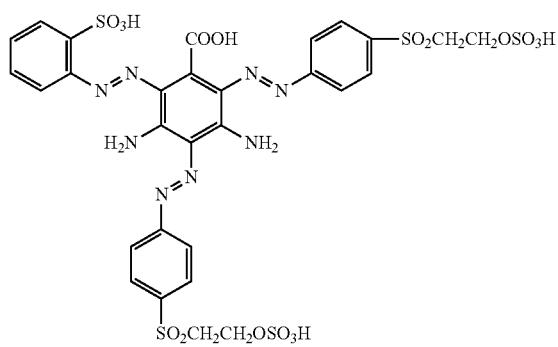
(V-1)

-continued
(V-2)
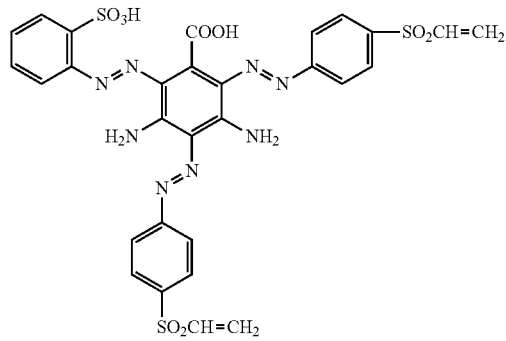
(V-3)
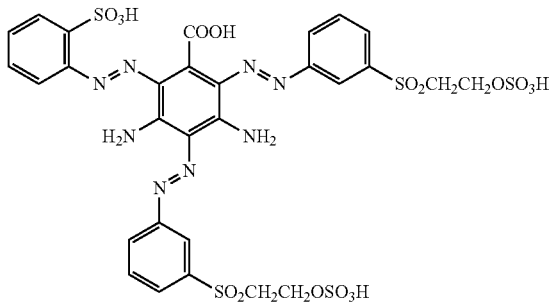
(V-4)
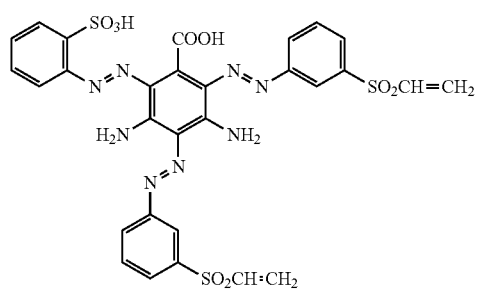
(V-5)
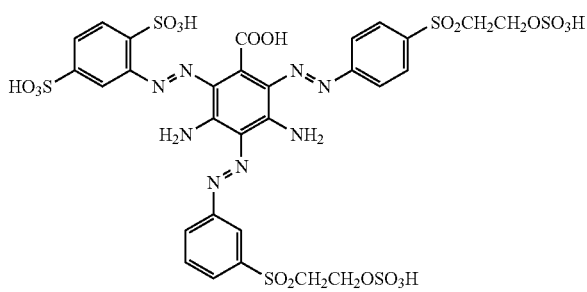
(V-6)
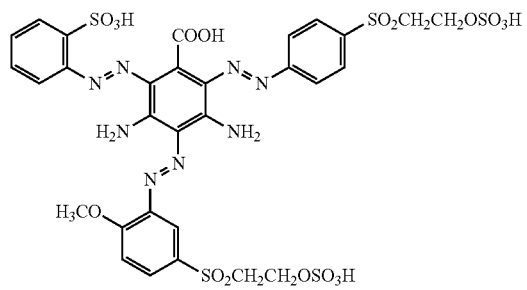
(V-7)
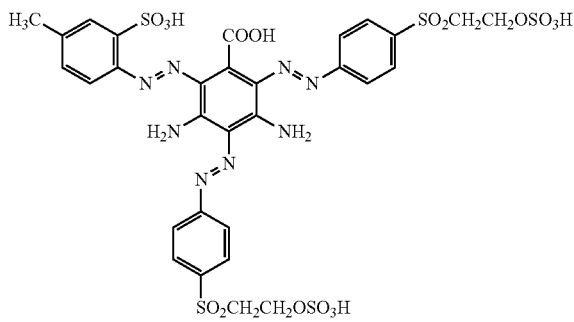
(V-8)
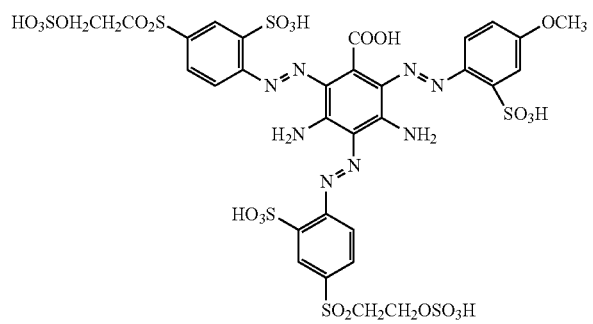
(VI-1)
(VI-2)
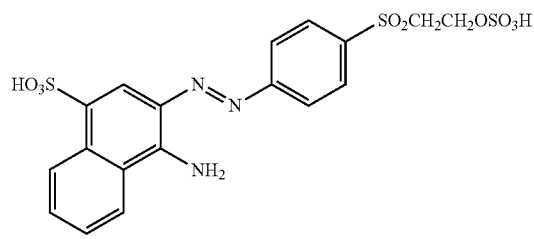
(VI-3)

12. The reactive navy to black dye composition as claimed in claim 8, wherein the reactive navy to black dye composition consists of component A, component B and component C.

13. The reactive navy to black dye composition as claimed in claim 4, wherein the dye composition comprises component A and component B, wherein component A is selected from at least one dye of formulae (I-1), (I-3), (I-4), (I-31), (I-32), (I-41), (I-48), (I-51), (I-52), (I-55) and (I-88);
and component B is selected from the dye of formula (II-1) and/or the dye of formula (II-3);
based on the sum of the mass of component A and component B, the mass percentage of component A is 5% to 50%, and the mass percentage of component B is 50% to 95%,

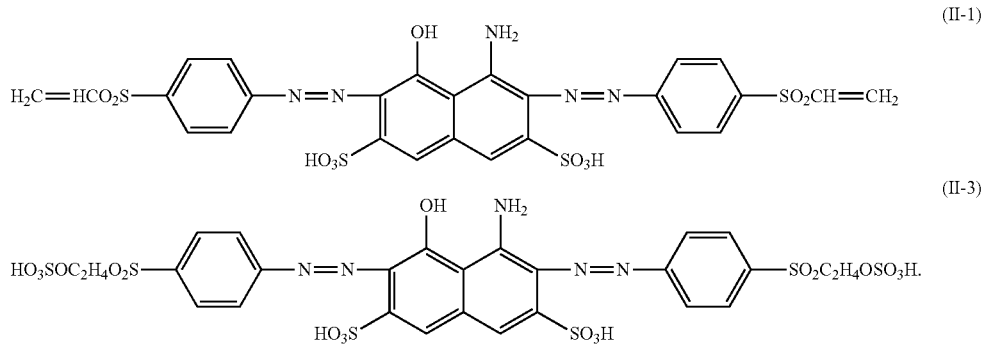

14. The reactive navy to black dye composition as claimed in claim 4, wherein the dye composition comprises component A, component B and component C, wherein
component A is selected from at least one dye of formulae (I-1), (I-3), (I-4), (I-31), (I-32), (I-41), (I-48), (I-51), (I-52), (I-55) and (I-88);
component B is selected from the dye of formula (II-1) and/or the dye of formula (II-3);
and component C is selected from at least one dye of formulae (III-1), (III-2), (III-4), (IV-1) and (IV-3);
based on the sum of the mass of component A and component B, the mass percentage of component A is 5% to 50%, the mass percentage of component B is 50% to 95%, and the mass of component C is 1% to 50% of the total mass of component A and component B,

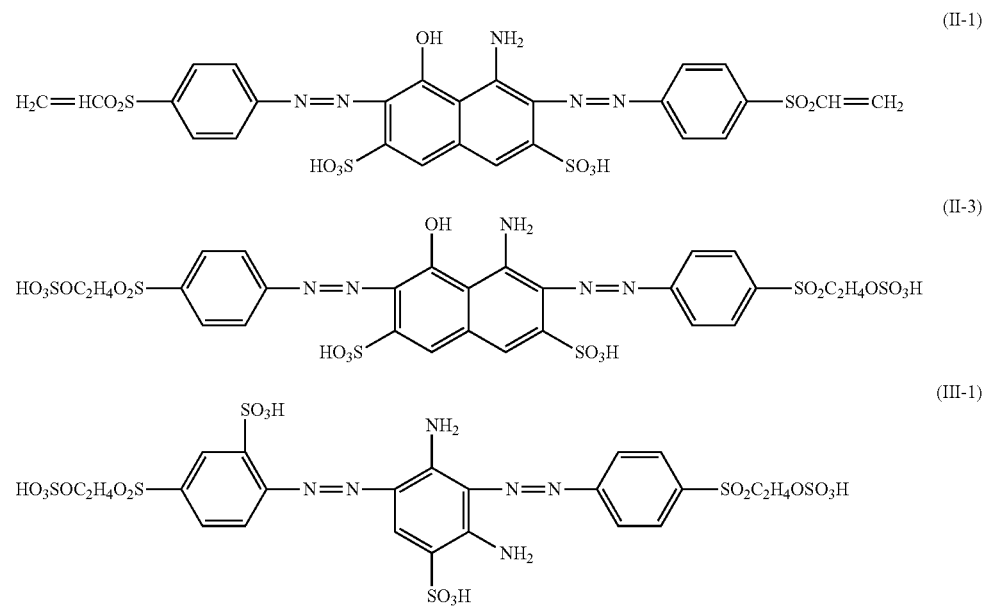

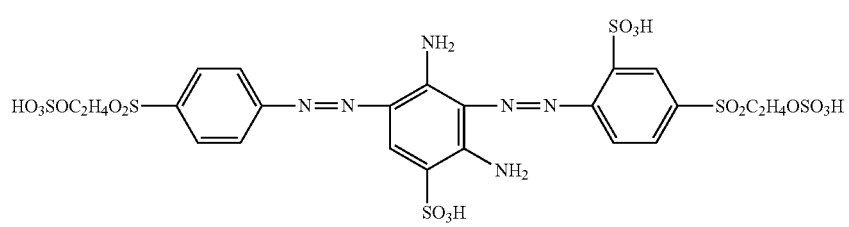
(III-2)
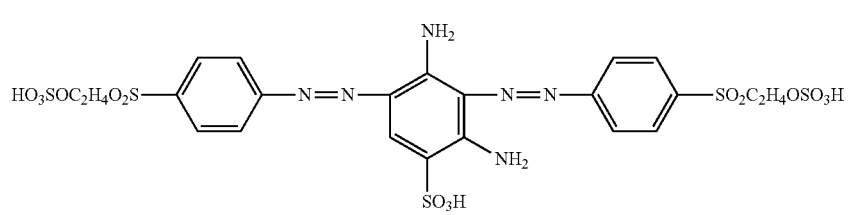
(III-4)
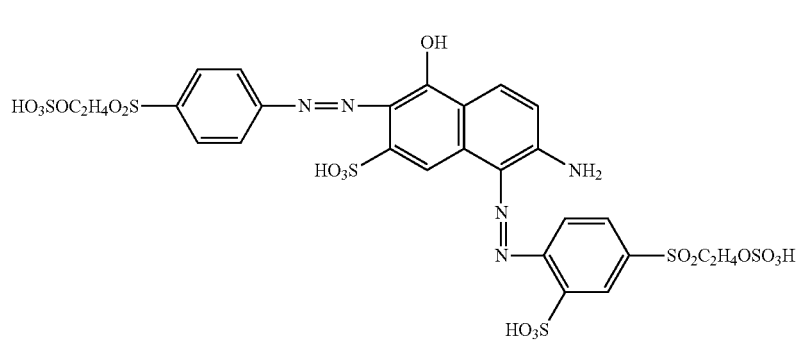
(IV-1)
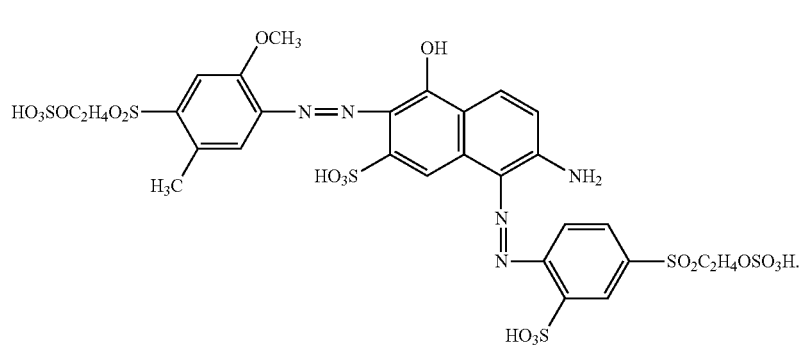
(IV-3)
15. The reactive navy to black dye composition as claimed in claim 1, wherein the dye of the general formula (I) contains a quinohydrazone structure of the following formula (Ia) and/or formula (Ib) and/or (Ic) and/or (Id), and the dye of the general formula (II) contains a quinohydrazone structure of the following formula (IIa):

(Ia) 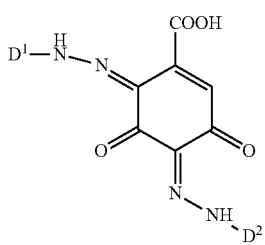

(Ib) 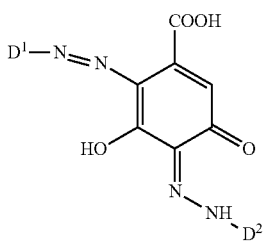

(Ic) 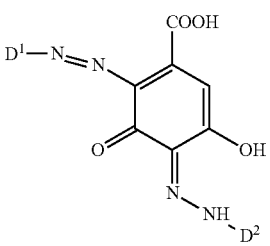

(Id) 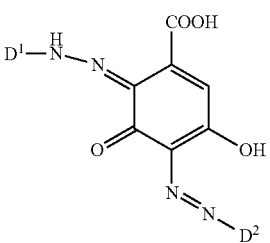

(IIa) 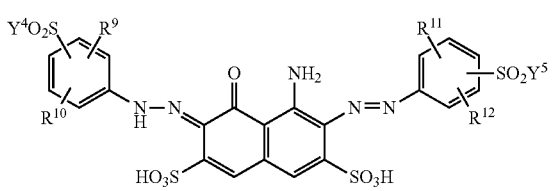

the definitions of the substituents of the above formulae (Ia)~(Id) are the same as that of formula (I), and the definitions of the substituents of formula (IIa) is the same as that of formula (II).

16. The reactive navy to black dye composition as claimed in claim 8, wherein the dye of the general formula (IV) contains a quinohydrazone structure of the following formula (IVa):

(IVa) 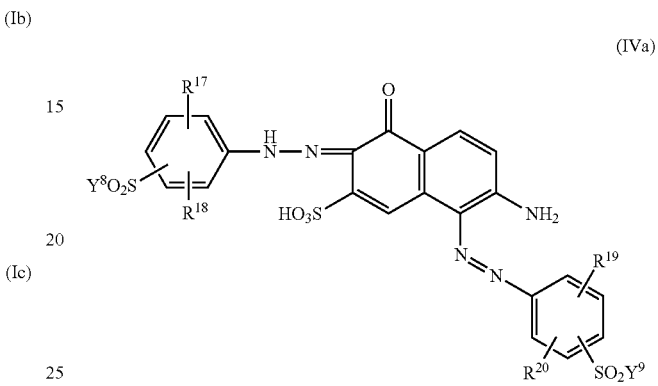

the definitions of the substituents of the above formula (Iva) is the same as that of formula (IV).

17. A reactive navy to black dye product, comprising the navy to black dye composition as claimed in claim 1.

18. The reactive navy to black dye composition as claimed in claim 1, wherein the alkali metal salt is sodium or potassium salt.

19. The reactive navy to black dye composition as claimed in claim 1, wherein the alkali metal salt is sodium salt.

20. The reactive navy to black dye composition as claimed in claim 8, wherein the alkali metal salt is sodium or potassium salt.

21. The reactive navy to black dye composition as claimed in claim 8, wherein the alkali metal salt is sodium salt.

* * * * *